US009968838B2

(12) United States Patent
Daniels et al.

(10) Patent No.: US 9,968,838 B2
(45) Date of Patent: May 15, 2018

(54) SYSTEMS AND METHODS FOR MARTIAL ARTS TRAINING DEVICES WITH ANATOMICALLY ACCURATE FORCE, PRESSURE AND OTHER RESPONSE

(71) Applicants: David Daniels, Summit, NJ (US); David Ordini, Summit, NJ (US)

(72) Inventors: David Daniels, Summit, NJ (US); David Ordini, Summit, NJ (US)

(*) Notice: Subject to any disclaimer, the term of this patent is extended or adjusted under 35 U.S.C. 154(b) by 0 days. days.

(21) Appl. No.: 14/855,347

(22) Filed: Sep. 15, 2015

(65) Prior Publication Data

US 2016/0101338 A1 Apr. 14, 2016

Related U.S. Application Data

(63) Continuation-in-part of application No. PCT/US2014/031131, filed on Mar. 18, 2014.
(Continued)

(51) Int. Cl.
*A63B 69/34* (2006.01)
*A63B 24/00* (2006.01)
(Continued)

(52) U.S. Cl.
CPC .......... *A63B 69/34* (2013.01); *A63B 24/0003* (2013.01); *A63B 69/004* (2013.01);
(Continued)

(58) Field of Classification Search
CPC ... A63B 69/34; A63B 24/0003; A63B 69/004; A63B 2250/58; A63B 2220/53;
(Continued)

(56) References Cited

U.S. PATENT DOCUMENTS 2,781,611 A * 2/1957 Bills ...................... A63H 3/001
434/267

3,027,655 A * 4/1962 Alderson ............... G09B 23/32
434/268
(Continued)

FOREIGN PATENT DOCUMENTS

GB 2490363 A 10/2012
WO 2006110629 A1 10/2006
(Continued)

OTHER PUBLICATIONS

Eurasian Search Report, Application No. 201591788, dated May 25, 2016.
(Continued)

*Primary Examiner* — Sundhara Ganesan
(74) *Attorney, Agent, or Firm* — Schwabe, Williamson & Wyatt, P.C

(57) ABSTRACT

An exemplary martial arts training device comprises anatomically correct legs, arms, torso and head that can be used individually, or partly or fully assembled. A user interacts with the device, and receives both immediate feedback and a global analysis of his training session. Feedback can include whether proper forces and angles were applied to achieve an actual break or other desired fighting goal in an opponent, and can be measured by the actual breaking of various strike points on the device, or by alerting the user when an appropriate sensor is struck with the required strength. The device can include breakable joints, bones, as well as soft tissue targets preset to respond to a defined striking force or joint manipulation. The user can reset the damaged physical structure or response sensor to its original configuration and setting, making the device repeatedly reusable.

21 Claims, 96 Drawing Sheets
(52 of 96 Drawing Sheet(s) Filed in Color)

Related U.S. Application Data

(60) Provisional application No. 61/800,892, filed on Mar. 15, 2013.

(51) Int. Cl.
*G06K 9/00* (2006.01)
*A63B 69/00* (2006.01)

(52) U.S. Cl.
CPC .. *G06K 9/00342* (2013.01); *A63B 2069/0042* (2013.01); *A63B 2069/0044* (2013.01); *A63B 2220/53* (2013.01); *A63B 2220/58* (2013.01); *A63B 2220/833* (2013.01); *A63B 2225/20* (2013.01)

(58) Field of Classification Search
CPC ...... A63B 2220/833; A63B 2069/0044; A63B 2225/20; A63B 2069/0042; G06K 9/00342
See application file for complete search history.

(56) References Cited

U.S. PATENT DOCUMENTS

| | | | | |
|---|---|---|---|---|
| 3,557,471 A * | 1/1971 | Payne et al. | ........... | G09B 23/32 434/270 |
| 3,861,676 A * | 1/1975 | Paul | ........... | A63B 69/34 482/83 |
| 3,895,451 A * | 7/1975 | Smrcka | ........... | A63H 3/003 264/DIG. 14 |
| 4,000,564 A * | 1/1977 | Haffner | ........... | G05B 19/075 434/274 |
| 4,088,315 A * | 5/1978 | Schemmel | ........... | A63B 69/34 482/4 |
| 4,350,490 A * | 9/1982 | Sandegard | ........... | G09B 23/32 434/274 |
| 4,605,373 A * | 8/1986 | Rosen | ........... | G09B 23/32 434/274 |
| 4,802,858 A * | 2/1989 | Lindskog | ........... | G09B 23/32 434/274 |
| 4,850,877 A * | 7/1989 | Mason | ........... | A61B 5/1107 434/274 |
| 5,419,706 A * | 5/1995 | Levy | ........... | B43L 1/008 434/267 |
| 5,700,230 A * | 12/1997 | Cardona | ........... | A63B 69/34 482/83 |
| 6,155,960 A * | 12/2000 | Roberts | ........... | A63B 69/34 482/83 |
| 6,422,945 B1 | 7/2002 | Okita et al. | | |
| 6,478,500 B1 * | 11/2002 | Farenholtz | ........... | A47F 8/00 223/66 |
| 7,828,701 B1 * | 11/2010 | Chen | ........... | A63B 69/004 482/83 |
| 7,833,130 B1 | 11/2010 | Horvath | | |
| 8,025,612 B1 * | 9/2011 | Buzzanco | ........... | A63B 21/0087 482/83 |
| 8,439,688 B2 * | 5/2013 | Wilkins | ........... | G09B 23/28 434/262 |
| 8,777,818 B1 * | 7/2014 | Tate, Jr. | ........... | A63B 69/004 482/83 |
| 9,021,857 B1 * | 5/2015 | Squire | ........... | G01L 5/0052 73/12.04 |
| 9,050,514 B1 * | 6/2015 | Mirza | ........... | A63B 69/004 |
| 9,227,128 B1 * | 1/2016 | Carfagna, Jr. | ........ | A63B 69/32 |
| 2001/0019818 A1 | 9/2001 | Yong | | |
| 2002/0193211 A1 * | 12/2002 | Kao | ........ | A63B 69/34 482/83 |
| 2005/0167925 A1 * | 8/2005 | Lewis | ........... | A63B 69/004 273/403 |
| 2009/0098955 A1 * | 4/2009 | Crook, II | ........... | A63B 69/345 473/422 |
| 2009/0305215 A1 | 12/2009 | Wilkins | | |
| 2010/0130329 A1 * | 5/2010 | Sullivan | ........... | A63B 69/004 482/4 |
| 2011/0111924 A1 * | 5/2011 | Jones | ........... | A63B 69/32 482/8 |
| 2011/0130183 A1 * | 6/2011 | Pelletter | ........... | A63B 69/004 463/7 |
| 2011/0281695 A1 * | 11/2011 | Machado | ........... | A63B 69/34 482/83 |
| 2014/0155228 A1 * | 6/2014 | Salerno | ........... | A63B 69/004 482/84 |
| 2014/0302969 A1 * | 10/2014 | Chen | ........... | A63B 69/203 482/90 |
| 2015/0065312 A1 * | 3/2015 | Harrigan | ........... | A63B 69/32 482/84 |

FOREIGN PATENT DOCUMENTS

| | | | |
|---|---|---|---|
| WO | 2007103178 A1 | 9/2007 | |
| WO | 2008129248 A1 | 10/2008 | |
| WO | WO2008/129248 A1 | 10/2008 | |

OTHER PUBLICATIONS

International Search Report, Application No. PCT/US2014/031131, dated Aug. 18, 2014.
Supplementary European Search Report dated Aug. 9, 2016, issued in related European patent application No. 14764724.
Communication pursuant to Article 94(3) EPC, dated Aug. 11, 2017, issued in related European patent application No. 14764724, 5 pages.
Eurasian Patent Application No. 201591788; Office Action; Dec. 4, 2017.
Japanese Patent Application No. 2016-502611; Office Action; Feb. 6, 2018.

* cited by examiner

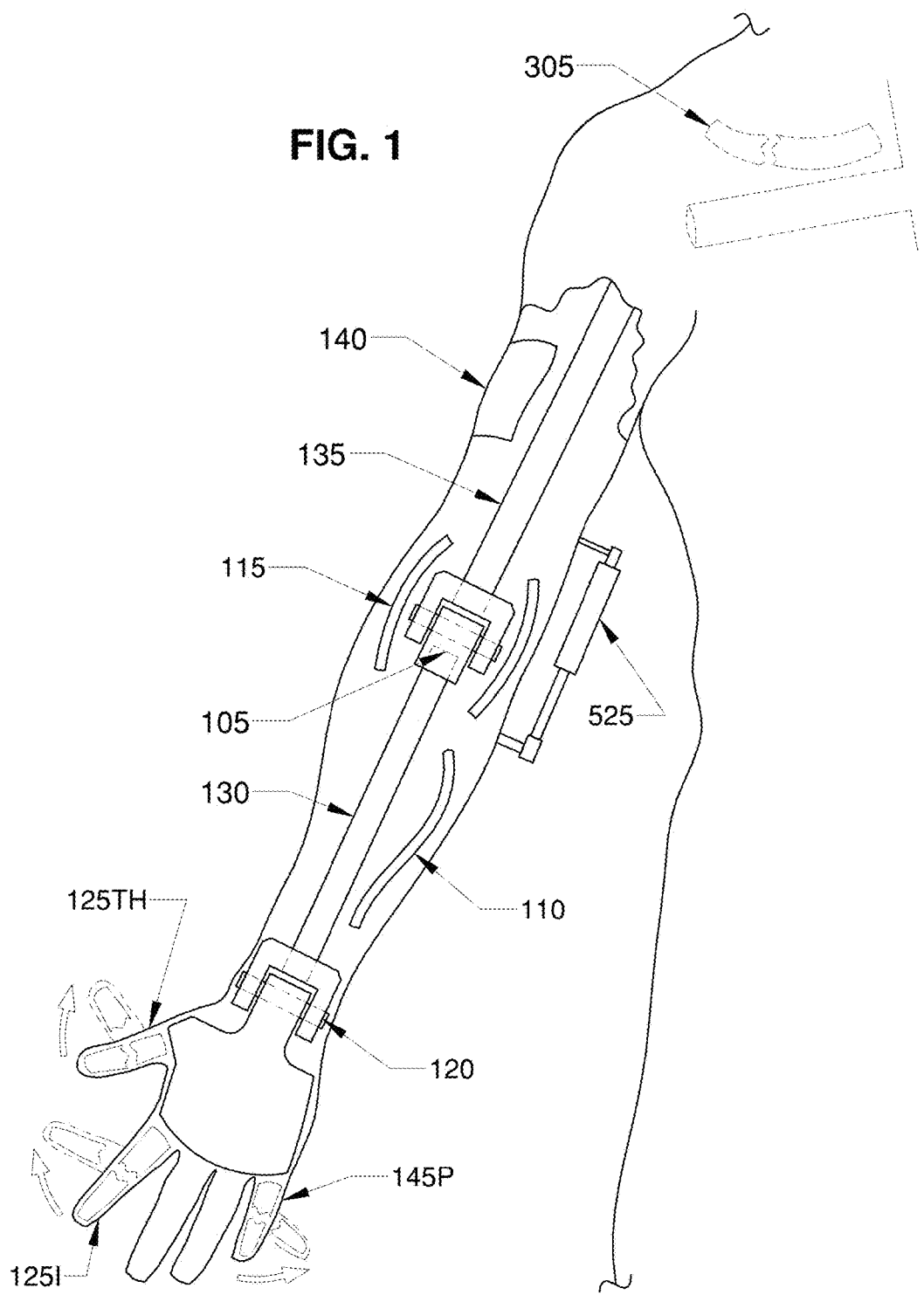

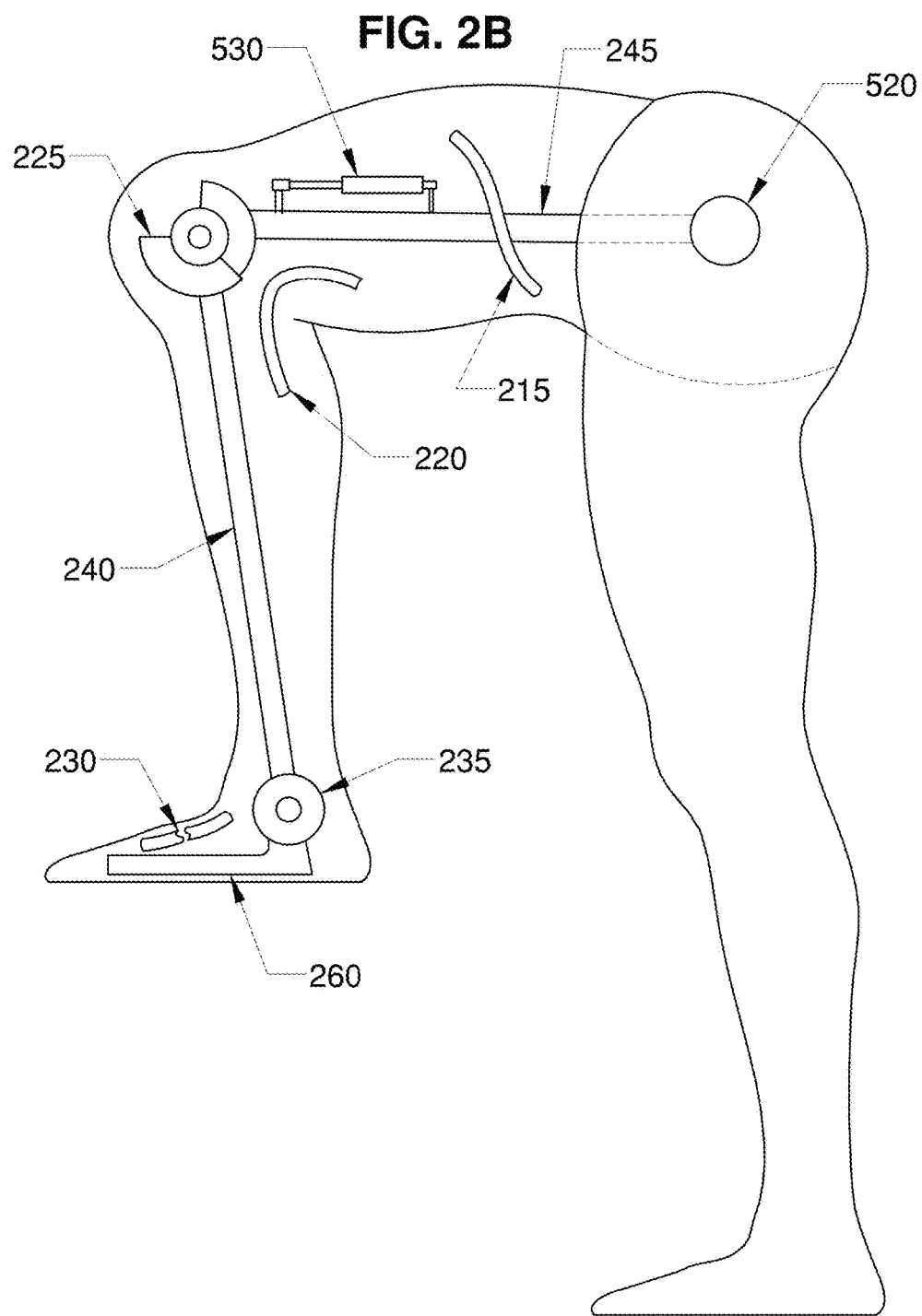

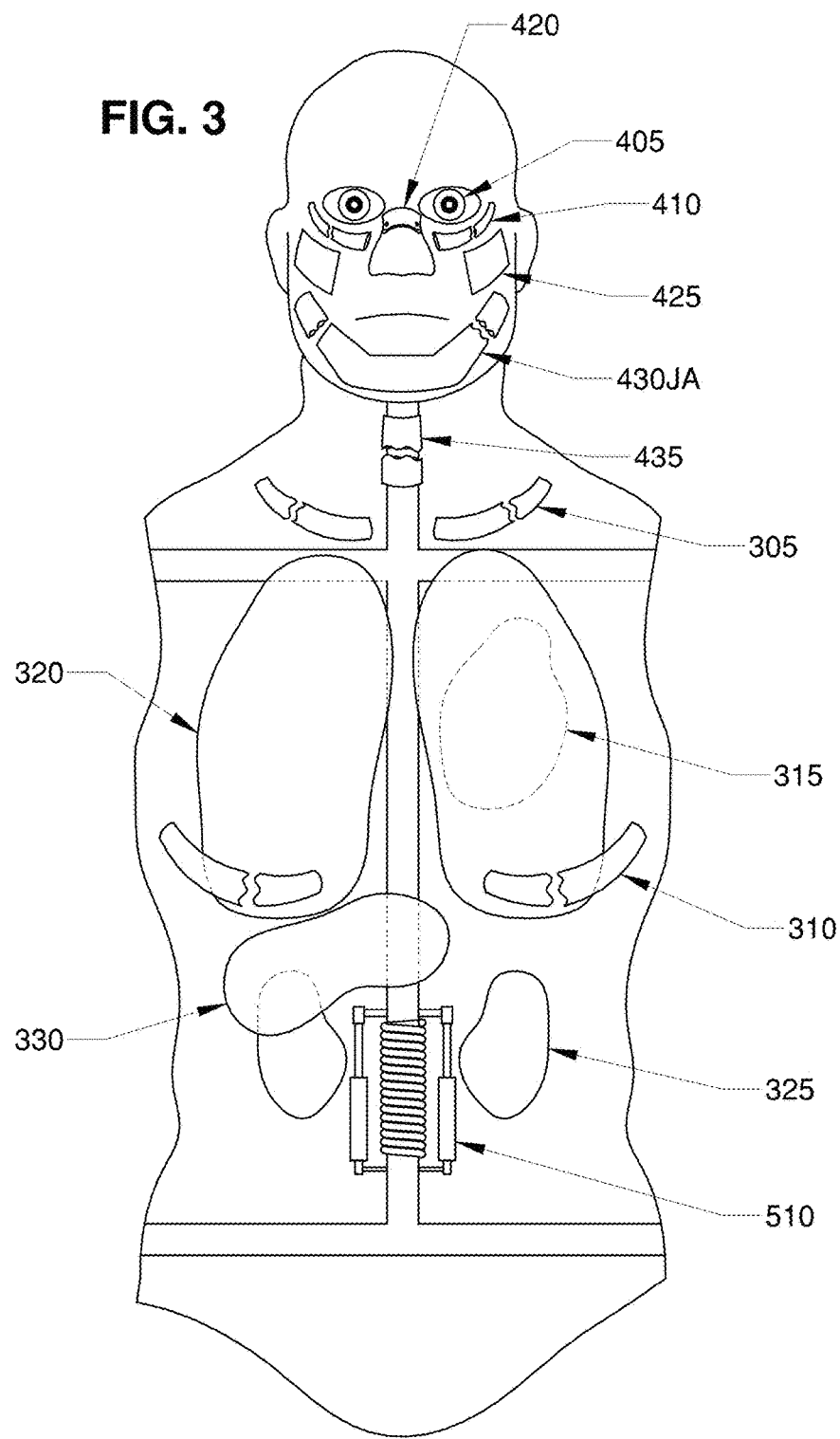

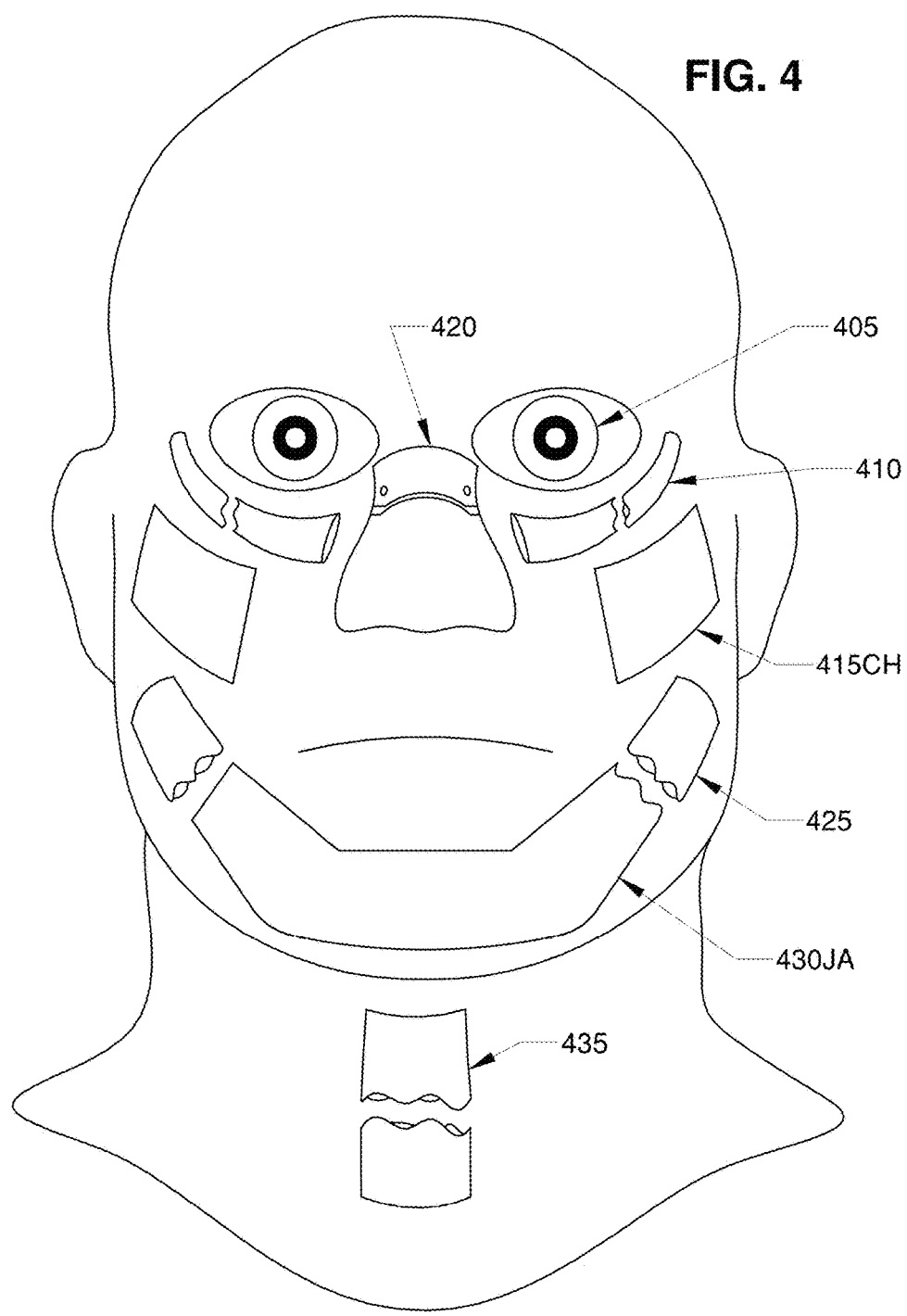

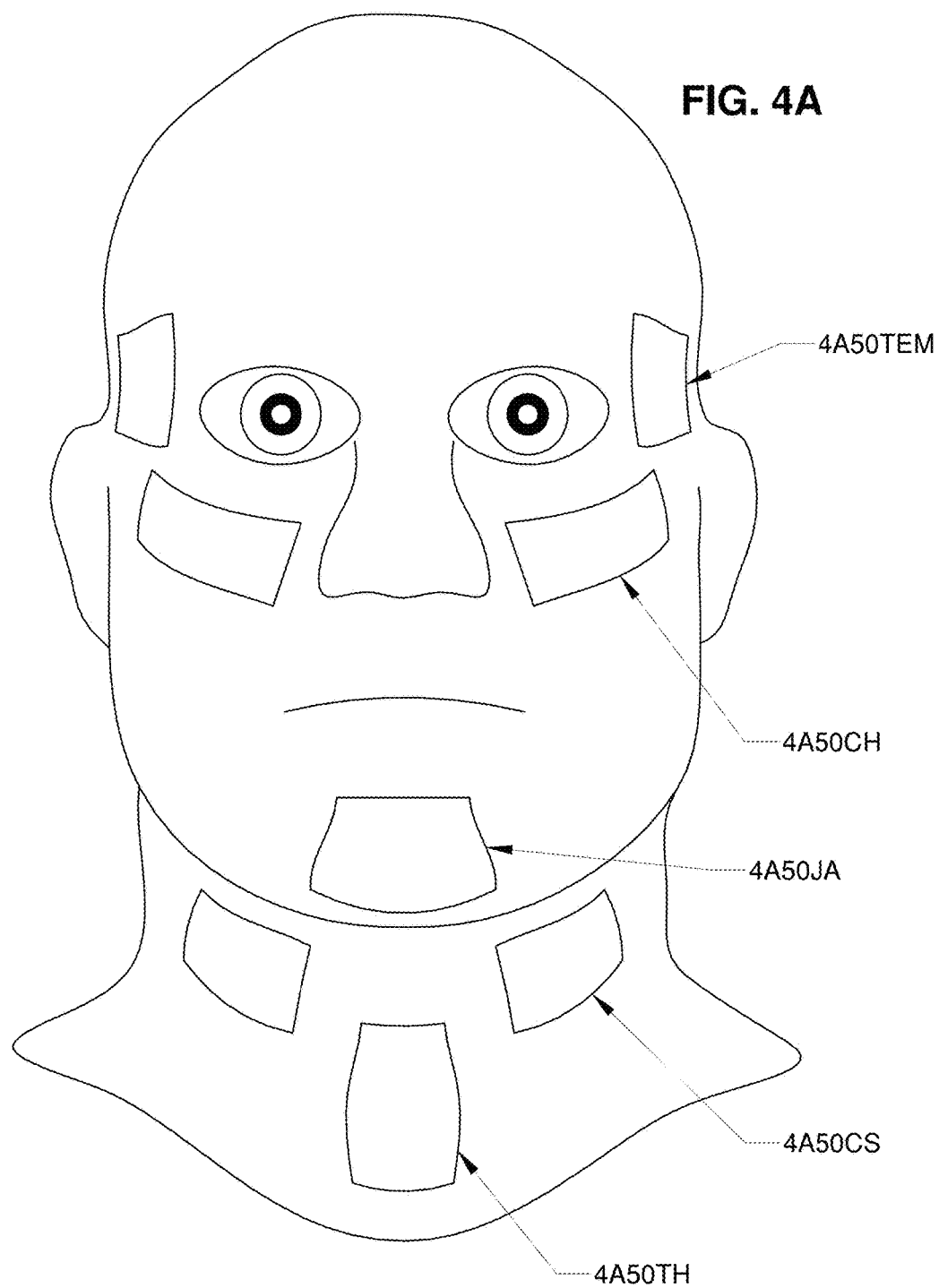

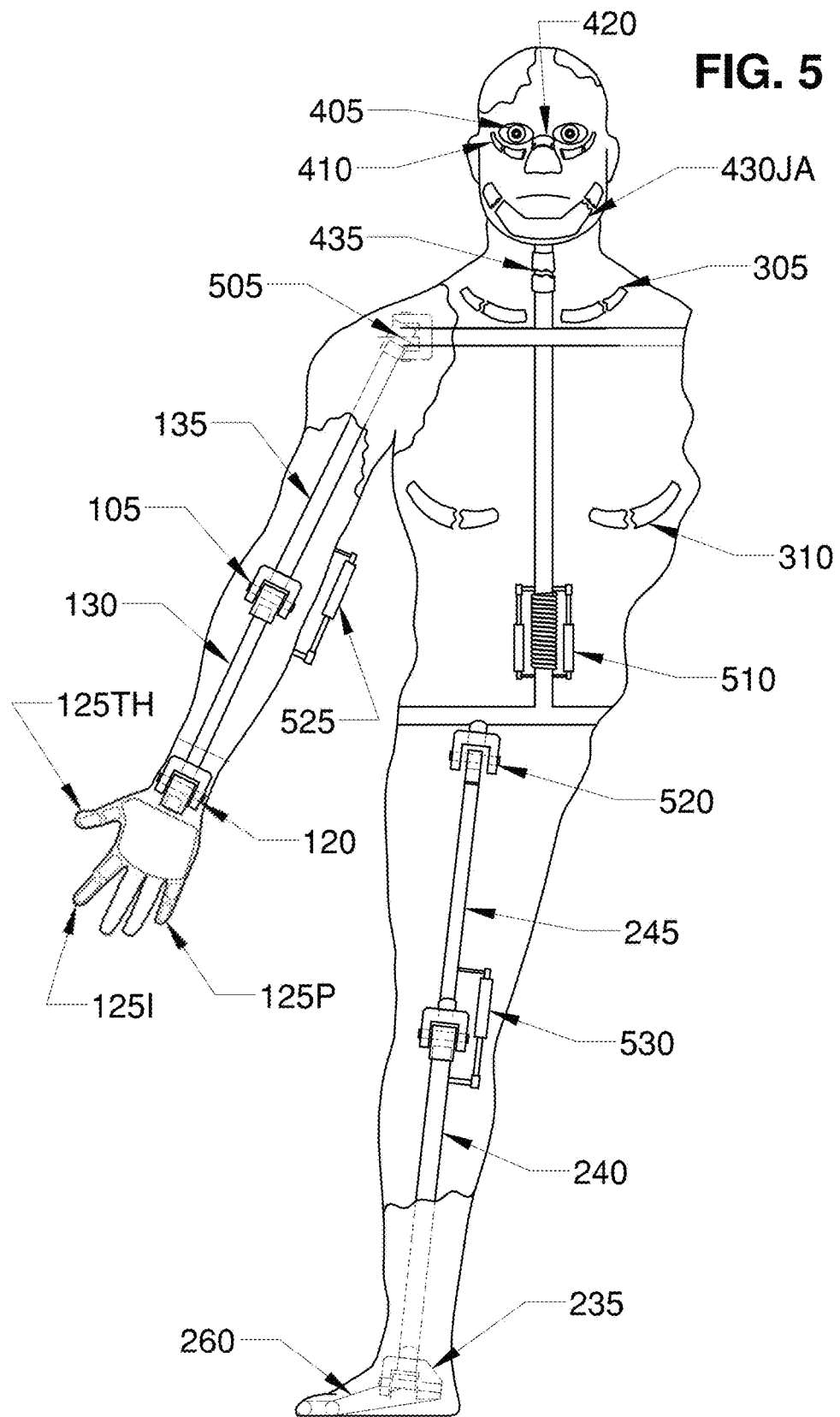

FINGER ASSEMBLY

FINGER BREAK ASSEMBLY

HAND ASSEMBLY

HAND ASSEMBLY

WRIST ASSEMBLY

WRIST ASSEMBLY

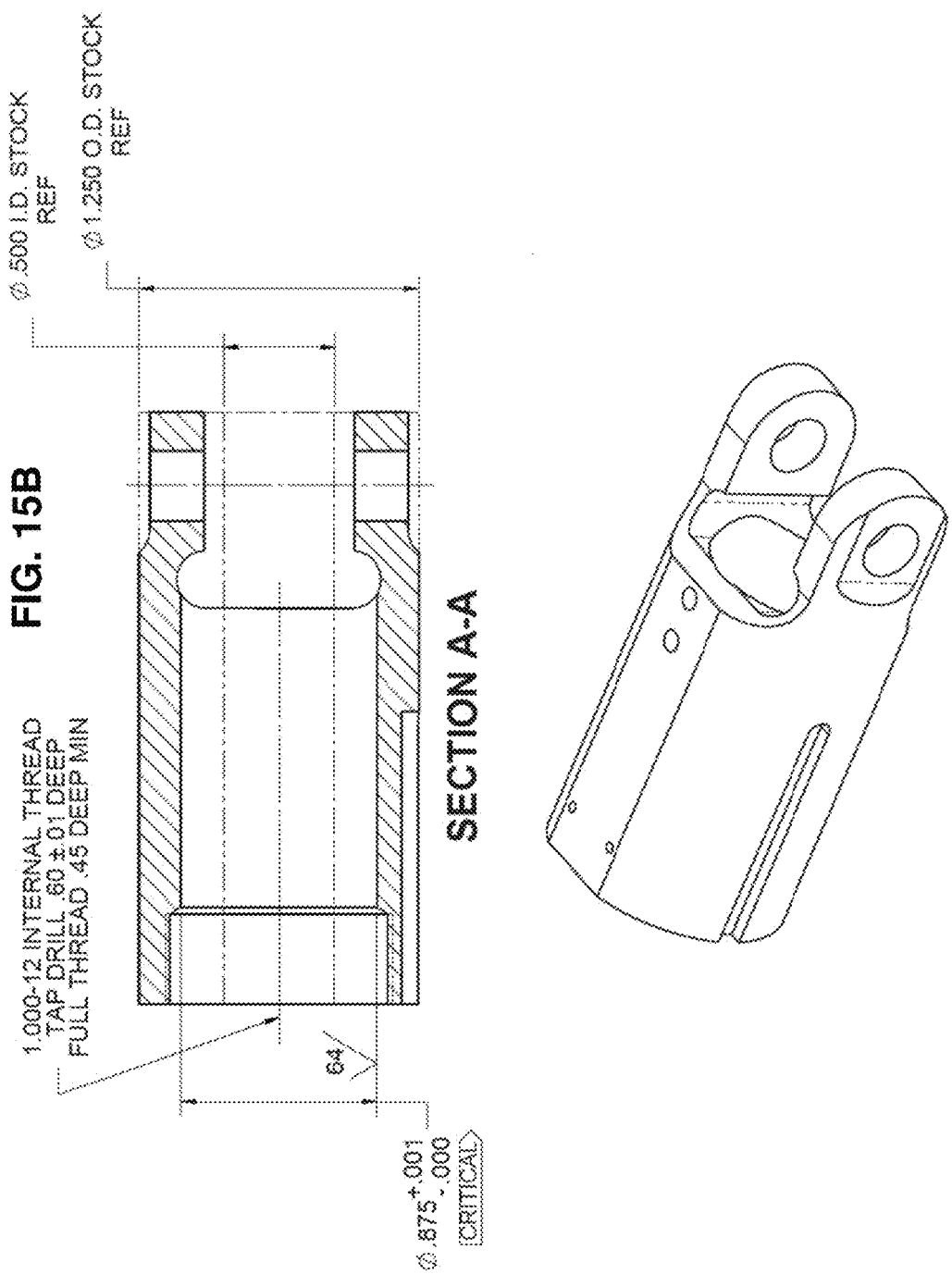

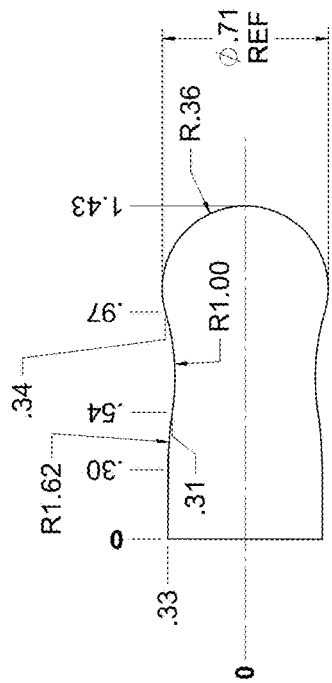
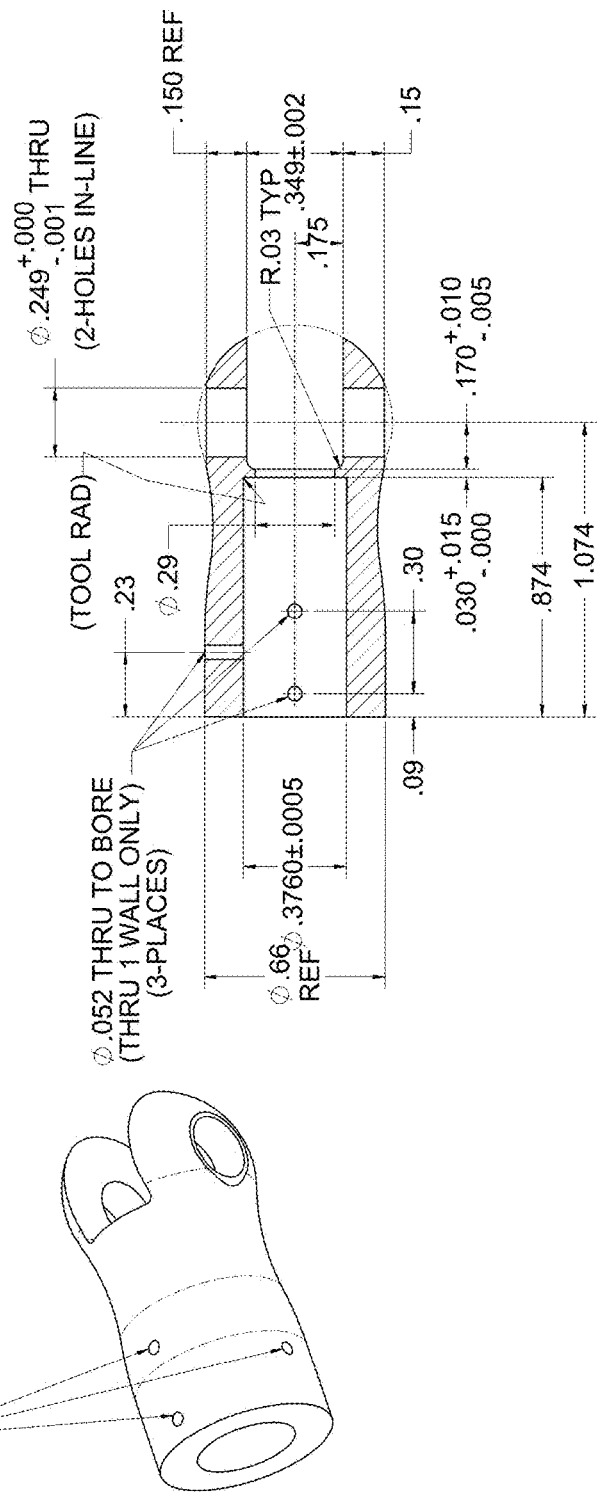
FIG. 19

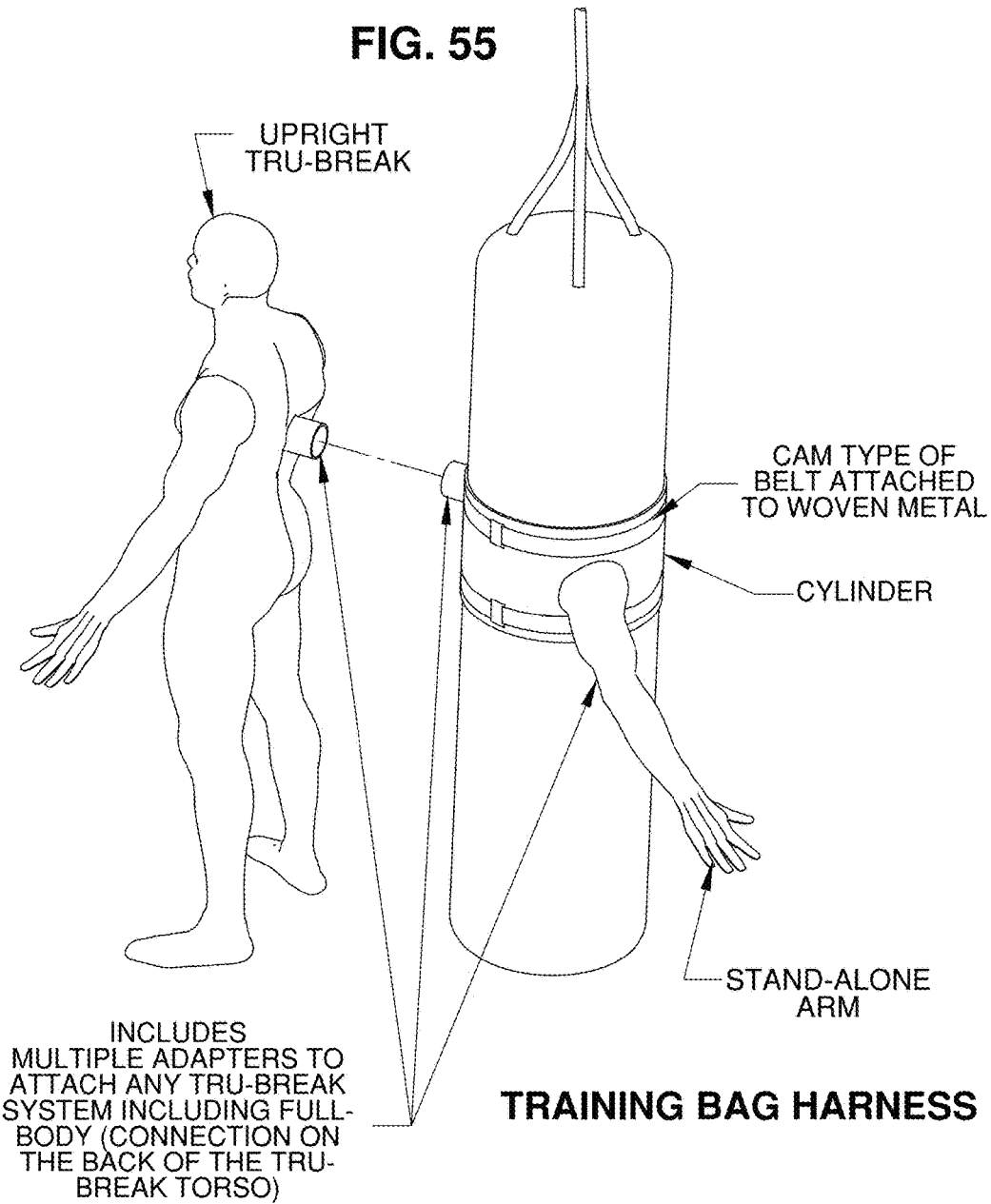

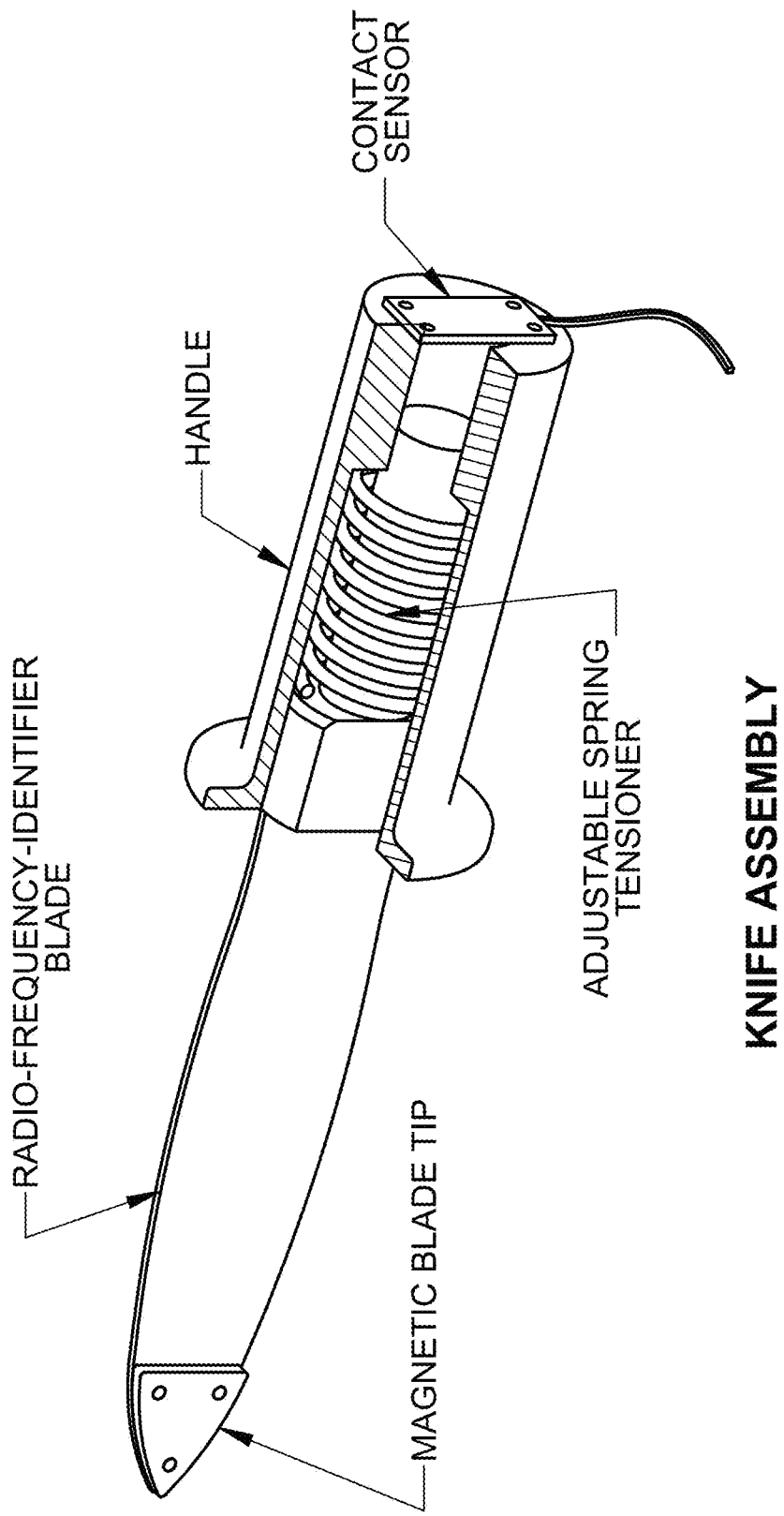

KNIFE ASSEMBLY

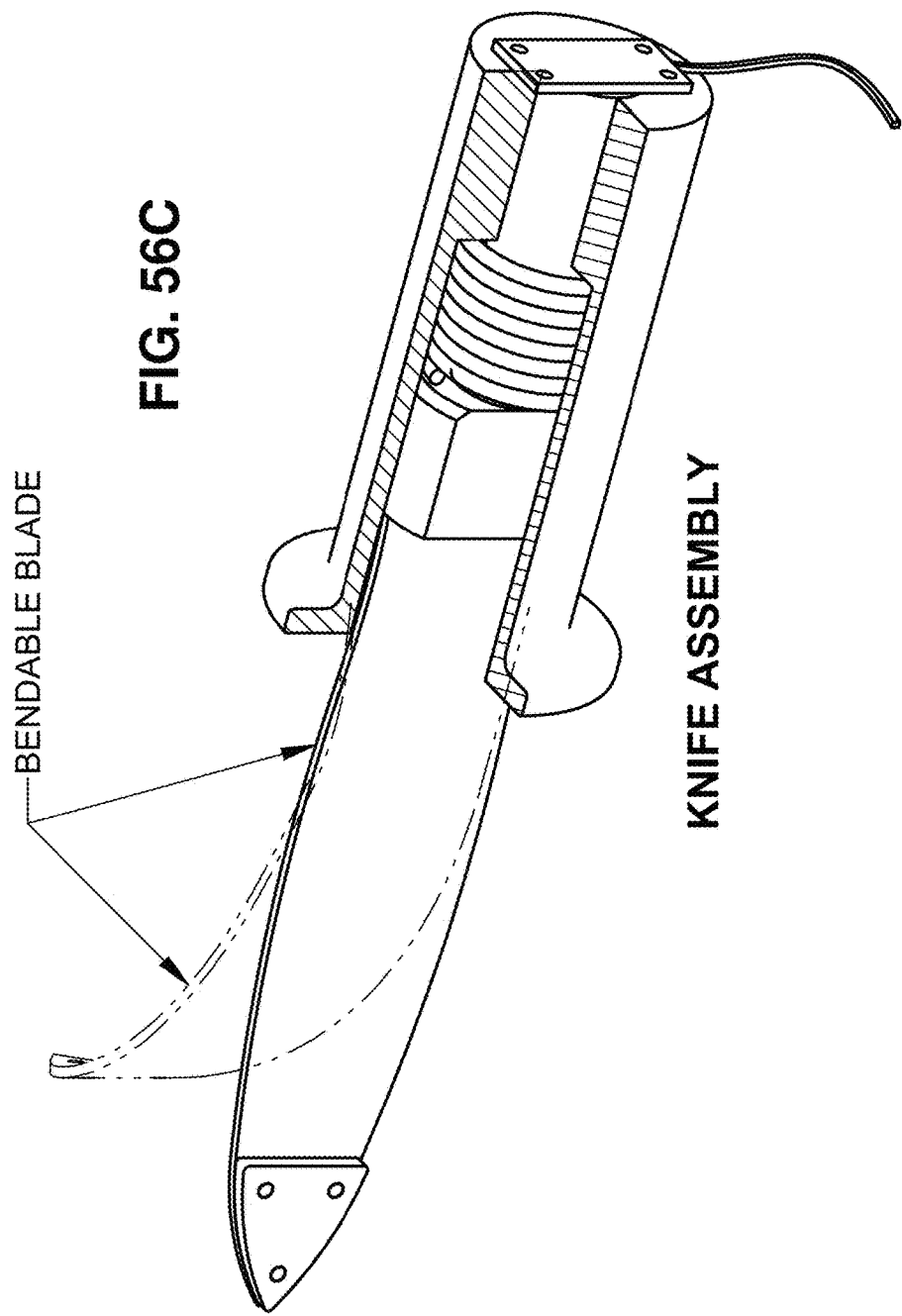

FINGER BREAK ASSEMBLY

(FINGER BREAK ASSEMBLY)

FINGER MAXIMUM HYPEREXTENSTION

FINGER HYPEREXTENSTION BREAK

WRIST BREAK ASSEMBLY

Fig. 65
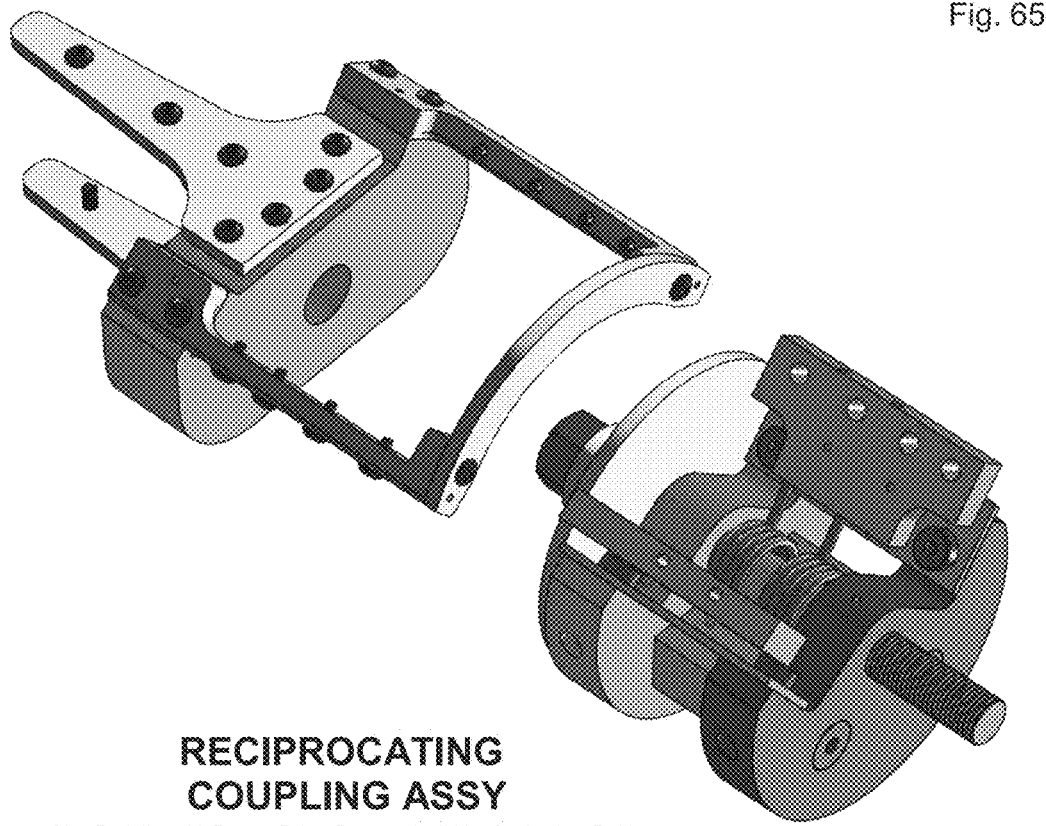
RECIPROCATING
COUPLING ASSY
(USED FOR SHOULDER/ WRIST
ROTATION)
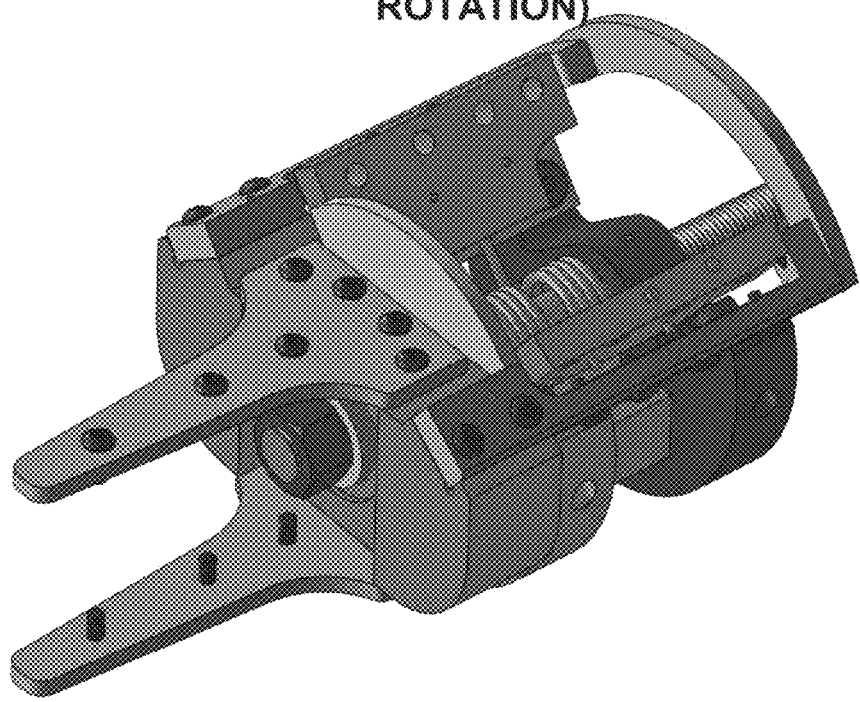

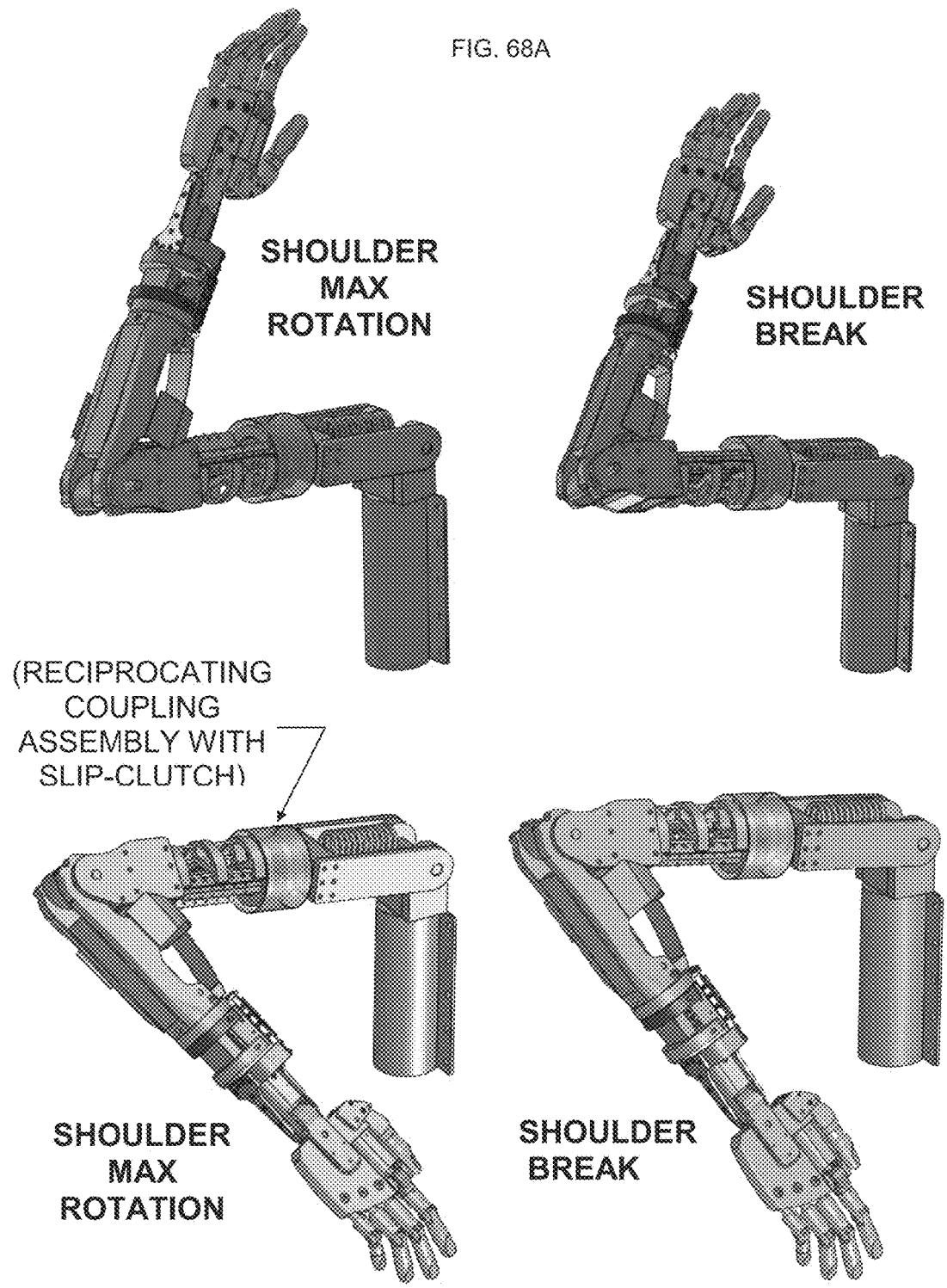

Fig. 69
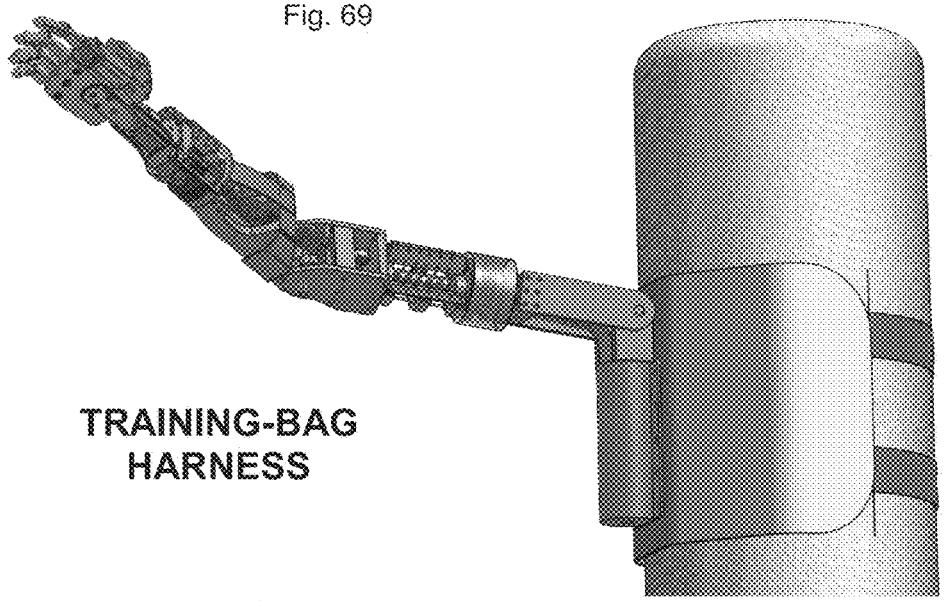
TRAINING-BAG HARNESS
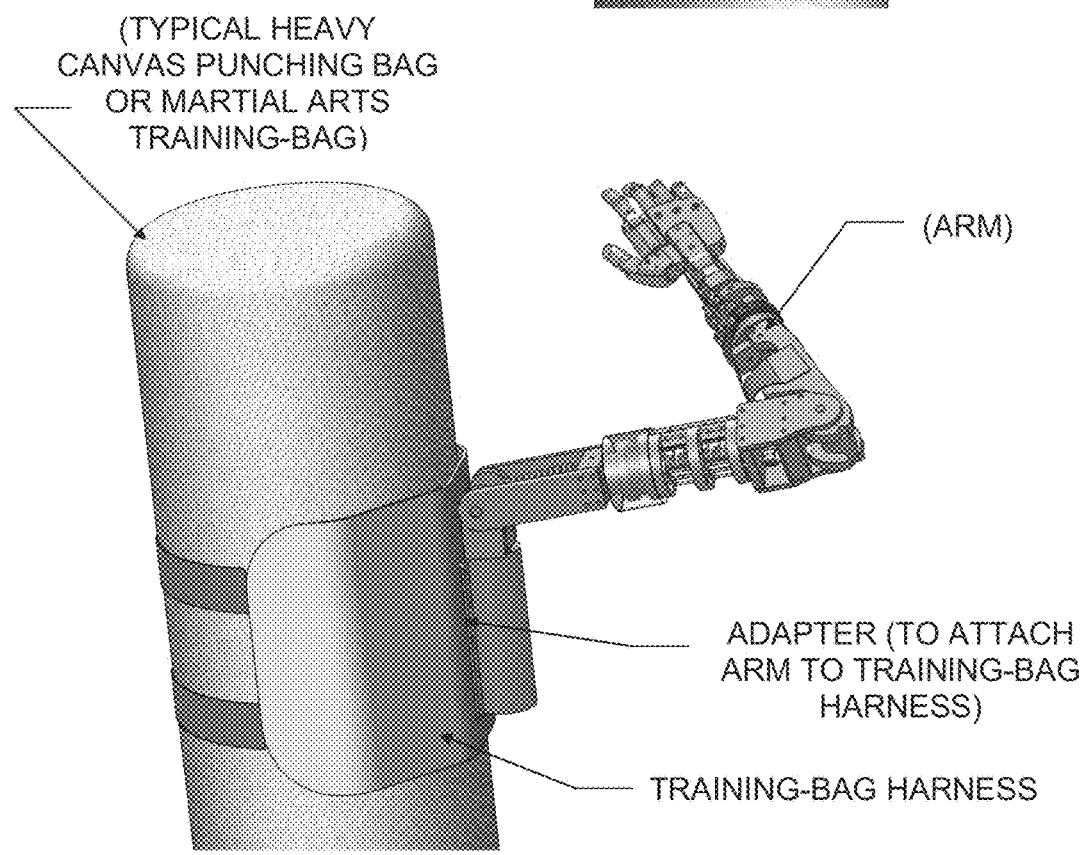
(TYPICAL HEAVY CANVAS PUNCHING BAG OR MARTIAL ARTS TRAINING-BAG)
(ARM)
ADAPTER (TO ATTACH ARM TO TRAINING-BAG HARNESS)
TRAINING-BAG HARNESS

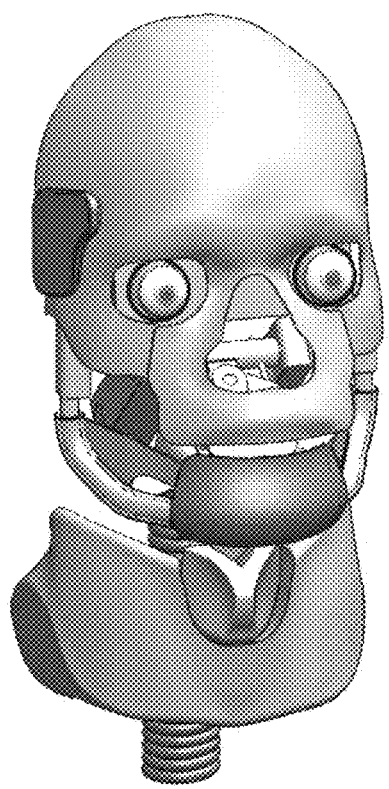
Fig. 73
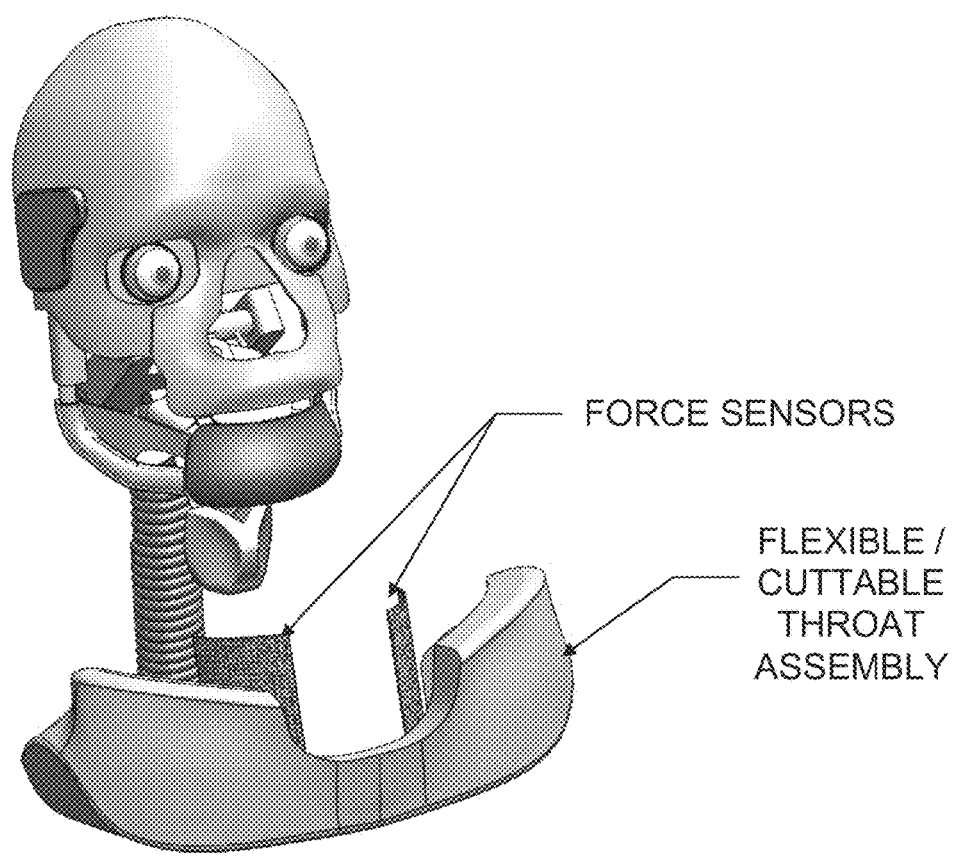
FORCE SENSORS
FLEXIBLE / CUTTABLE THROAT ASSEMBLY

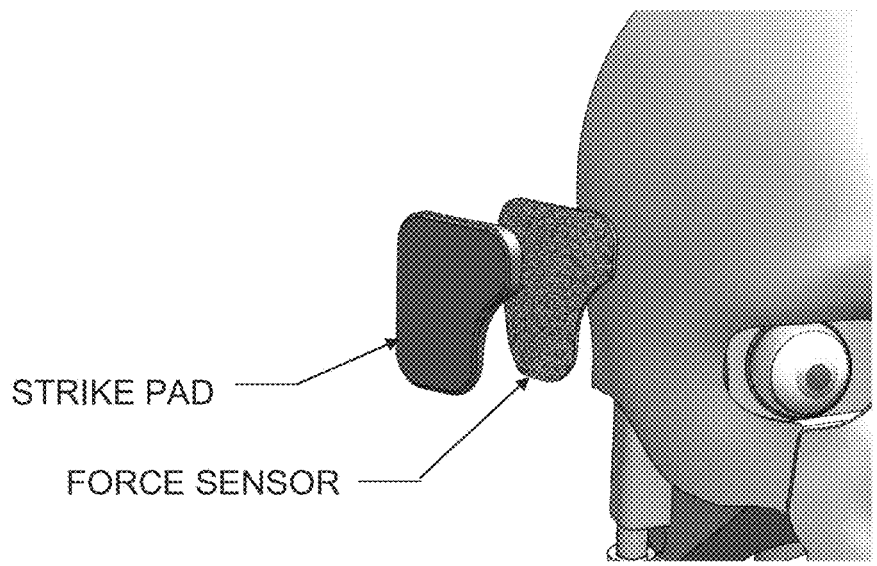
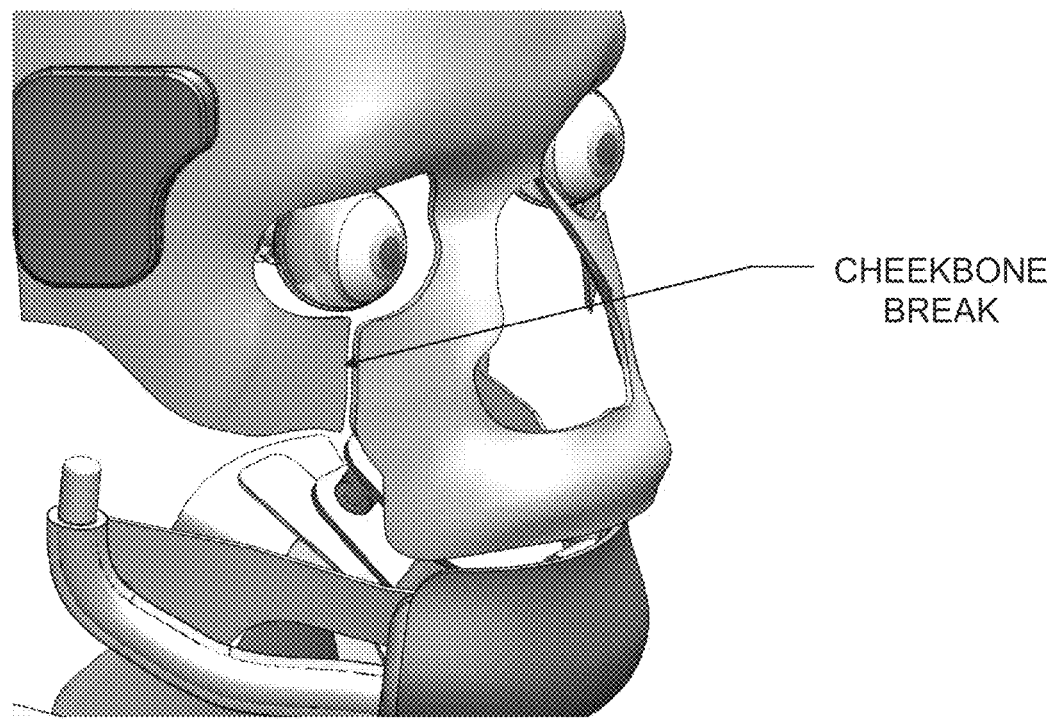
Fig. 74

JAWBONE BREAK

SYSTEMS AND METHODS FOR MARTIAL ARTS TRAINING DEVICES WITH ANATOMICALLY ACCURATE FORCE, PRESSURE AND OTHER RESPONSE

CROSS REFERENCE TO RELATED APPLICATIONS

This application is a continuation-in-part of PCT/US2014/31131, filed on Mar. 18, 2014, now published as WO 2014/146136, which itself claims the benefit of U.S. Provisional Patent Application No. 61/800,892 filed on Mar. 15, 2013, the disclosure of each of which is hereby fully incorporated herein by reference.

TECHNICAL FIELD

The present invention relates to physical training devices, and, more particularly, to systems and methods to provide a user with simulated opponents having anatomically accurate force and pressure response, as well as detailed feedback as to the user's technique in interacting with the simulations.

BACKGROUND OF THE INVENTION

Conventionally, force-on-force training, or aggressive joint manipulation and sparring, typically resulted in injury to one or both training partners. Continued training with a human opponent at full ferocity and aggression for any appreciable length of time is bound to result in injury.

While heavy bags, both hanging and free standing, may be useful for a work out, can help somewhat with accuracy, and can allow the user to employ his technique at full force and intensity, they typically are too large to really develop pinpoint accuracy. Moreover, even given their size, heavy bags are not really heavy enough, as they typically weigh only about 120 lbs, to simulate humans, and they do not lend themselves to practicing locks, breaks, chokes, knife techniques, disarming maneuvers, or other human anatomy specific techniques, for example.

Often a martial arts trainee is forced to train with a partner at a restrained effort level, to minimize risk of injury. Thus, when training breaks and locks, both people must move and apply pressures that do not inflict more than a minimal amount of pain. Such simulated training does not allow a trainee to practice their art at the level that is actually needed when, for example, a violent real-world, self-defense situation presents itself.

Thus, there is a need in the art for a training platform that would allow users to train at full effort and ferocity with realistic damage feedback. The platform should be capable of human-like defensive, and even offensive, movements. It should be configured to suffer breaks and dislocated bones and/or joints at various points, and should be capable of delivering a multitude of feedback information to the user. Desirably, it should have an approximately 1:1 height and weight ratio to that of a real human. It should also be designed to be accessible and affordable.

SUMMARY OF THE INVENTION

Systems and methods for martial arts training devices are presented. An exemplary martial arts training device comprises anatomically correct legs, arms, a torso and a head that can be used individually, or as partly assembled, or as fully assembled to present a full sized human training dummy. A user interacts with the device, and receives both immediate feedback and a global analysis of his training session. Feedback can include whether proper forces and angles were applied that would achieve a real world break, puncture or other desired fighting goal with respect to a real world, fit, human opponent of average fighting skill. Thus, one embodiment of the exemplary training device and associated systems is known as the "Trubreak" dummy, training platform, and associated system. In some embodiments, user feedback can be provided in the form of actual breaking of various strike points on the device that physically register a break, and/or by alerting the user with a pre-programmed or default signal which may include, without limitation, one or more of blinking light or other visual signal, sound stimulus or computer prompt when a given sensor is struck at the appropriate strength. Thus, predetermined targets on the device may be equipped with sensors that, when sensing an appropriate user action, emit or cause to emit, such feedback signals. The device can include breakable joints, bones, as well as soft tissue targets, such as blood vessels and organs, preset to respond to an average person's sensitivity to applied strike forces or joint manipulations based on medical research. The user can reset the damaged physical structure or response sensor to its undamaged position or resting status to engage the device repeatedly.

Extending from the individual training device case, in some exemplary embodiments, an on-line global feedback system is also presented, accessed via one or more websites. A community of users, guided by the Trubreak team, can create documentation standards, and a user can connect to a Trubreak website and compare his or her results to those of other users listed in best to worst format. For example, within a specified category, which a user may specify in a login process, the user may be queried by the system with a list of questions so as to evaluate and place the user in a "class." Once the user is registered and logged in, for example, she can challenge herself to complete a series of strikes and breaks, according to a defined program in the system, to "compete" against other users or that user's own past performances.

The sequence of strikes and breaks will be digitally simulated, and, for example, text may be displayed instructing the user to practice the moves before they go to a "record sequence" option in the system menu. After the user performs the drill for scoring, his or her results as well as his or her competitive placement will be instantly registered so the user can see if they are in, for example, first place or 500$^{th}$ place.

Additionally, the user can request to view a tutorial video, established and vetted thorough the Trubreak board, to help achieve better results in subsequent competition attempts. In some embodiments, various tutorial videos may be provided on the website, with variation in addressing or focusing on various weaknesses and areas needing improvement. The correct tutorial may be dynamically delivered based on the detailed actual results of a user's drill.

Using available sensor technology, the various mechanical apparatuses which trip upon application of actual real-world needed force, properly applied, can also be mirrored using various electronic or electromechanical sensors. Thus, as a user interacts with the actual Trubreak device, it can establish force of impact, length of time between one strike and the next strike, average power across all hits, and accuracy. By closing an open circuit, the reverse, or using various other electronics, the system can recognize a bone or joint break, cut through an organ, etc. In the mechanical dummy, the resting position of the mechanics of each target joint simulates an undamaged joint. Thus, for every mechanical break point on the training dummy or apparatus, an electronic circuit can be "broken" (either opened, closed, or other) as well, thus creating a digital footprint of every mechanical interaction possible which can be sent to the system server.

Still other objects and advantages of the present invention will in part be obvious and will in part be apparent from the specification.

BRIEF DESCRIPTION OF THE DRAWINGS

It is noted that the US. patent or application file contains at least one drawing executed in color. Copies of this patent or patent application publication with color drawings will be provided by the US. Patent Office upon request and payment of the necessary fee.

Basic Figures

FIG. 2B depicts the exemplary right leg of FIG. 2 in a knee bent and raised position showing how the right leg would be lifted to achieve that position;

FIG. 3 depicts a front view of an exemplary head and torso of an exemplary training device with the skin pulled back to show internal structures according to an exemplary embodiment of the present invention;

FIG. 4 depicts a front view of the head of an exemplary training device with the skin pulled back to show internal structures;

FIG. 4A depicts the head of FIG. 4, including imitation skin, showing placement of various target sensors;

FIG. 5 is a full frontal view of an exemplary device with the skin removed to reveal internal joint and bone simulating structures, according to an exemplary embodiment of the present invention;

DETAIL AND EXPLODED VIEW FIGURES

Figure 2:
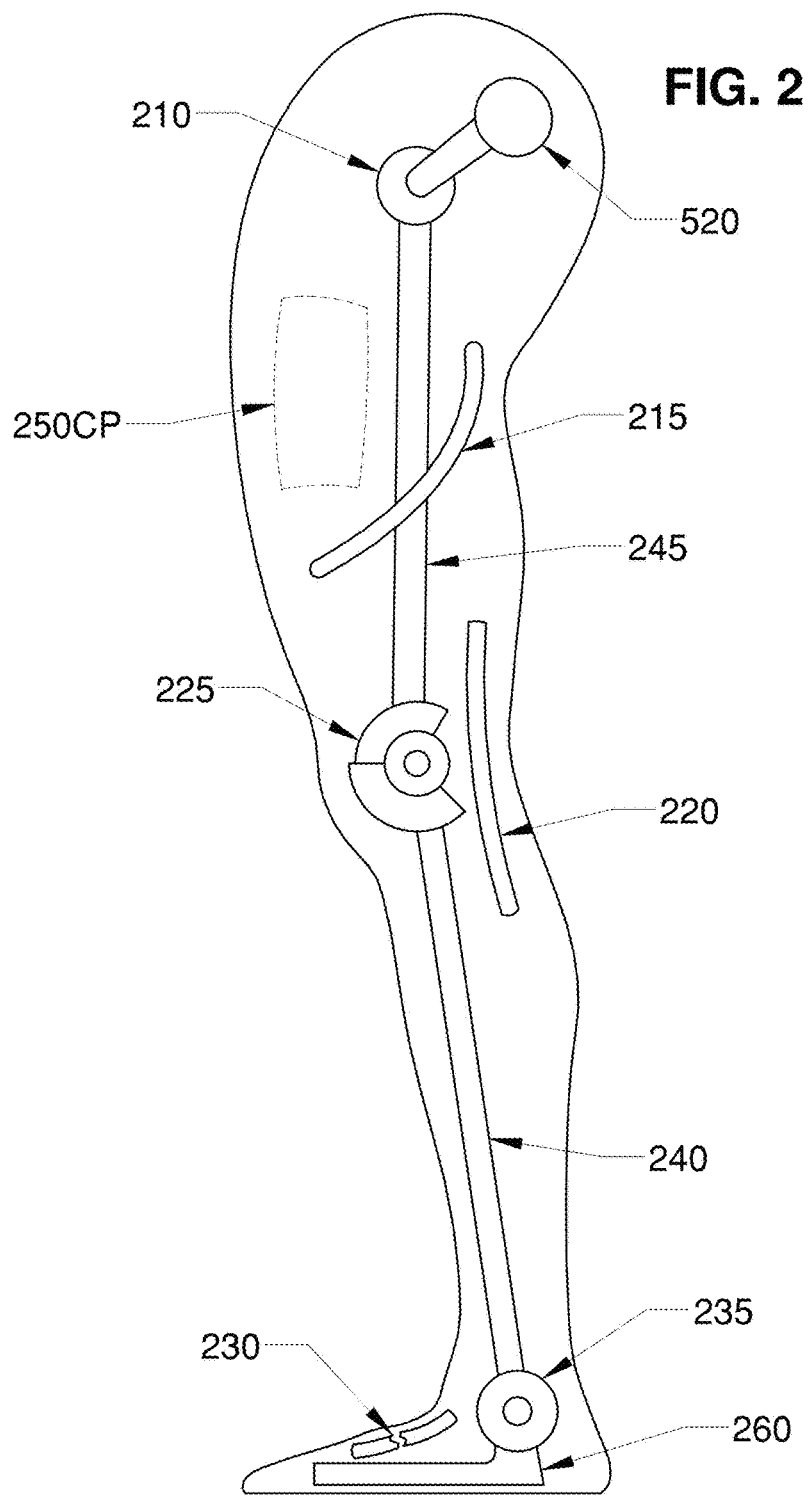
FIG. 2 depicts a side (internal) view of an exemplary right leg of an exemplary training device with the skin pulled pack to show internal structures according to an exemplary embodiment of the present invention.
Figures 1, 2, 6:
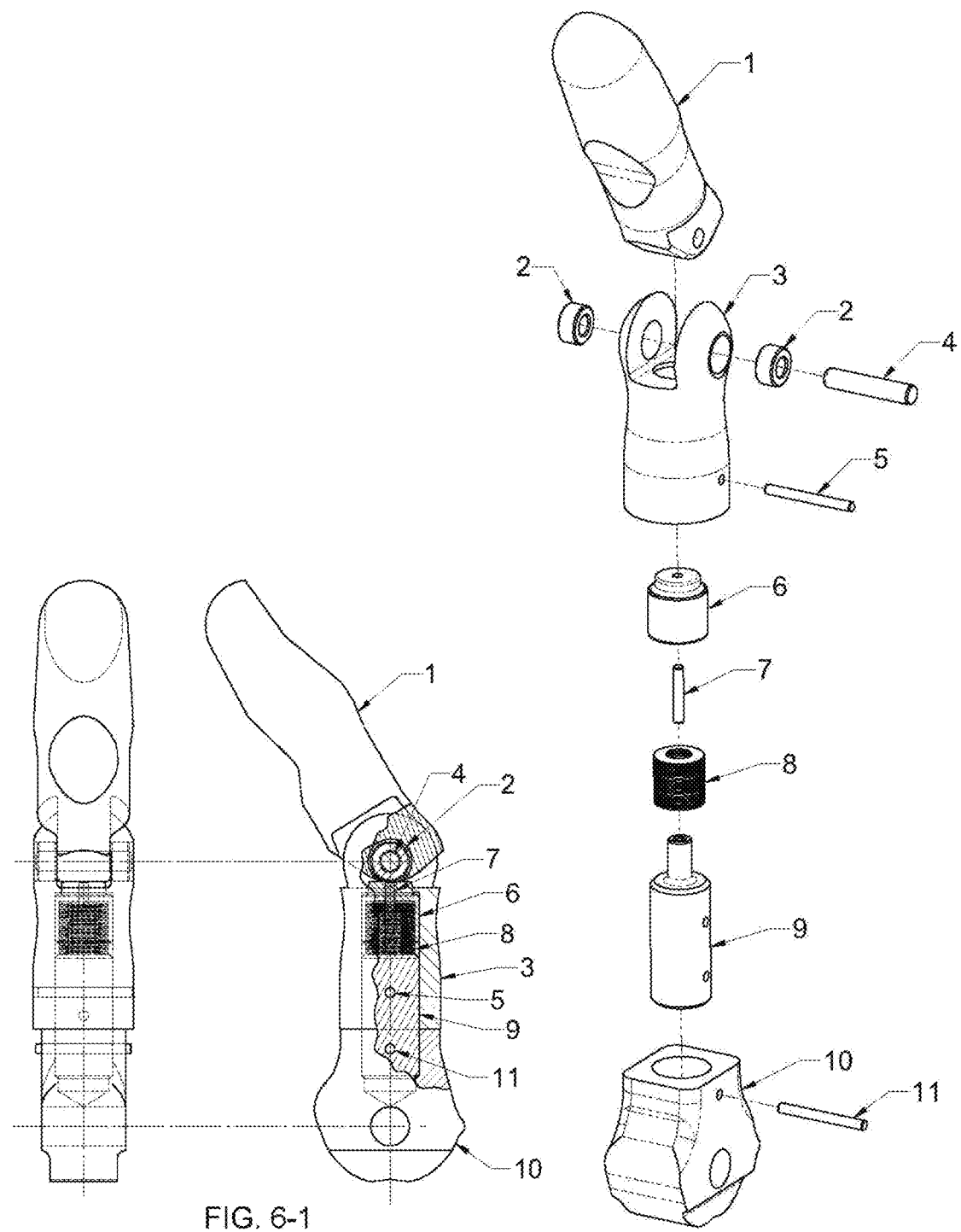
FIG. 1 depicts a front view of an extended right arm of an exemplary training device with the skin pulled back to show internal structures according to an exemplary embodiment of the present invention.
Figures 1, 2, 7:
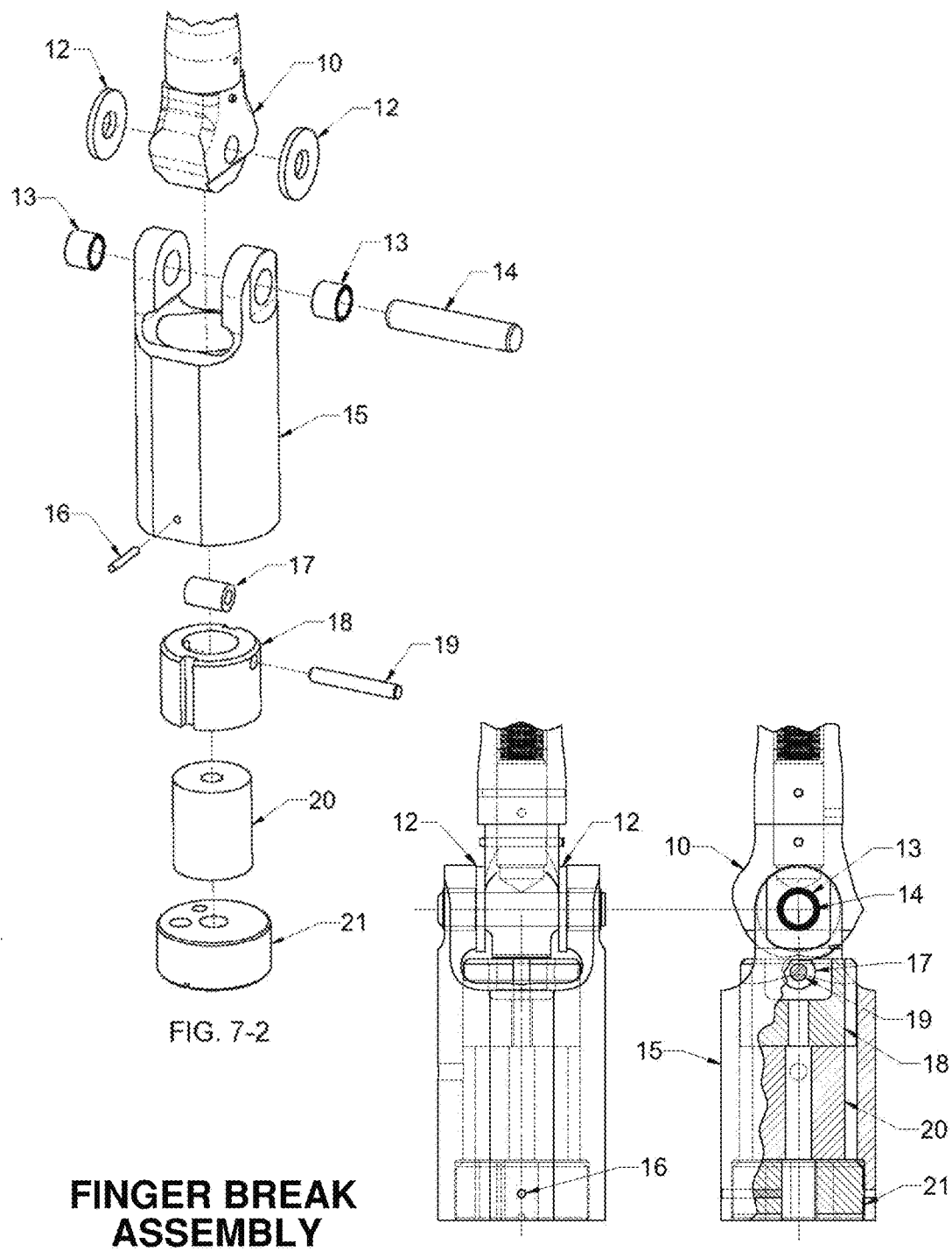
Figure 8:
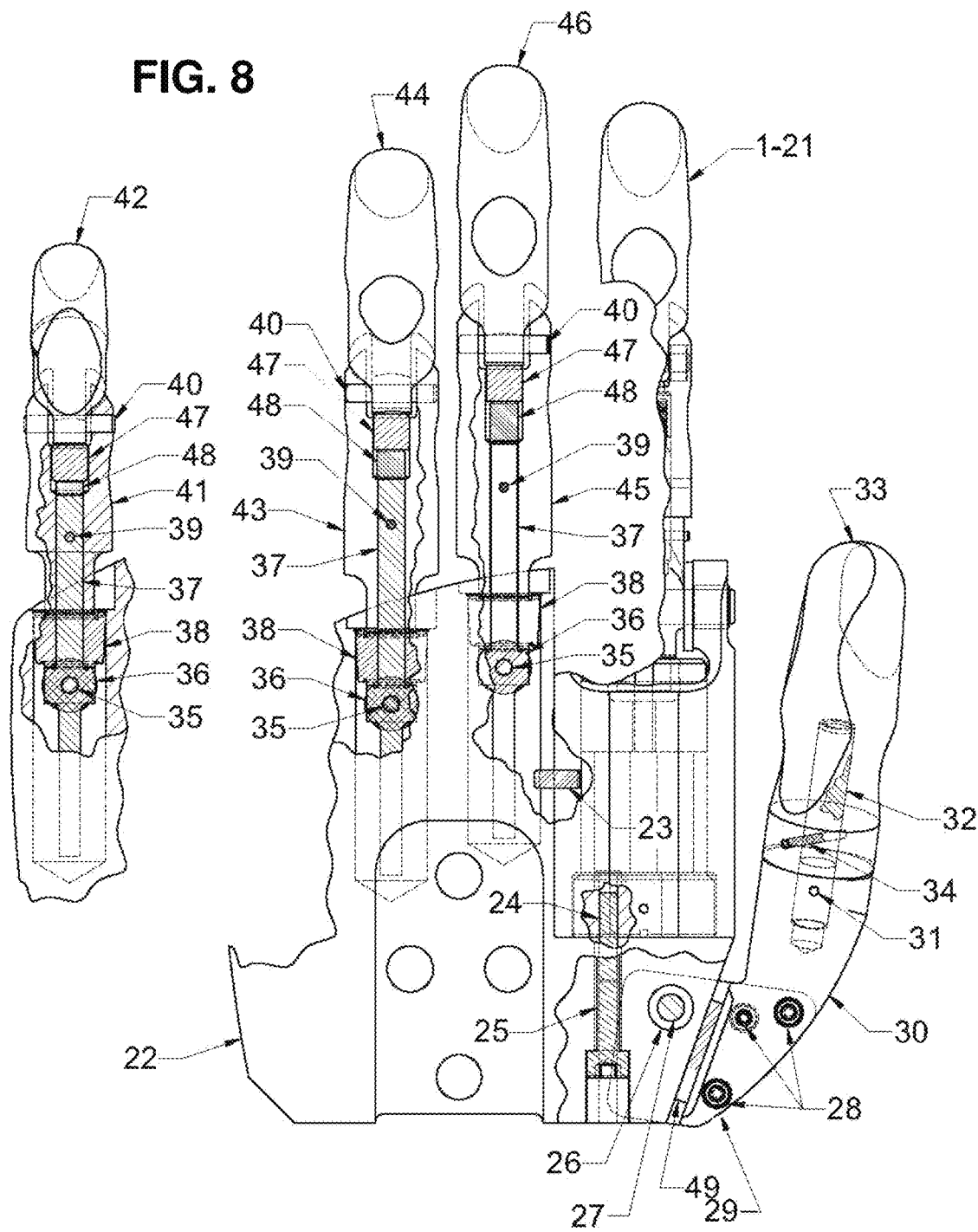
Figure 9:
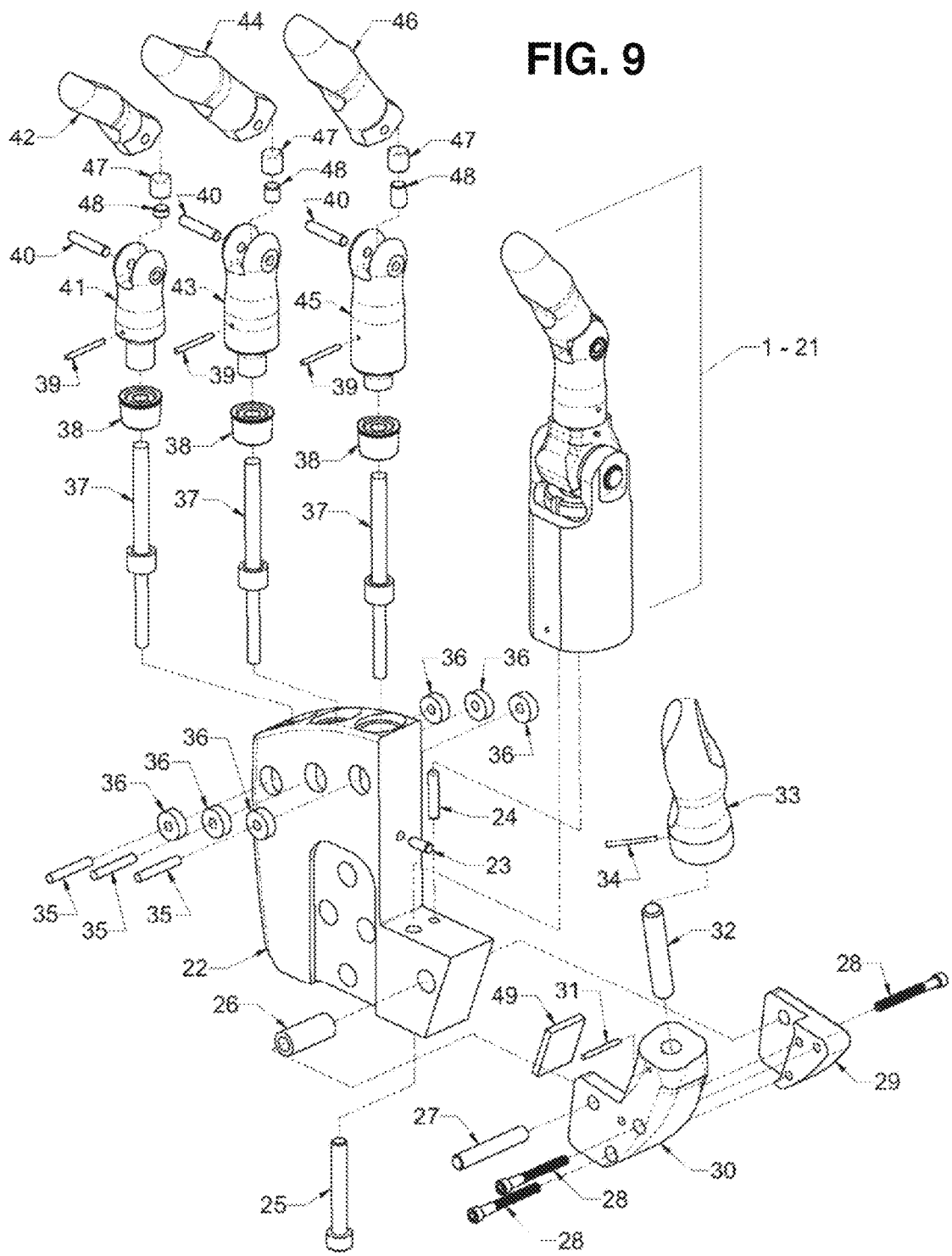
Figure 10:
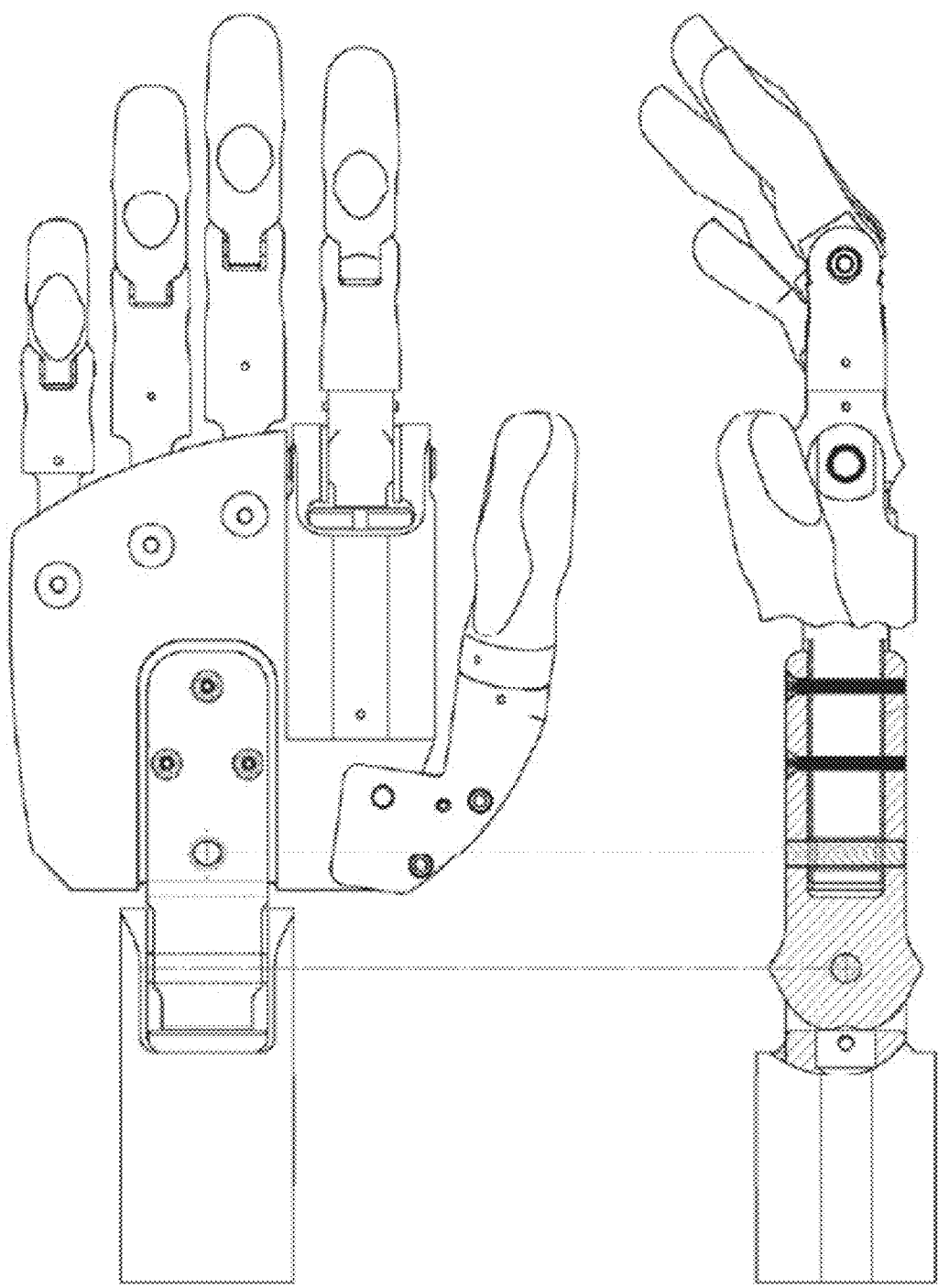
Figure 11:
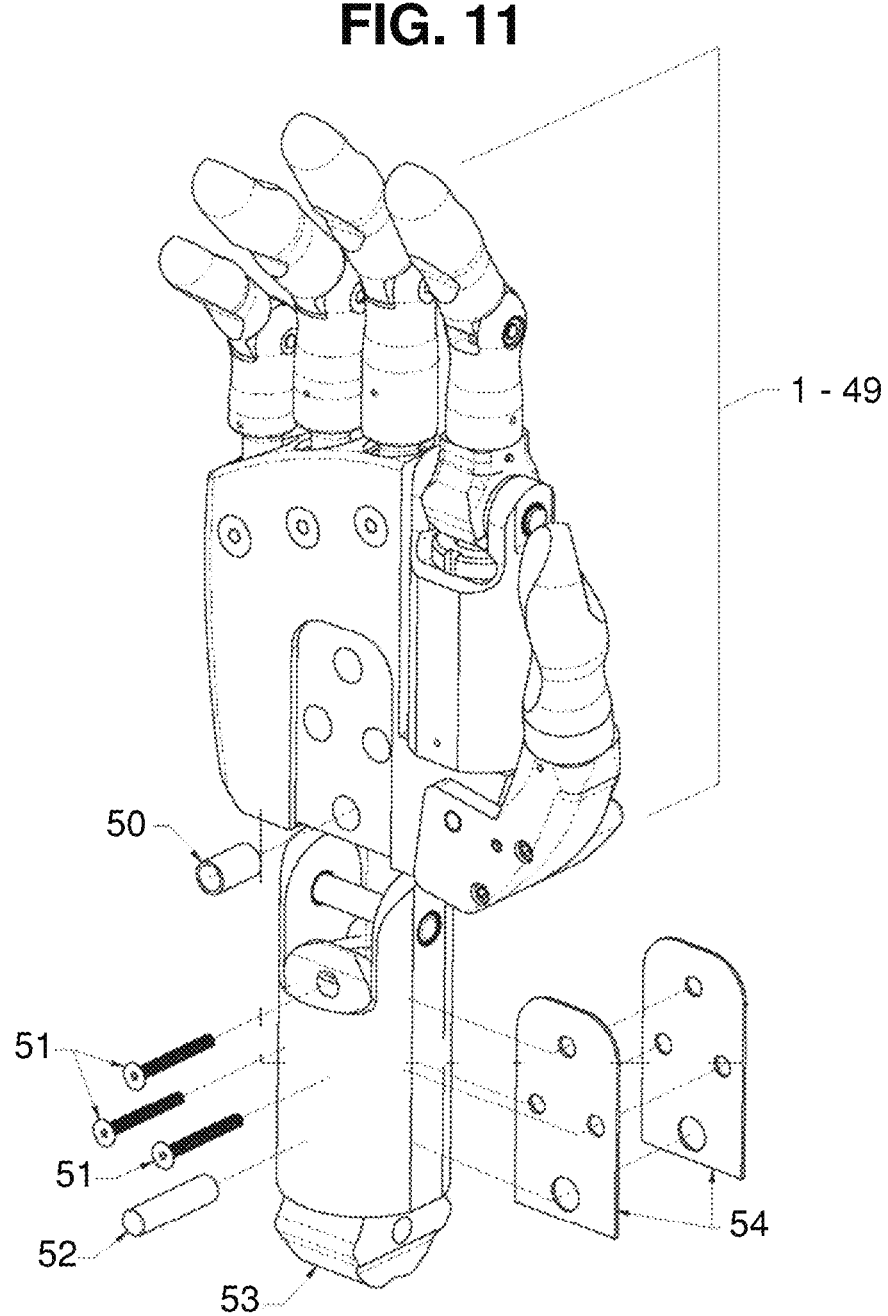
Figure 12:
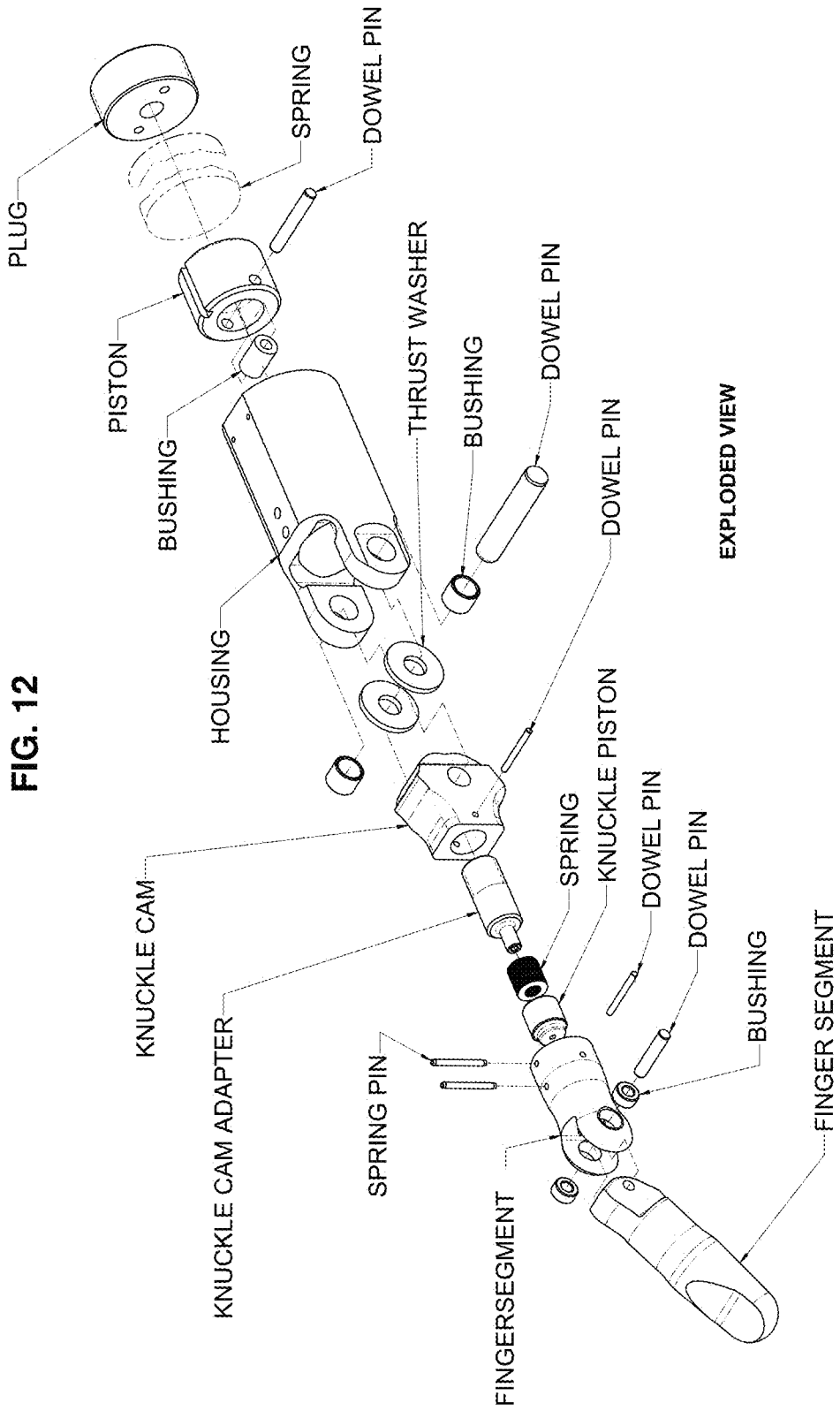
Figure 13:
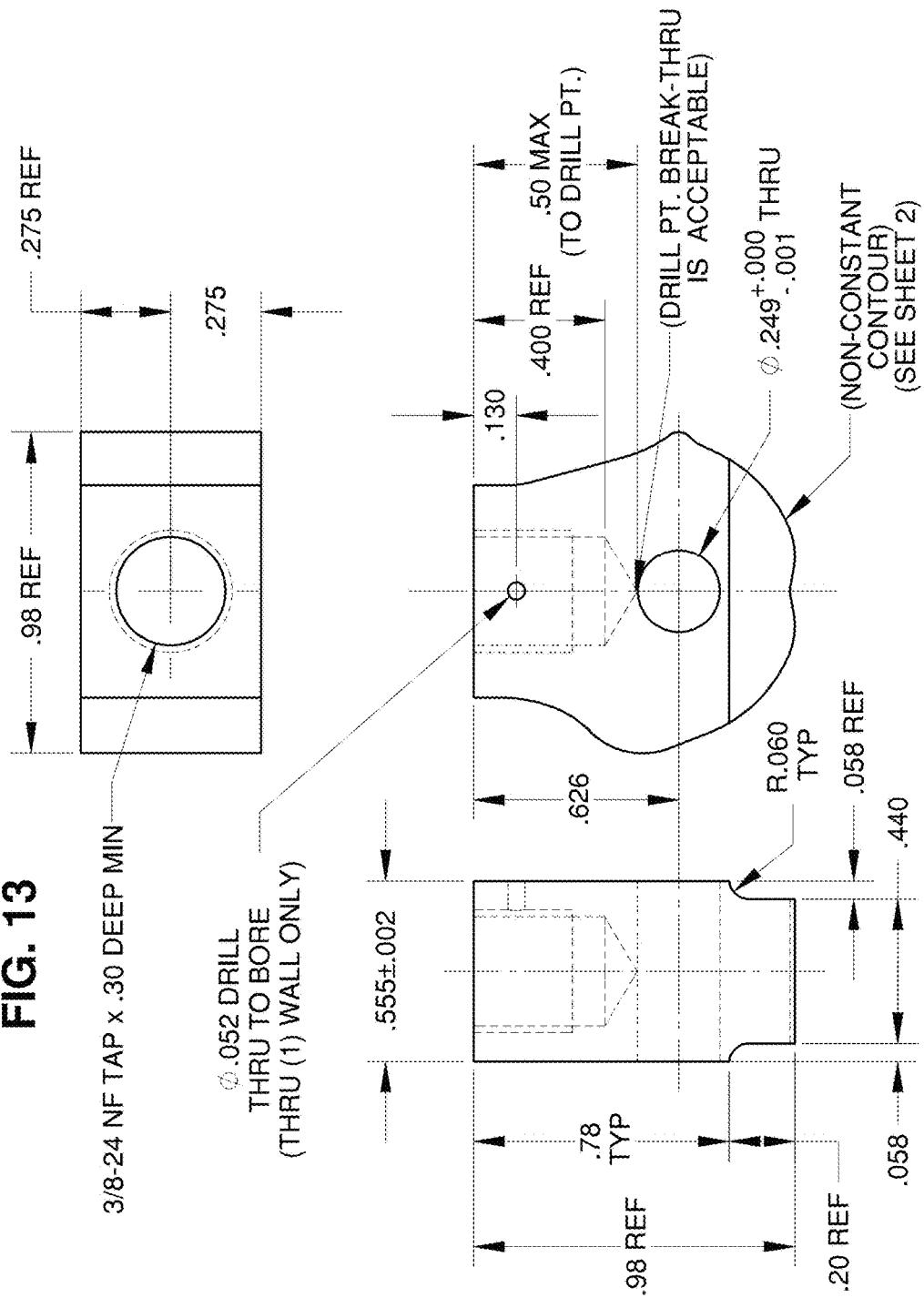
Figure 14:
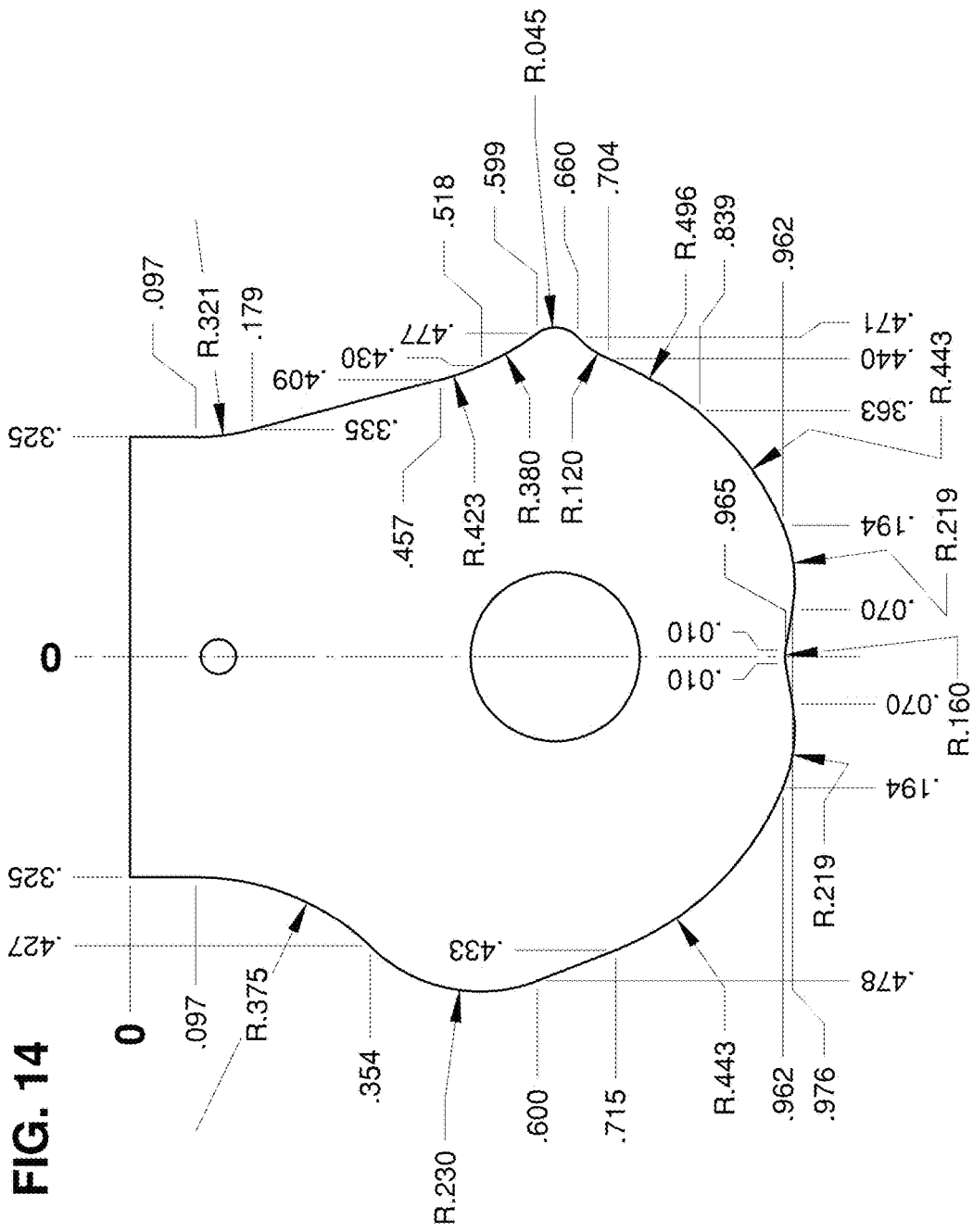
Figure 15A:
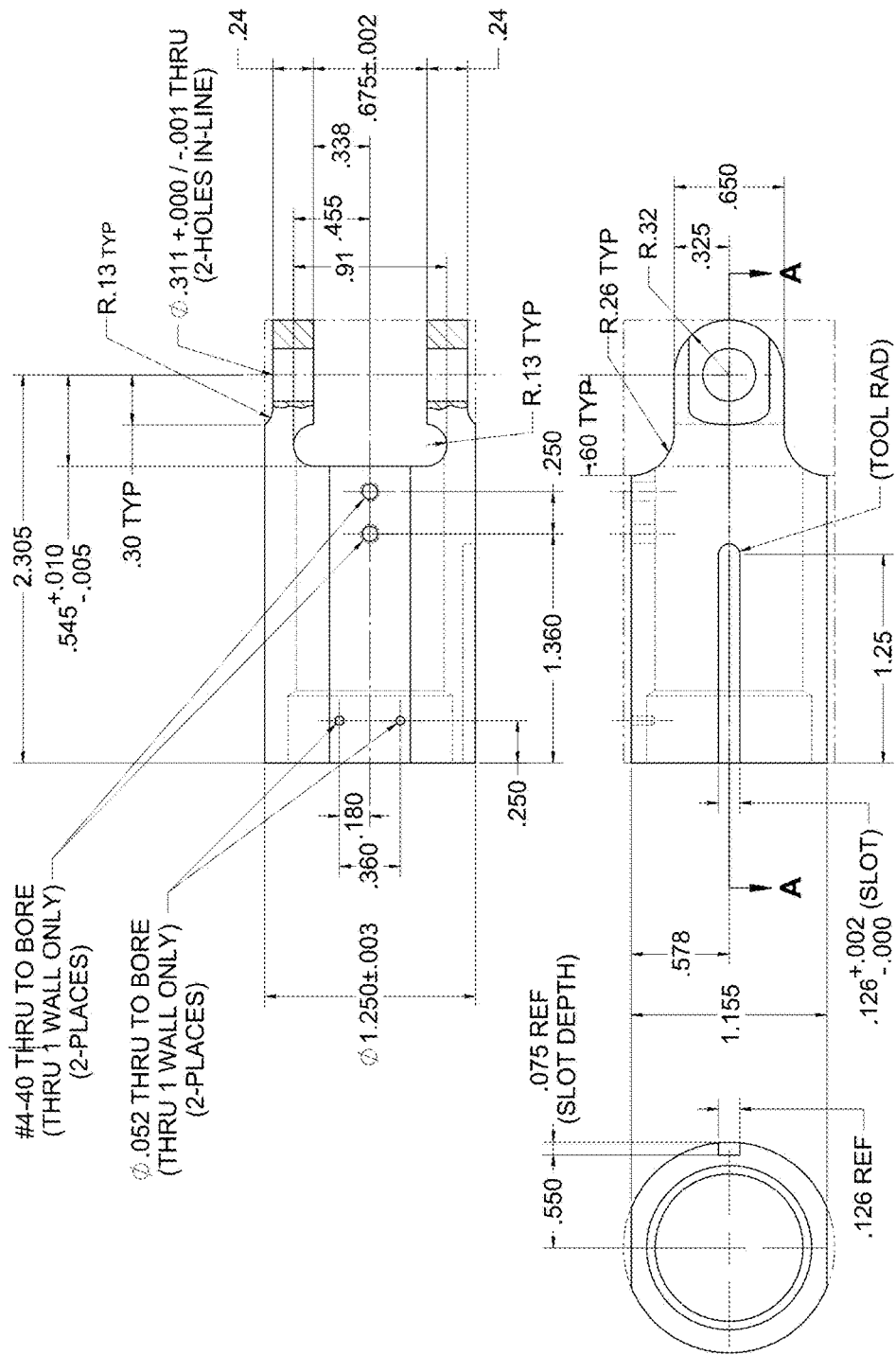
Figure 16:
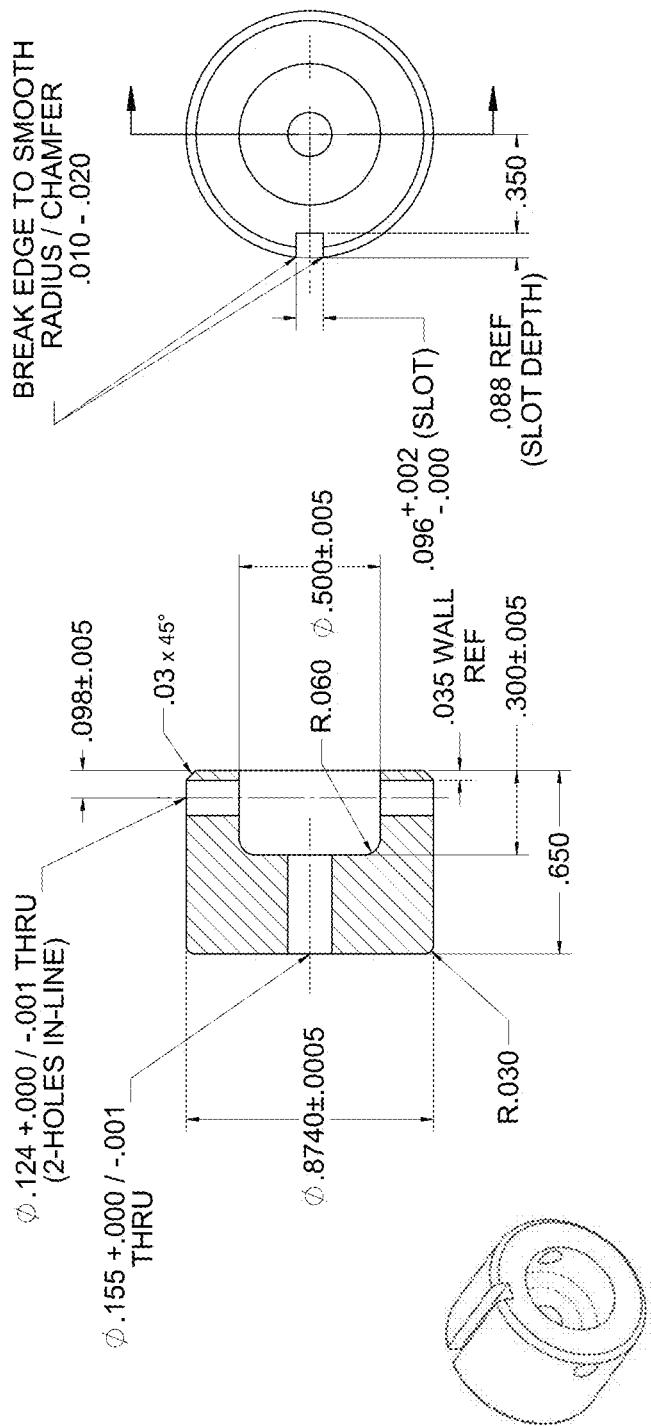
Figure 17:
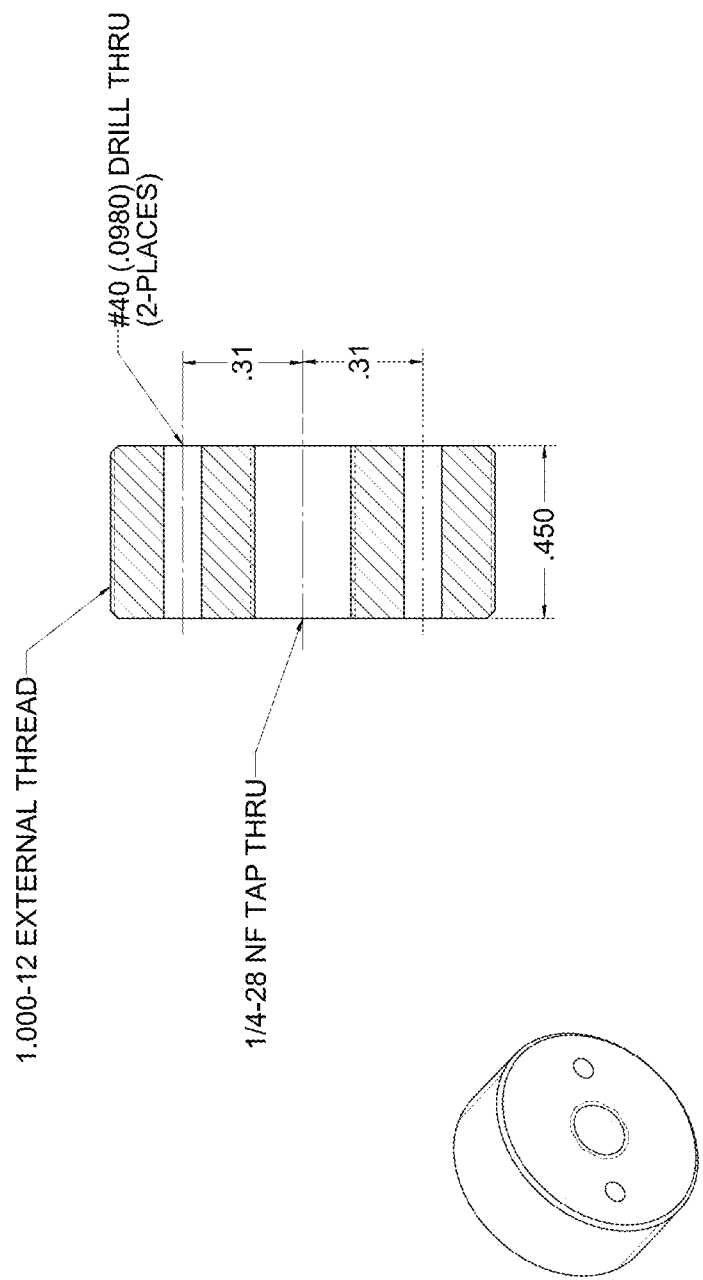
Figure 18:
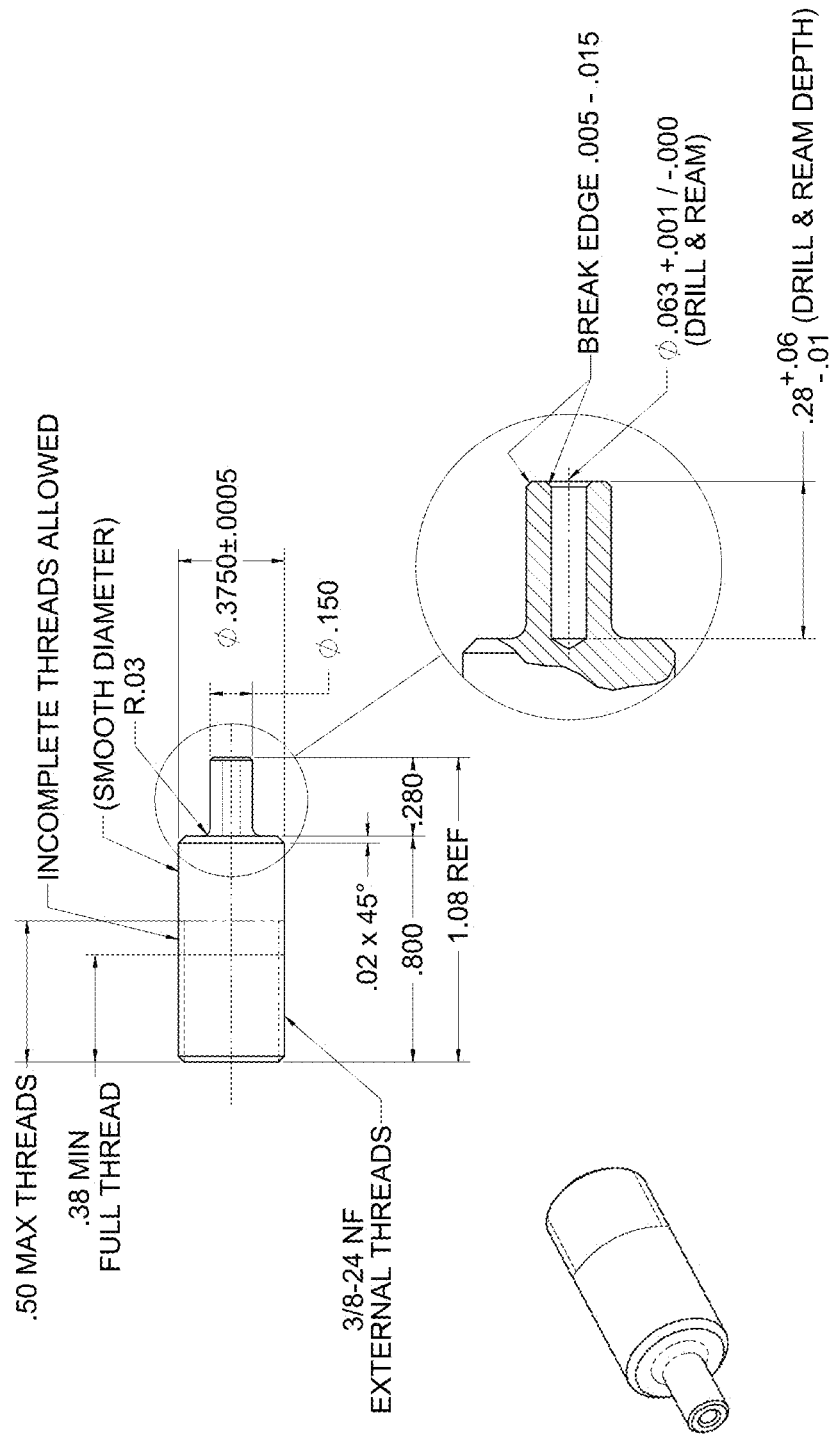
Figure 20:
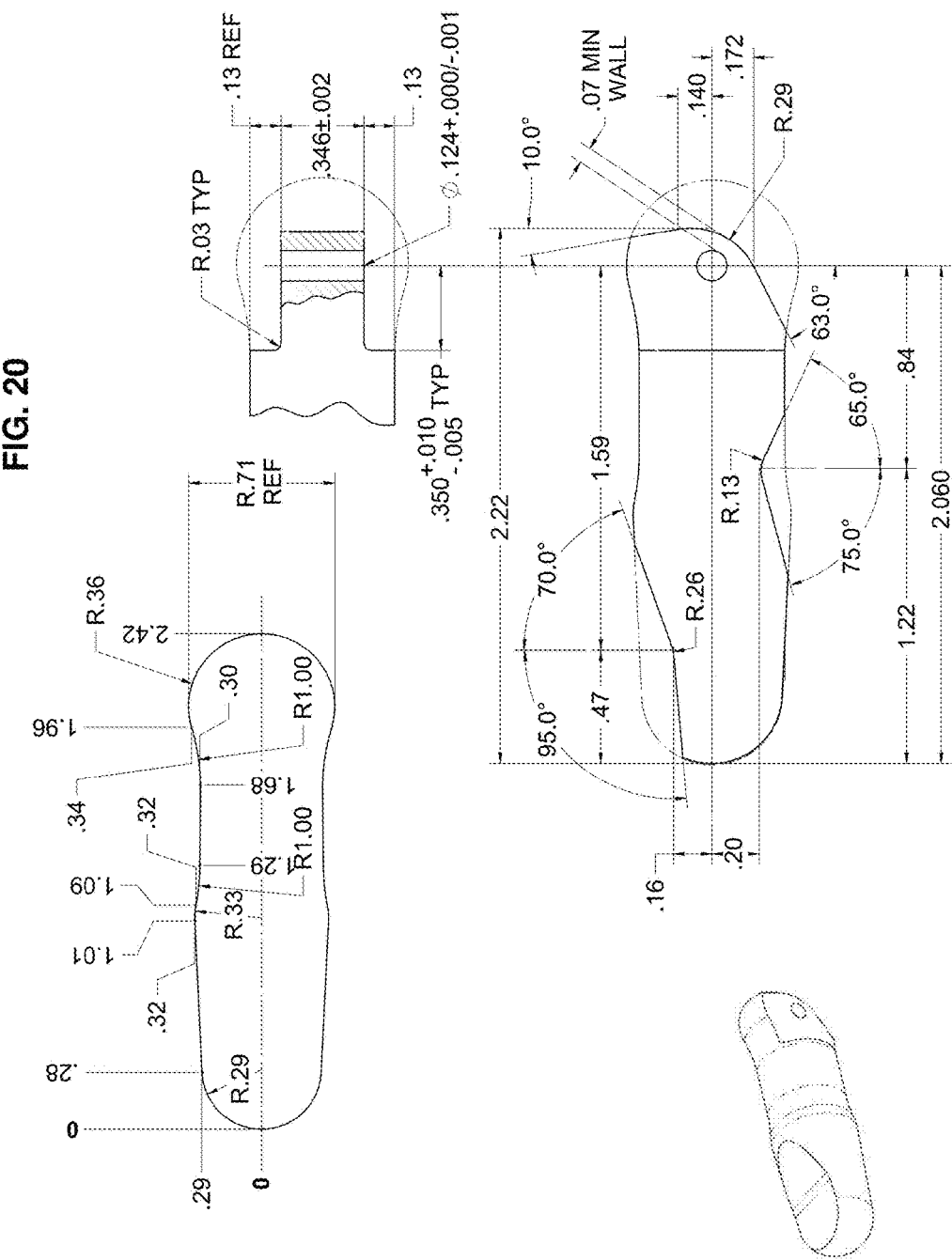
Figure 21:
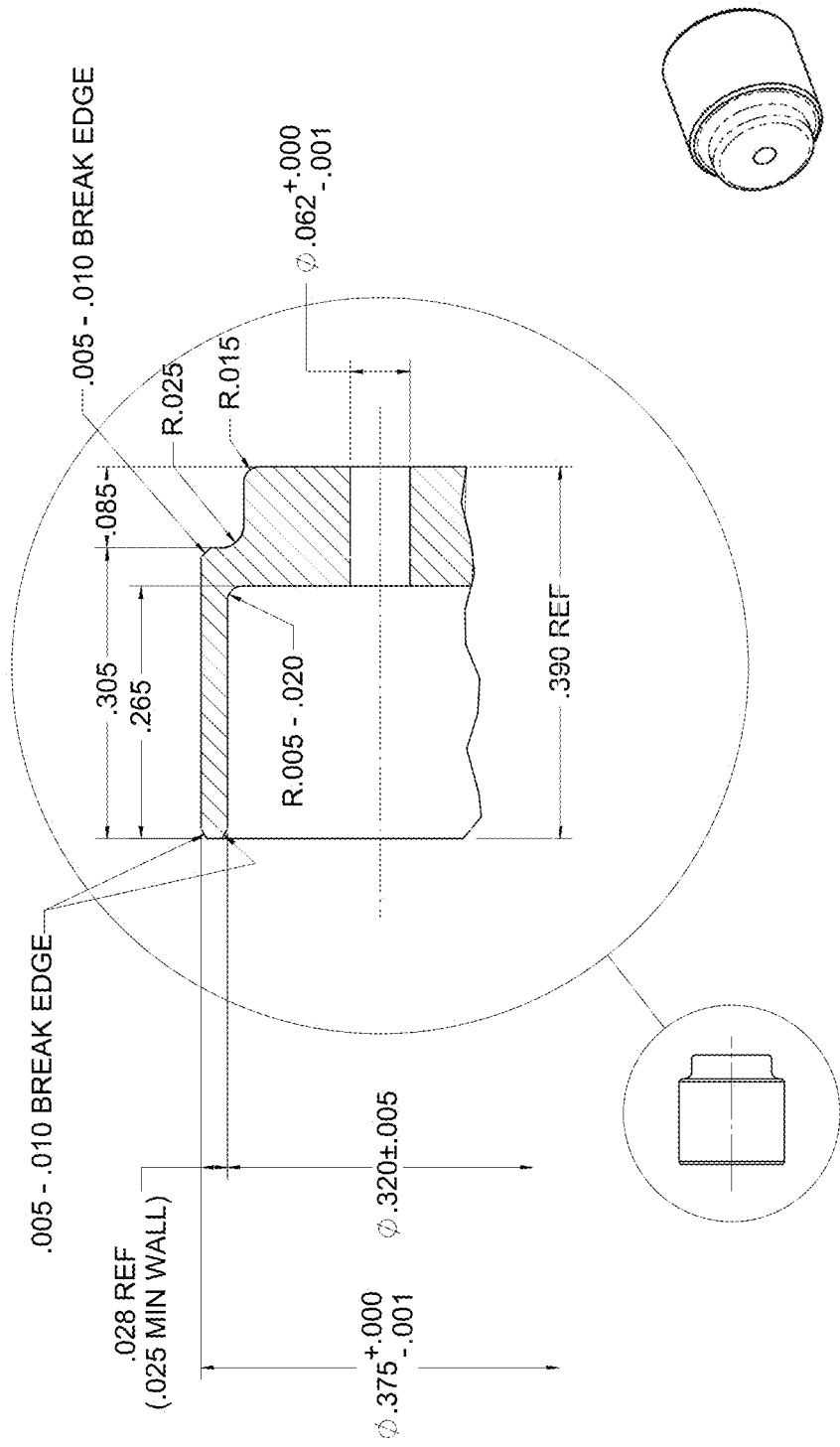

FIG. 6-1 depicts a front or top view, as well as a side view of a breakable finger assembly according to exemplary embodiments of the present invention;

FIG. 6-2 is an exploded view of the exemplary breakable finger assembly of FIG. 6-1;

FIG. 7-1 depicts a top and side view of an exemplary base for the breakable finger assembly of FIG. 6;

FIG. 7-2 depicts an exploded view of the base for the breakable finger assembly show in FIG. 7-1;

FIG. 8 illustrates details of a hand hyper extension break assembly according to exemplary embodiments of the present invention;

FIG. 9 is an exploded view of various elements of the hand hyper extension break assembly of FIG. 8;

FIG. 10 shows a bottom view (looking at the palm) and a side view of the hand hyper extension break assembly of FIGS. 8 and 9 mounted on a wrist assembly according to an exemplary embodiment of the present invention;

FIG. 11 shows further details of the wrist assembly of FIG. 10;

FIG. 12 shows details and exemplary parts for the breakable index finger sub-assembly shown in FIG. 6;

FIG. 13 illustrates details of exemplary sizes of the knuckle cam shown in FIG. 12;

FIG. 14 depicts further detail of the outside contour of the knuckle cam of FIG. 13;

FIG. 15A illustrates exemplary sizes and dimensions of the knuckle-break housing as shown in FIG. 12;

FIG. 15B depicts a perspective view and cross-section A-A of the housing of FIG. 15A;

FIG. 16 provides details of the exemplary knuckle-break piston which fits into the knuckle-break housing; said knuckle-break piston also shown in FIG. 12;

FIG. 17 provides details and exemplary dimensions of the plug as shown in FIG. 12;

FIG. 18 provides details of the knuckle-cam adapter as shown in FIG. 12;

FIG. 19 shows details and exemplary dimensions of the index finger proximal segment shown in FIG. 12;

FIG. 20 shows details and exemplary dimensions of the index finger distal segment shown in FIG. 12;

FIG. 21 provides details and exemplary dimensions of the piston shown in FIG. 12;

Force and Range of Motion Figures

Figure 22:
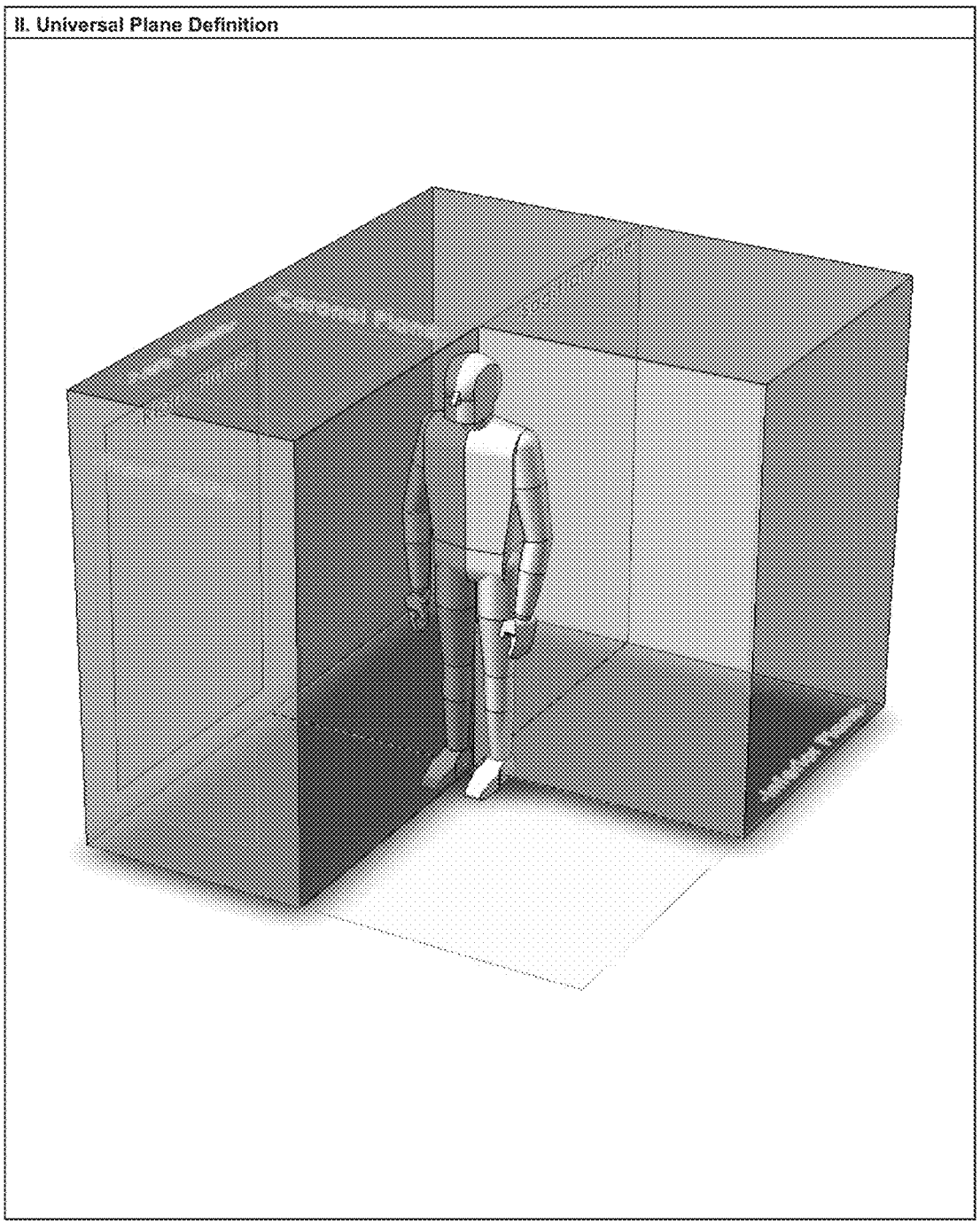
Figure 23:
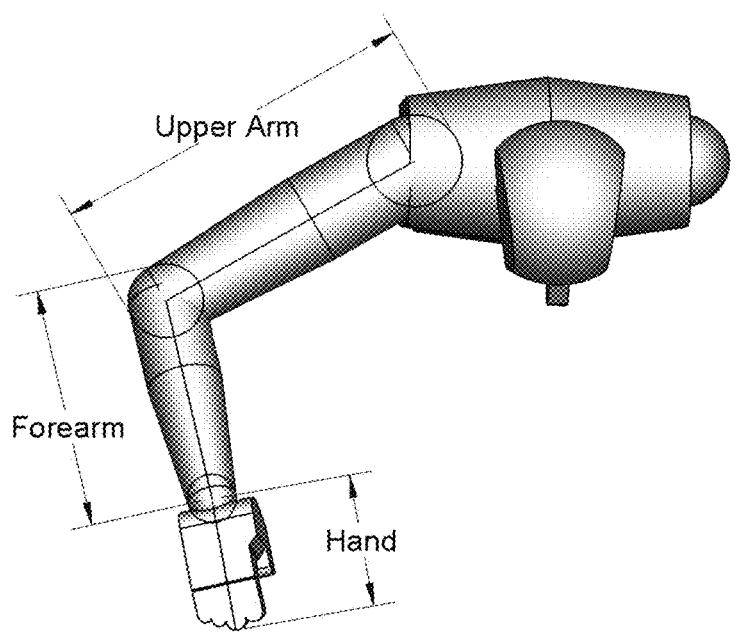
Figure 24:
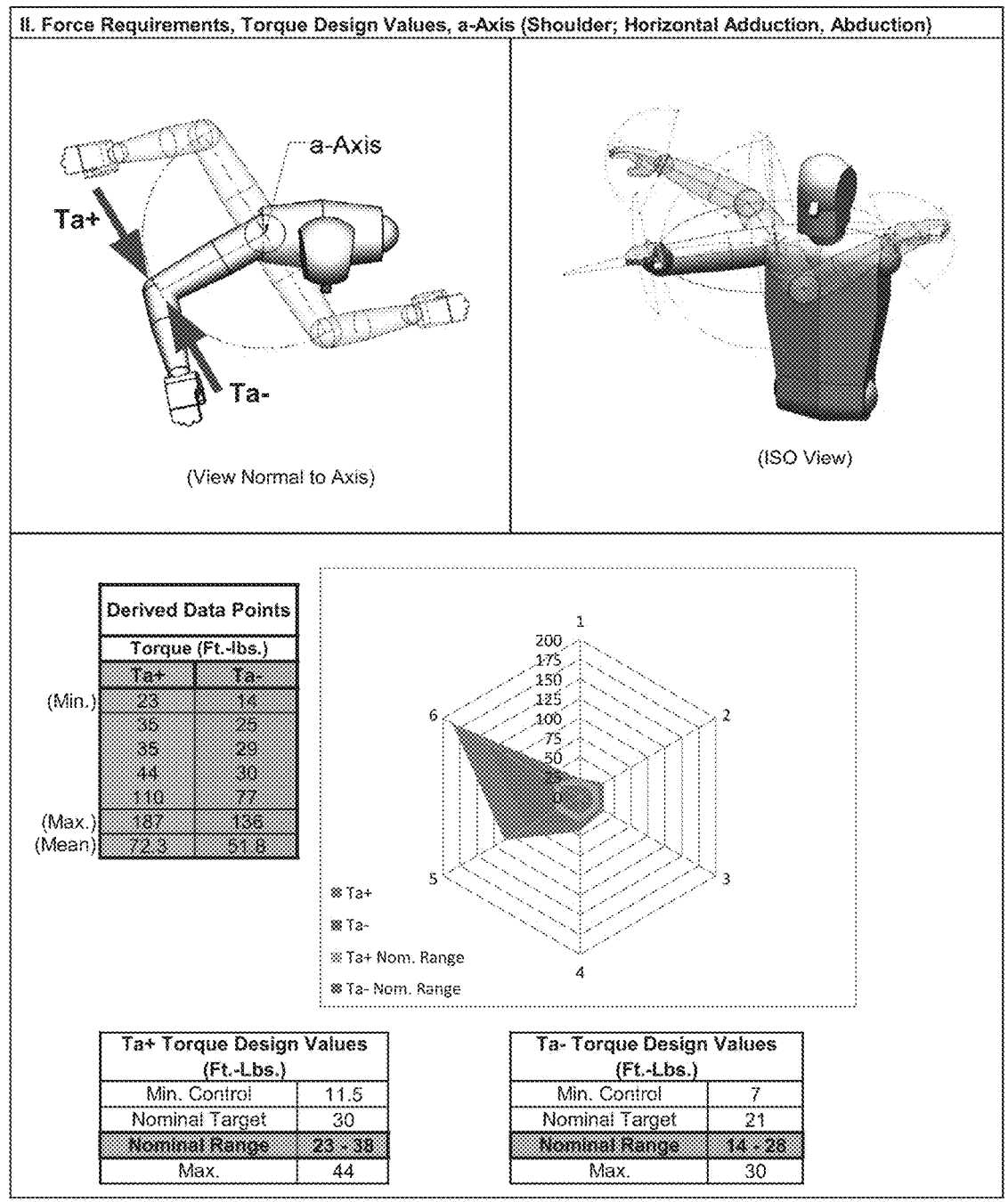
Figure 25:
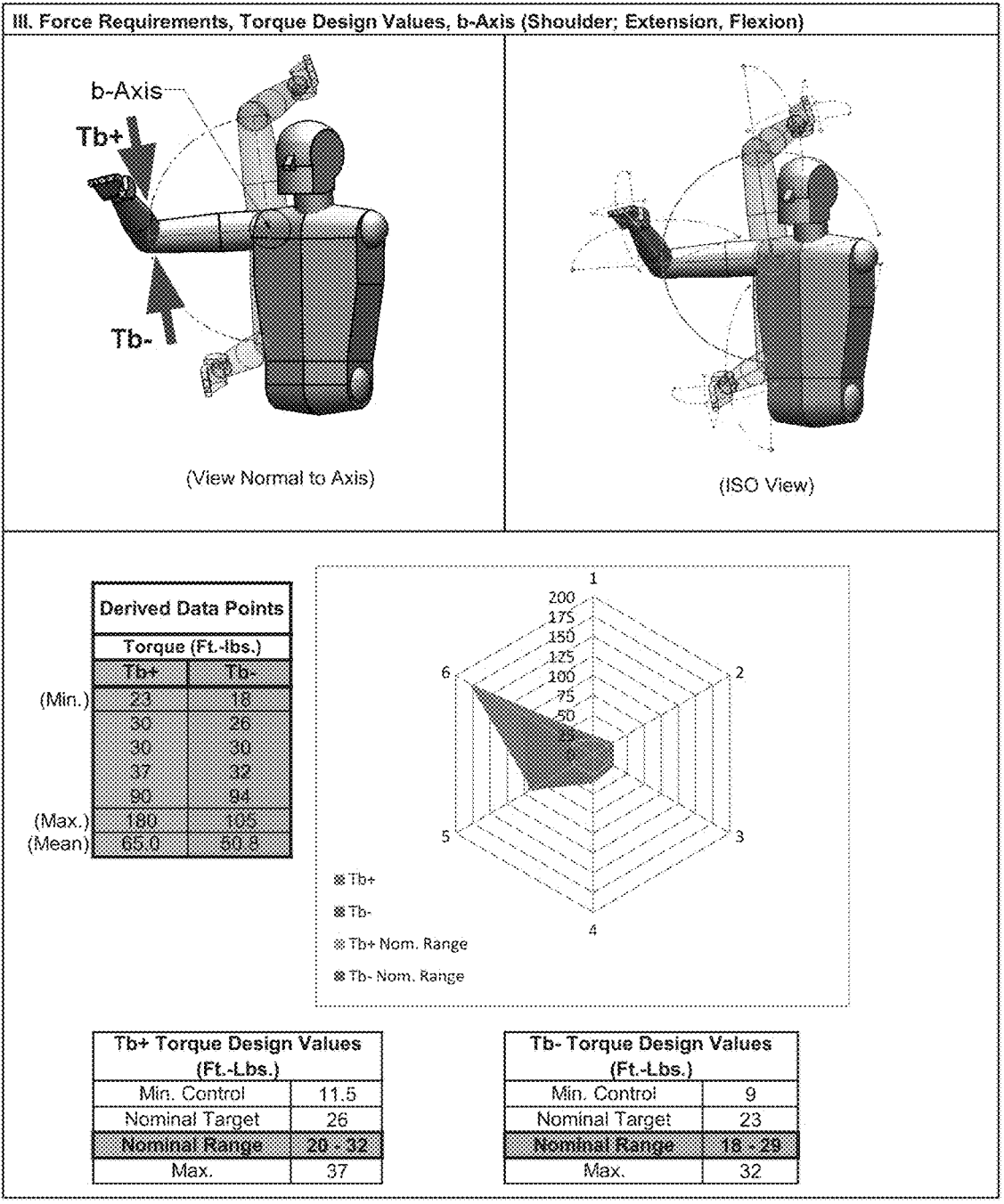
Figure 26:
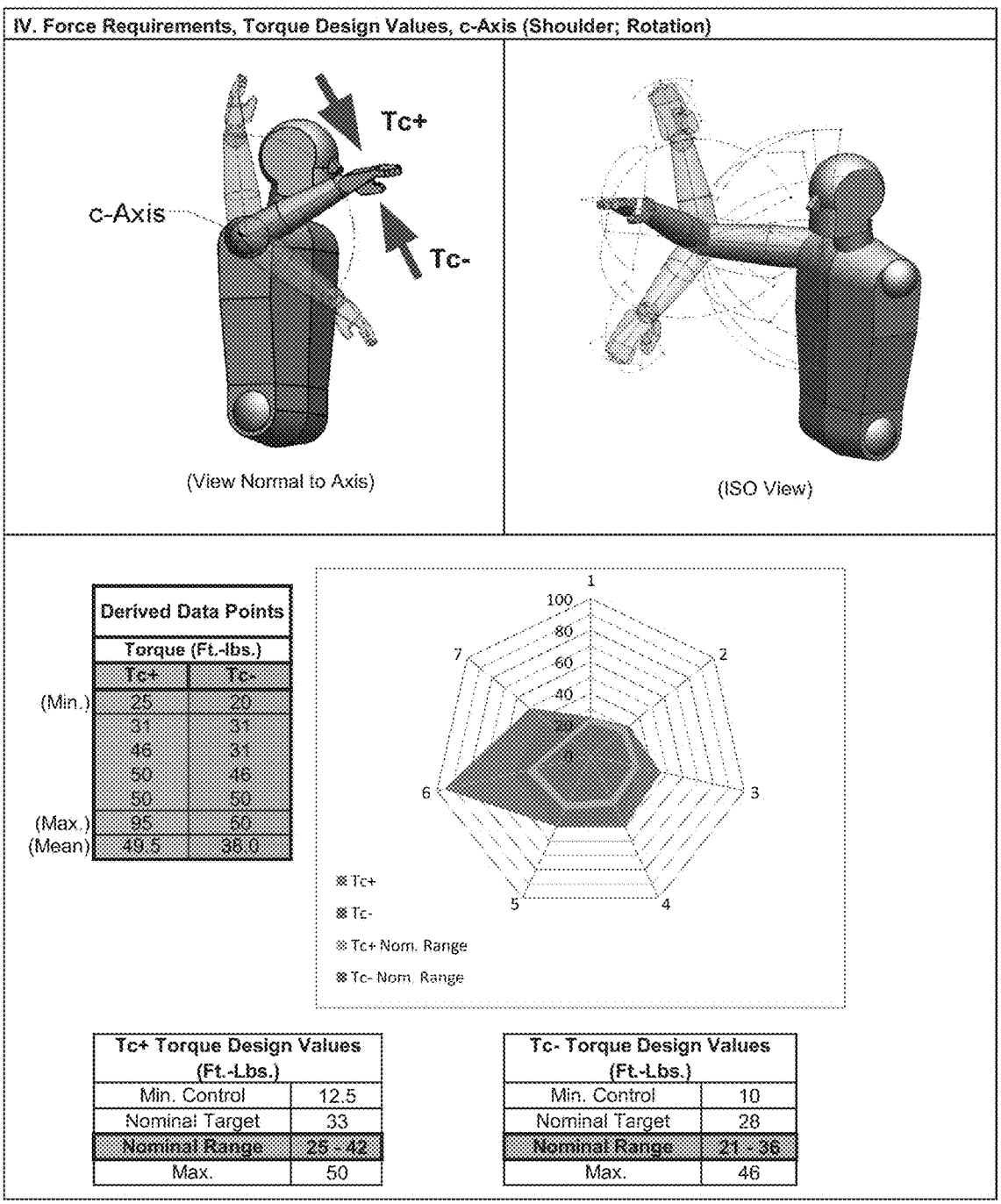
Figure 27:
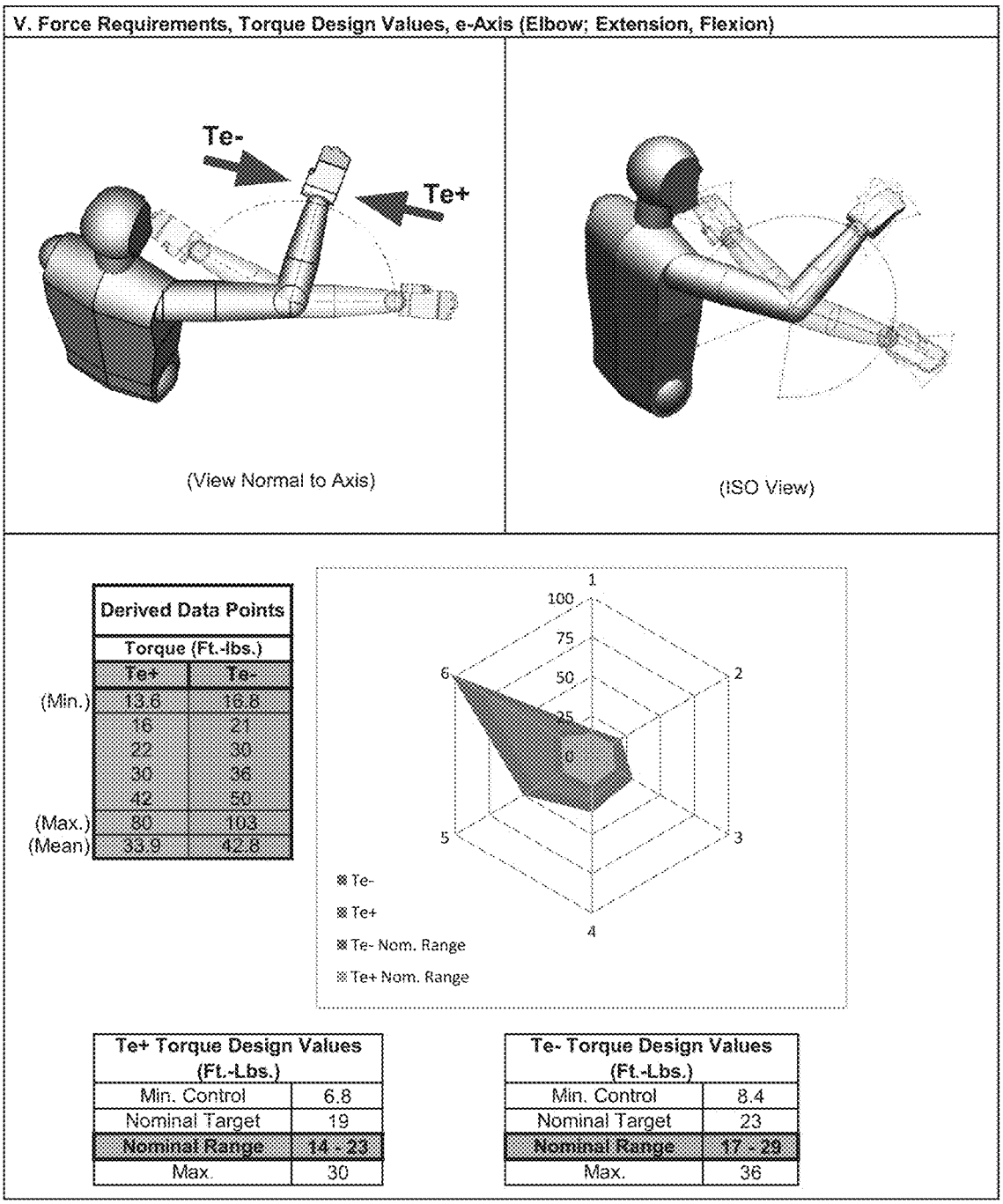
Figure 28:
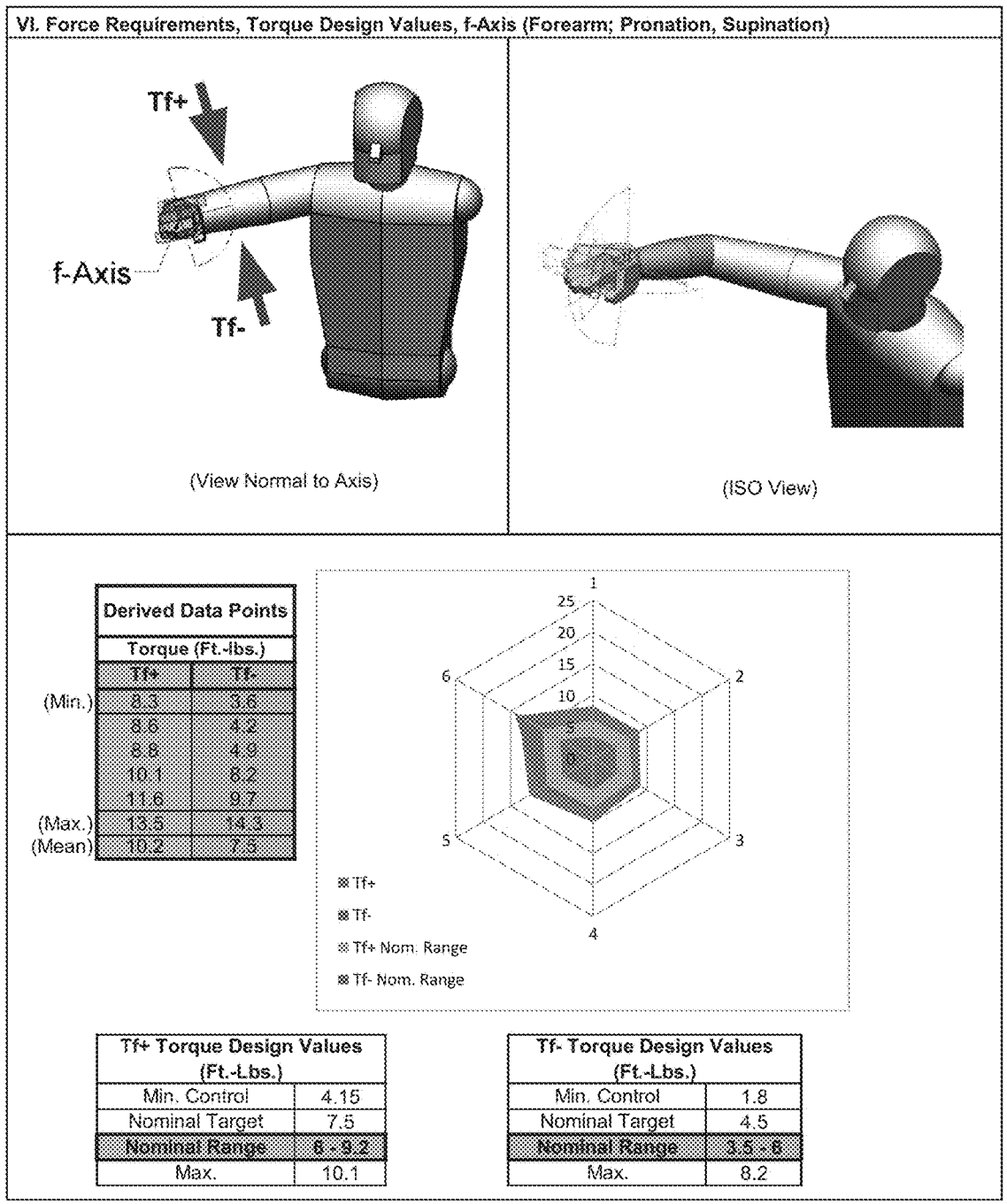
Figure 29:
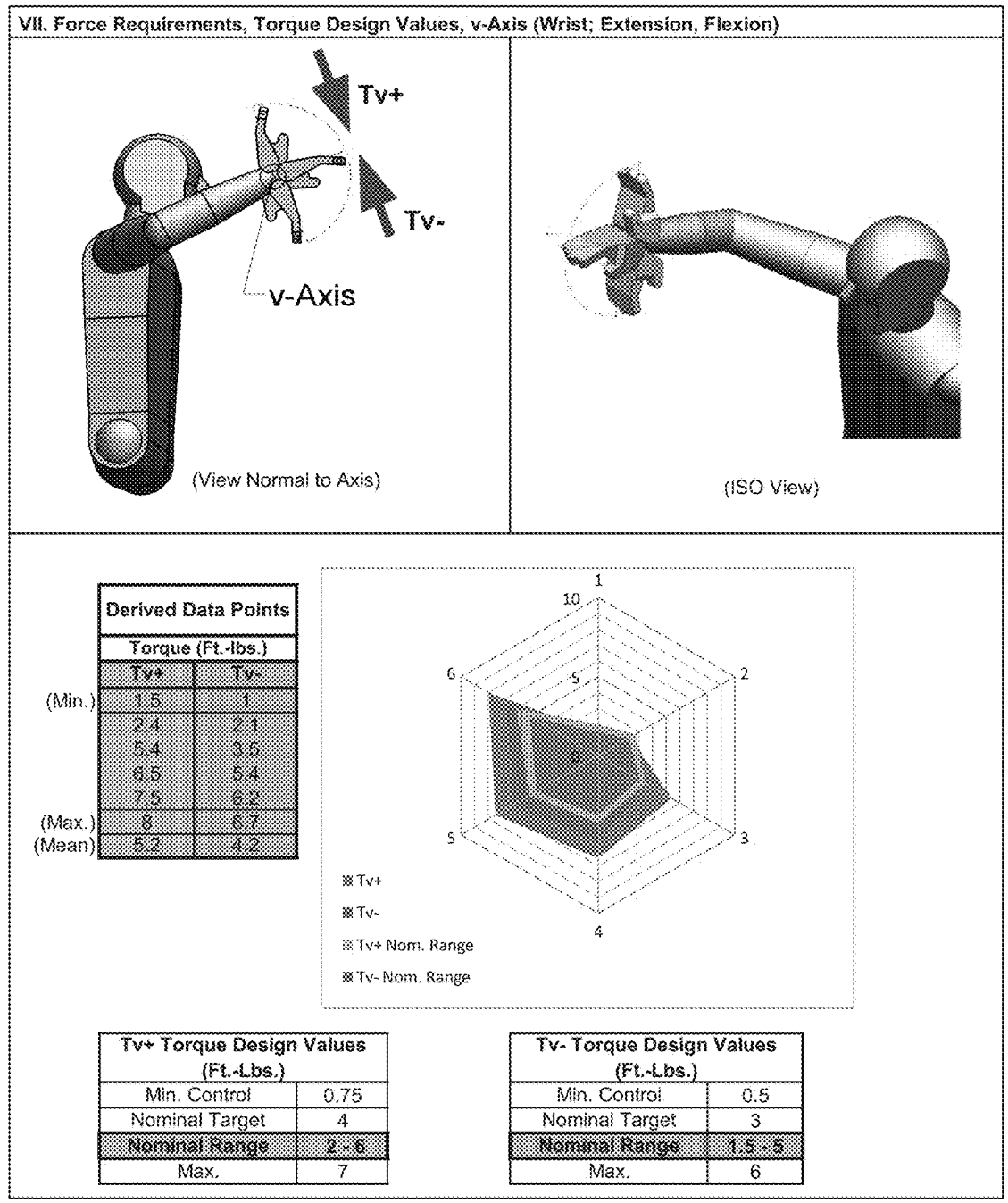
Figure 30:
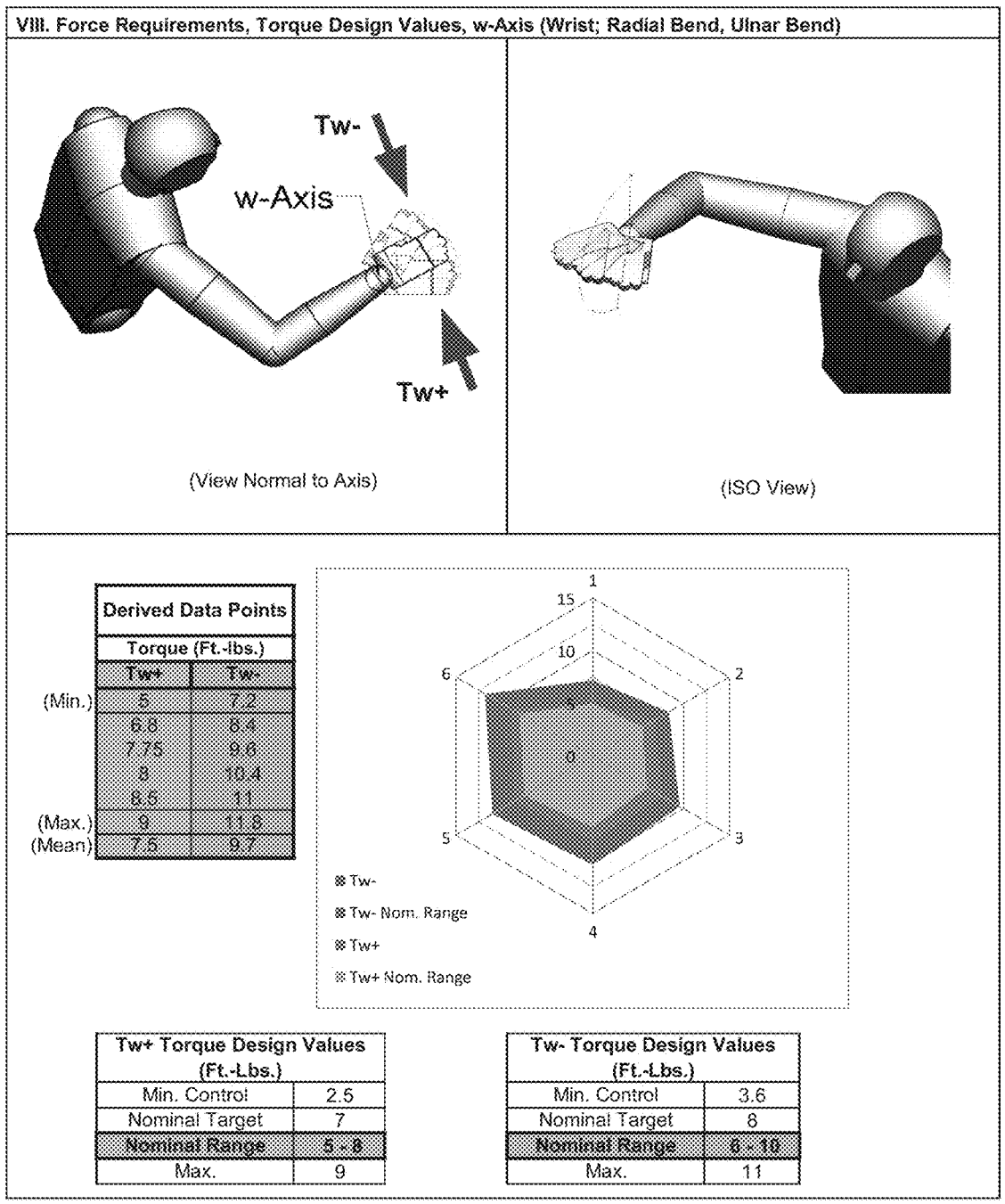
Figure 31:
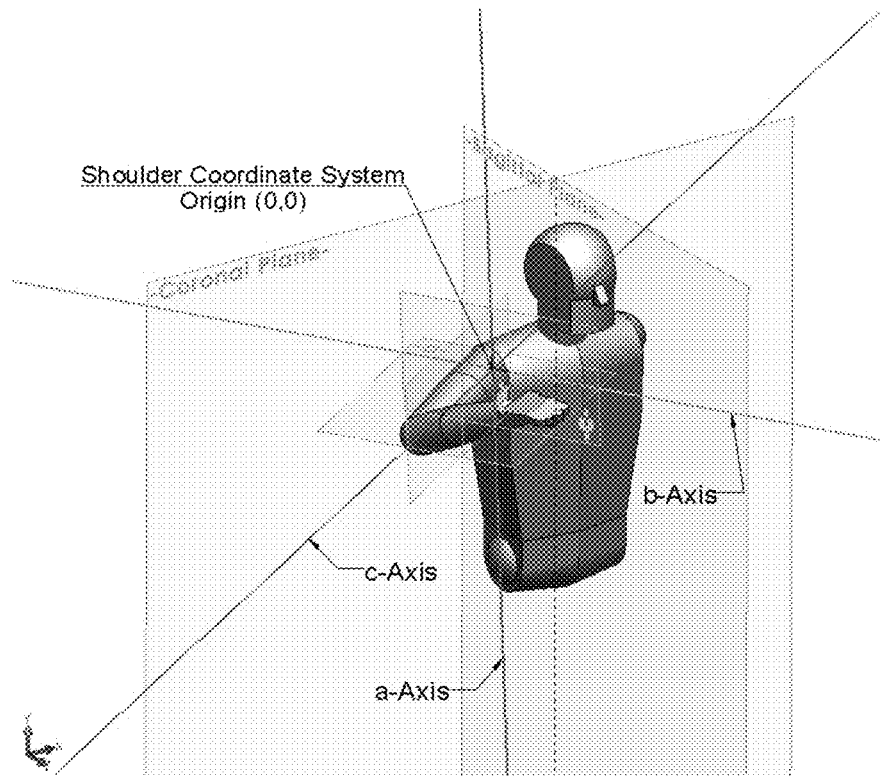
Figure 32:
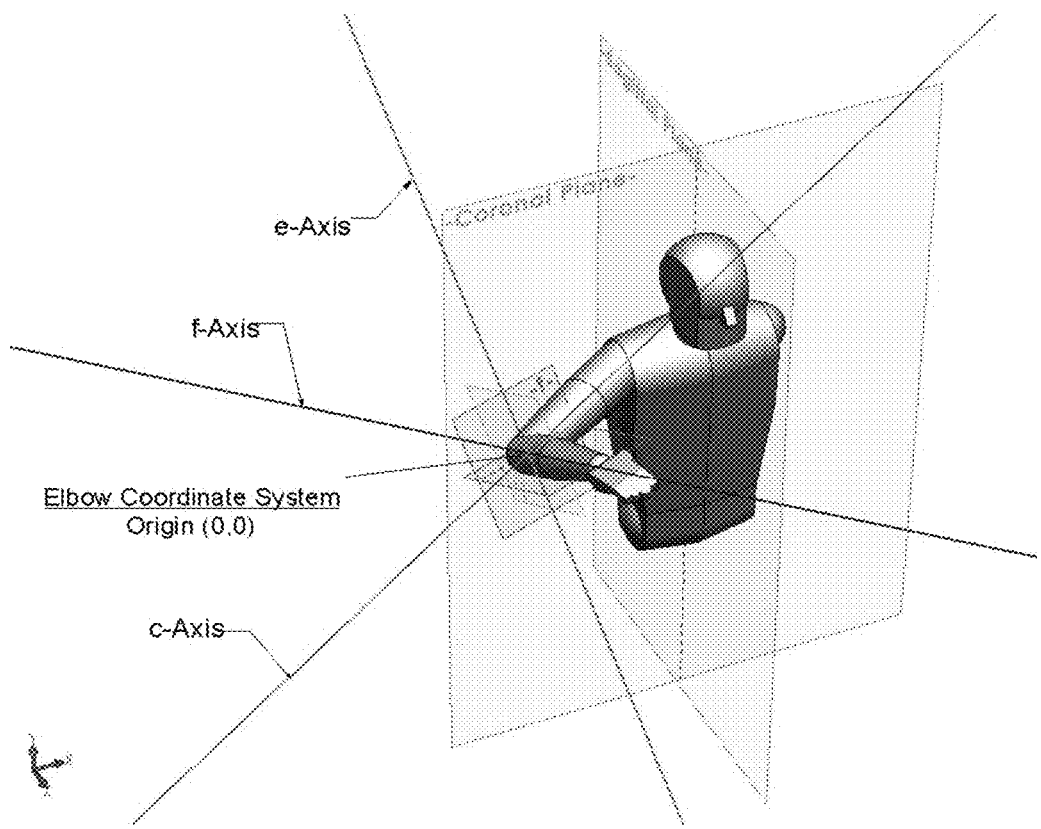
Figure 33:
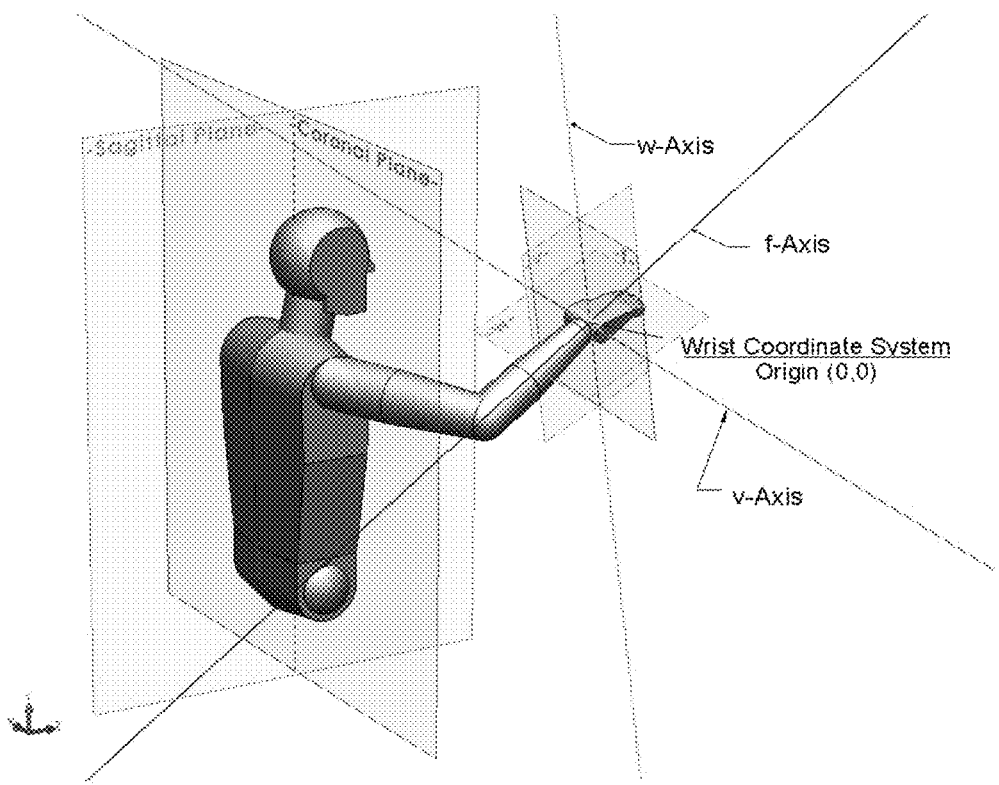
Figure 34:
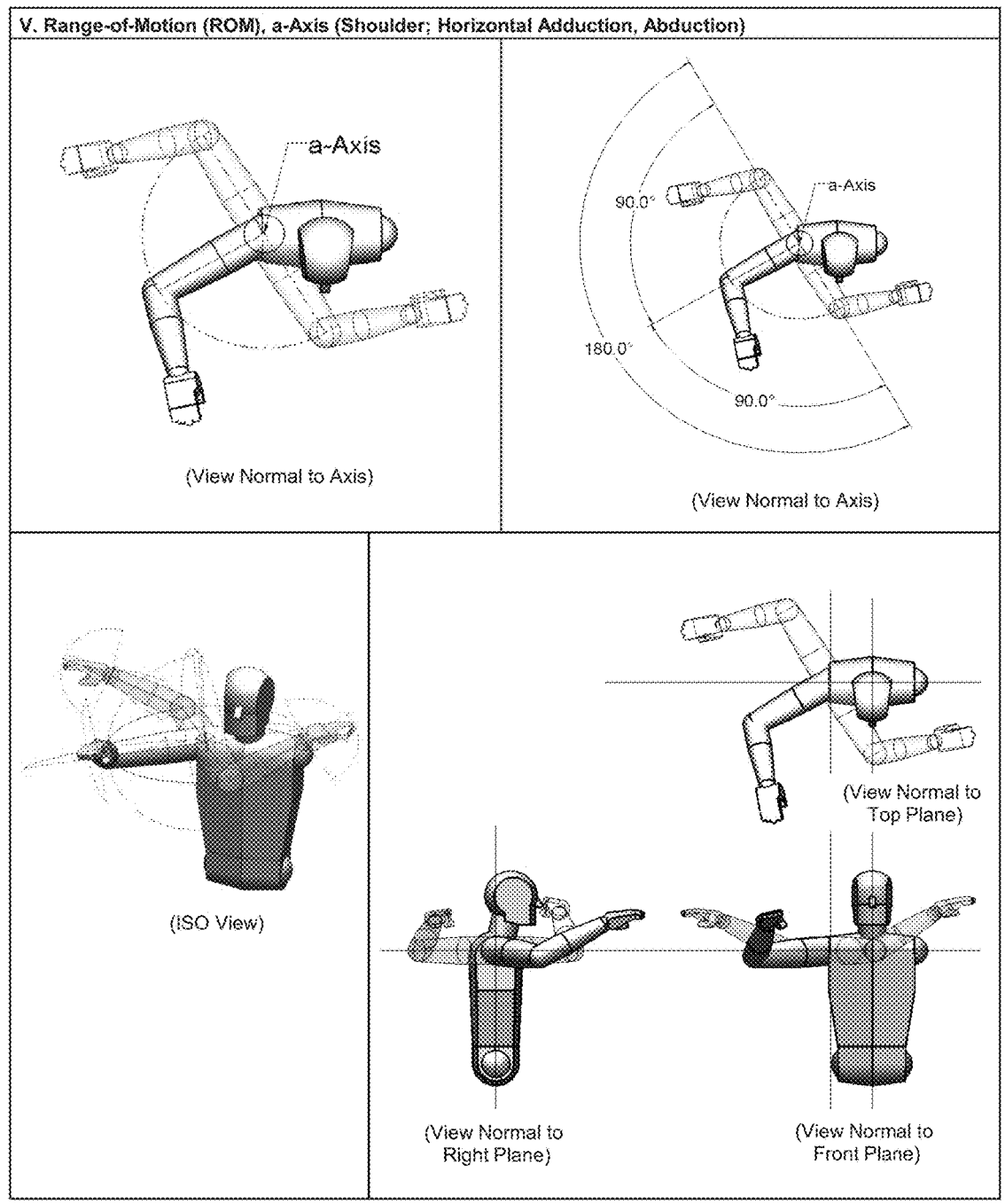
Figure 35:
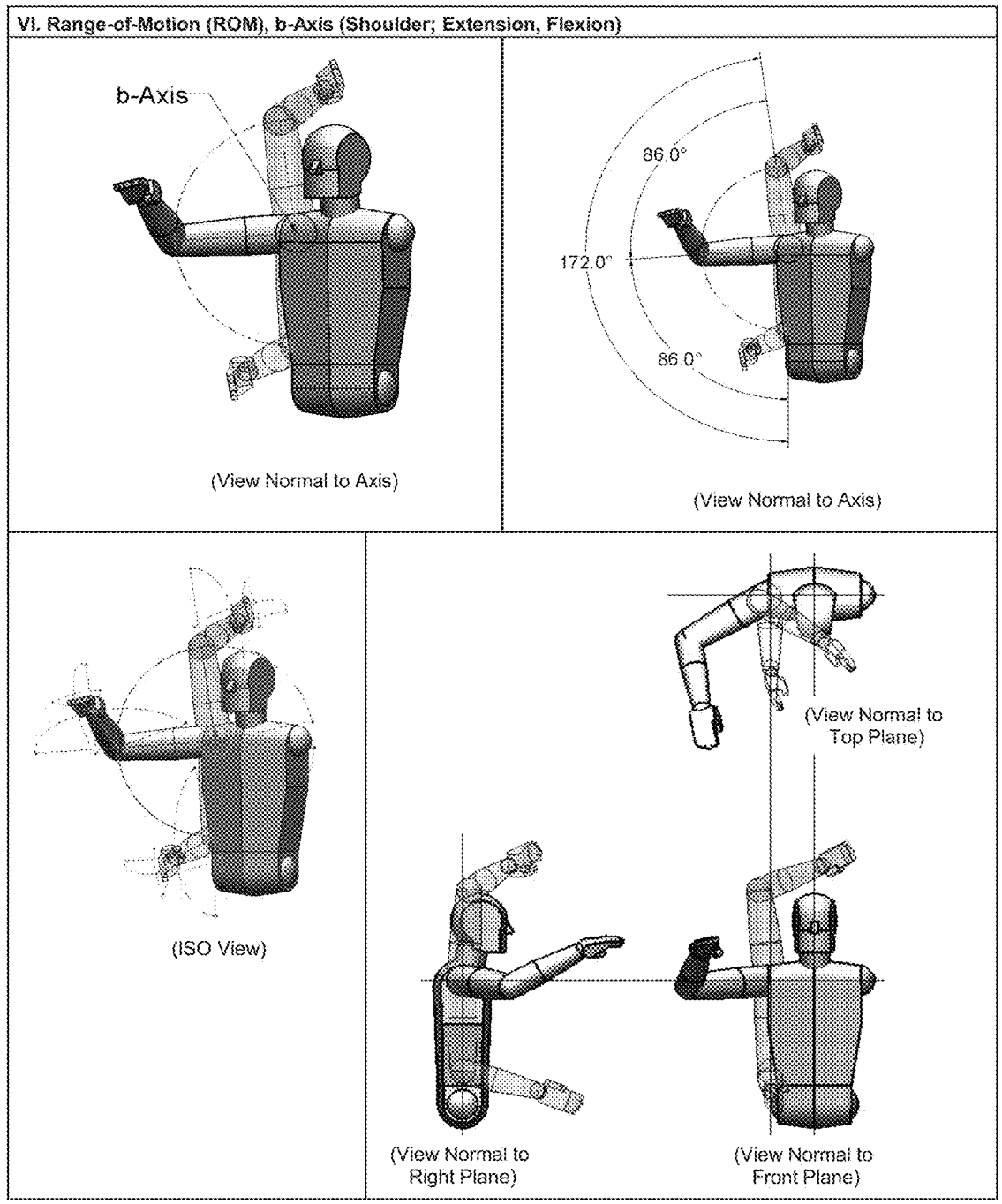
Figure 36:
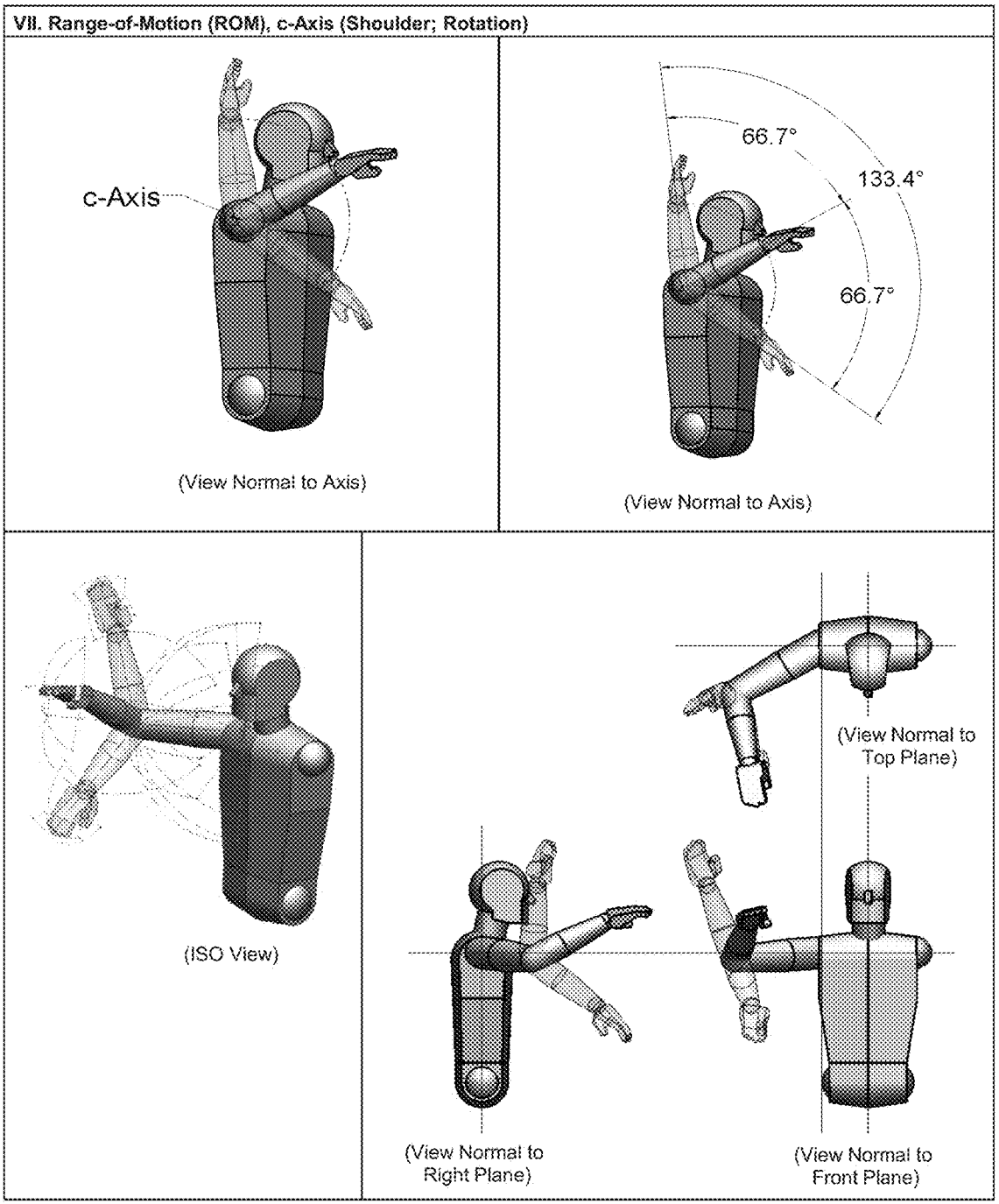
Figure 37:
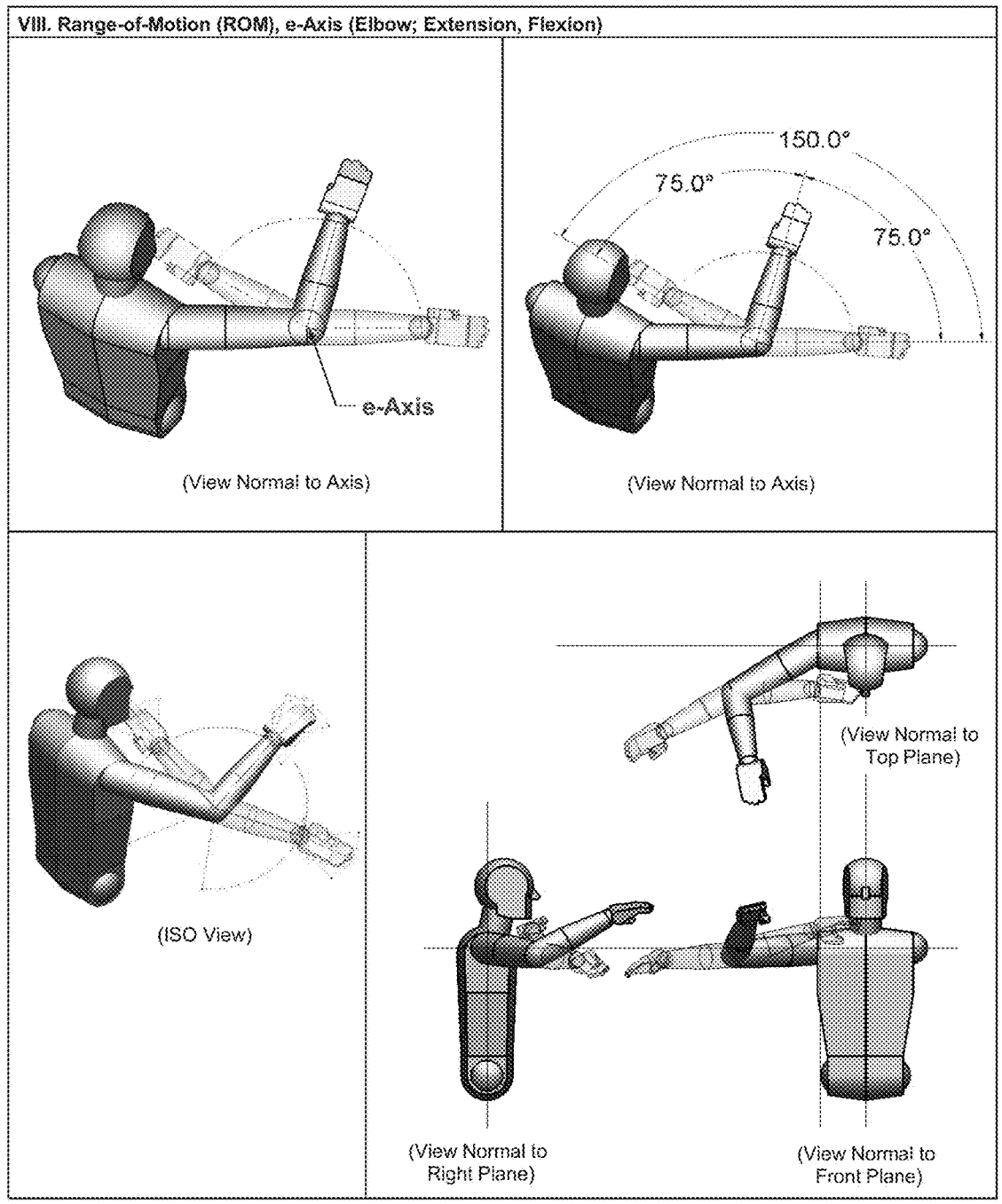
Figure 38:
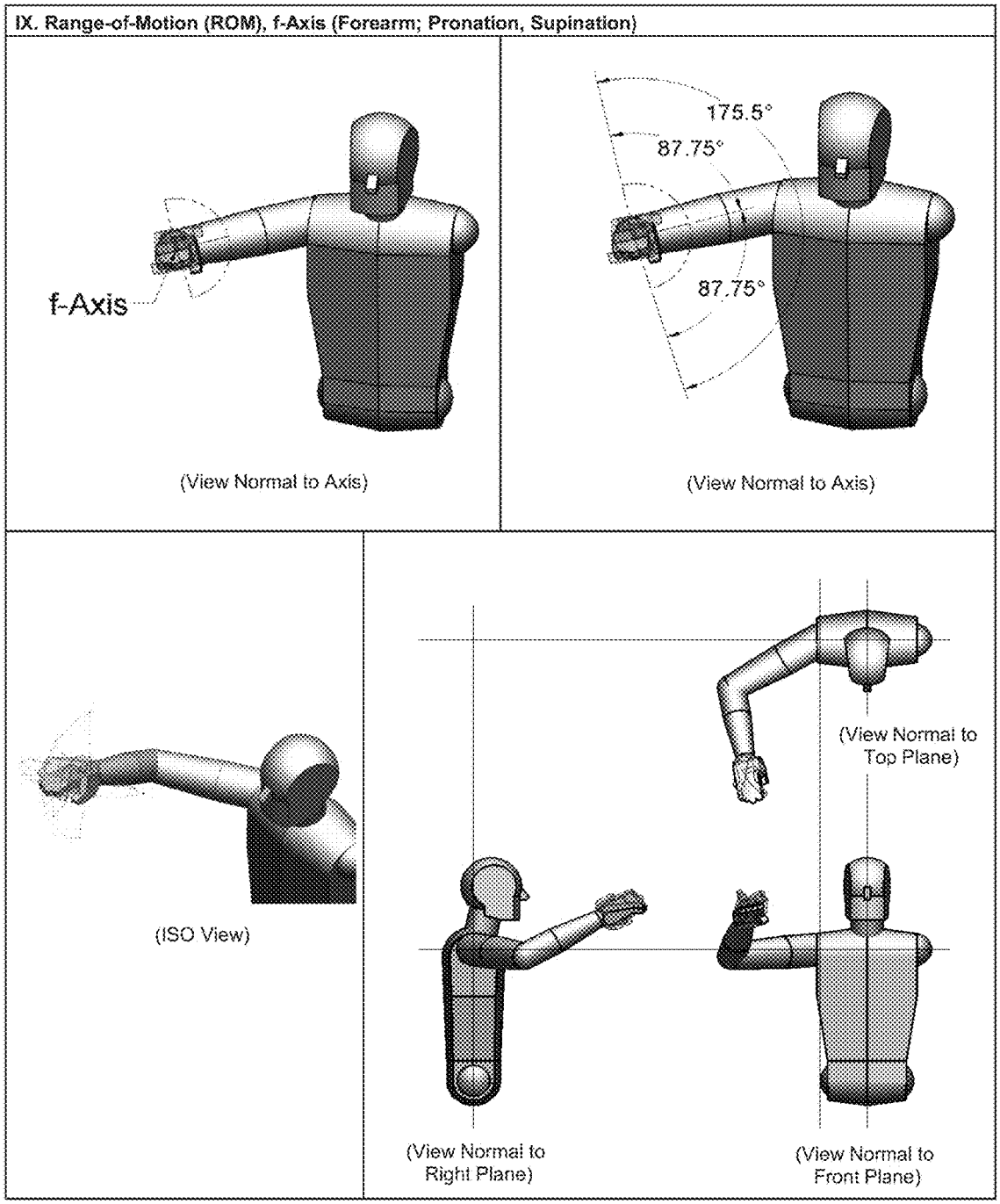
Figure 39:
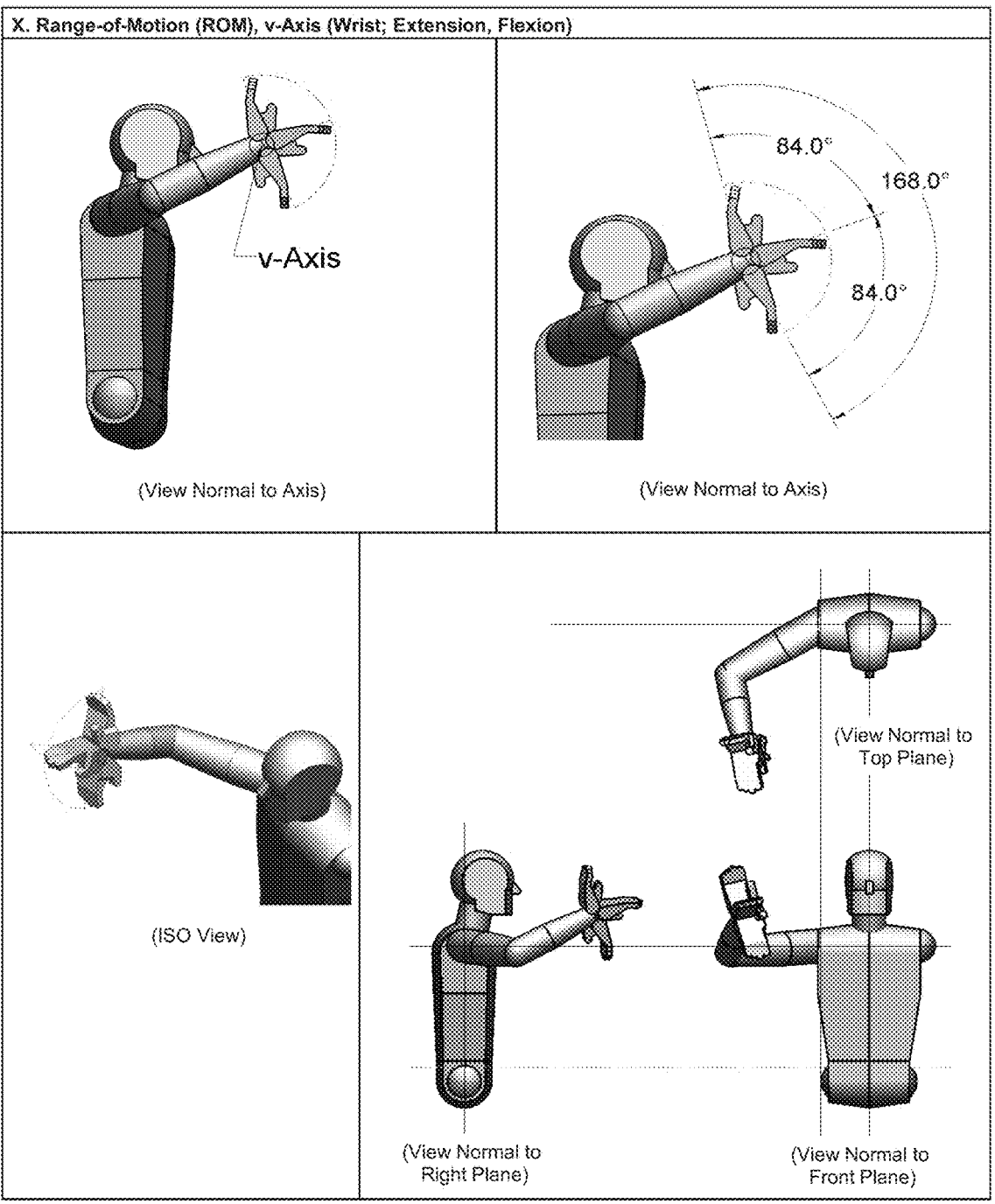
Figure 40:
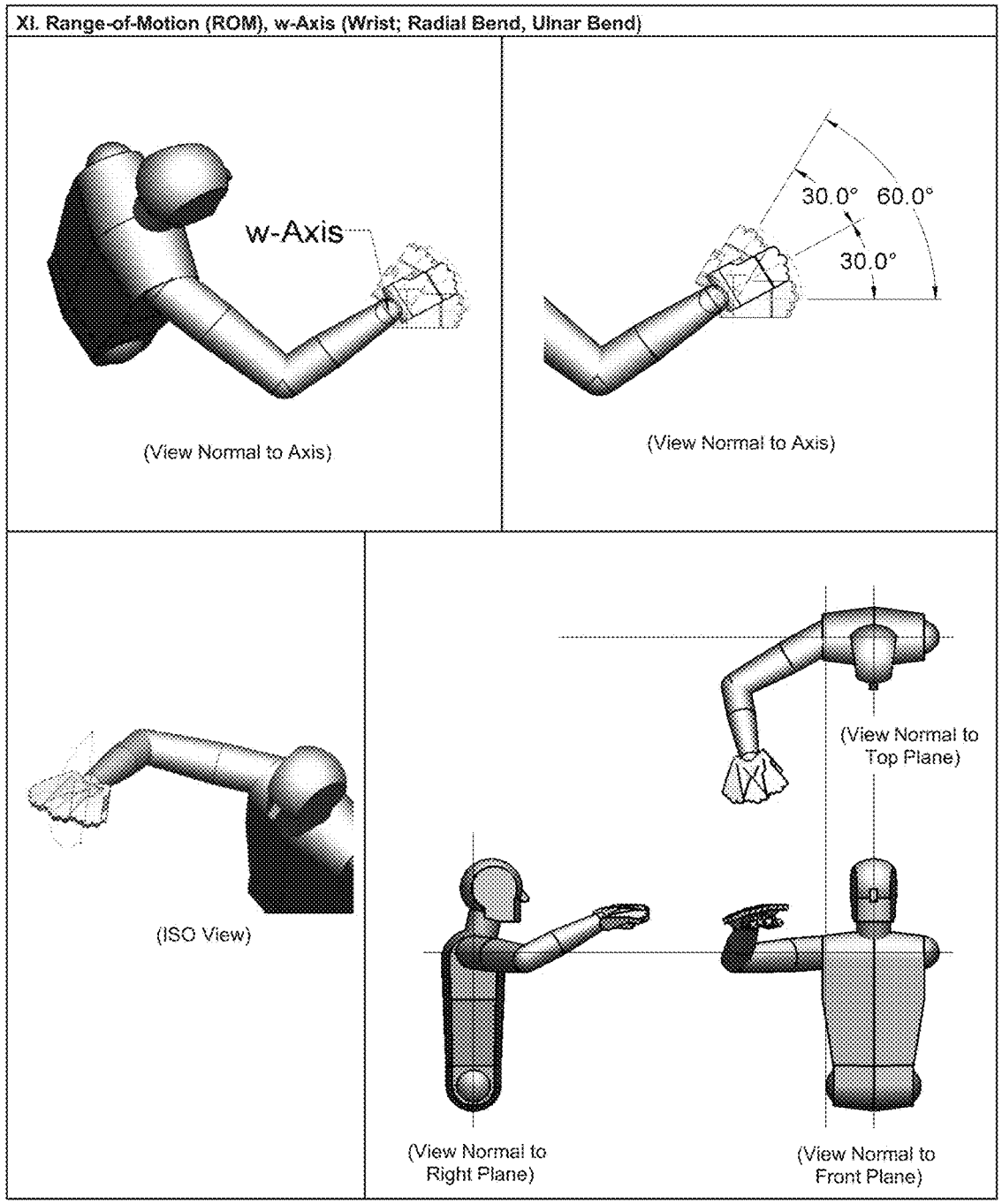

FIG. 22 depicts an exemplary universal plane definition for use in illustrating ranges of motion for the exemplary arm and wrist portions of an exemplary training device according to exemplary embodiments of the present invention;

FIG. 23 is a top view providing exemplary arm segment lengths for each of the upper arm, forearm and hand of exemplary Trubreak device according to exemplary embodiments of the present invention;

FIG. 24 illustrates force requirements and torque design values for an exemplary shoulder a-Axis (horizontal adduction and abduction) for the exemplary Trubreak device shown in FIG. 23;

FIG. 25 illustrates force requirements and torque design values for an exemplary shoulder b-Axis (extension and flexion) for the exemplary Trubreak device shown in FIG. 23;

FIG. 26 illustrates force requirements and torque design values for an exemplary shoulder c-Axis (rotation) for the exemplary Trubreak device shown in FIG. 23;

FIG. 27 illustrates force requirements and torque design values for the exemplary elbow e-Axis (extension and flexion) of the exemplary device of FIG. 23;

FIG. 28 illustrates force requirement and torque design values for the exemplary forearm f-Axis of the exemplary device of FIG. 23 which is the forearm axis used in pronation and supination;

FIG. 29 illustrates force requirements and torque design values for the exemplary v-Axis which is a wrist axis used in extension and flexion;

FIG. 30 illustrates force requirements and torque design values for the exemplary w-Axis of the exemplary device which is a wrist axis used in radial bend and ulnar bend;

FIG. 31 illustrates range of motion for various shoulder, arm and wrist axes (a, b and c, of (of FIGS. 24-26)) in a combined diagram for ease of viewing;

FIG. 32 shows exemplary elbow axes c, e and f (of FIGS. 26-28) in a similar combined diagram;

FIG. 33 shows wrist axes f, w and v (of FIGS. 28-30) in a similar combined diagram;

FIG. 34 illustrates an exemplary range of motion for the shoulder a-Axis (horizontal adduction and abduction);

FIG. 35 illustrates an exemplary range of motion for the shoulder b-Axis (extension and flexion);

FIG. 36 illustrates an exemplary range of motion for the shoulder c-Axis (rotation);

FIG. 37 illustrates an exemplary range of motion for the elbow e-Axis (extension and flexion);

FIG. 38 illustrates an exemplary range of motion for the forearm f-Axis (pronation and supination);

FIG. 39 illustrates an exemplary range of motion for the wrist v-Axis (extension and flexion);

FIG. 40 illustrates an exemplary range of motion for the wrist w-Axis (radial bend and ulnar bend);

Eye Assembly Figures

Figure 41:
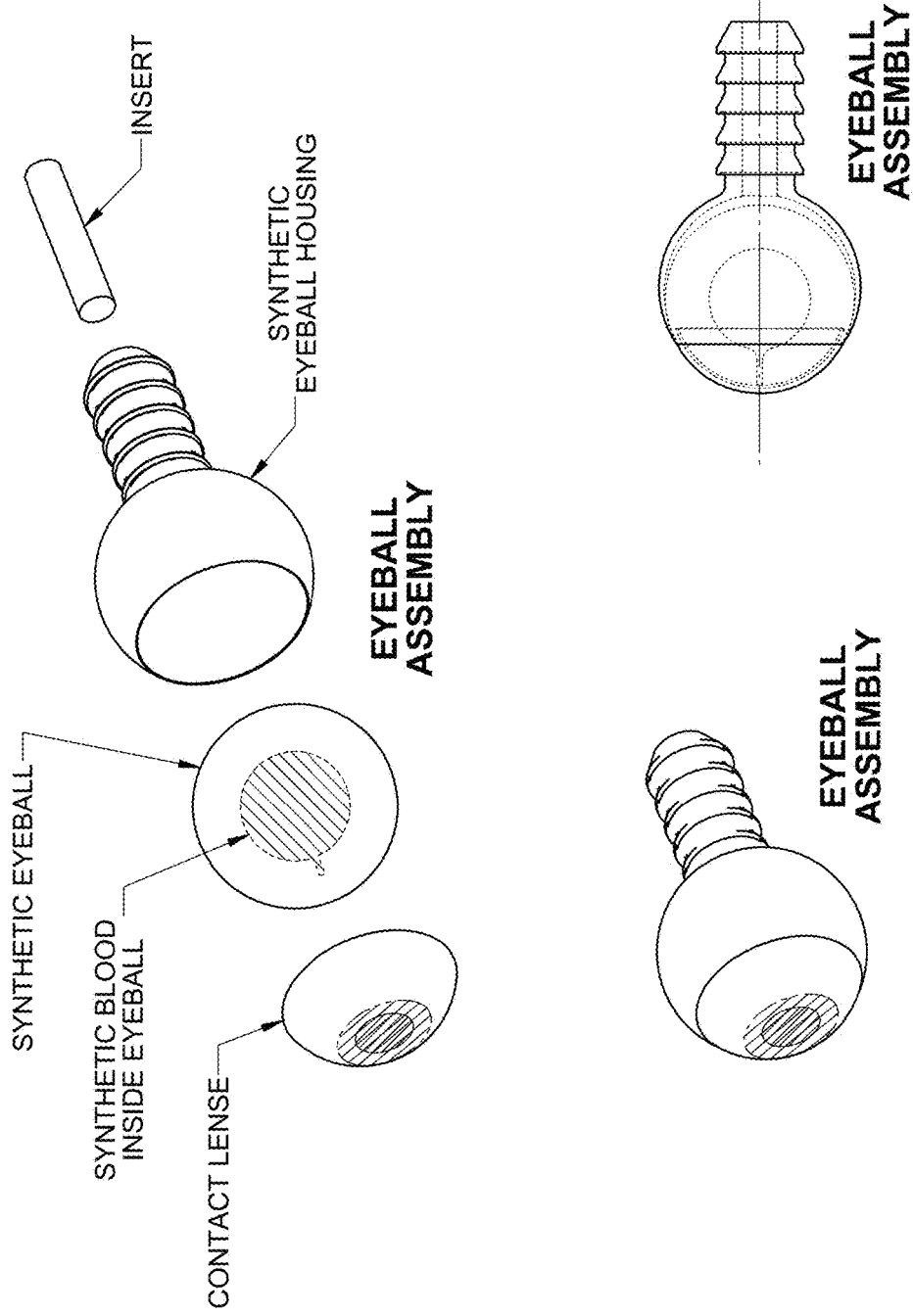
Figure 42:
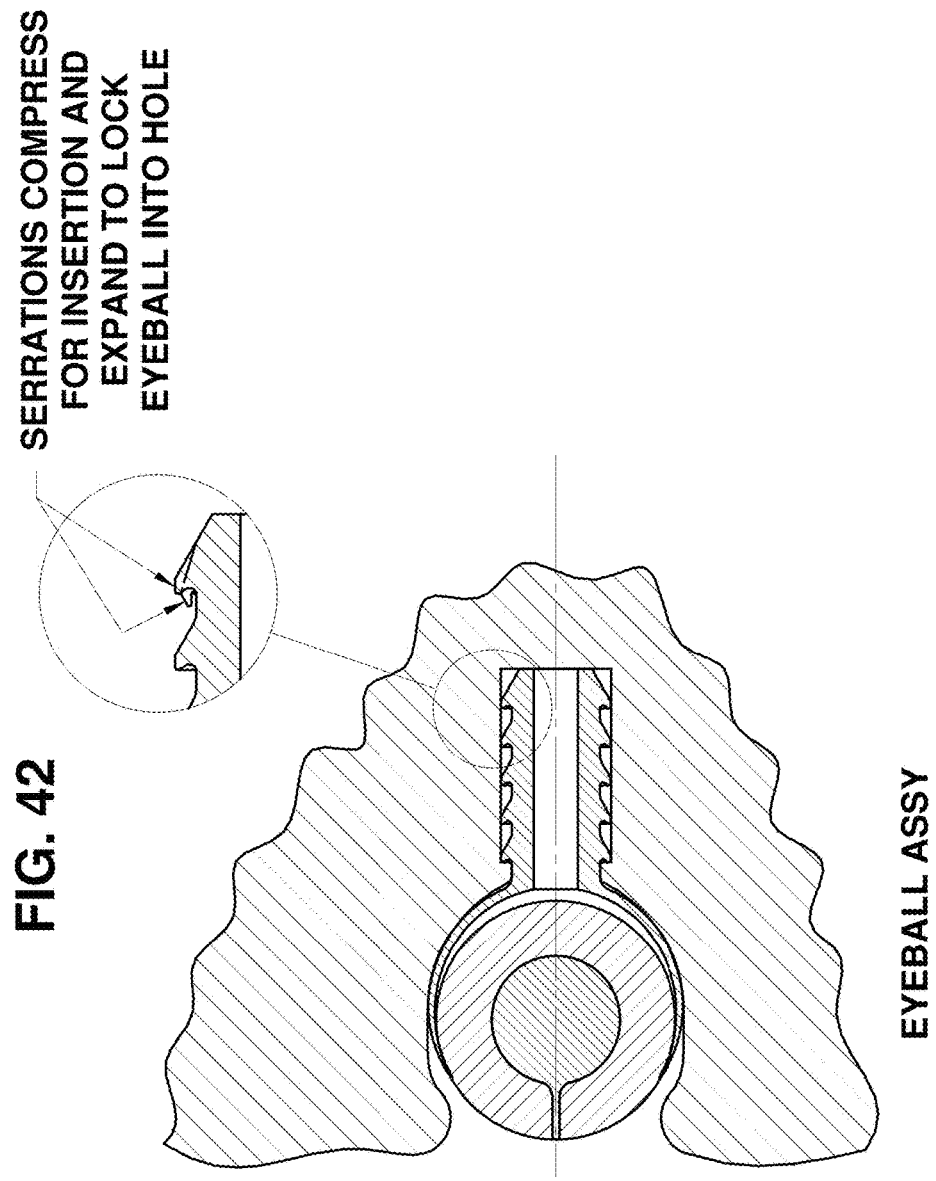
Figure 43:
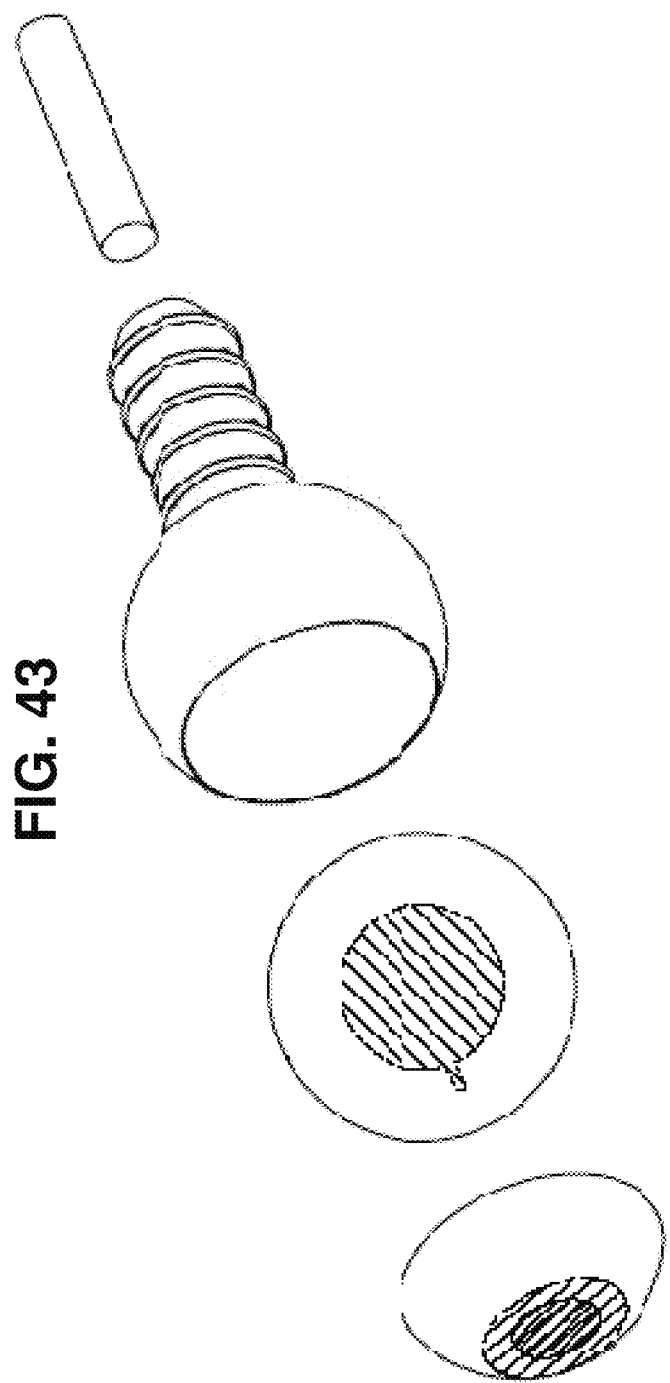
Figure 44:
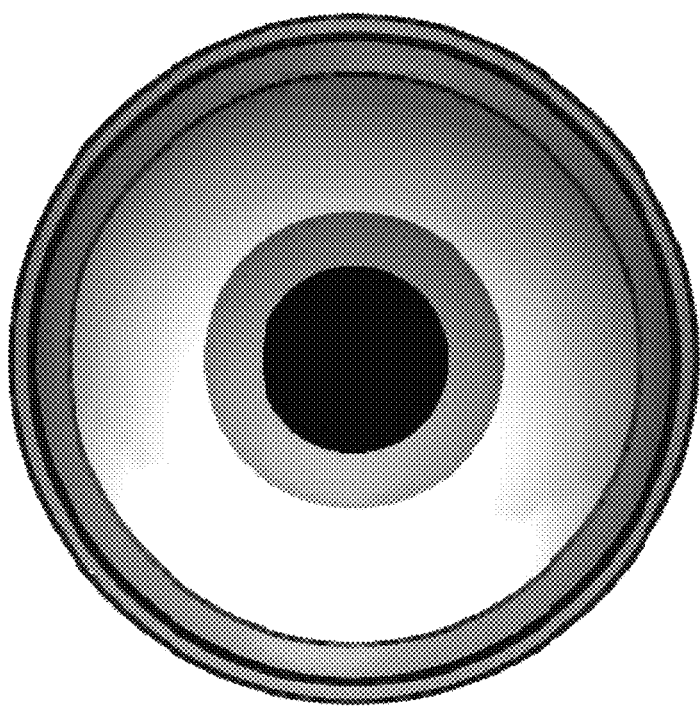
Figure 45:
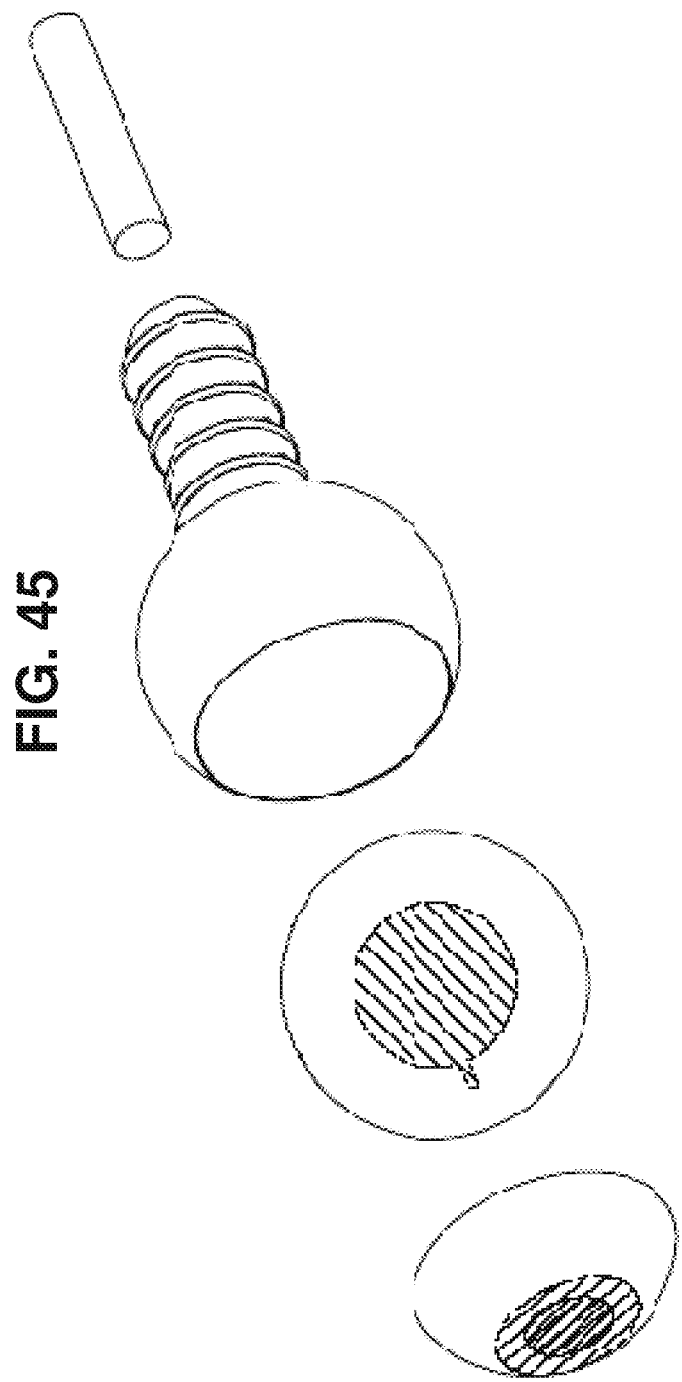
Figure 46:
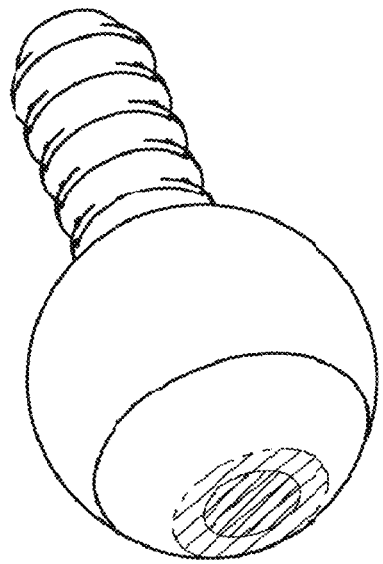
Figure 47:
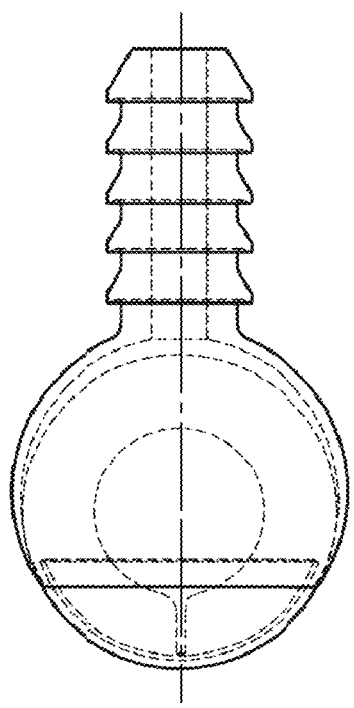

FIG. 41 depicts exploded views of an exemplary eyeball assembly, and details thereof according to an exemplary embodiment of the present invention;

FIG. 42 depicts the exemplary eyeball assembly of FIG. 41 fitting into an exemplary socket and details of its affixation therein;

FIG. 43 depicts a detailed exploded view of the exemplary eyeball assembly of FIG. 41;

FIG. 44 depicts a close up of the exemplary eye surface (a contact lens) of the exemplary eyeball assembly of FIG. 41;

FIG. 45 depicts the elements of the eyeball assembly of FIG. 41 aligned on a central axis;

FIG. 46 depicts a magnified version of the RS view of the eyeball assembly of FIG. 41;

FIG. 47 depicts a magnified version of the ISO view of the eyeball assembly of FIG. 41;

Full View Interaction Regions Figures

Figure 48:
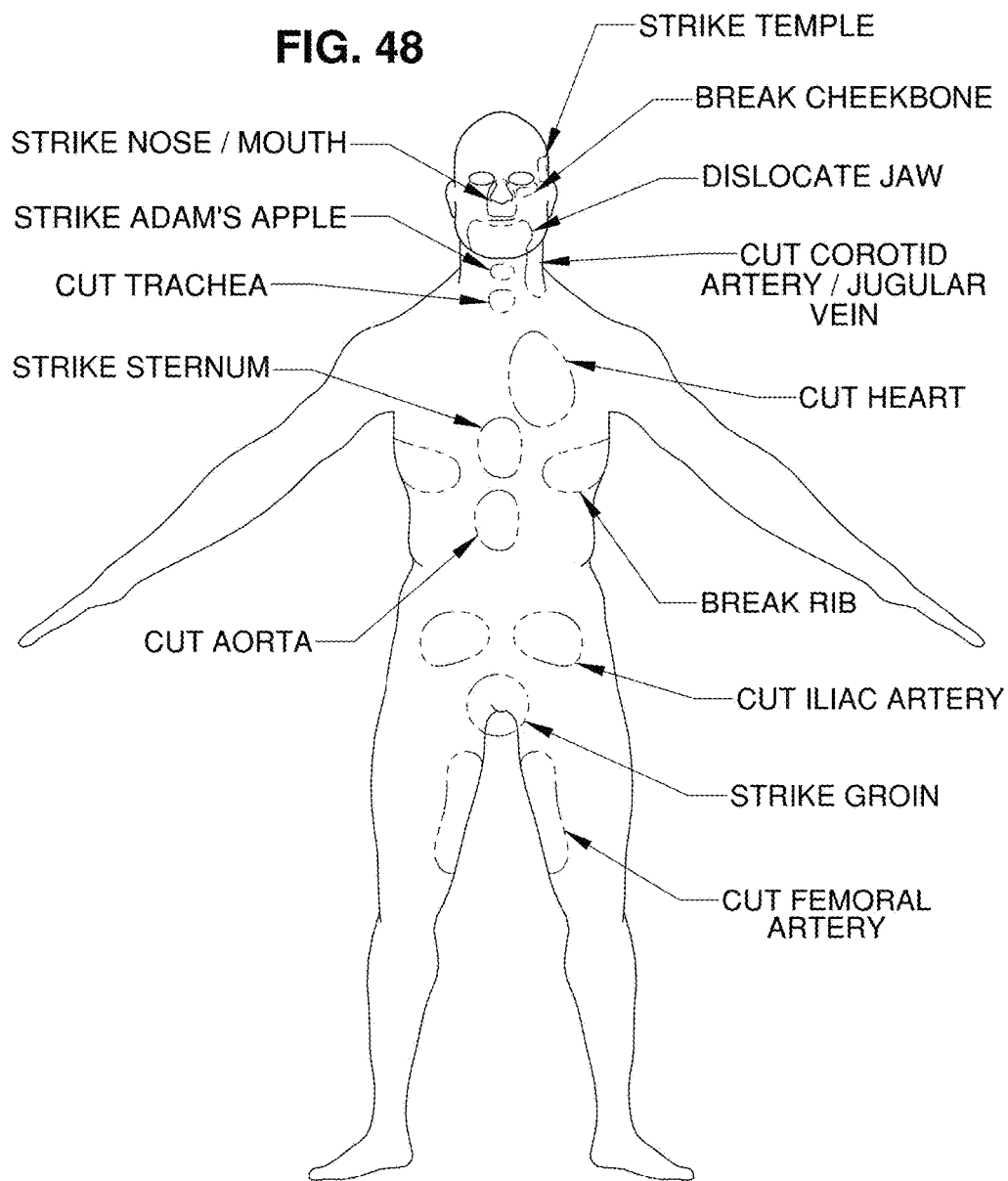
Figure 49:
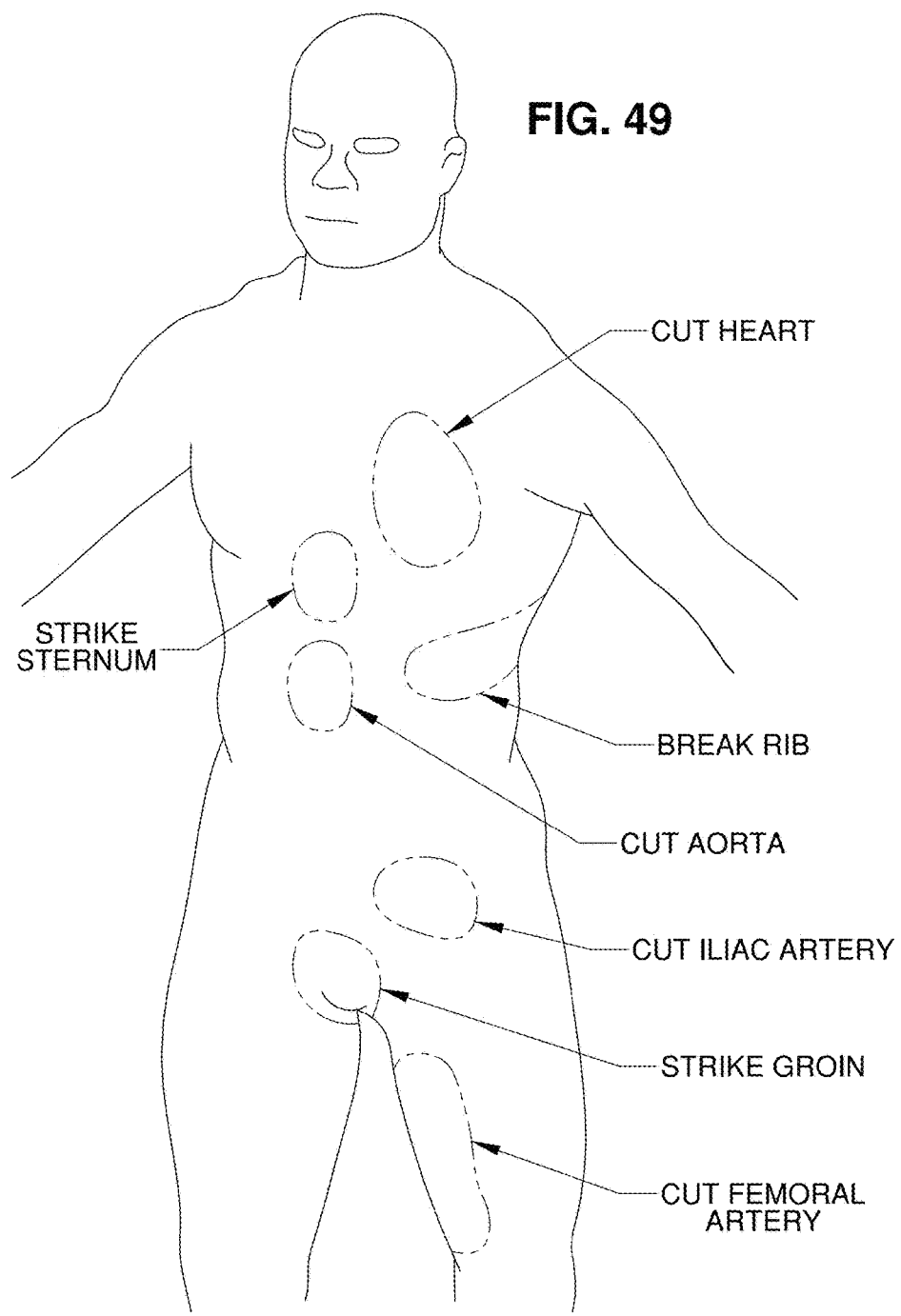
Figure 50:
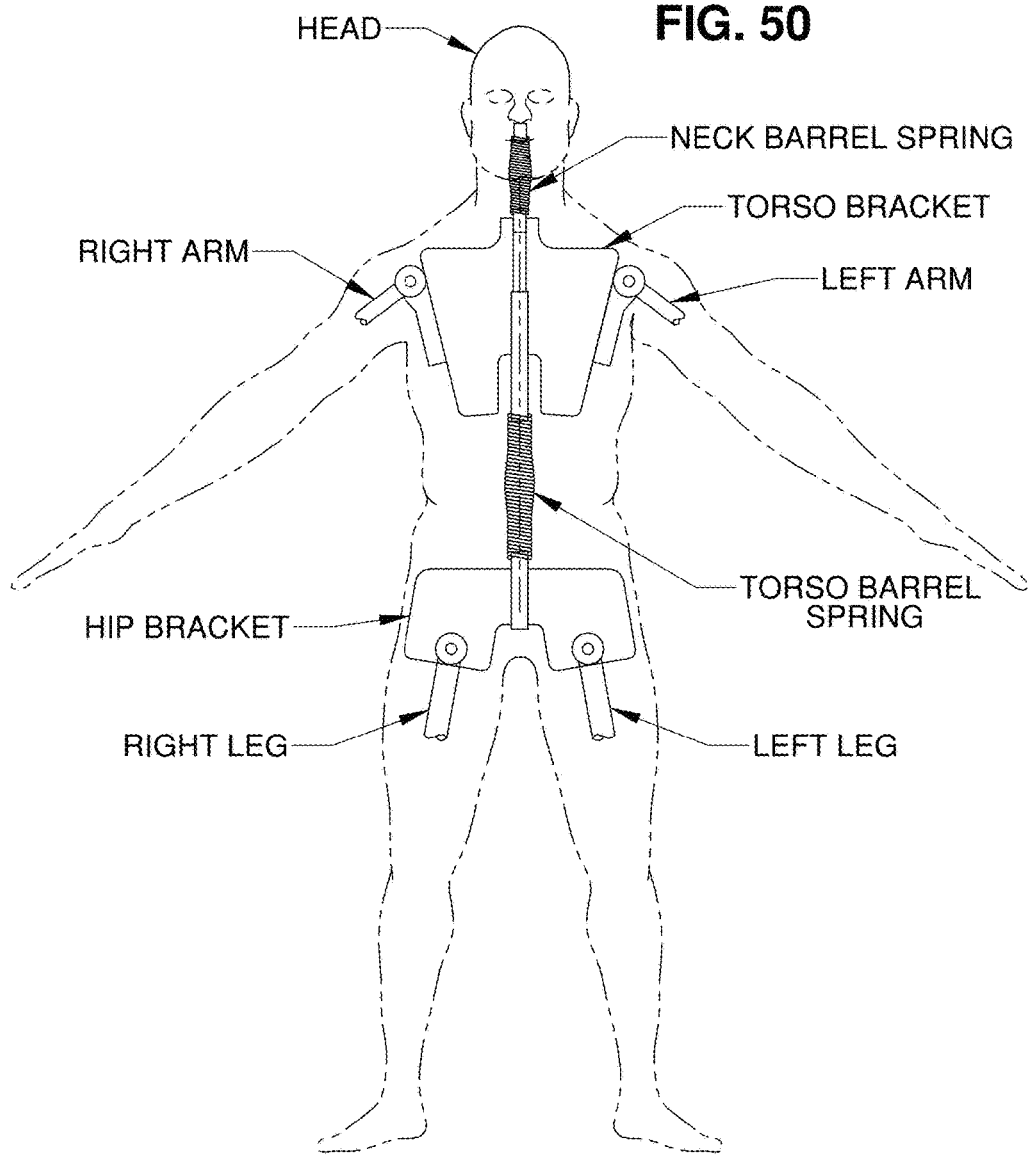
Figure 51:
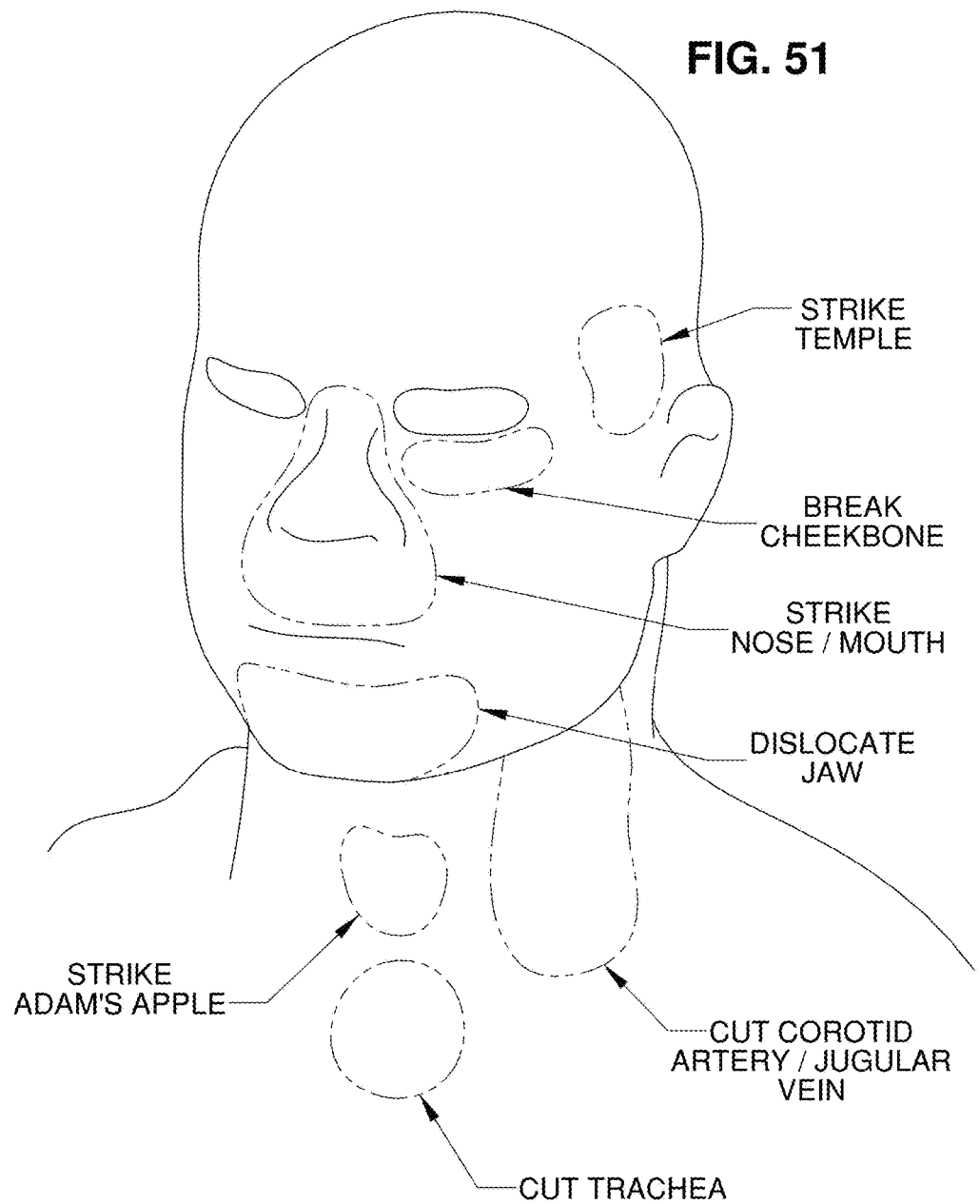

FIG. 48 depicts a full frontal view of an exemplary Trubreak dummy according to an exemplary embodiment of the present invention, showing various user interactive regions;

FIG. 49 depicts a close-up view of the head, torso and groin of the exemplary Trubreak dummy of FIG. 48 and various attach positions;

FIG. 50 depicts the exemplary Trubreak dummy of FIG. 48 as mounted on a vertical pole, with associated brackets, according to an exemplary embodiment of the present invention;

FIG. 51 depicts a perspective close-up view of the head of the exemplary Trubreak dummy of FIG. 48, with detailed user interactive regions;

Attachment Mechanism Figures

Figure 52:
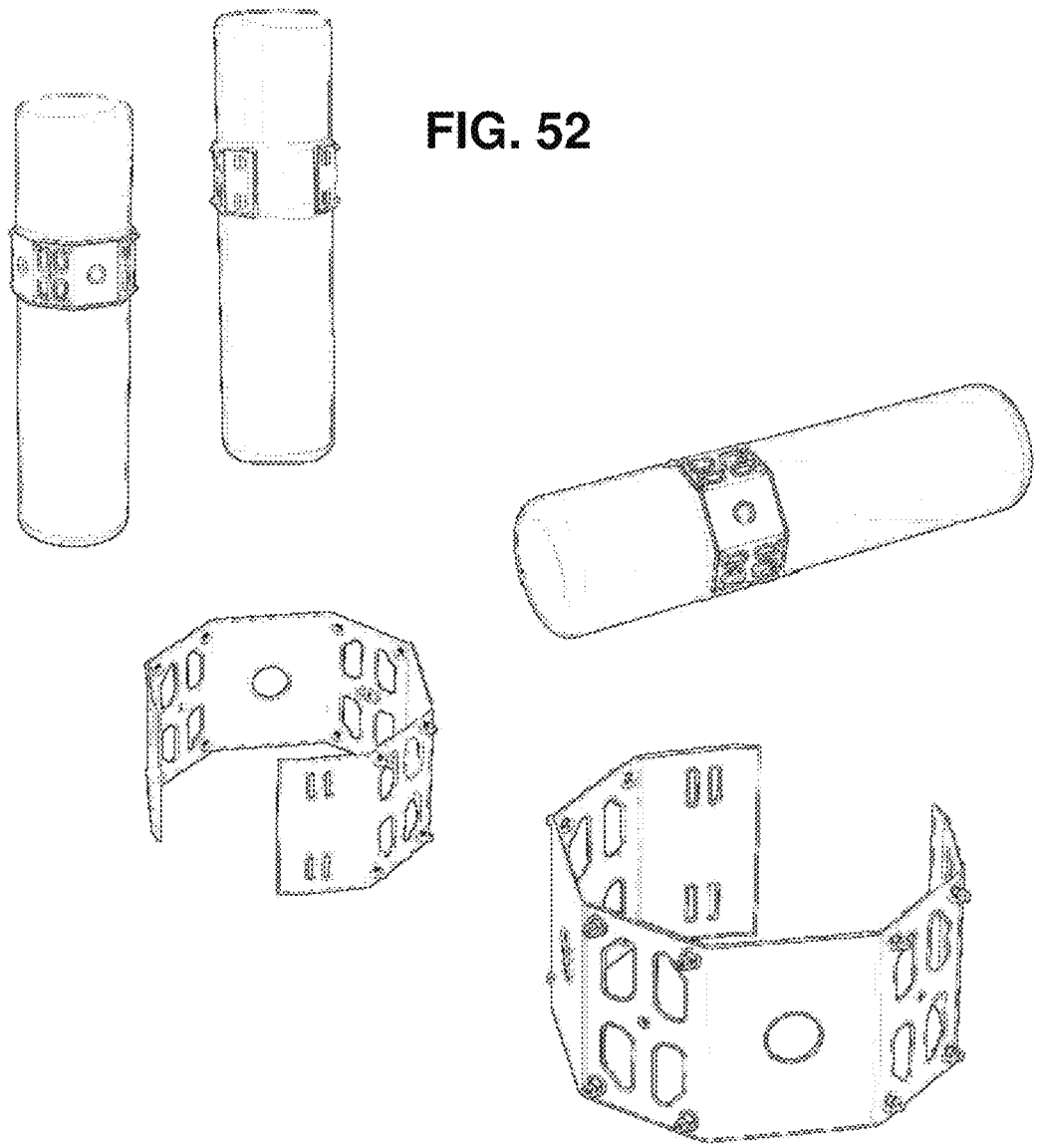
Figure 53:
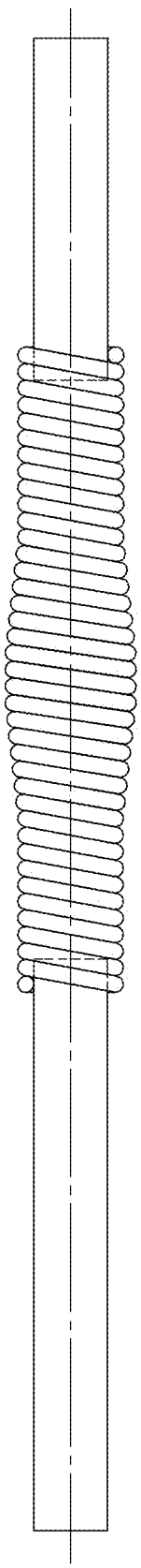
Figure 54:
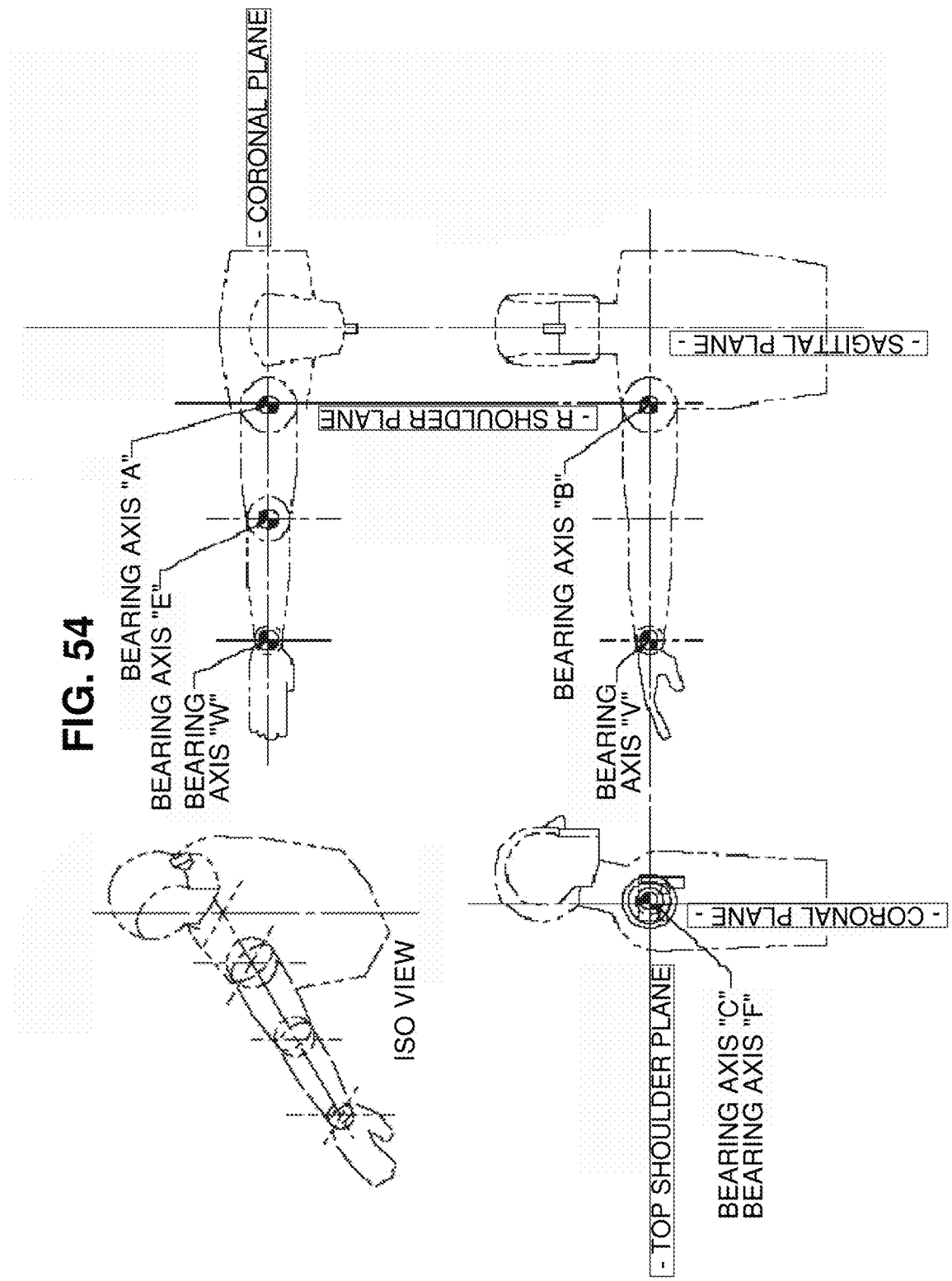

FIG. 52 depicts an exemplary punching bag attachment device (perimeter band) for an exemplary Trubreak dummy according to an exemplary embodiment of the present invention;

FIG. 53 depicts a vertical pole with spring on upper portion for vertically mounting an exemplary Trubreak dummy according to an exemplary embodiment of the present invention as shown in FIG. 50;

FIG. 54 illustrates exemplary bearing specifications for each of the bearings to be used in axes W, E, A, C, F, V and B (as defined in FIG. 54 and corresponding to those shown in FIGS. 24-30) of an exemplary Trubreak dummy according to an exemplary embodiment of the present invention;

FIG. 55 depicts an alternate training bag harness for an exemplary Trubreak dummy according to an exemplary embodiment of the present invention;

Trubreak Compatible Knife Figure

Figure 56B:
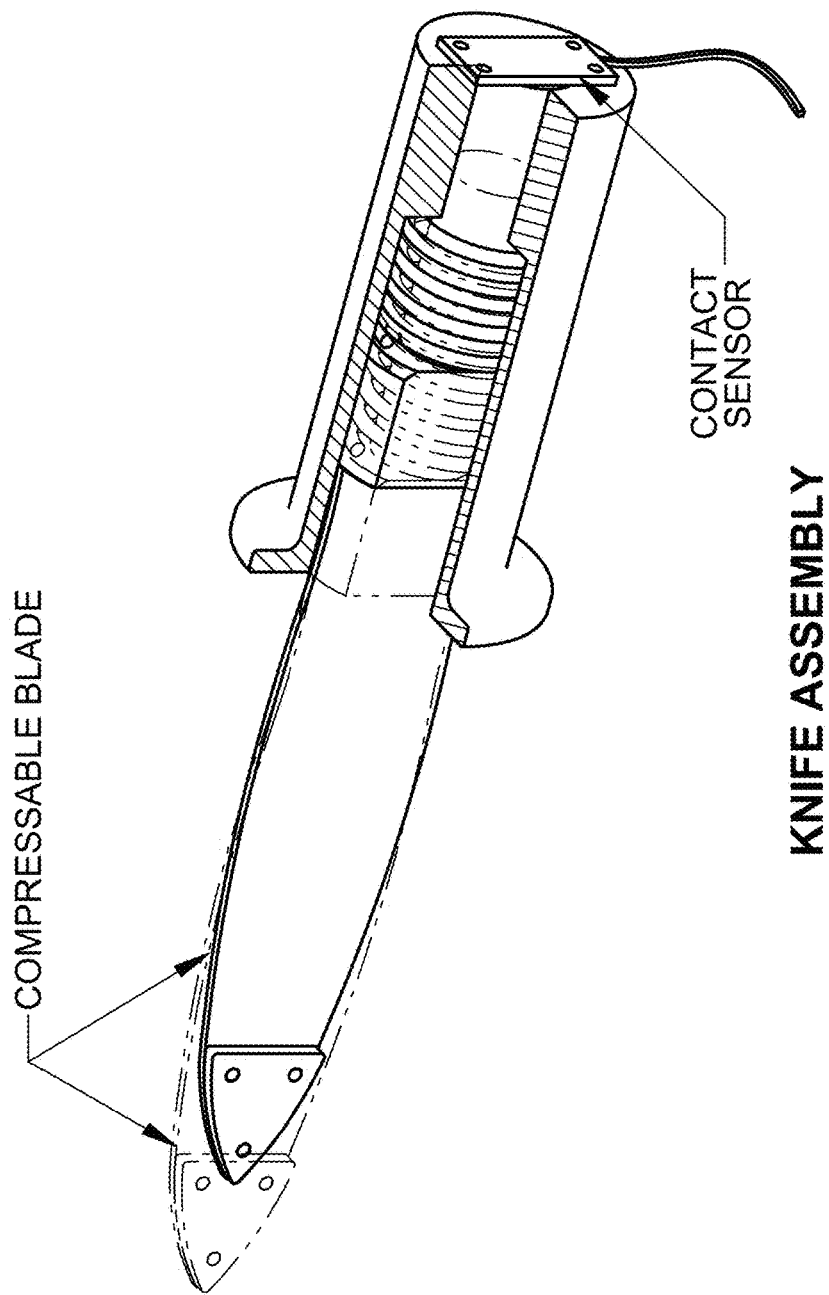

FIG. 56A depicts an exemplary "Trubreak compatible" knife device, with a RFID blade, that may be used to simulate cutting and puncturing according to an exemplary embodiment of the present invention;

FIG. 56B illustrates the compressibility of the exemplary knife device of FIG. 56A, and how it is spring-loaded;

FIG. 56C illustrates how the exemplary knife blade of FIGS. 56A and 56B is also bendable, so that it does not break when thrust into an exemplary Trubreak dummy;

Exemplary Renderings Figures

Figure 57:
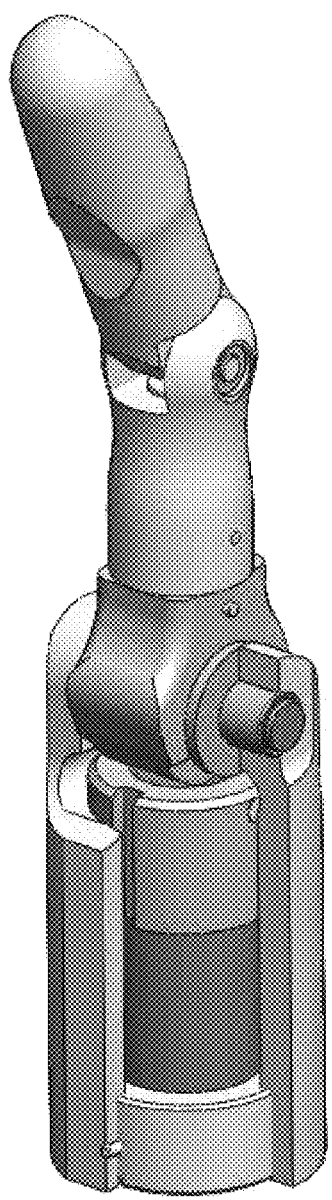
Figure 58:
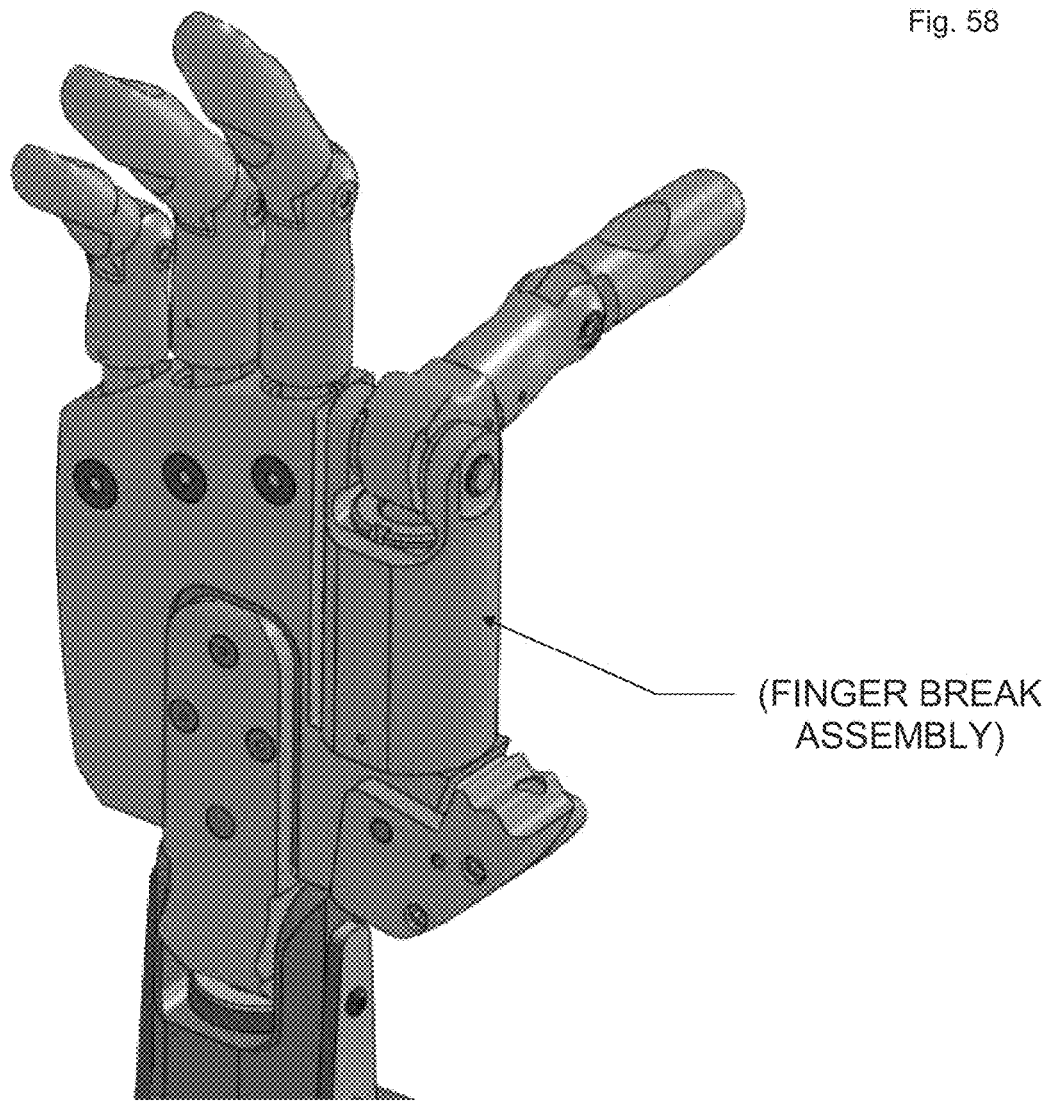
Figure 59:
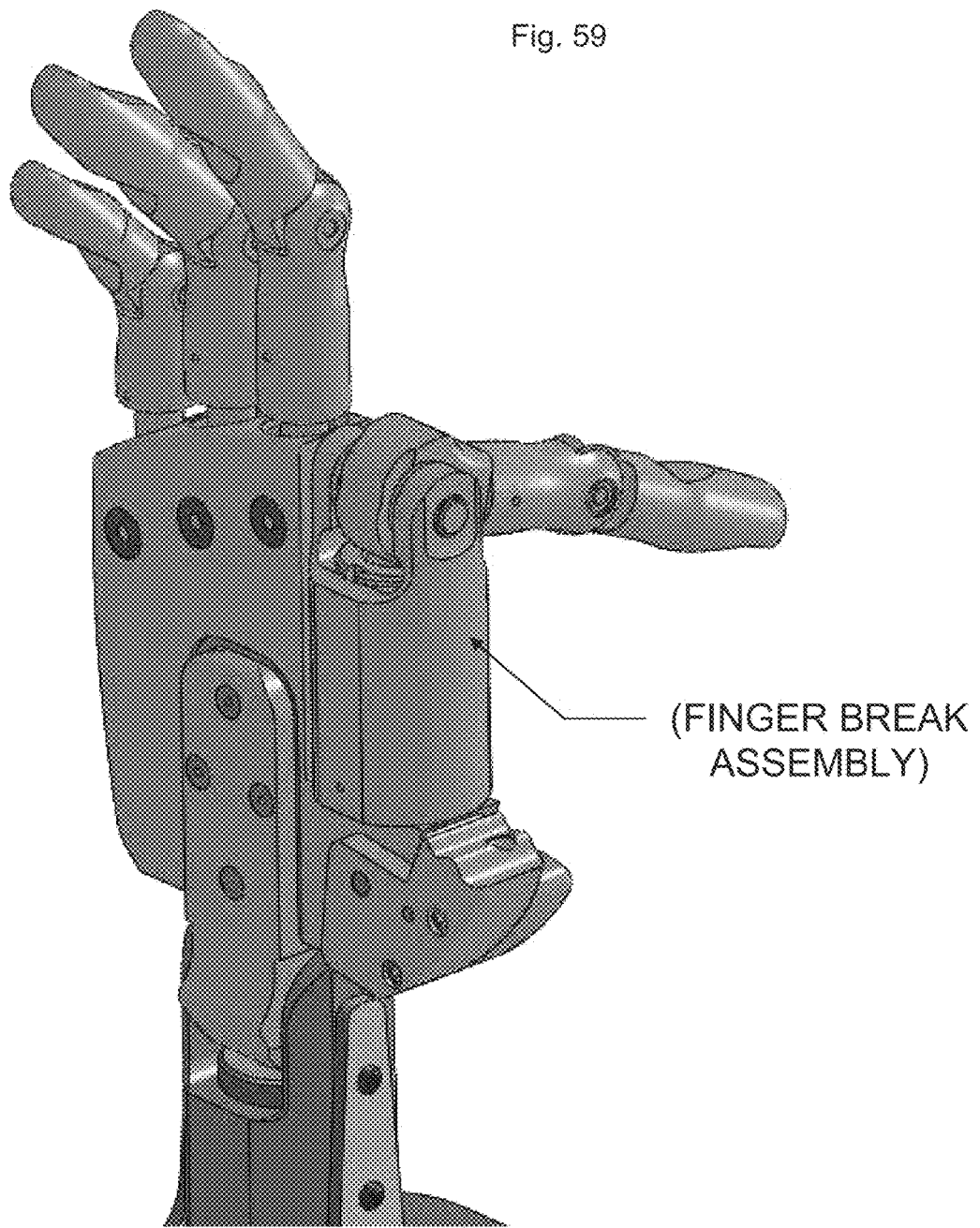
Figure 60:
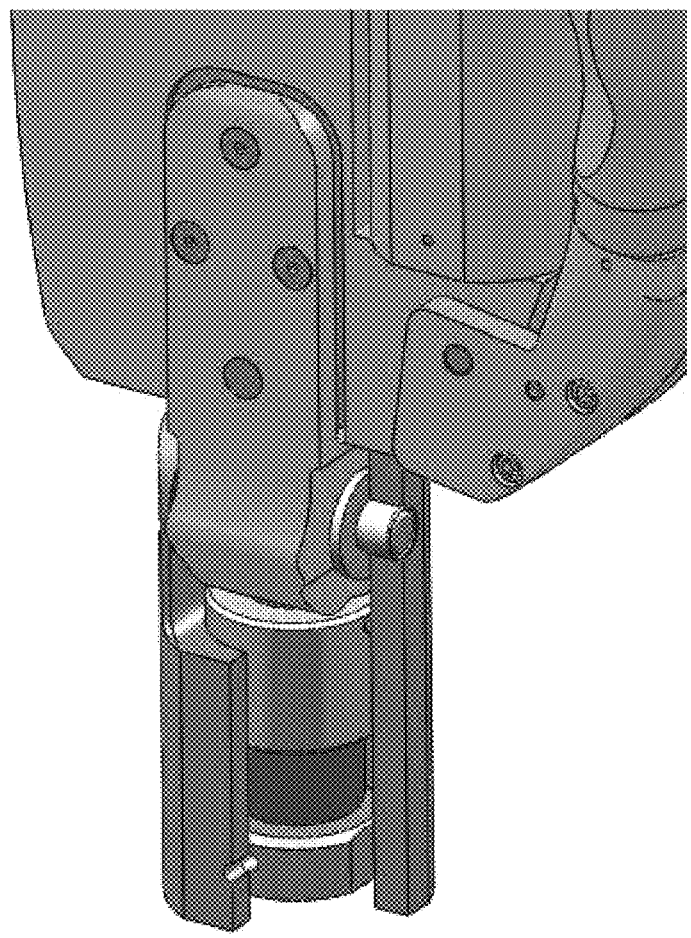
Figure 61:
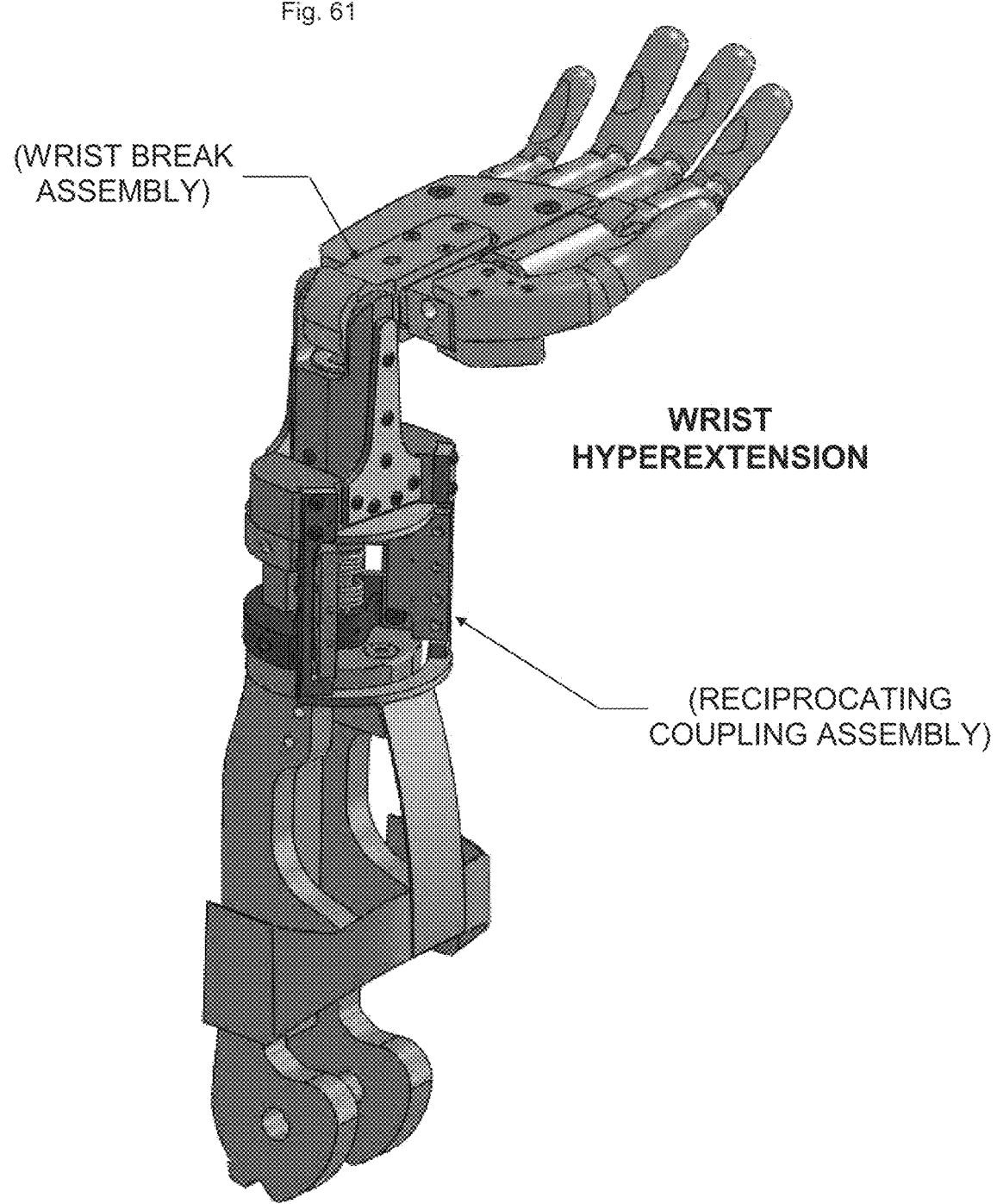
Figure 62:
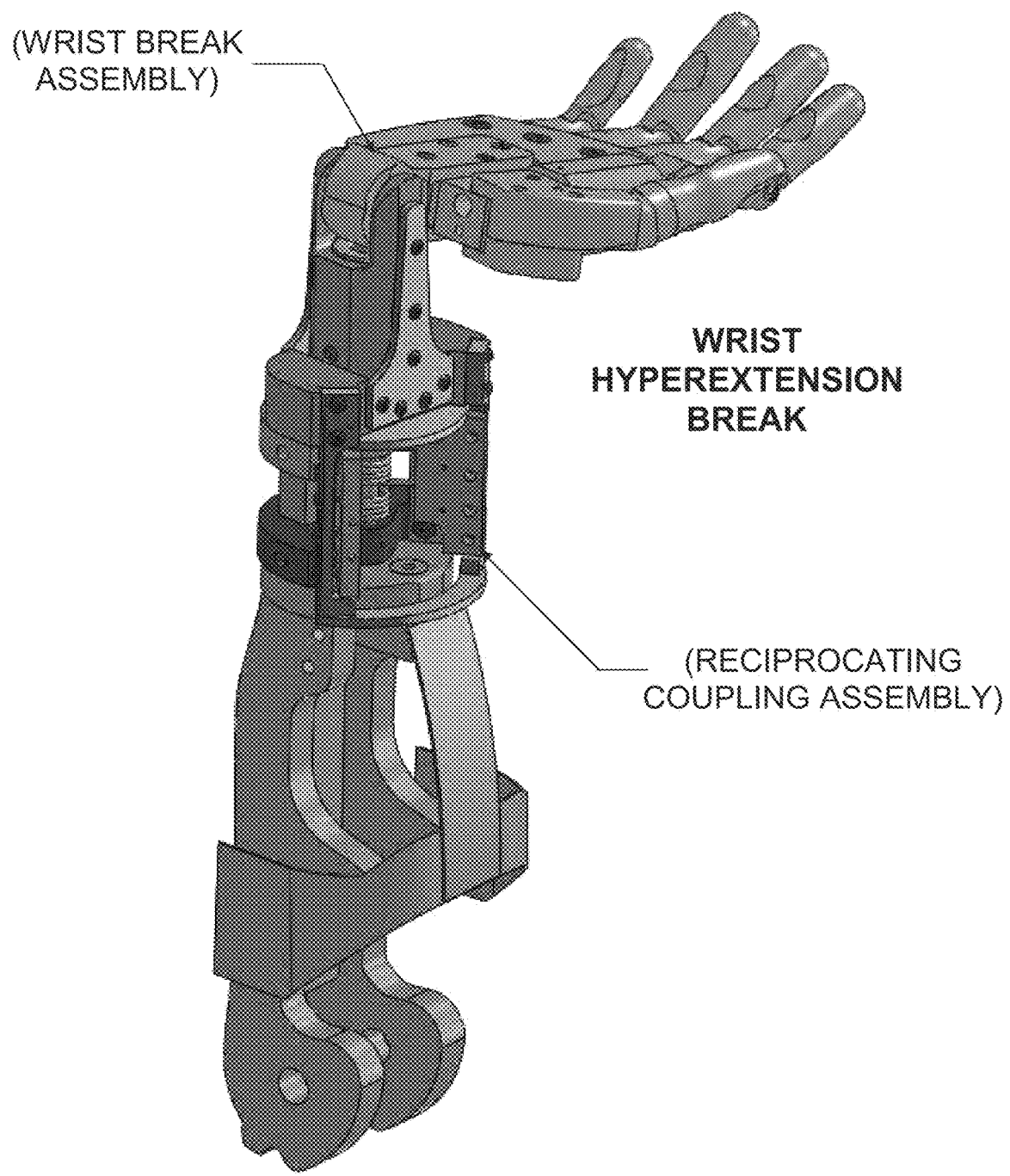
Figure 63:
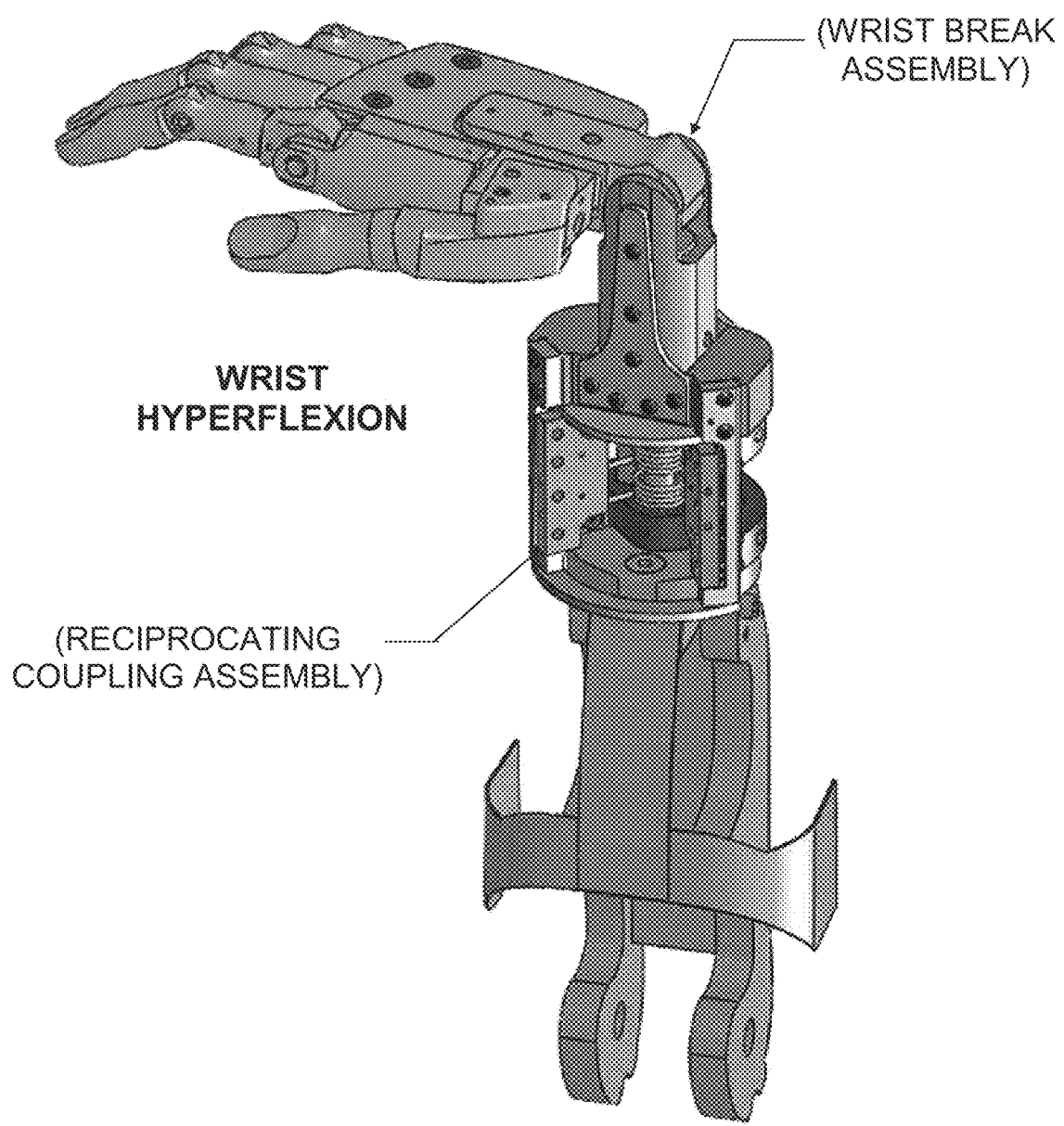
Figure 64:
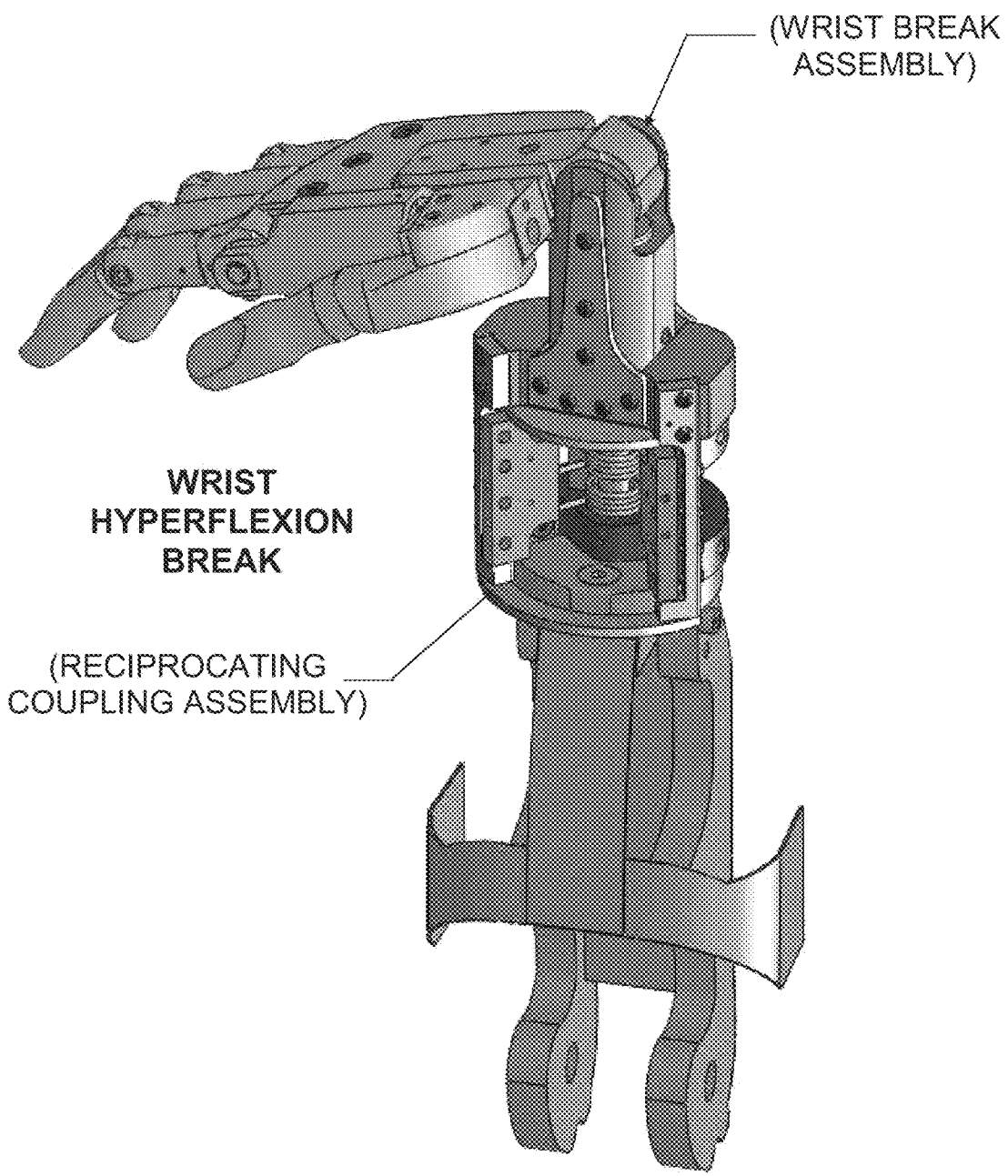
Figure 66:
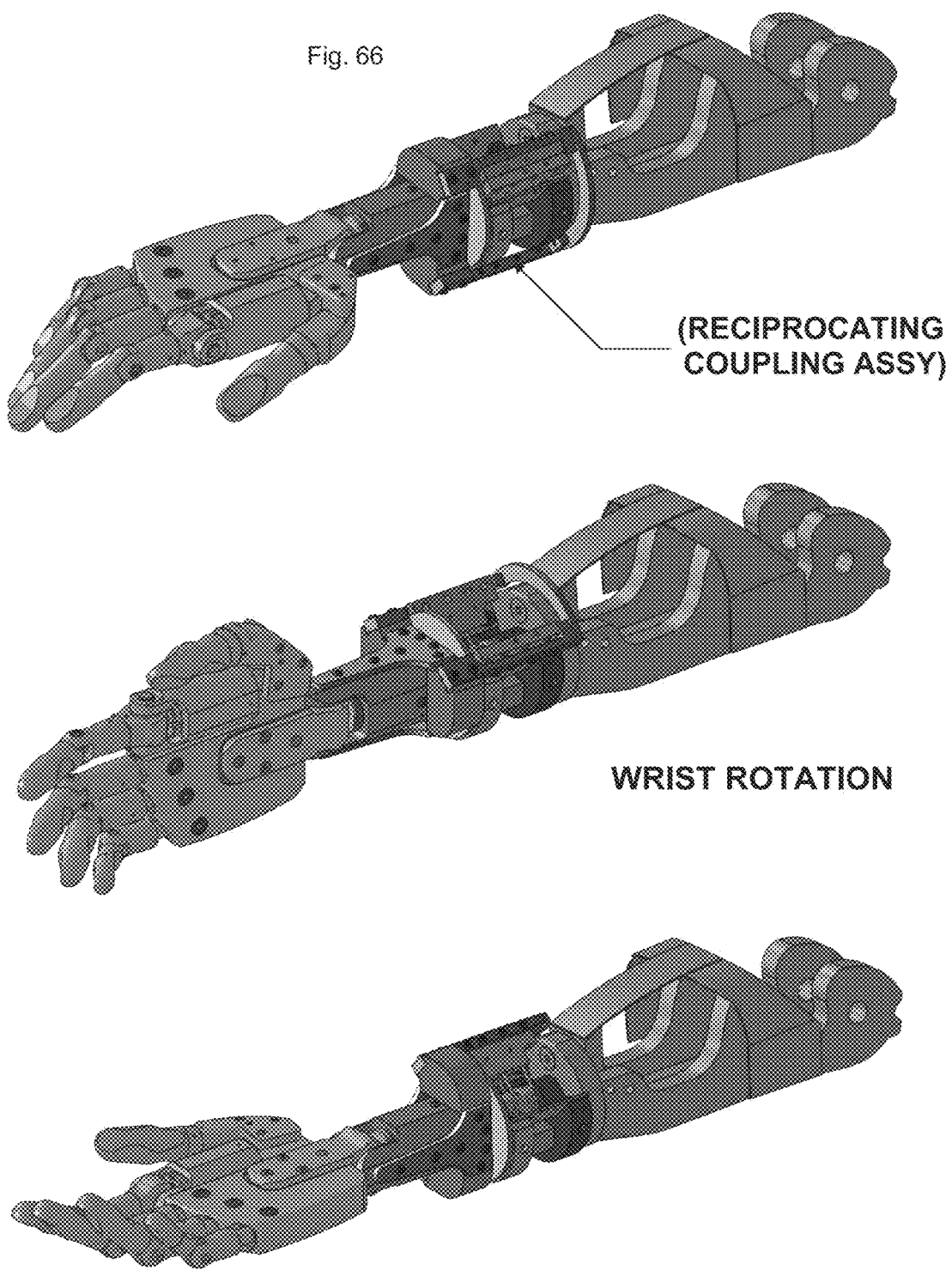
Figure 67:
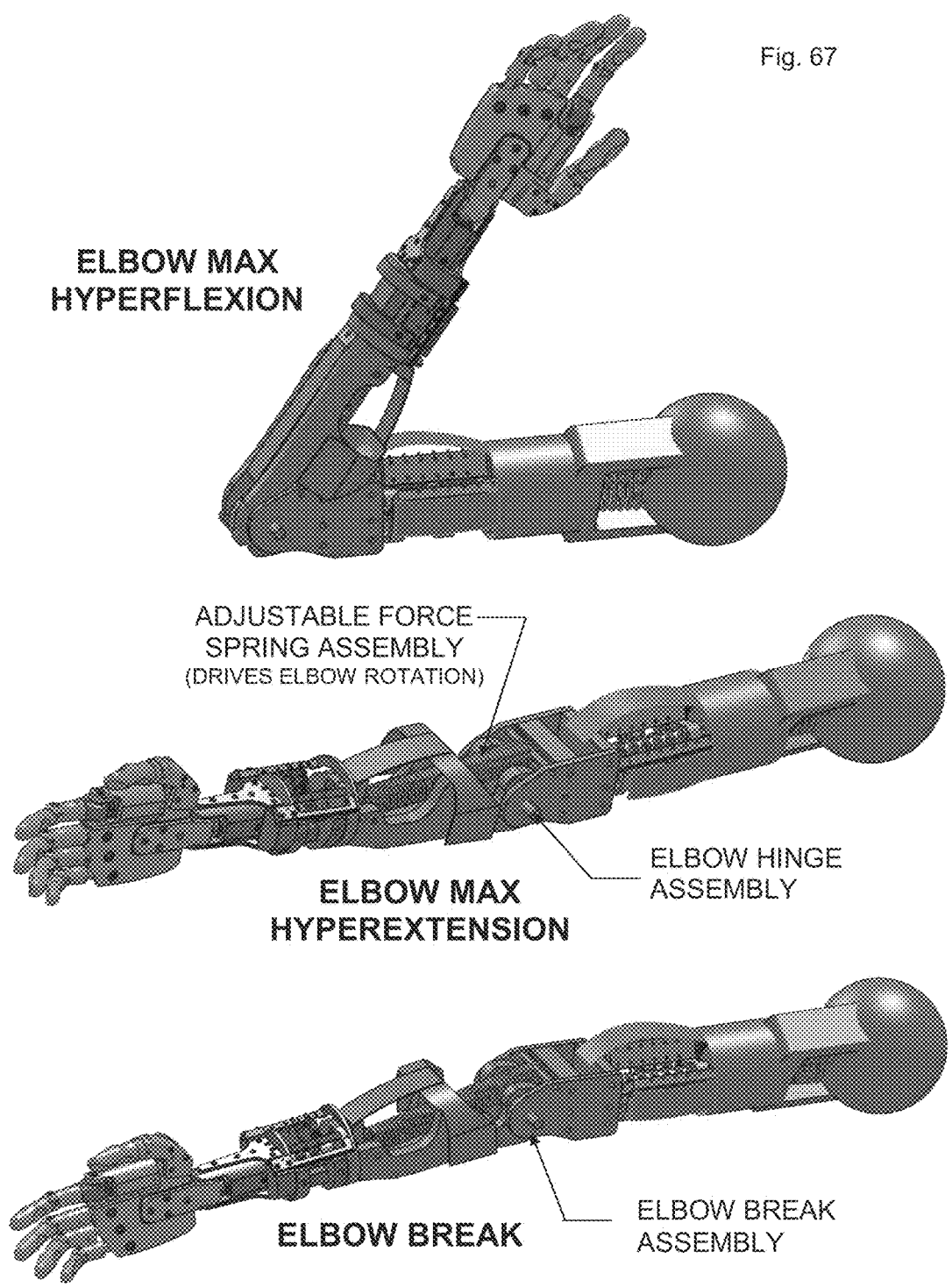
Figure 68B:
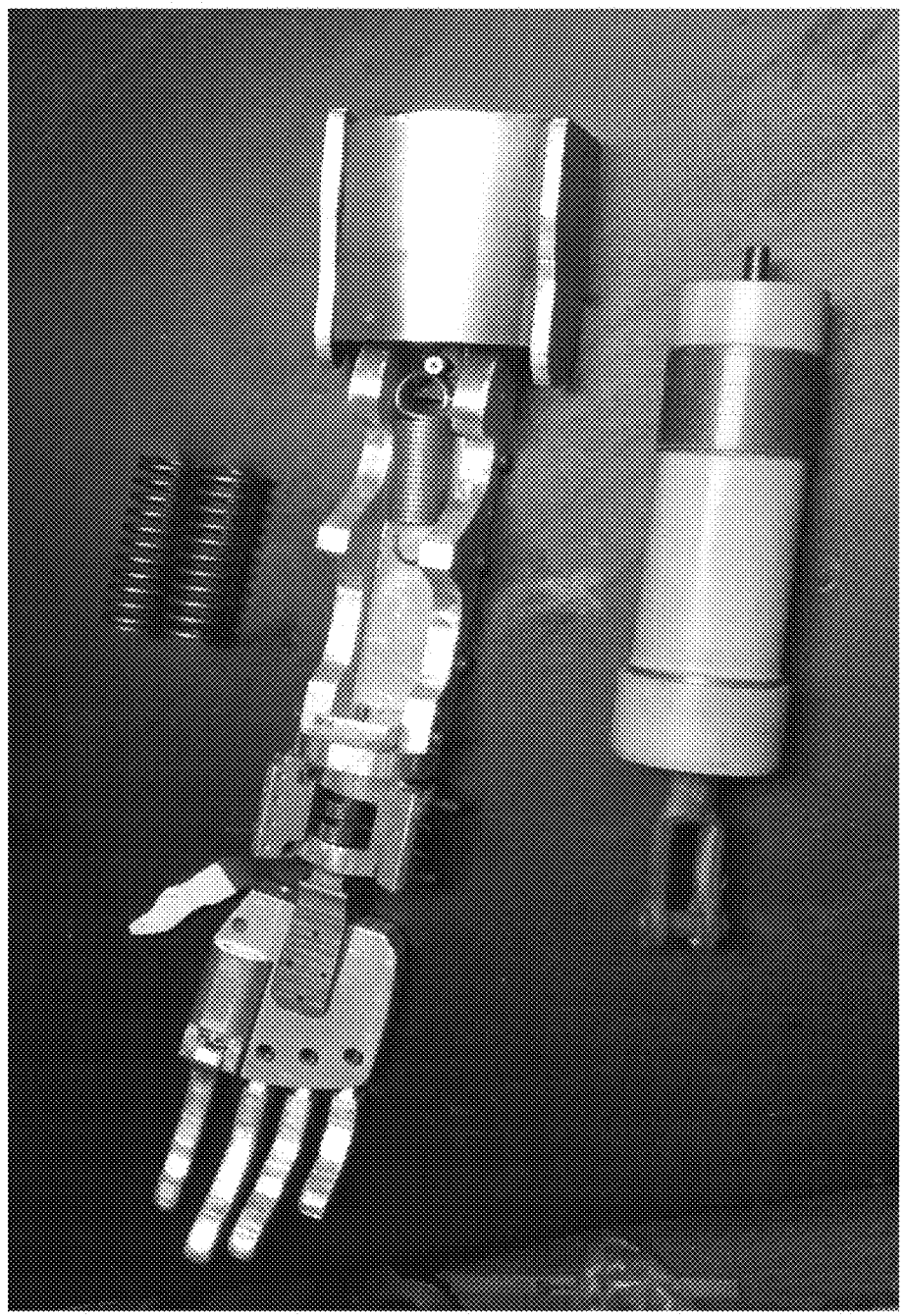

FIG. 57 depicts a 3-D rendering of an exemplary finger break assembly such as shown in FIGS. 6-7 according to an exemplary embodiment of the present invention;

FIG. 58 depicts a 3-D rendering of the finger break assembly of FIG. 57 mounted on an exemplary hand and wrist of an exemplary Trubreak dummy (as shown in FIGS. 10-11) according to an exemplary embodiment of the present invention, illustrating a maximum finger-hyperextension (bending backwards);

FIG. 59 illustrates the point at which the finger break assembly of FIG. 58 will break—known as the "finger hyperextension break";

FIG. 60 depicts a 3-D rendering of an exemplary wrist break assembly according to an exemplary embodiment of the present invention;

FIG. 61 depicts a 3-D rendering of the exemplary wrist break assembly of FIG. 60, in wrist hyperextension, as mounted on an exemplary arm, said arm having a rotational enabling reciprocating coupling assembly according to an exemplary embodiment of the present invention;

FIG. 62 depicts a 3-D rendering of the wrist break assembly structure of FIG. 61 at the breaking point of the wrist hyperextension (wrist pulled too far back) according to exemplary embodiments of the present invention;

FIG. 63 depicts a 3-D rendering of a hyperflexion (wrist pulled too far forward) of the exemplary wrist break assembly of FIG. 61 according to exemplary embodiments of the present invention;

FIG. 64 depicts a 3-D rendering of the wrist hyperflexion of FIG. 63 now at a breaking point, known as the "wrist hyperflexion break" according to exemplary embodiments of the present invention;

FIG. 65 depicts a 3-D rendering illustrating details of an exemplary spring loaded reciprocating coupling assembly according to exemplary embodiments of the present invention, which may be used for both shoulder rotation as well as wrist rotation;

FIG. 66 depicts a 3-D rendering illustrating wrist rotation using the reciprocating coupling assembly of FIG. 65 in clockwise (from the point of view of the dummy) rotations of 90 and 180 degrees);

FIG. 67 depicts a 3-D rendering illustrating (i) maximum hyperflexion of an exemplary elbow, (ii) maximum hyperextension of an exemplary elbow; and (iii) the elbow breaking point, i.e., beyond such maximum hyperextension, according to exemplary embodiments of the present invention;

FIG. 68A depicts a 3-D rendering illustrating (i) maximum shoulder rotation (left side), and (ii) shoulder breaking point (right side), from both counterclockwise and clockwise rotation of an exemplary shoulder according to exemplary embodiments of the present invention;

FIG. 68B is a picture of an actual prototype hand and arm assembly according to an exemplary embodiment of the present invention.

Figure 68C:
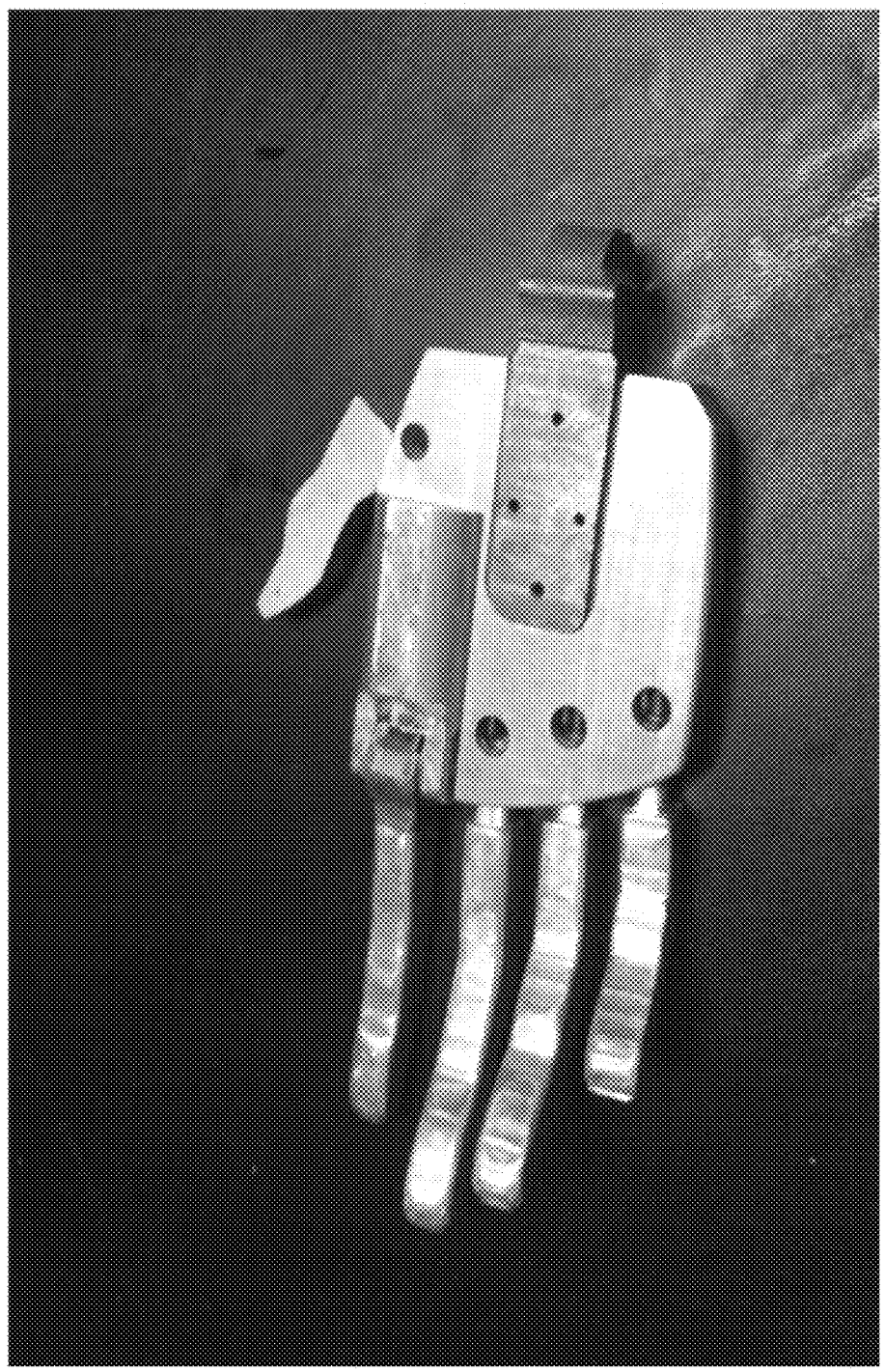
Figure 70:
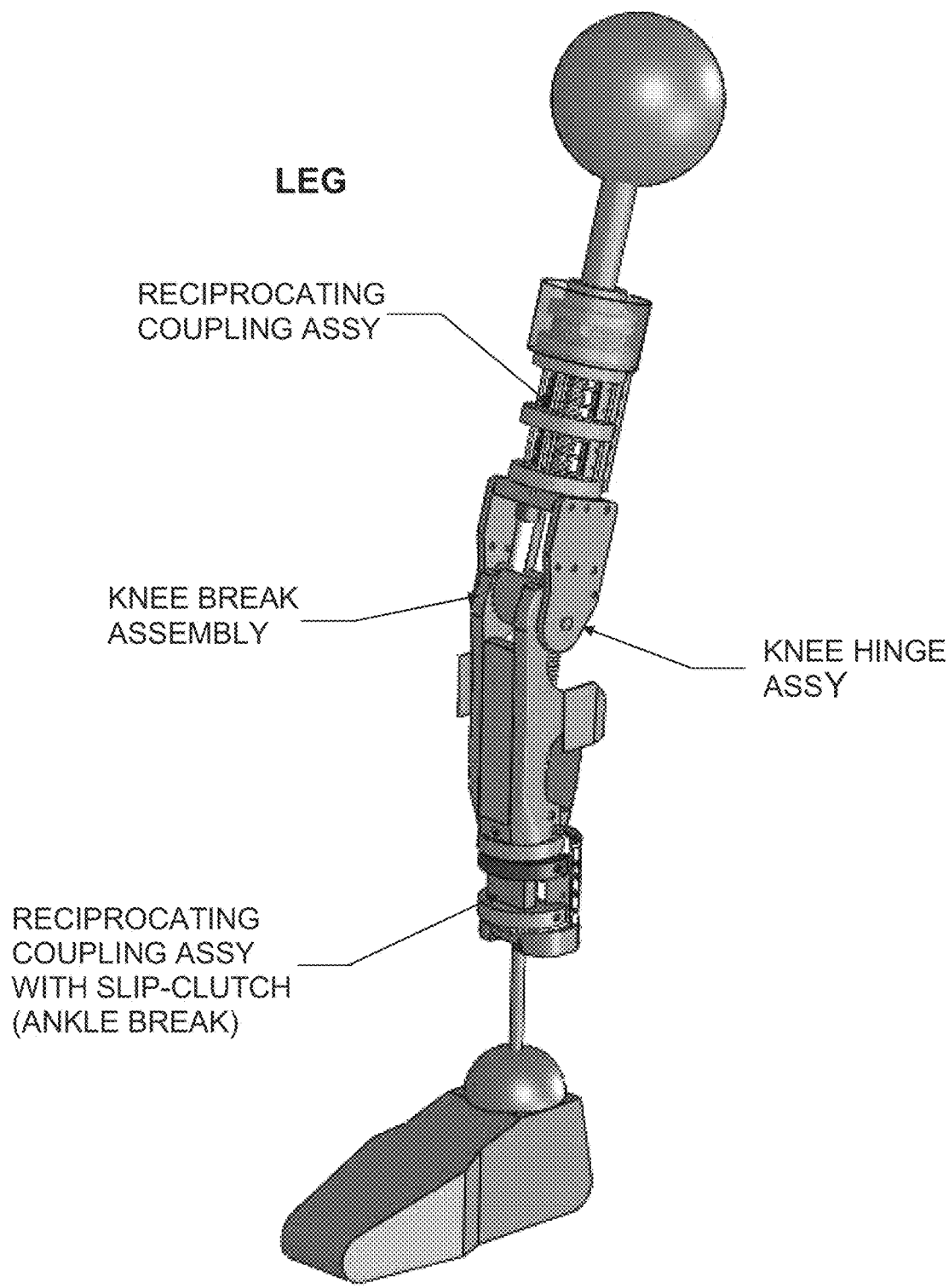
Figure 71:
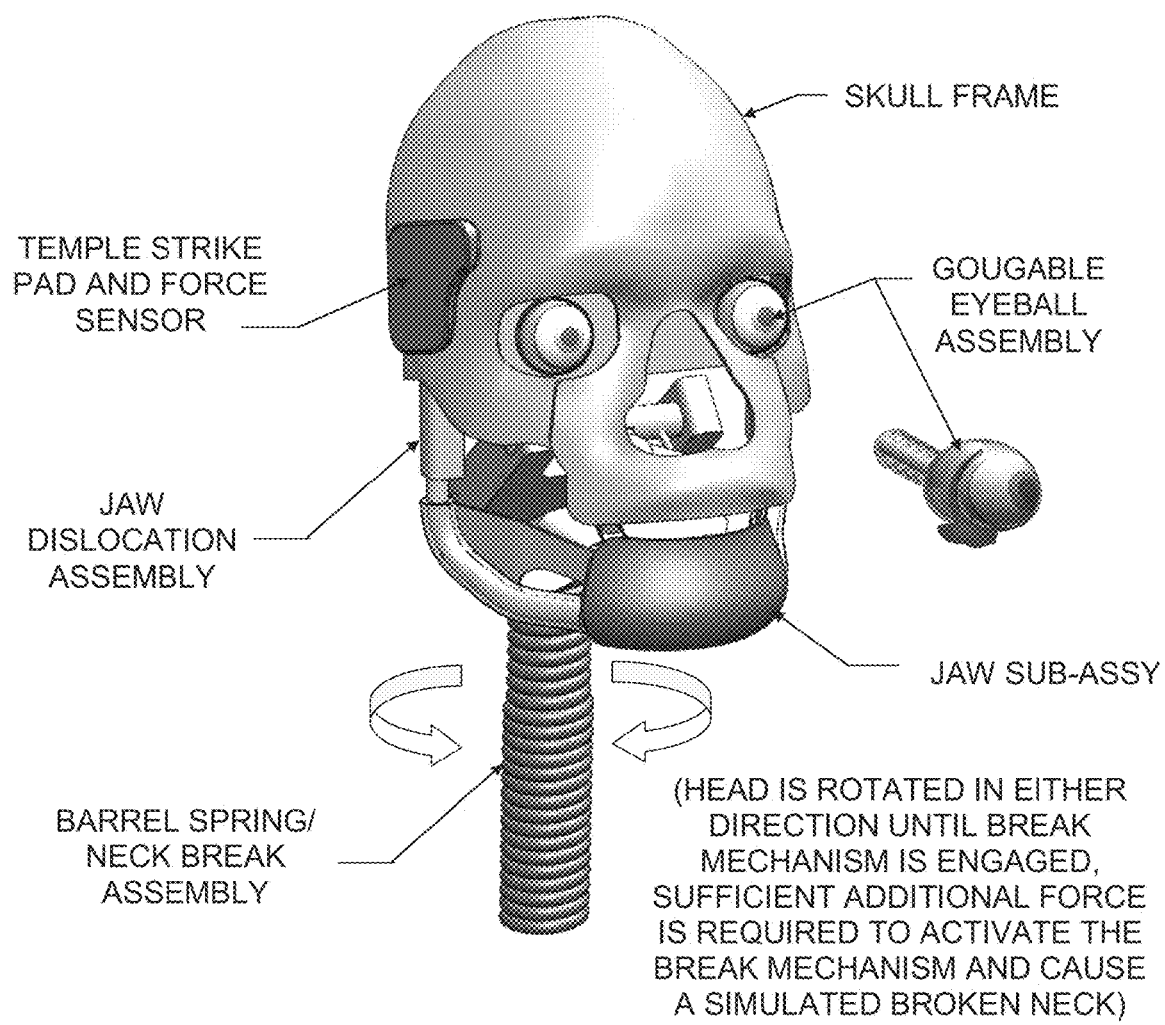
Figure 72:
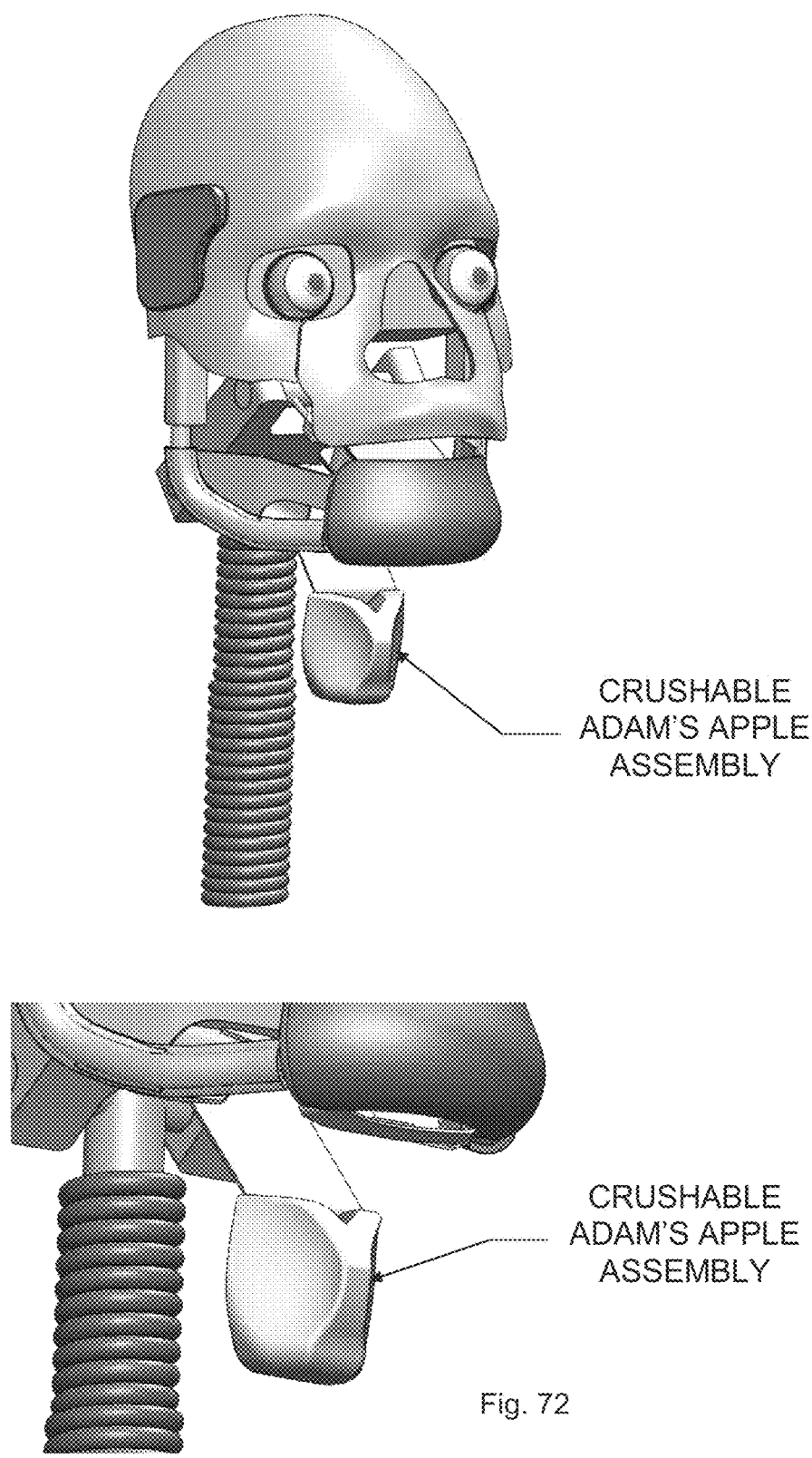
Figure 75:
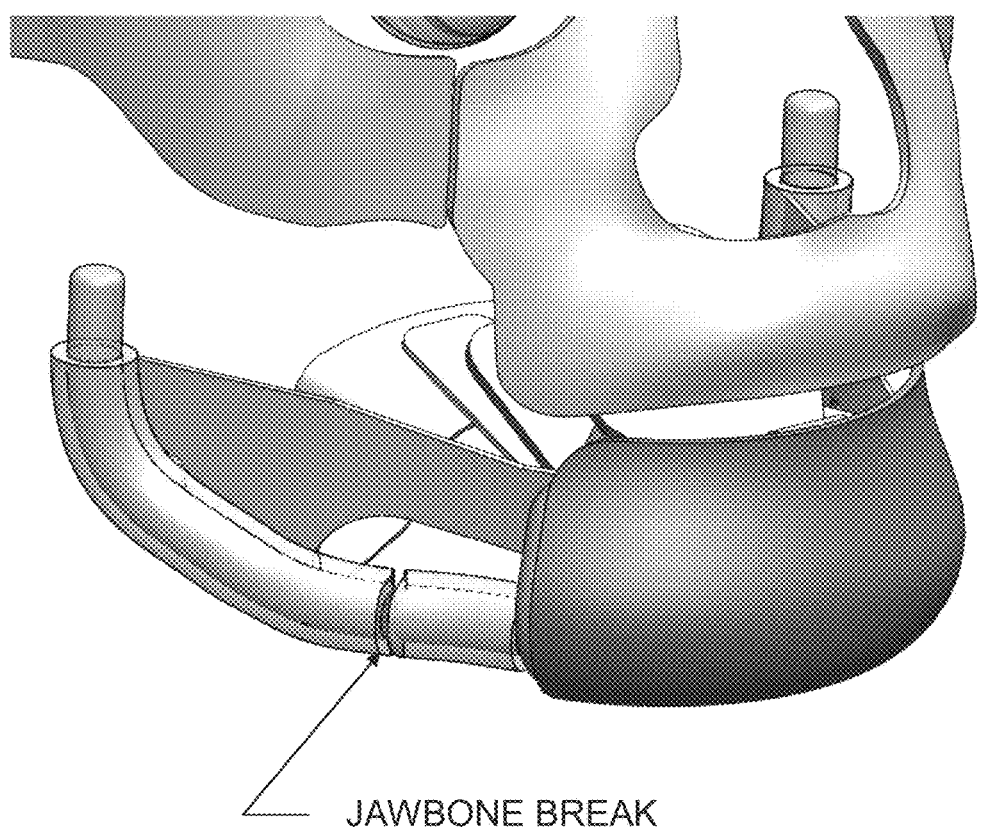

FIG. 68C is a close-up view of the hand assembly shown in FIG. 68A;

FIG. 69 illustrates attachment of an exemplary Trubreak arm (by itself, i.e., just the arm), such as is shown in FIG. 68A, to a canvas heavy punching or martial arts training bag, via adapter and harness, according to exemplary embodiments of the present invention;

FIG. 70 illustrates an exemplary leg of an exemplary Trubreak dummy according to exemplary embodiments of the present invention, showing (i) reciprocating coupling assembly, (ii) knee break assembly, (iii) knee hinge assembly, and (iv) reciprocating coupling assembly with slip clutch (ankle break);

FIG. 71 illustrates an exemplary head according to exemplary embodiments of the present invention, including (i) skull frame; (ii) temple strike pad and force sensor; (iii) gougeable eyeball assembly; (iv) jaw dislocation assembly; (v) jaw sub-assembly; (vi) barrel spring/neck break assembly; and (vii) the fact that the head may be rotated in either direction until a break mechanism is engaged, where sufficient additional force is required to activate a break mechanism to cause a simulated broken neck;

FIG. 72 depicts the head of FIG. 71, showing detail of an exemplary crushable Adam's apple assembly according to exemplary embodiments of the present invention;

FIG. 73 depicts the head of FIGS. 71 and 72 with the addition of a flexible/cuttable throat assembly with force sensors according to exemplary embodiments of the present invention with force sensors;

FIG. 74 depicts detail of the temple strike pad shown in FIG. 71 as well as a mechanism for simulating a cheek bone break according to exemplary embodiments of the present invention;

FIG. 75 illustrates a mechanism for simulating a jawbone break according to exemplary embodiments of the present invention;

Force Sensor Figures

Figure 76:
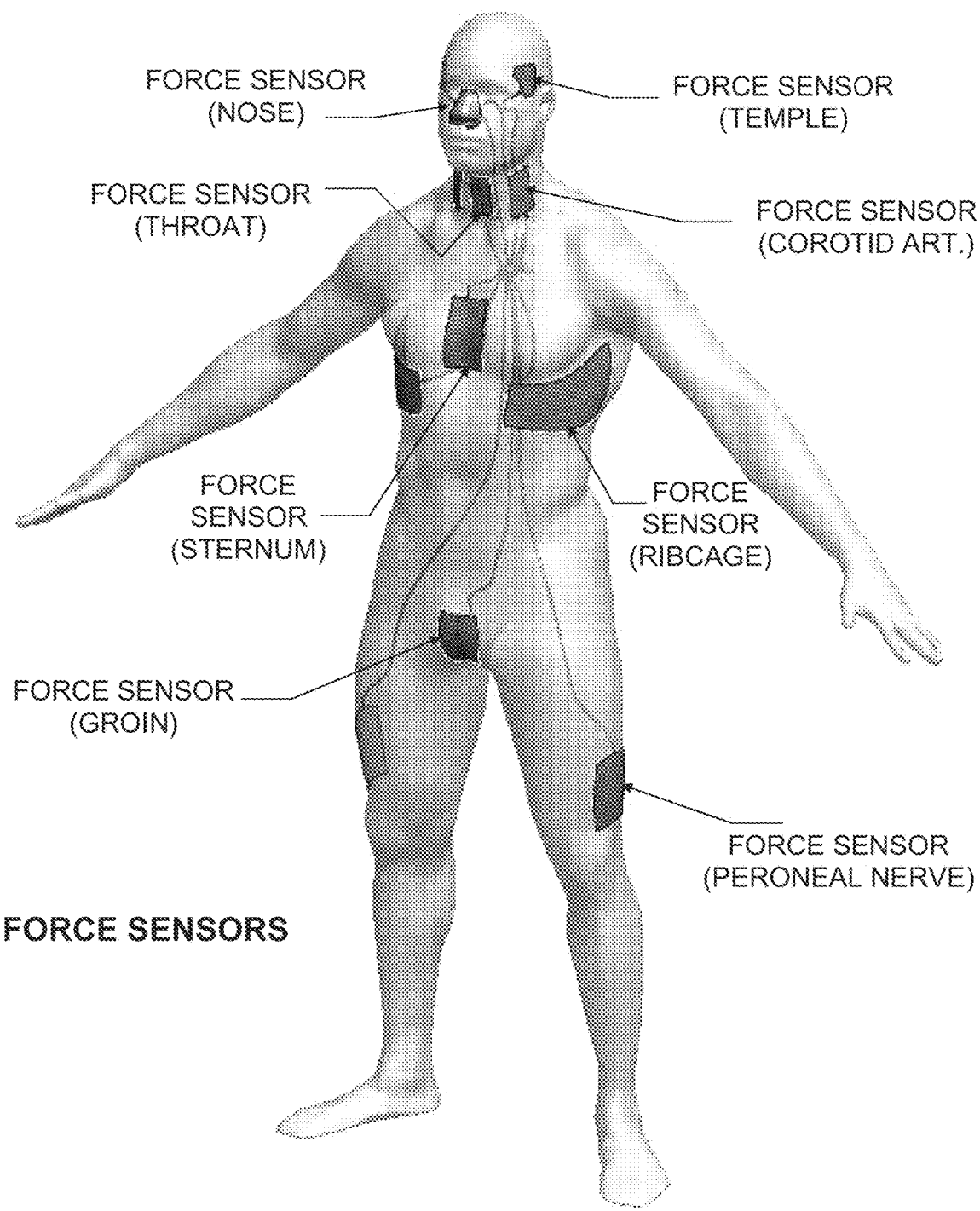
Figure 77:
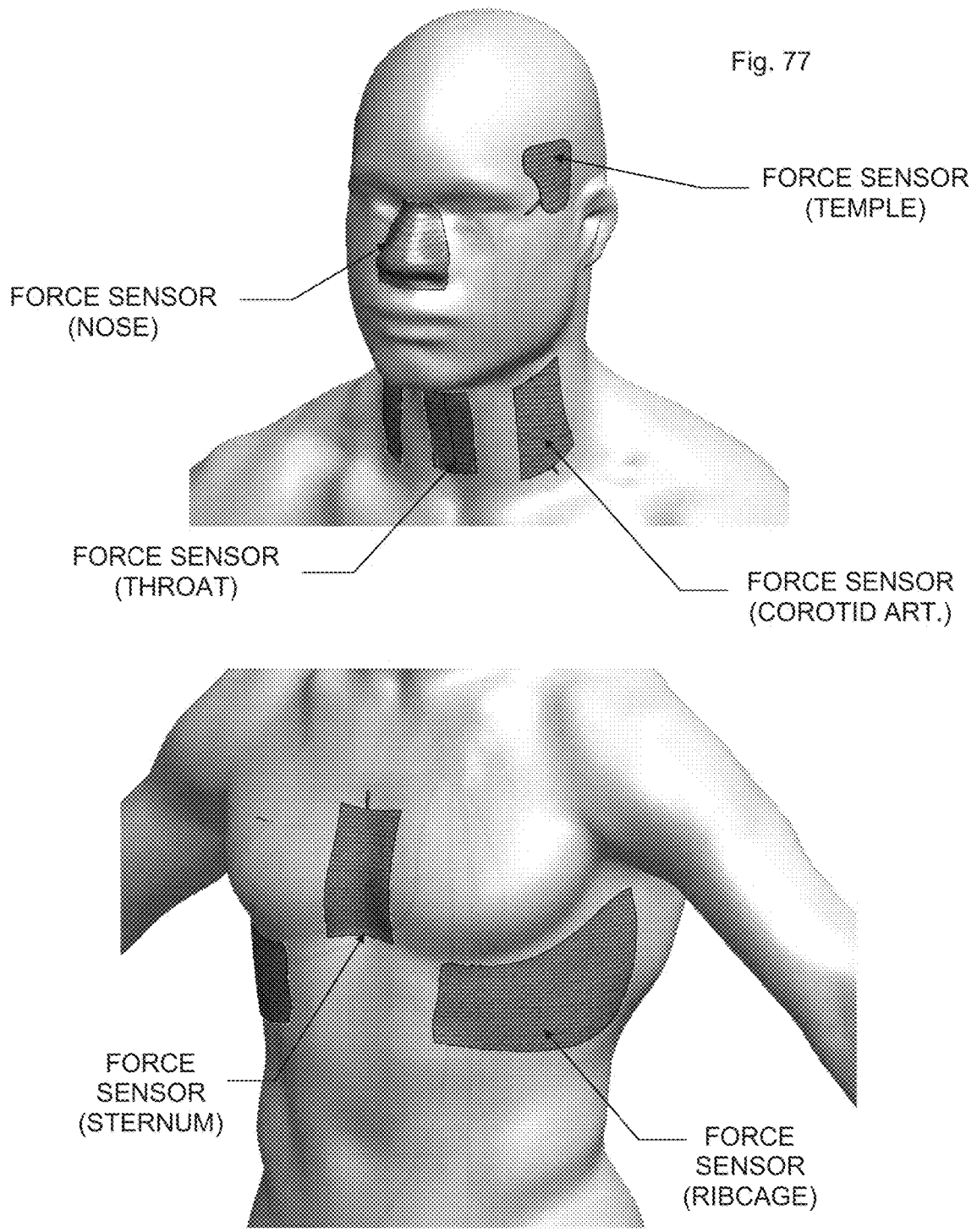
Figure 78:
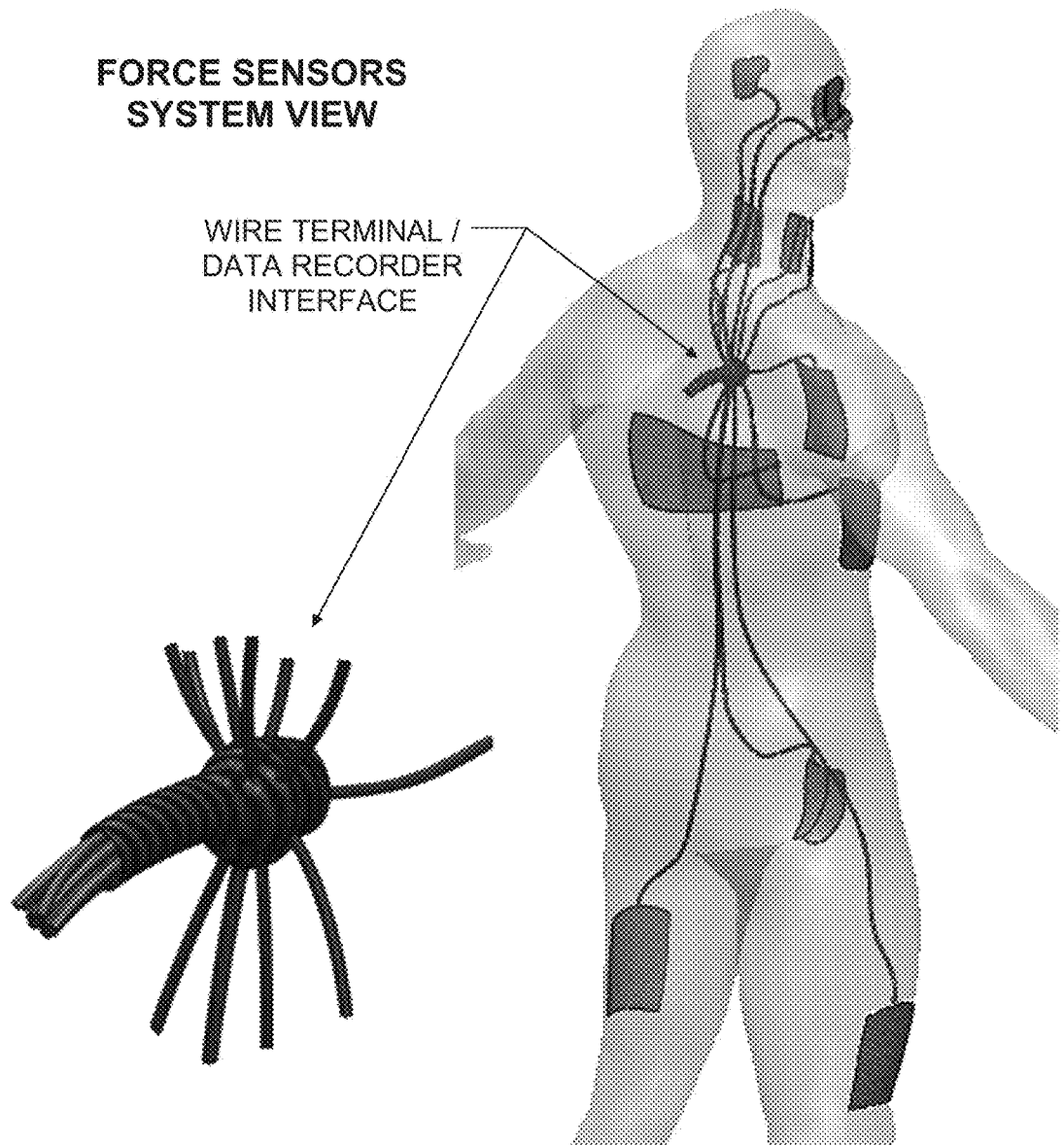

FIG. 76 illustrates various force sensors placed on an exemplary Trubreak dummy according to exemplary embodiments of the present invention, said dummy being provided with an outer simulated skin covering; the force sensors including a nose sensor, a temple sensor, a throat sensor, a carotid artery sensor; a sternum sensor, a ribcage sensor, a groin sensor and a peroneal nerve sensor;

FIG. 77 illustrates details of the nose, temple, throat and carotid artery force sensors on the upper image, as well as details of the sternum and ribcage sensors on the lower image, according to exemplary embodiments of the present invention;

FIG. 78 depicts a wire terminal and data recorder interface provided in the chest cavity of an exemplary Trubreak dummy, and which is communicably connected to, or has wires running to, the various force sensors depicted in FIG. 76, all according to exemplary embodiments of the present invention;

Synthetic Blood Vessel Figures

Figure 79:
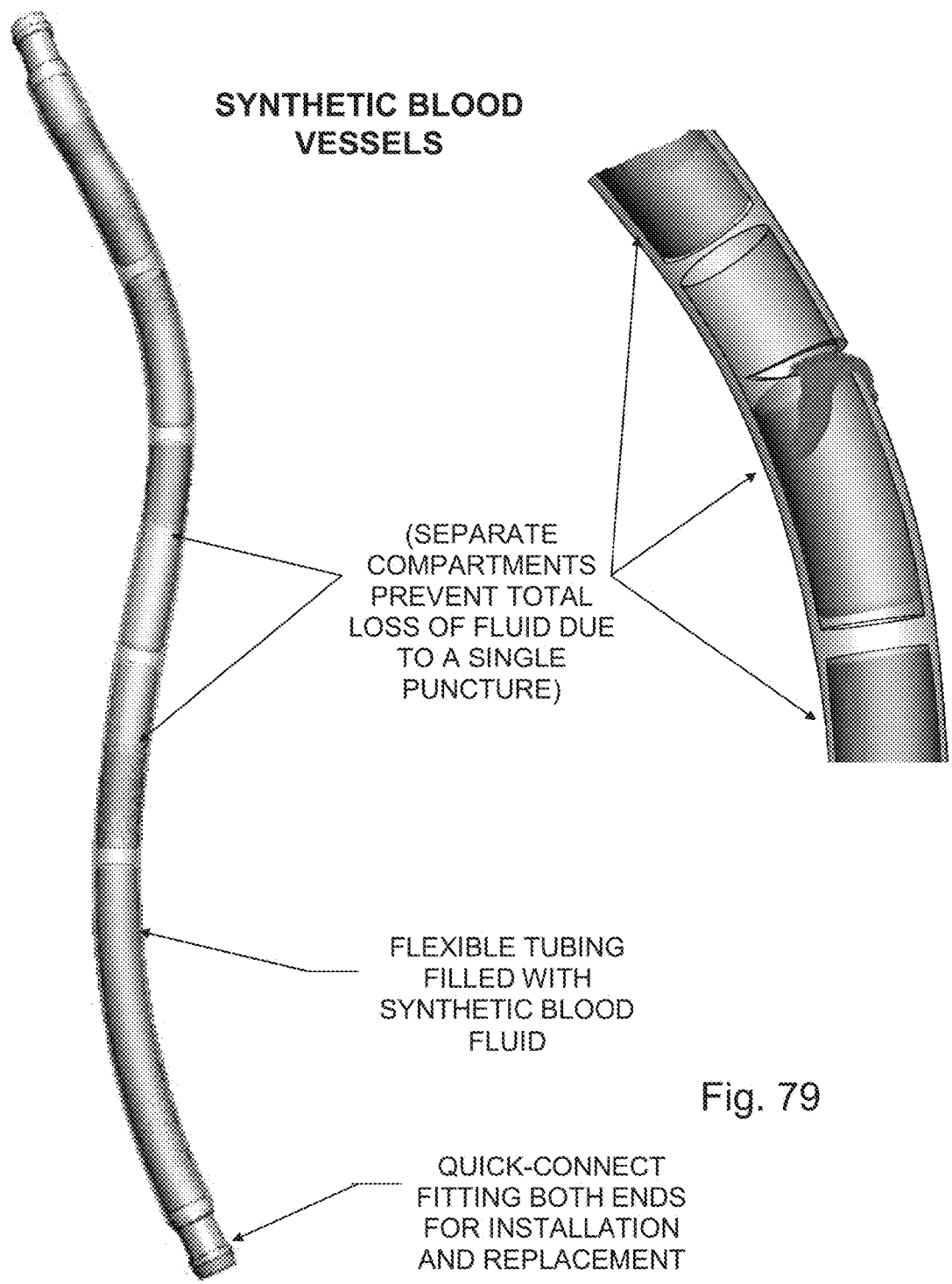
Figure 80:
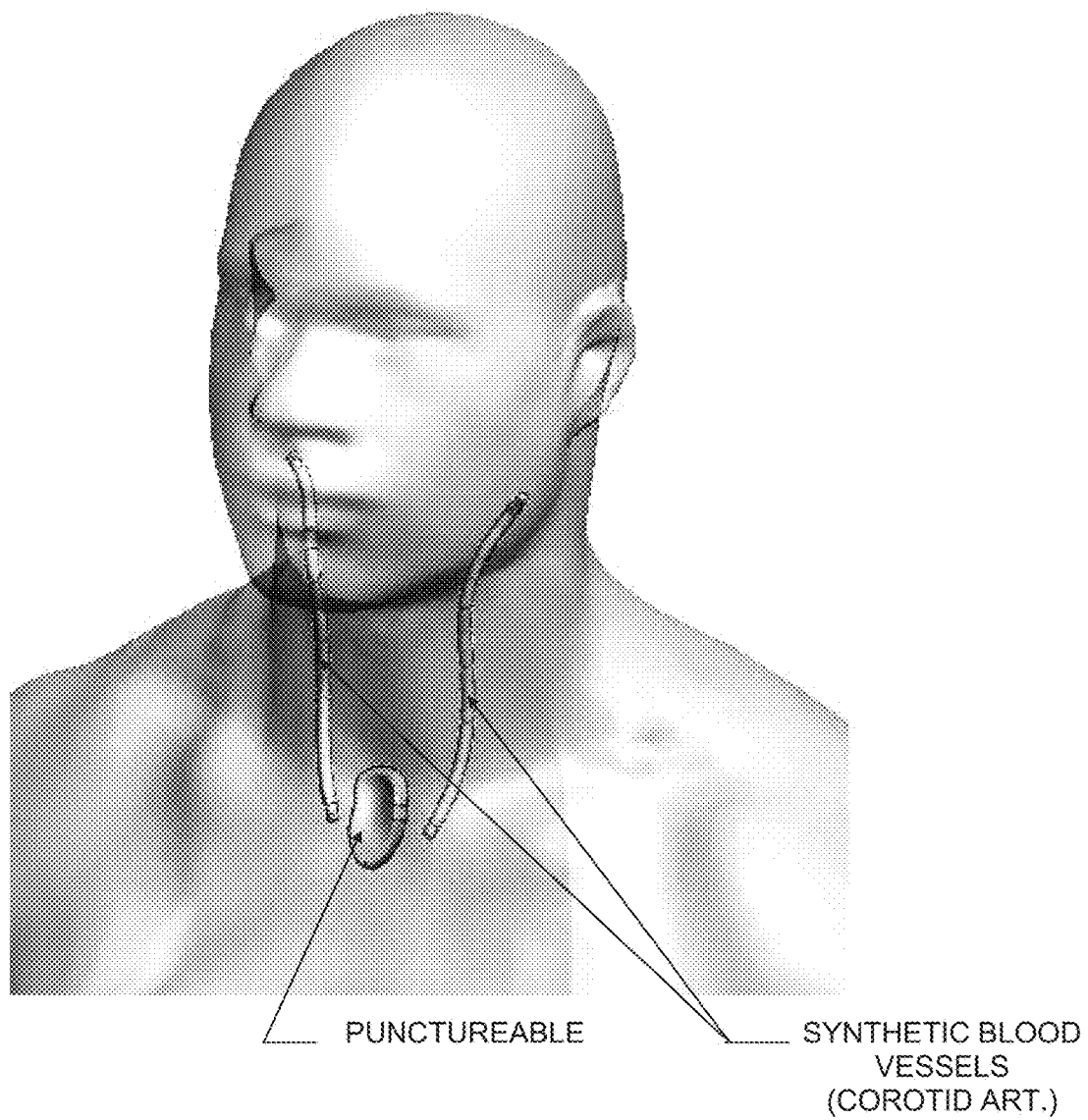
Figure 81:
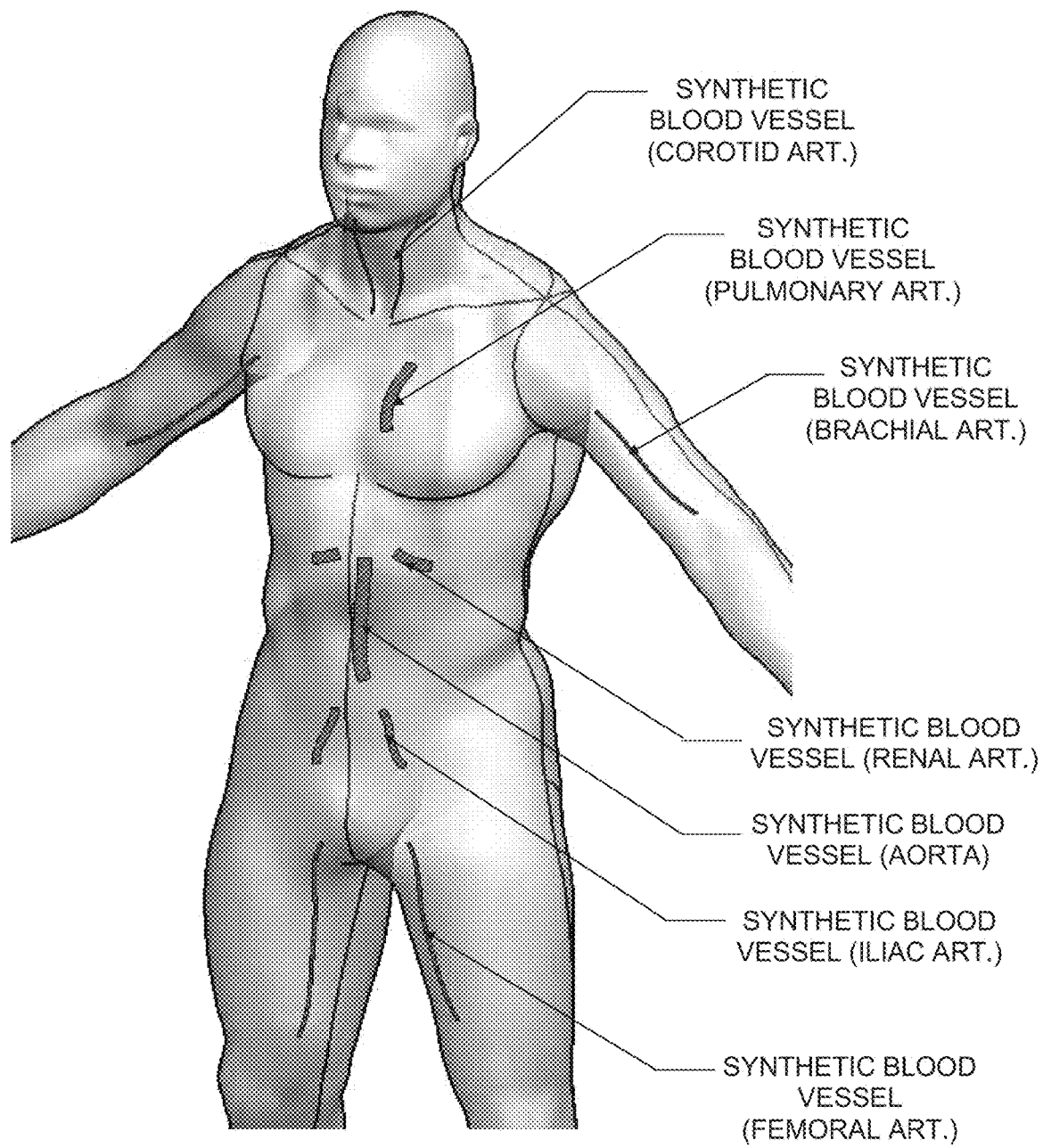

FIG. 79 illustrates exemplary synthetic blood vessels that may be used in an exemplary Trubreak dummy according to exemplary embodiments of the present invention, the synthetic blood vessels may contain separate compartments to prevent total loss of fluid due to a single puncture, may be made of a flexible tubing filled with synthetic blood fluid, and may be provided with a quick-connect fitting at both ends for easy installation and replacement;

FIG. 80 illustrates two synthetic blood vessels and a punctureable trachea area according to exemplary embodiments of the present invention, the synthetic blood vessels used to simulate the carotid arteries running to the head;

FIG. 81 illustrates essentially a full body Trubreak dummy with various synthetic blood vessels for each of (i) the carotid arteries, (ii) the pulmonary arteries, (iii) brachial arteries in the upper arm; (iv) renal arteries; (v) an aorta; (vi) iliac arteries and (vii) femoral arteries;

Flexible Cutable Synthetic Organ Figures

Figure 82:
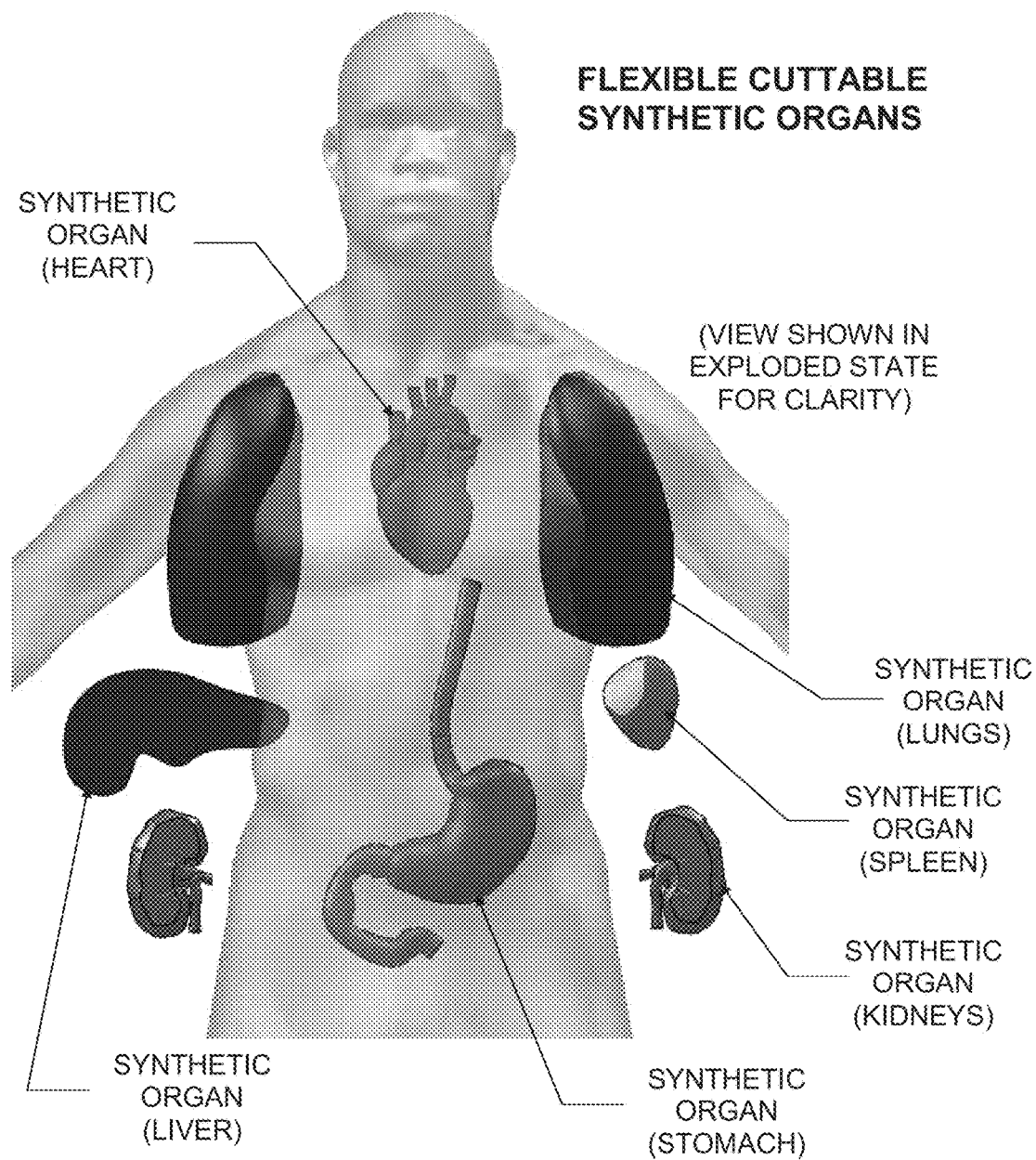
Figure 83:
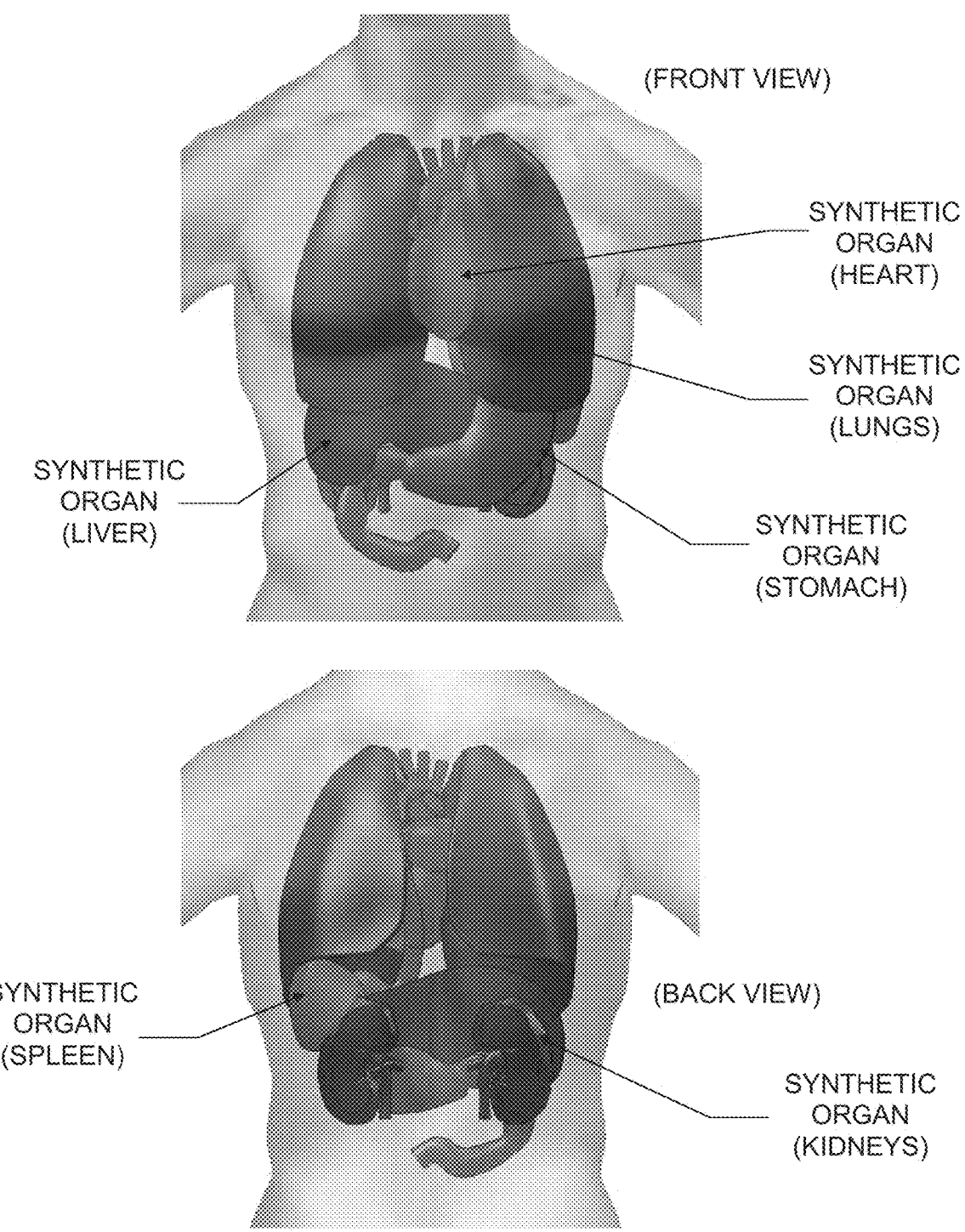

FIG. 82 illustrates a variety of flexible/cutable synthetic organs which may be provided in an exemplary Trubreak dummy according to exemplary embodiments of the present invention, including (i) a synthetic heart; (ii) lungs; (iii) spleen; (iv) liver; (v) stomach, and (vi) kidneys;

FIG. 83 shows a front and back view of the torso and lower back of an exemplary Trubreak dummy with a number of synthetic organs provided, including a (i) heart; (ii) lungs, (iii) stomach, (iv) liver, (v) spleen; and (vi) kidneys in anatomically correct positions according to exemplary embodiments of the present invention;

Force Indicating Sensor Organs

Figure 84:
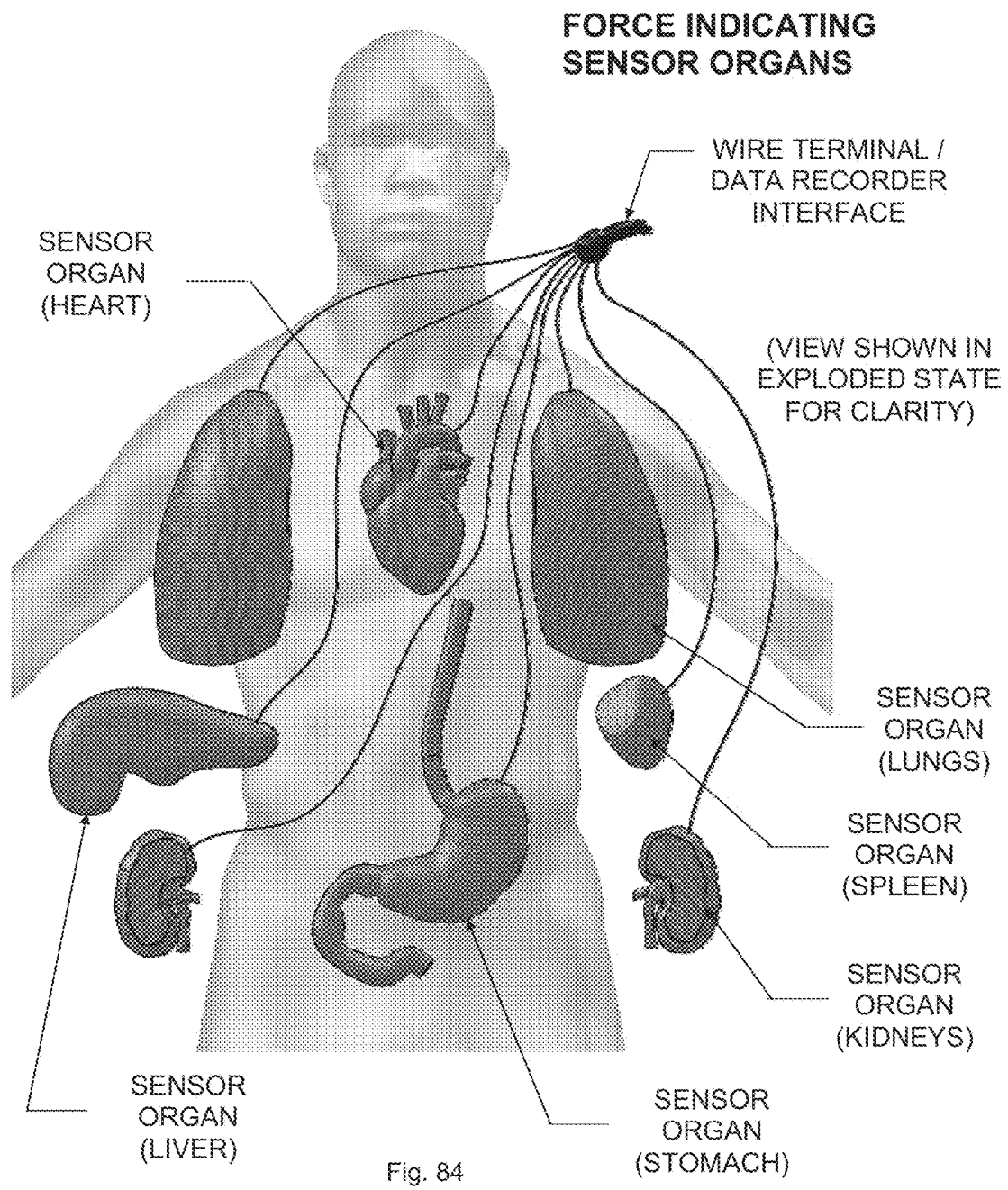

FIG. 84 illustrates an exemplary set of organs provided with sensors to indicate applied force according to exemplary embodiments of the present invention, including (i) heart, (ii) liver, (iii) stomach; (iv) kidneys, (v) spleen, (vi) lungs, as well as an exemplary wire terminal/data recorder interface to capture the sensor recordings when these synthetic organs are hit or subjected to trauma;

Actuation, Motion-Recognition, Data Capture Figure

Figure 85:
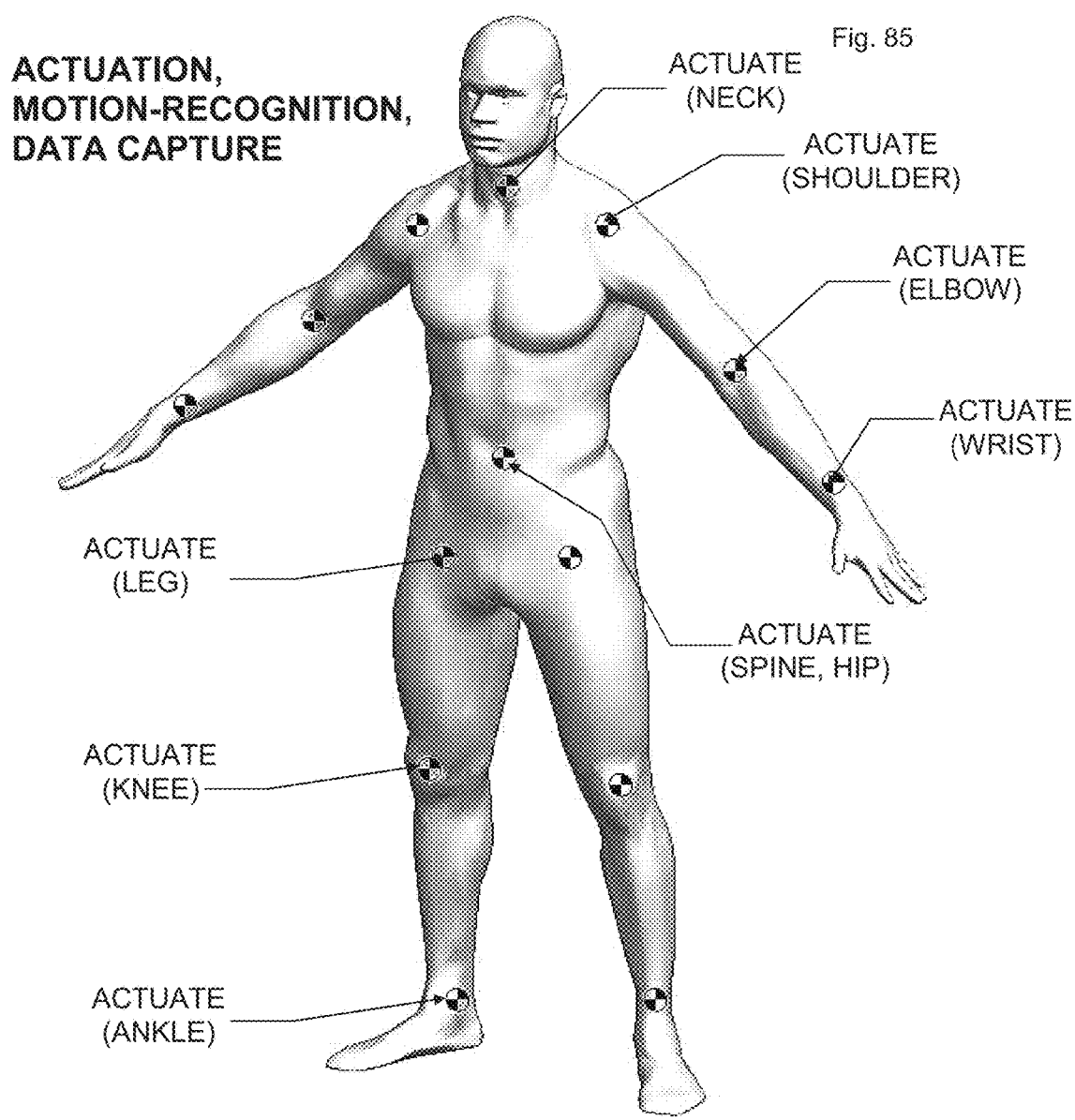

FIG. 85 illustrates a number of actuation devices which can both capture data and animate an exemplary Trubreak dummy according to exemplary embodiments of the present invention, including (i) neck, (ii) shoulder, (iii) elbow, (iv) wrist, (v) spine, (vi) hip, (vii) leg, (viii) knee and (ix) ankle actuators; the design intent here is to provide a semi-mobile mounting fixture and an integrated "move-by-wire" system of mechanical linkages, mechanical actuators, electronic controls and software which will provide the indicated features.

Figure 86:
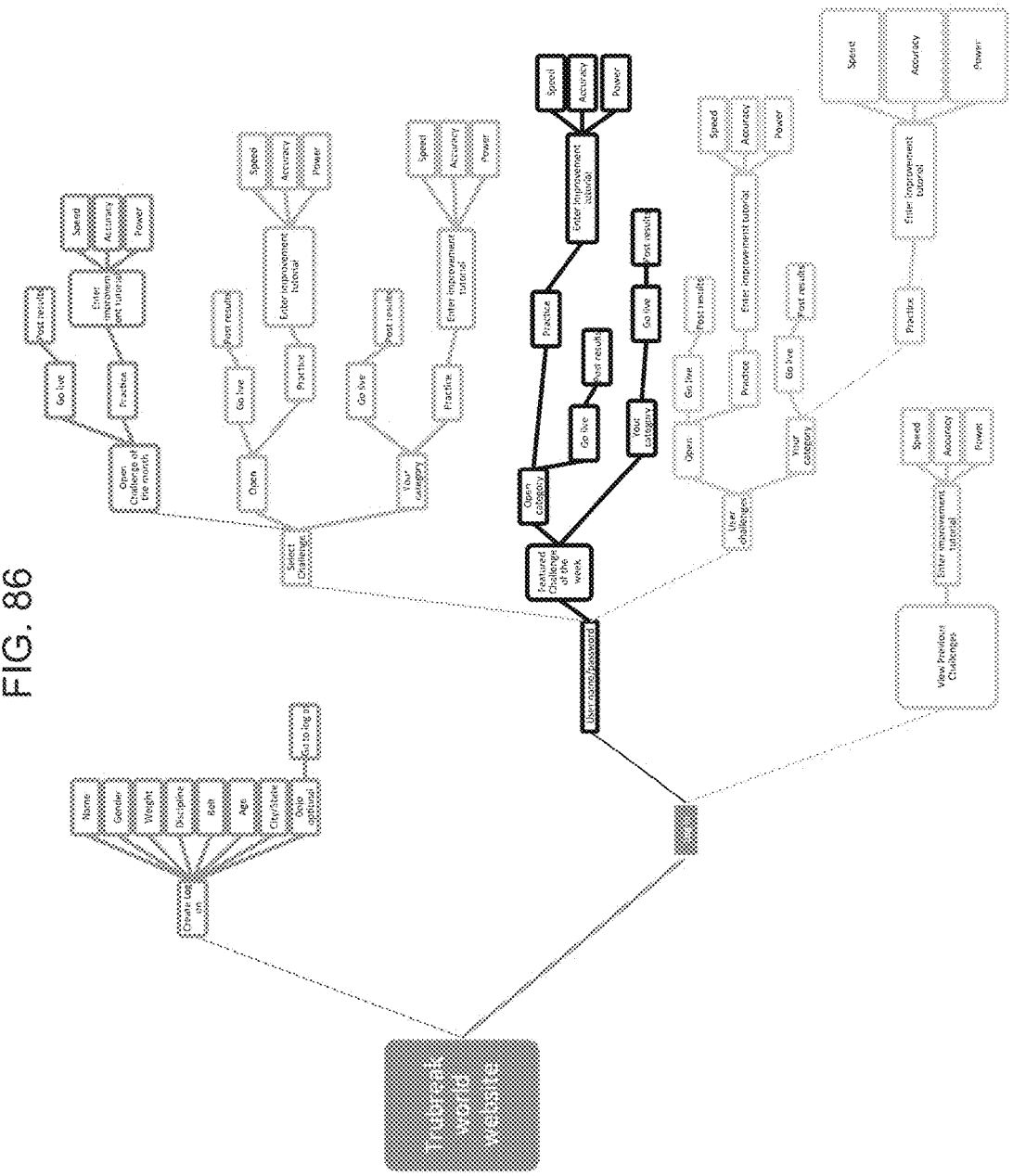
Figure 87:
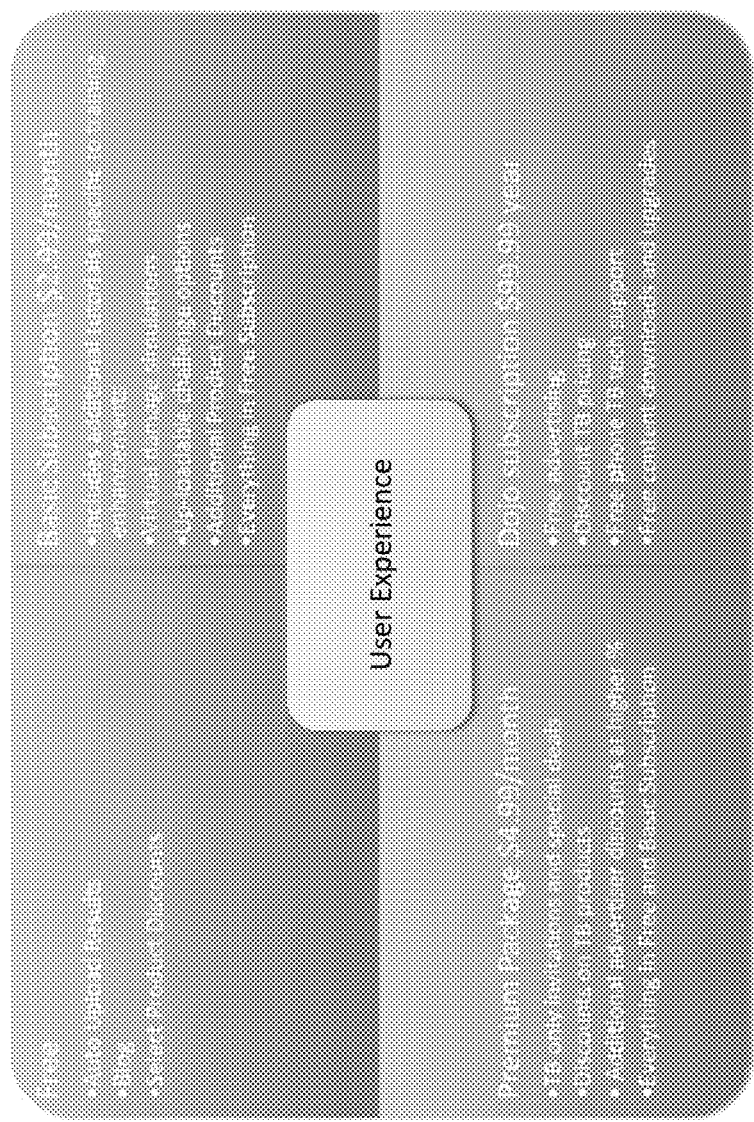

FIG. 86 illustrates an exemplary process flow at a system website and server, according to exemplary embodiments of the present invention; and FIG. 87 depicts exemplary user plans available at the exemplary system website of FIG. 86.

DETAILED DESCRIPTION OF THE INVENTION

The various exemplary embodiments disclosed herein allow for full force martial arts training with real biomechanical and digital feedback, yet without the negative consequences of conventional "full power and aggression" training with live partners.

In exemplary embodiments of the present invention, a martial arts training dummy comprises a computerized biofeedback system. Multiple points within and provided in various surface areas of the dummy are configured to be responsive to physical attacks—the responsiveness being calibrated based on actual human anatomical and medical measurements.

In a preferred embodiment, the fully assembled dummy can allow a user to apply strikes, breaks, joint manipulations, chokes and knife attacks, as well as monitor impact force feedback. In exemplary embodiments of the present invention, a preferred device has two arms, two legs, a head and a torso that can either be attached together to make a full sized and weight-simulated human form, or where such parts can be used individually or partly assembled, and mounted on their own base, as on other devices.

Thus, when a martial artist applies specific locks to do damage to an arm, for example, it is not necessary to have a fully assembled dummy. All that is needed is a dummy from torso to head, and where the arm attaches to the shoulder, so that the user can manipulate the arm (i.e., the true break arm attached to the torso) as if they are doing ground work. In such case, the legs are not needed; nor are the other arms. All that is needed is something that the user can wrap his body and legs around, so that he can get hold of the appendage (e.g., a single arm) that he wants to damage, or train to damage in a human-body realistic manner. Accordingly, the various dummy parts described above can be used either individually, partly or fully assembled.

In some embodiments, an exemplary dummy can be attached to a stand, such as, for example, a stand (like a "Bob" stand) having a base filled with water, sand or the like, to achieve about seventy or eighty pounds. The inventive dummy can attach to the stand with a suitable locking mechanism, and the stand can be height adjustable. With the torso and one or two arms attached, for example, a trainee, such as, for example, a police officer, can practice cuffing techniques, standing arm bar techniques, standing take down techniques, and other techniques where specific pressure is applied to certain joints.

Exemplary embodiments of the present invention include at least one appendage that can be attached to a torso to create a truer human look and feel. Connection receptacles in the torso allow a user to attach any combination of appendages as long as connect points are available. Thus, for example, a user could have a torso with five legs if desired.

The torso can thus be configured to receive (releasably lock) multiple appendages that can be "torsoed" (i.e., attached to the TB torso) at any time. For example, the torso can accommodate several arms, legs or heads to permit multiple users to work on the same dummy at the same time. This is facilitated by providing locking mechanisms for the arms, legs and head that are uniform. As noted, one could put five arms on a torso; an arm here, an arm there, an arm where the hip would go, even an arm where the head would go. It should be appreciated that in some embodiments, one may purchase a single torso with several sets of appendages so as to enable multiple individuals to interact with the dummy without having to purchase multiple torsos. In some embodiments the torso, with various appendages, may be attached to a heavy bag utilizing one of the Trubreak harness systems as shown in FIG. 52, 55 or 69, for example.

Each appendage may have, for example, sensors, breakable joints and bones, severable tendons and ligaments, as well as realistic simulations of organs and arteries that can be punctured or otherwise manipulated. In some embodiments, the dummy can be attached to a platform so as to "stand" like a human fighter, as depicted in FIG. 50, or it may be removed and used on the ground. In some embodiments, each individual appendage can be attached to its own component base and used as a stand-alone device.

In exemplary embodiments of the present invention the angles of limbs can accommodate hyper-extension. For the angles of the shoulders, a minimum standard can be established for rotation and pronation until the ligaments separate or are damaged. In exemplary embodiments of the present invention all such separations are repeatedly resettable, so that one may train over and over on the various techniques.

In exemplary embodiments of the present invention, the various simulation organs in the dummy may be located at anatomically correct positions and depths. This facilitates training with a knife or other puncturing weapon on a realistic target.

One aspect of the present invention is to allow user to punch or kick to the head, and then inspect the resulting internal damage inflicted on the dummy. For example, a user can fold back the head's skin to reveal a dislocated jawbone and a broken nose. The user can then realign the jaw on its track, reset the nose, fold back the covering skin, and continue training anew.

In another aspect of the present invention, a user may apply a theoretical break force to the back of the dummy's elbow. If the proper force, based on available medical research, is applied or exceeded at the correct angle, the breakable and resettable joint at the dummy's elbow would then hyperextend and snap. As above, the user can then fold back the skin and reset this joint to repeat the technique.

Still another aspect of the present invention permits a user to attack the Trubreak dummy with a knife or other puncturing weapon. This weapon may be a blunt force weapon, a cutting weapon, or a Trubreak compatible simulated weapon. Thus, the various organs in the dummy are located at the anatomically correct positions and depths so as to accurately simulate a living human. The user can attempt to penetrate the dummy's skin and cut into a targeted organ, say a kidney or heart, for example. When the exercise is complete the user can fold back the skin at the attacked area and inspect the damage to the targeted organ. The organ can be repaired or replaced for repeated use and continued training. Further, severable realistic ligaments and tendons, as well as arteries, can be placed throughout the dummy, thus allowing the user to train in a realistic way at multiple target areas.

Another aspect of the present invention allows a user to apply choke techniques to the dummy's neck. Under the dummy's skin sensors may be provided that trigger a signal to the user when enough force is applied to an individual sensor or a combination of sensors to achieve a choke, either a blood choke or an airway choke. This signal can alert the user, for example, that the airway to a human training partner would be impeded causing unconsciousness or even death. The sensor may have multiple applications and feedback capabilities and may be located in various positions. A given sensor can send feedback to a user by sound, light, vibration, or be digitally connected to a computer system (which can record and then itself signal the user, or an instructor), for example.

In exemplary embodiments of the present invention, a support platform can give the user the opportunity to connect to a computer system, either locally or over a network, such as a VPN or the Internet. This platform connection can enable, using XBOX™ Connect technology for example, or any other like technology, or, for example, Bluetooth connections, the capability to recognize an impending attack from the trainee and, using pneumatic (air or liquid, or both) or other robotic movement devices, controllers and equipment, via a remote user interface, move the dummy so as to avoid the attack. In such exemplary embodiments, the platform's "eye" can be calibrated to send signals to the dummy thus making it virtually alive. Thus, local or wide area controls can allow the trainee to virtually fight against an individual, such as an instructor or other martial artist, that is controlling the dummy. This allows for virtual competitions and remote instruction. In some embodiments, a preset program or user created program through an exemplary platform can allow the user to train in different scenarios as well as allow the user to record (and obtain metrics regarding) accuracy improvement, attack speed, impact force increases, as well as reaction time.

This remote fighting technique is similar to multiple computer game participants over the Internet, for example. The difference here is that there is not just a virtual world displayed on a screen; the remote commands and control signals issued by the instructor, for example, are expressed in actual motions of the Trubreak dummy.

Thus, for example, an instructor using the platform's eye or webcam over an Internet or other computer network connection connected or synchronized to the trainee's system can connect to the feedback sensors in a trainees' Trubreak dummy and thereby observe the trainees' technique. Further, over an audio communications channel, either provided in an app for the trainees' computer or smartphone, or, for example, embedded and integrated in the dummy or in a platform or base for the dummy, the instructor can have the trainee move through a given technique or kata and be able to instantly correct or compliment the trainee based on the digital feedback sent to the instructor from the trainees' dummy. Additionally the instructor can look at images of the trainees' technique through the platform's eye. Such a connection allows a user to virtually train with any instructor in the world, at any time of day or night, as long as there is an Internet connection.

It is noted that the webcam, or platform's eye, may be integrated in an advanced dummy, so as to provide the remote viewer with an actual front on realistic fighting view of the trainee, or, for example, a user's smartphone or computer may be placed near the dummy (in a calibration operation), and the view provided to the remote participant via a smartphone or computer video-chat type app, as the case may be.

In what follows, various anatomical areas of an exemplary self-defense/martial arts training dummy are described with reference to one or more of the accompanying figures. These various areas can, for example, contain sensors of various types, as well as anatomically correct simulations of skin, bone, joints, ligaments, vessels, organs and other anatomical structures. The exemplary dummy is modeled on an average sized human male, but this is only for illustrative purposes. It is understood that in exemplary embodiments of the present invention "dummies," that model various shapes, sizes, ages, genders and builds of human and non-human subjects may be used. Which type of subject is used in a given exemplary embodiment will, in general, be determined based upon the type of opponent or subject that a given user (or his teacher or dojo) desires to focus upon.

It is also contemplated that various exemplary embodiments of the present invention may be marketed under the trade name "Trubreak." Thus, for ease of illustration, the exemplary training dummies described herein may often be referred to as "TB dummies", "TB dummy", or "Trubreak".

Right Arm

FIG. 1 depicts a front view of the right arm of an exemplary TB dummy with the skin pulled back to show internal structures. The skin of the TB dummy can be made, for example, from a simulated skin product. For example, it may be the product marketed by Paramount Industries in Bristol, Pa. known as "Dragon Skin® Series silicones", or any similar realistic skin simulation. Such skins may be, for example, high performance platinum cure silicone rubbers that can be mixed 1A:1B by weight or volume and cure at room temperature with negligible shrinkage. Cured Dragon Skin®, for example, is very strong and very "stretchy". It can thus stretch many times its original size without tearing, and can rebound to its original form without distortion. Such imitation skin is suitable for making high performance molds used for rapid prototyping, wax casting (foundries and candle makers), architectural restoration and for casting concrete. In addition, Dragon Skin®, for example, is used in many special effects applications, especially animatronics where repetitive motion is required. It is water-based white translucent and will accept pigments for creating color effects.

In exemplary embodiments of the present invention, a simulated skin may have the same thickness, weight, and density of that of a real human arm, for example (the same criteria apply to other limbs and organs in any Trubreak device). In exemplary embodiments of the present invention, it is preferable to use simulations of skin, bone, muscle, joint, ligaments, vessels, etc. in a TB dummy that have properties as close as possible to those of the actual species and body type being simulated (here a human male). This is because for the user to be able to train at full intensity, he must have a training tool as close to the real thing as possible. Anything less than anatomically correct would create false training feedback, and result in inaccurate muscle memory if the trainee tries to apply his training to an actual human opponent. However, it is understood that various exemplary embodiments can utilize dummies with some, or all, anatomical components that less faithfully simulate their actual human counterparts, for various economic, robustness, or interoperability reasons, as described more fully below.

Continuing with reference to FIG. 1, there may be an upper arm bone 135 that can have, for example, the same weight and density as a human arm, and can be provided with pneumatic pistons 525 that can, for example, control the flexion of the entire arm from wrist to bicep. Additional devices that could potentially be used to complete a flexing motion include, for example, motors, belts, pulleys, gears, electro-magnetic, magnetic, hydraulics, elastic bands, counter weights and contractible polymers. A severable bicep sensor 140 can also be provided, for example, to deactivate the pneumatic piston, so as to represent a massive trauma of the bicep muscle resulting in an inflexible arm. This reaction is triggered by the user severing a circuit or by a force sensor being impacted with enough force to send a cut off signal to the flexing device. Cuttable sensor 140 can, for example, have a power source that is located locally, or alternatively, can be connected to a central power source that supplies many or all of the TB dummy's sensors and electronics. Sensor 140 can be implemented using, for example, a Tekscan™ flexi force sensor, for example, and can be wired to pneumatic piston 525 for signal relay. Also shown is elbow joint 105, which can have, for example, a hyperextension break pressure of preferably 3500 Newtons of force, or for example, anywhere from 3000-4000 Newtons. It may be adjustable. This simulation joint can utilize, for example, torque, spring, groove, piston, electro pneumatic, or any other combination of components and materials to achieve a real to life break point. Two tendons, made of simulated skin material at the outside edge of the elbow, 115, can be severable and replaceable. When these tendons are severed, like 140, a signal will stop the ability for the arm to flex from the movement at 525. These tendons 115 may also use a force sensor, as do biceps 140, to measure the necessary force needed to stop flexion of the arm at 525. The tendons will also be severable, which will sever an arm flexing signal at 525 if cut through. Thus, tendons 115 will shut off the pneumatic ability of biceps 525 if enough damage is done. This simulates real trauma to a working arm's tendons. Lower arm bone 130 connects to elbow 105 in similar fashion as the way in which upper arm bone 135 does. Femoral artery 110 runs along the inside of lower arm bone 130. This artery is severable in similar fashion to tendons 115 and may be made of the same "Dragon Skin" product, for example, or any other simulated skin product, such as, for example, contractable polymers. Wrist 120 can function almost identically to elbow 105 as far as breakability and resetability, and thus can be a smaller version of elbow 105. This breakable wrist could be made of hard plastic, alloy, metal, rubber, wood, silicon, or hybrid combination of the above, for example. Wrist 120 may be tongue and groove, gear, torque, snap, screw, or latch movement. Breakable fingers including thumb 125TH, index finger 125I, and pinky 125P can also be provided, and can, for example, be smaller versions of the apparatus used for wrist 120, and elbow 105.

Finally, clavicle bone 305 can also be provided, which can have the same density and weight as a real clavicle and can respond with breaking at the appropriate force which is 7 to 11 psi of force at the center. It can also be resettable. Thus, each of elbow 105, wrist 120, thumb 125TH, index finger 125I, and pinky 125P can be reset for repeated use.

Figure 1A:
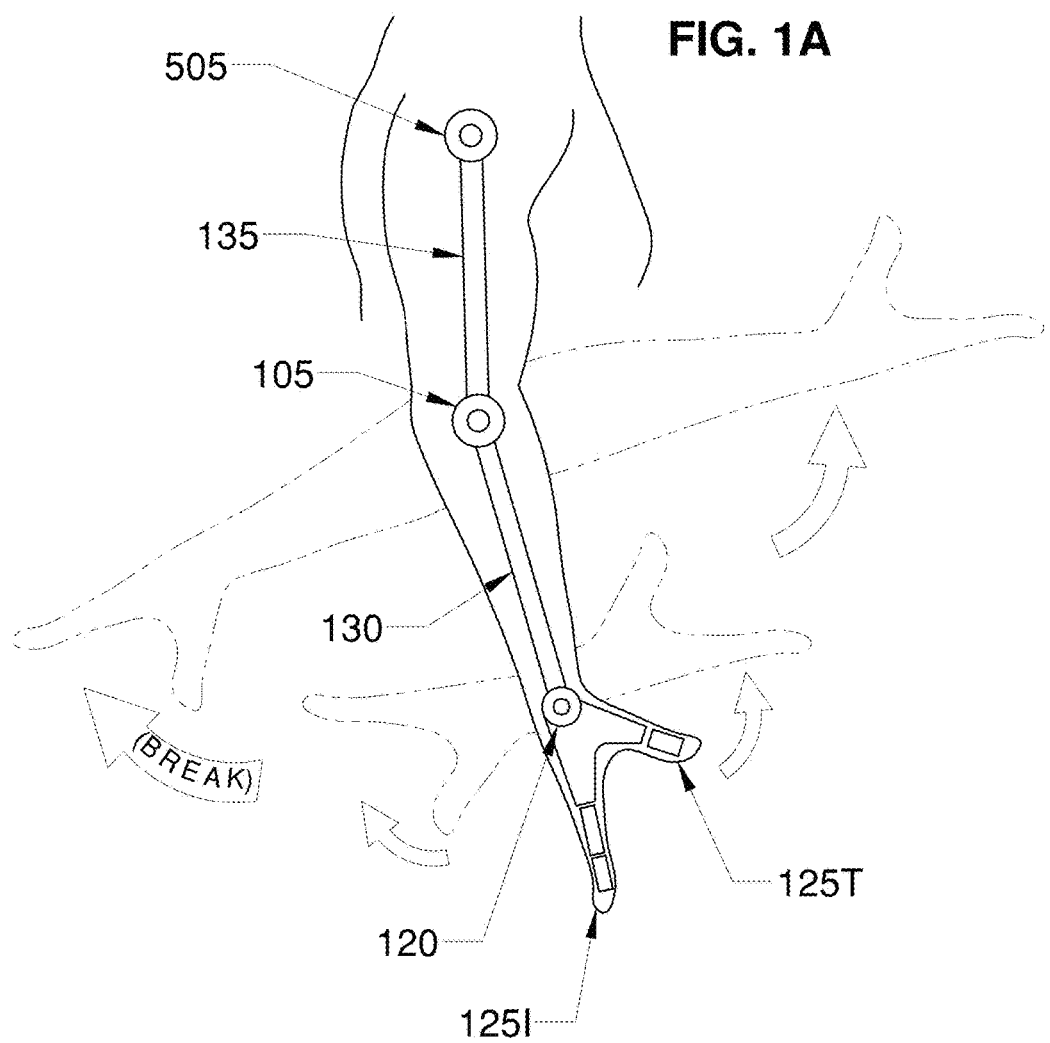
FIG. 1A depicts the right arm shown in FIG. 1 from a side view, showing the range of motion of the forearm and wrist and also indicating the direction in which a user would push the wrist to break the finger and the elbow to break it.

FIG. 1A depicts the right arm shown in FIG. 1 from a side view, showing the range of motion of the forearm and wrist and also indicating the directions in which a user would push the wrist to break the finger and the elbow to break it.

Right Leg

FIG. 2 depicts a side view of the right leg of an exemplary TB dummy with the skin pulled back to show internal structures. The skin of the TB dummy can be made, for example, from a simulated skin product, as noted above.

The simulated skin can have the same thickness, weight, and density of that of a real human arm. In exemplary embodiments of the present invention, it is preferable to use simulations of skin, bone, muscle, joint, etc. in a TB dummy that have properties as close as possible to those of the actual species and body type being simulated (here a human male). This is because for the user to be able to train at full intensity, he must have a training tool as close to the real thing as possible. Anything less than anatomically correct would create false training feedback and result in inaccurate muscle memory if needed to do on an average sized human. However, it is understood that various exemplary embodiments can utilize dummies with some or all anatomical components that less faithfully simulate their actual human counterpart, for various economic, robustness, or interoperability reasons, as described more fully below.

Figure 2A:
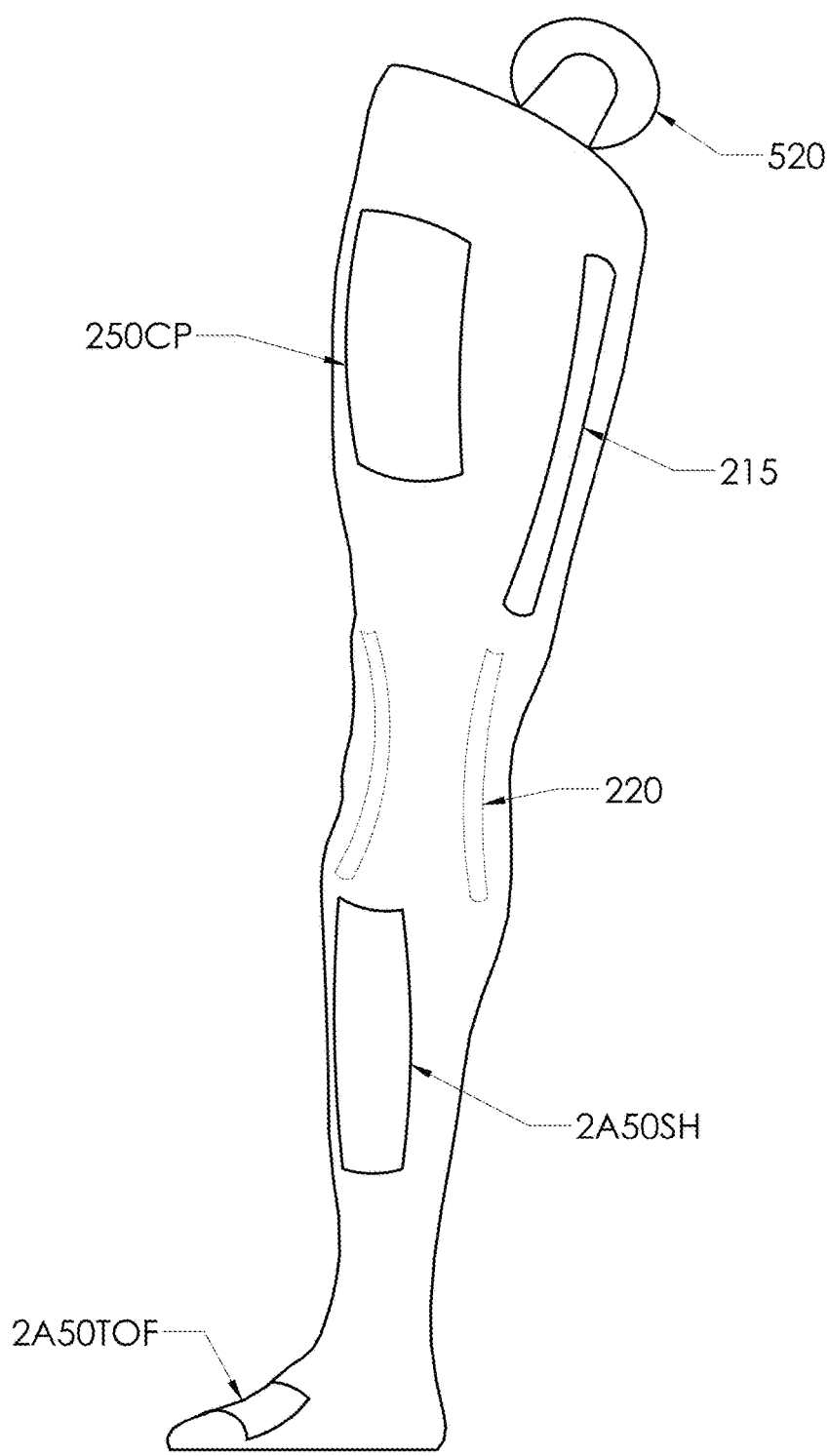
FIG. 2A depicts the exemplary right leg of FIG. 2 including imitation skin, and showing key attack regions.

Continuing with reference to FIGS. 2 and 2A, there is shown an upper leg bone 245 that can have, for example, the same weight and density as a human leg bone, and that can be provided with pneumatic pistons 530, as shown in FIG. 2B that can, for example, control the flexion of the entire leg from knee to hip. Additional devices that may be used to complete a flexing motion include motors, belts, pulleys, gears, electromagnetic, magnetic, hydraulics, elastic bands, counter weights, and contractible polymers. A severable bank of knee sensor(s) 220 can also be provided, for example, to deactivate the pneumatic piston, so as to represent a massive trauma of the tendon/muscle connection resulting in an inflexible leg. This reaction may be triggered by the user severing a circuit or by the force sensor at 250CP or 2A50SH in FIG. 2A, being impacted with enough force to send a cutoff signal to the flexing device. Cuttable sensor 220 can, for example, have a power source that is located locally, or alternatively, can be connected to a central power source that supplies many or all of the TB dummy's sensors and electronics, as may be desired in different contexts.

Sensors 220, 2A50SH, and 250CP can be implemented, for example, using a Tekscan™ FlexiForce™ sensor, as noted above, for example, and can be wired to pneumatic piston 530 for shutoff. Also shown in FIG. 2 is knee joint 225, and hip joint 210, which each can have, for example, a hyperextension break pressure of preferably 3500 Newtons of force, or for example, anywhere from 3000-5000 Newtons. These simulation joints can utilize, for example, torque, spring, groove, piston, electro-pneumatic, or any other combination of components and materials to achieve a real to life break point. A femoral artery 215, made of, for example, artificial membrane at the inside edge of the thigh can be, for example, severable and replaceable. Also shown is ankle joint 235, which can preferably have, for example, a hyperextension break pressure of preferably 3500 Newtons of force, or, for example, anywhere from 3000-4000 Newtons. This simulation joint can utilize, for example, torque, spring, groove, piston, electro pneumatic, or any other combination of components and materials to achieve a real to life break point. A breakable and resettable bone may be located at the top of foot 230. It can, for example, break at 30 psi with 1000 Newtons of applied force. Another force sensor 215 in FIG. 2A may be located at the outside edge of the thigh above the knee and below the hip. This sensor can also have a shut-off signal attachment to the pneumatic actuator at 530 causing the leg to not flex for a specified period of time, for example between 6 to 10 seconds. This shut-off signal will only occur if the sensor 215 is impacted with 5000 Newtons or greater. Another force sensor, using the exact same technology and shut off signal sensors, can be shin sensor 2A50SH shown in FIG. 2A. It is located on the lower leg bone 240 in FIG. 2. Thus, shin sensor 2A50SH and sensor 250CP will shut off the pneumatic ability of 530 if enough damage is done to simulate real trauma to a working leg's thigh and shin. Lower leg bone 240 connects to ankle 235 in similar fashion to the way in which upper leg bone 245 connects to the knee 225. Ankle 235 can function almost identically to knee 225 as far as breakability and resetability and thus can be a smaller version of knee 225. These breakable knees and ankles could be made of hard plastic, alloy, metal, rubber, wood, silicon, or hybrid combination of the above. Joints 235 and 225 can be tongue and groove, gear, torque, snap, screw, or latch movement, for example. A severable Achilles tendon may also be provided (not shown).

Finally, a magnetic base in the foot 260 may be used to keep the TB dummy in a standing position while upright. It may be magnetically attached to a separate TB platform. This magnetic connection can allow the TB leg to have the rigidity of a real human leg in a standing position, thus creating a more realistic training experience.

Torso

FIG. 3 depicts a front view of the torso of an exemplary TB dummy with the skin pulled back to show internal structures. The skin of the TB dummy can be made, for example, from a simulated skin product, as noted above. The simulated skin can thus have the same thickness, weight, and density of that of a real human arm. In exemplary embodiments of the present invention, it is preferable to use simulations of skin, bone, muscle, joint, etc. in a TB dummy that have properties as close as possible to those of the actual species and body type being simulated (here a human male). This is because for the user to be able to train at full intensity, he must have a training tool as close to the real thing as possible. Anything less than anatomically correct would create false training feedback and result in inaccurate muscle memory if needed to do on an average sized human.

However, it is understood that various exemplary embodiments can utilize dummies with some or all anatomical components that less faithfully simulate their actual human counterpart, for various economic, robustness, or interoperability reasons, as described more fully below.

FIG. 3 illustrates several organs made of a synthetic skin material that can be cut, punctured, and severed using tools, either real or Trubreak compliant simulation tools (as described below in connection with FIG. 56), that can cause such damage. A TB user can attack the TB dummy with, for example, a knife, saw, axe, screw driver, or any other cutting, puncturing, or blunt force tool, or even a simulated gun. If the user penetrates deep enough past the first layer of, for example, Dragon Skin, which would have sufficient thickness and resistance to simulate a human's multiple layers of skin and fat, the attacker may damage the simulated organs in the TB dummy. When the user reveals the specific organs, tendons, muscles, arteries, and veins after his attack sequence, he will be able to determine the damage that could be caused in real life by looking at the appearance of the attacked organ. These organs can, for example, be the same size, weight, and density, and have the same anatomical location, as a living human would. These organs may include, as shown in FIG. 3, for example, heart 315, lungs 320, liver 330, and kidneys 325. Each organ could be filled with a colored liquid or gel for ease of inspection when engaging in cutting, puncturing, shooting, or blunt force training. Alternatively the organs may be fitted with feedback sensors capable of registering the type and degree of damage that would be caused, and these sensors would thus allow a user to weapon train with a Trubreak compliant tool/device (including, for example, as may be based upon, or include RFID, magnetic, pressure, force sensor, spring loaded, or other technologies) so as not to damage the TB training system. Alternatively, the cuttable tendons and veins found throughout the TB appendages could potentially be moved into other locations of the body to practice additional cutting accuracy training. Since these replaceable TB tendons and veins can be moved, the user can adjust the intensity and lethality of the training. Also shown in FIG. 3 are breakable ribs 310, which can have, for example, a break pressure of preferably 2000 Newtons of force, or for example, anywhere from 1500-3000 Newtons of force. These simulation bones can utilize, for example, torque, spring, groove, magnetic, or any other combination of components and materials to achieve a real breaking feel to the user. Also shown is pneumatic devices 510 that can control the TB dummy's movement in a bending at the waist direction that include bending over head toward feet, as well as head toward hip laterally as if doing an oblique crunch. This pneumatic can have the same technology as in 530 of FIGS. 2 and 2B, described above.

Head

FIG. 4 depicts a front view of the head of an exemplary TB dummy with the skin pulled back to show internal structures. The skin of the TB dummy can be made, for example, from a simulated skin product, as noted above. The simulated skin may have the same thickness, weight, and density of that of a real human.

FIG. 4 depicts two jaw bones 425 and 430JA that can have, for example, the same weight and density as a human jaw, and which may be knocked off of a track, out of a groove, or removed from a magnetic or latch type of connection, so as to simulate the breaking and dislocation of the jaw from the skull. As shown in FIG. 4A, A jaw force sensor 4A50JA, a temple force sensor 4A50TEM, a jugular vein 4A50CS, and throat force sensor 4A50TH can also be provided, for example, to register various types of head trauma. If sufficient individually or in the aggregate, the trauma may deactivate pneumatic piston 530 of the leg, so as to represent a massive trauma to the central nervous system or knockout reflex connection resulting in an inflexible leg. This reaction can be triggered by these four force sensors being impacted individually with enough force to send a cut off signal to the flexing device. All four head sensors, 4A50JA, 4A50TEM, 4A50CS and 4A50TH can, for example, have a power source that is located locally, or alternatively, can be connected to a central power source that supplies many or all of the TB dummy's sensors and electronics.

Also shown in FIG. 4 are the breakable and resettable nose bone 420, and cheek bones 410 which can have, for example, a break pressure of preferably 2000 Newtons of force, or for example, anywhere from 1500-3000 Newtons. These simulation bones can utilize, for example, torque, spring, groove, magnetic, or any other combination of components and materials to achieve a real breaking feel to the user. Also shown are removable and puncturable, and replaceable eyes 405, details of which are discussed in connection with FIGS. 41-47. The eyes can rest in a socket and can be damaged by object or fingers from a user's attack. Neck joint 435, which can have, for example, a hyperextension break pressure of preferably 3500 Newtons of force, or for example, anywhere from 3000-4000 Newtons with a lateral rotation of over 50 degrees. This simulation joint can utilize, for example, torque, spring, groove, piston, electro pneumatic, or any other combination of components and materials to achieve a real to life break point.

Full Body

FIG. 5 represents a full frontal view of an exemplary TB dummy with the skin removed to reveal the internal workings. In this exemplary embodiment, the TB arms are connected into the TB torso at 505. The connection may be, for example, a latch and key, screw, peg and connector, track connection, or the like. The TB arms connect to the torso at 505 allowing the user to manipulate the dummy for various police control holds, submission techniques, and joint manipulations that would require a total upper body. Also shown, using similar or the same technology, for example, is the leg to torso connections 520. By connecting a right leg and left leg, as well as a right arm and left arm, a user may create a full size and full weight training dummy. This full size TB dummy, if attached to a magnetic platform, can stand upright for standup training, law enforcement cuffing and hold training, as well as impact force measurement from a standing position when the force sensors are engaged with applied force.

Element/Component Numbering for FIGS. 1-5

For ease of understanding the above-described FIGS. 1-5, which present the basic TB dummy and its various elements, various index numbers appearing in such figures, and the objects or elements they referred to, are provided below. This generally obviates the need to reread the text to find the referent of any such index number.

FIG. 1. Arm
105. Breakable elbow.
110. Cuttable artery.
115. Cuttable tendon.
120. Breakable wrist.
125TH, 125I, 125P: Breakable thumb, index finger, and pinky finger, respectively.
130. Forearm bone.
135. Upper arm bone.
140. Cuttable bicep muscle.

305. Clavicle bone.
525. Arm flexion pneumatic.
FIG. 1A Arm
505. Connection point for shoulder into torso anchor.
FIG. 2. Leg
210. Breakable hip bone and tendons.
215. Cuttable/puncturable femoral artery.
220. Cuttable/puncturable tendon.
225. Breakable knee.
230. Breakable top of foot.
235. Ankle joint.
240. Shin Bone.
245. Upper leg bone.
250CP. Common upper thigh force sensor.

It is noted that the term "force sensor" as used herein and throughout this disclosure denotes any force sensing device. In one example, the force sensing device may be the FlexiForce™ sensors manufactured by Tekscan, Inc., as here: https://www.tekscan.com/product-group/embedded-sensing/force-sensors, or, for example may include any equivalent device that can measure the force between almost any two surfaces and are durable enough to stand up to most environments. Such force sensing devices can be used in the Trubreak device, for example, to (i) measure relative change in force or applied load, (ii) measure rate of change in force, and (iii) measure force thresholds and trigger appropriate action.

260. Magnet sole of foot for balance on an exemplary Trubreak platform that is also magnetized.
520. Connection point for leg into torso anchor.
FIG. 2A
250CP. Common upper thigh force sensor.
2A50SH. Shin force sensor.
2A50TOF. Top of foot force sensor.
FIG. 2B
530. Leg flexion pneumatic.
FIG. 3
305. Breakable clavicle.
310. Breakable rib.
315. Cuttable/puncturable impact-responsive heart.
320. Cuttable lung.
325. Cuttable kidney.
330. Cuttable liver.
510. Pneumatic for horizontal or vertical bending.
FIG. 4
405. Gougeable eye.
410. Breakable cheek bone.
415CH. Cheek force sensor.
420. Breakable nose.
425, 430JA. Breakable jawbones.
435. Breakable neck joint.
FIG. 4A
4A50TEM. Temple force sensor.
4A50CH. Force sensor cheek.
4A50JA. Force sensor jaw.
4A50CS. Force sensor for carotid sheath. This particular force sensor will signal when enough pressure is applied.
4A50TH. Force sensor for throat. This particular force sensor will signal when enough pressure is applied.
FIG. 5
505. Connection point for shoulder into torso anchor.
510. Pneumatic for horizontal or vertical bending.
520. Connection point for leg into torso anchor.
525. Pneumatic at bicep.
530. Pneumatic at thigh.

(Remaining elements described in FIGS. 1-4.)
Description of FIGS. 6-11

Next described are various details of FIGS. 6-11. The following index numbers provided in FIGS. 6-11 indicate, or refer to the following:

FIG. 6

1 Distal Finger Segment that rotates about the axis of the integral clevis of Item 3 (Proximal Finger Segment), and contains integral cam surfaces. During rotation, the integral cam surfaces contact.

6 (Piston) is driven axially in the bore of Item 3 (Proximal Finger Segment) towards Item 8 (Spring), compressing Item 8 (Spring) and releasing elastic potential energy that drives Item 6 (Piston) in the opposite direction, counteracting the force exerted by rotation of the integral cam surfaces.

2 Bearing that provides the bearing surfaces of the integral clevis of Item 3 (Finger Segment).

3 Proximal Finger Segment with an integral piston bore and an integral clevis perpendicular to the piston bore.

4 Bearing Shaft that serves as the rotational axis of the integral clevis of Item 3 (Proximal Finger Segment)

5 Pin that affixes Item 3 (Proximal Finger Segment) to Item 9 (Adapter).

6 Piston that slides in-line with the integral piston bore of Item 3 (Proximal Finger Segment), driven in one direction by Item 8 (Spring) and driven in the opposite direction by rotation of cam surfaces of Item 1 (Distal Finger Segment).

7 Shaft that acts as a linear guide for Item 6 (Piston).

8 Spring that seats inside Item 3 (Proximal Finger Segment), on Item 9 (Adapter) and exerts linear force on Item 6 (Piston) in one direction as a function of the force exerted on Item 6 (Piston) in the opposite direction by rotation of the integral cam surfaces of Item 1 (Distal Finger Segment).

9 Adapter that attaches Item 10 (Cam) to Item 3 (Proximal Finger Segment), and provides a seat for Item 8 (Spring).

10 Cam that rotates about the axis of the integral clevis of Item 15 (Housing). During rotation, the surfaces of the cam contact Item 17 (Cam Follower) and cause Item 18 (Piston) to be driven axially in the bore of Item 15 (Housing), towards Item 20 (Spring), compressing Item 20 (Spring), and releasing elastic potential energy that drives Item 18 (Piston) in the opposite direction, counteracting the force exerted by rotation of the surfaces of the cam. The cam includes a "raised boss area" at one location along the cam surfaces. As the cam is rotated, the "raised boss area" contacts Item 17 (Cam Follower) and drives Item 18 (Piston) axially down the bore of Item 15 (Housing), causing a large increase in compression of Item 20 (Spring), thereby building and storing elastic potential energy in Item 20 (Spring). As the cam is rotated further, the stored elastic potential energy is released as the surfaces of the "raised boss area" pass over the axis of Item 17 (Cam Follower).

11 Pin that affixes Item 10 (Cam) to Item 9 (Adapter)

FIG. 7

12 Washer that provides thrust bearing surfaces for Item 10 (Cam) to bear upon during rotation.

13 Bearing that provides the bearing surfaces of the integral clevis of Item 15 (Housing).

14 Bearing Shaft that serves as the rotational axis of the integral clevis of Item 15 (Housing).

15 Housing with an integral piston bore and an integral clevis positioned perpendicular to the piston bore.

16 Pin that affixes Item 21 (End Cap) to Item 15 (Housing)

17 Cam Follower that provides a contact bearing surface for the cam surfaces of Item 10 (Cam) to bear upon during rotation, and transmits rotary motion of Item 10 (Cam) into linear motion of Item 18 (Piston).
18 Piston that slides in-line with the integral piston bore of Item 15 (Housing), driven in one direction by Item 20 (Spring) and driven in the opposite direction by rotation of cam surfaces of Item 10 (Cam).
19 Bearing Shaft that serves as the rotational axis of Item 17 (Cam Follower).
20 Spring that seats inside Item 15 (Housing), on Item 21 (End Cap) and exerts linear force on Item 18 (Piston) in one direction as a function of the force exerted on Item 6 (Piston) in the opposite direction by rotation of the cam surfaces of Item 10 (Cam).
21 End Cap that retains Item 18 (Piston) and Item 20 (Spring) inside Item 15 (Housing), and provides a seat for Item 20 (Spring).
FIGS. 8-9
22 Housing that retains Items 1-21 and Items 23-49.
23 Pin that affixes Items 1-21 to Item 22 (Housing).
24 Pin that affixes Items 1-21 to Item 22 (Housing).
25 Screw that affixes Items 1-21 to Item 22 (Housing).
26 Bearing that provides bearings surfaces for Item 27 (Bearing Shaft).
27 Bearing Shaft that provides axis of rotation for Item 30 (Fitting).
28 Screw that affixes Item 29 (Fitting) to Item 30 (Fitting).
29 Fitting that is affixed to Item 30 (Fitting).
30 Fitting that is affixed to Items 27-29 and Items 31-34.
31 Pin that affixes Item 30 (Fitting) to Item 32 (Adapter).
32 Adapter that attaches Item 30 (Fitting) to Item 33 (Distal Thumb Segment).
33 Distal Thumb Segment that is affixed to Item 32 (Adapter).
34 Pin that affixes Item 32 (Adapter) to Item 33 (Distal Thumb Segment).
35 Pin that is installed In Item 37 (Stud) and acts to limit axial rotation of Item 37 (Stud) by contacting and compressing Item 36 (Spring Plug) inside Item 22 (Housing).
36 Damper that is housed in Item 22 (Housing) and provides radial force on Item 35 (Pin) to limit the axial rotation of Item 37 (Stud).
37 Stud that rotates in Item 38 (Clinch Bearing) and provides axial rotation and retention of Items 41, 43, and 45.
38 Clinch Bearing that is affixed to Item 22 (Housing) and provides thrust and radial bearing surfaces for Item 37 (Stud) and Items 41, 43, 45.
39 Pin that affixes Item 37 (Stud) to Items 41, 43, 45.
40 Bearing Shaft that serves as a rotational axis of Items 41, 42, 43, 44, 45, 46.
41 Proximal Finger Segment with an integral piston bore and an integral clevis perpendicular to the piston bore.
42 Distal Finger Segment that rotates about the axis of the integral clevis of Item 41 (Proximal Finger Segment), and contains integral cam surfaces. During rotation, the integral cam surfaces contact Item 47 (Piston), and Item 47 (Piston) is driven axially in the bore of Item 41 (Proximal Finger Segment) towards Item 48 (Spring), compressing Item 48 (Spring) and releasing elastic potential energy that drives Item 47 (Piston) in the opposite direction, counter-acting the force exerted by rotation of the integral cam surfaces.
43 Proximal Finger Segment with an integral piston bore and an integral clevis perpendicular to the piston bore.
44 Distal Finger Segment that rotates about the axis of the integral clevis of Item 43 (Proximal Finger Segment), and contains integral cam surfaces. During rotation, the integral cam surfaces contact Item 47 (Piston), and Item 47 (Piston) is driven axially in the bore of Item 43 (Proximal Finger Segment) towards Item 48 (Spring), compressing Item 48 (Spring) and releasing elastic potential energy that drives Item 47 (Piston) in the opposite direction, counter-acting the force exerted by rotation of the integral cam surfaces.
45 Proximal Finger Segment with an integral piston bore and an integral clevis perpendicular to the piston bore.
46 Distal Finger Segment that rotates about the axis of the integral clevis of Item 45 (Proximal Finger Segment), and contains integral cam surfaces. During rotation, the integral cam surfaces contact Item 47 (Piston), and Item 47 (Piston) is driven axially in the bore of Item 45 (Proximal Finger Segment) towards Item 48 (Spring), compressing Item 48 (Spring) and releasing elastic potential energy that drives Item 47 (Piston) in the opposite direction, counter-acting the force exerted by rotation of the integral cam surfaces.
47 Piston that slides in-line with the integral piston bore of Items 41, 43, 45, driven in one direction by Item 48 (Spring) and driven in the opposite direction by rotation of cam surfaces of Items 42, 44, 46.
48 Spring that seats inside Items 41, 43, 45 and exerts linear force on Item 47 (Piston) in one direction as a function of the force exerted on Item 47 (Piston) in the opposite direction by rotation of the integral cam surfaces of Items 42, 44, 46.
49 Damper that limits motion between Items 29, 30 and Item 22 (Housing).
FIGS. 10-11
50 Bearing that provides rotational axis for Item 53 (Cam Fitting).
51 Screw that attaches Item 53 (Strap Fitting) to Item 22 (Housing).
52 Bearing Shaft that provides axis of rotation for Item 53 (Cam Fitting).
53 Cam that rotates about the axis of the integral clevis of Item 54 (Housing). During rotation, the surfaces of the cam contact Item 59 (Cam Follower) and cause Item 60 (Piston) to be driven axially in the bore of Item 54 (Housing), towards Item 61 (Spring), compressing Item 61 (Spring), and releasing elastic potential energy that drives Item 60 (Piston) in the opposite direction, counter-acting the force exerted by rotation of the surfaces of the cam. The cam includes a "raised boss area" at one location along the cam surfaces. As the cam is rotated, the "raised boss area" contacts Item 59 (Cam Follower) and drives Item 60 (Piston) axially down the bore of Item 54 (Housing), causing a large increase in compression of Item 61 (Spring), thereby building and storing elastic potential energy in Item 61 (Spring). As the cam is rotated further, the stored elastic potential energy is released as the surfaces of the "raised boss area" pass over the axis of Item 59 (Cam Follower).
ROM and Force Requirements: FIGS. 22-40
FIGS. 22-40, next described, provide exemplary details of range of motion and force requirements for exemplary embodiments of an arm and wrist device.
FIG. 22 depicts an exemplary universal plane definition for use in illustrating ranges of motion for the exemplary arm and wrist portions of an exemplary training device according to exemplary embodiments of the present invention.
FIG. 23 is a top view providing exemplary arm segment lengths for each of the upper arm, forearm and hand of exemplary Trubreak device according to exemplary embodiments of the present invention. FIG. 24 illustrates force requirements and torque design values for an exemplary shoulder a-Axis (horizontal adduction and abduction) for the exemplary Trubreak device shown in FIG. 23.

FIG. 25 illustrates force requirements and torque design values for an exemplary shoulder b-Axis (extension and flexion) for the exemplary Trubreak device shown in FIG. 23, FIG. 26 illustrates force requirements and torque design values for an exemplary shoulder c-Axis (rotation) for the exemplary Trubreak device shown in FIG. 23, and FIG. 27 illustrates force requirements and torque design values for the exemplary elbow e-Axis (extension and flexion) of the exemplary device of FIG. 23.

FIG. 28 illustrates force requirement and torque design values for the exemplary forearm f-Axis of the exemplary device of FIG. 23 which is the forearm axis used in pronation and supination, FIG. 29 illustrates force requirements and torque design values for the exemplary v-Axis which is a wrist axis used in extension and flexion, and FIG. 30 illustrates force requirements and torque design values for the exemplary w-Axis of the exemplary device which is a wrist axis used in radial bend and ulnar bend.

FIG. 31 illustrates range of motion for various shoulder, arm and wrist axes (a, b and c, of (of FIGS. 24-26)) in a combined diagram for ease of viewing. FIG. 32 shows exemplary elbow axes c, e and f (of FIGS. 26-28) in a similar combined diagram. FIG. 33 shows wrist axes f, w and v (of FIGS. 28-30) in a similar combined diagram.

FIG. 34 illustrates an exemplary range of motion for the shoulder a-Axis (horizontal adduction and abduction), FIG. 35 illustrates an exemplary range of motion for the shoulder b-Axis (extension and flexion), FIG. 36 illustrates an exemplary range of motion for the shoulder c-Axis (rotation), FIG. 37 illustrates an exemplary range of motion for the elbow e-Axis (extension and flexion), FIG. 38 illustrates an exemplary range of motion for the forearm f-Axis (pronation and supination), and FIG. 39 illustrates an exemplary range of motion for the wrist v-Axis (extension and flexion).

Finally, FIG. 40 illustrates an exemplary range of motion for the wrist w-Axis (radial bend and ulnar bend). Further details of the various views shown in FIGS. 22-40, the co-ordinate system used, the various axes shown, and the Torque Design Values for applied forces from various directions, may all be obtained from a careful reading of FIGS. 22-40, and for ease of illustration, are not repeated.

Related to this set of figures is also FIG. 54, which illustrates exemplary bearing specifications for each of the bearings to be used in axes W, E, A, C, F, V and B (as defined in FIG. 54 and corresponding to those shown in FIGS. 24-30) of an exemplary Trubreak dummy according to an exemplary embodiment of the present invention.

Detail of Exemplary Trubreak Eye: FIGS. 41-47

FIGS. 41-47 illustrate an exemplary gougeable/injurable eye according to exemplary embodiments of the present invention. FIG. 41 depicts exploded views of an exemplary eyeball assembly, and details thereof according to an exemplary embodiment of the present invention. There is shown a contact lens, a synthetic eyeball provided with synthetic blood, a housing for the synthetic eyeball, and an insert into the housing. FIG. 42 depicts the exemplary eyeball assembly of FIG. 41 as fitted into an exemplary socket, using a set of serrations which compression upon insertion but then expand for a locking fit. FIG. 43 depicts a detailed exploded view of the exemplary eyeball assembly of FIG. 41 showing lens, eyeball, housing and insert along a common axis. FIG. 44 depicts a close up front view of the exemplary eye surface (a contact lens) of the exemplary eyeball assembly of FIG. 41. FIG. 45 depicts the elements of the eyeball assembly aligned on a central axis, FIG. 46 depicts a magnified version of the RS view of the eyeball assembly of FIG. 41, and FIG. 47 depicts a magnified version of the ISO view of the eyeball assembly of FIG. 41.

Full View Interaction Regions

FIG. 48 depicts a full view of an exemplary Trubreak dummy according to an exemplary embodiment of the present invention, showing various user interactive regions and the attacks or techniques that may be performed at each of them. These include the following, beginning at the upper left and proceeding counterclockwise: strike nose/mouth, strike Adam's Apple, cut trachea, strike sternum, cut aorta, cut femoral artery, strike groin, cut iliac artery, break rib, cut heart, cut carotid artery/jugular vein, dislocate jaw, break cheekbone, and strike temple. FIG. 49 depicts a close-up view of the head, torso and groin of the exemplary Trubreak dummy of FIG. 48. FIG. 50 depicts the exemplary Trubreak dummy of FIG. 48 as mounted on a vertical pole according to an exemplary embodiment of the present invention. The Trubreak dummy is shown mostly in phantom, and the details of the mounting are shown in solid lines. With reference thereto are seen the head, left arm, right arm and left and right legs of the Trubreak dummy. Also seen are the Neck barrel Spring and Torso Bracket of the mounting apparatus. The latter attaches to the right arm and left arm attachment points of the dummy. Similarly, there is shown the Torso Barrel Spring, and its attachment to the Hip Bracket, which in turn attaches to the right and left attachment points of the Trubreak dummy. Thus, using the exemplary mounting apparatus, the dummy may be held in a "standing" position, which allows for direct frontal attacks. FIG. 51 depicts a close-up view of the head of the exemplary Trubreak dummy of FIG. 48, with the detailed user interactive regions form FIG. 48.

Attachment Mechanism Figures

FIG. 52 depicts a punching bag attachment device for an exemplary Trubreak dummy according to an exemplary embodiment of the present invention. FIG. 53 depicts a vertical pole with spring on upper portion and horizontal attachment mechanism on top, for mounting vertically an exemplary Trubreak dummy according to an exemplary embodiment of the present invention as shown in FIG. 50. The springs in FIGS. 50 and 53 allow the dummy to bend at both the head and the back. (FIG. 54 was previously described).

FIG. 55 depicts an alternate punching bag attachment device for an exemplary Trubreak dummy according to an exemplary embodiment of the present invention. It may comprise a stand-alone harness, as shown, with a cam type of belt attached to, for example, woven metal. It may include a cylinder, such as of 18-24 inches in diameter, for example. The cylinder may have numerous attachment adapters, so as to allow any TB system (full man size, arm alone, head neck and torso, etc., etc.) to be connected to it. As shown in FIG. 55, one side of the harness has a full TB dummy attached, the other side just an arm.

Trubreak Compatible Knife Technology

FIGS. 56A through C depict an exemplary "Trubreak compatible" knife-like device that may be used to simulate cutting and puncturing according to an exemplary embodiment of the present invention. As shown in the figures, an exemplary knife may have a magnetic tip, an RFID enabled blade, adjustable spring tensions, and a plate sensor for puncturing. It may be bendable. The blade may be compressed and it also may move on its axis. It may be used, for example, for practicing in a real way slashing and puncturing motions. The RFID can be arranged to read impact contact points on the dummy, and, for example, the magnetic tip can activate sensors for targeted areas.

In exemplary embodiments of the present invention, a Trubreak knife system may be designed to be used with an exemplary TB dummy when training for edged weapon contact. The knife may, for example, be approximately 8 inches long with a 3.5 inch blade. True to form it can, for example, weigh about the same as an average fixed blade knife. Electronics inside the TB knife may, for example, activate sensors inside the TB dummy based on contact, force and target area. Using any combination of magnet, RFID, pressure sensor relays, force sensors, or any other feedback technology, the knife can be calibrated to the user's TB dummy, for example. As the user connects the knife to targeted contact pings on the TB system, feedback to the user can be of the same type as the breakable feedback portions of the dummy. The user, can, for example, be alerted of a proper strike with the weapon by signal or digital feedback. The user will know that they used the proper force and power to do the desired weapon result.

Additionally, the knife will be fitted with springs or washers which will allow the blade of the knife to move based on the direction of the slash or puncture depth. Not unlike prop knives that create the illusion of penetration when thruster into the target, the TB knife will add the same blade movement response as well as with slashing. The blade will bend and flex so there is no damage to the TB dummy but give the feeling of cutting or penetration to the user. The blade will not be sharp enough to cut into the TB skin but it will be edged like a real knife. Custom blade/handle combinations can be ordered to satisfy a particular training necessity upon request and the knife mechanics can be altered to fit the users training parameters.

Various other "simulated" weapons can also be created that are recognized electronically by a Trubreak system. These can include guns, pipes, wood poles or 2×4's, nun-chuku, blackjacks, etc. By fitting such devices with RFID technology and contact sensors, when appropriate, a trainee may get used to using such weapons to better understand how they operate and thereby be able to defend against them. Such training removes the fear of facing such varied weapons, which, unfortunately, a trainee, especially law enforcement personnel, may encounter in various unseemly, but very real, situations.

Exemplary Renderings Figures

To better illustrate how the actual embodiments according to the present invention would look and operate, FIGS. 57-85 are presented, which are 3-D renderings of some of the structures illustrated in 2-D in previous figures, but in a way that actually brings them to life, to the extent possible. While we describe these figures, the best way to gain the information they disclose is to study them in connection with the earlier drawings and their descriptions, and then visualize the various aspects being depicted.

FIG. 57 depicts a rendering of an exemplary finger break assembly according to an exemplary embodiment of the present invention. FIG. 58 depicts a rendering of the finger break assembly of FIG. 57 mounted on an exemplary hand of an exemplary Trubreak dummy according to an exemplary embodiment of the present invention, illustrating the maximum finger-hyperextension. FIG. 59 illustrates the point at which the finger break assembly of FIG. 58 will break according to exemplary embodiments of the present invention—this is known as the "finger hyperextension break".

FIG. 60 illustrates an exemplary wrist break assembly according to an exemplary embodiment of the present invention. FIG. 61 illustrates the exemplary wrist break assembly of FIG. 60 as mounted on an exemplary arm, said arm having a rotational enabling reciprocating coupling assembly according to an exemplary embodiment of the present invention. FIG. 62 illustrates the wrist break assembly structure of FIG. 61 at the breaking point of the wrist hyperextension (wrist pulled too far back) according to exemplary embodiments of the present invention. FIG. 63 illustrates a hyperflexion of the exemplary wrist break assembly according to exemplary embodiments of the present invention. FIG. 64 illustrates the wrist hyperflexion of FIG. 63 now at a breaking point, known as the "wrist hyperflexion break" according to exemplary embodiments of the present invention.

FIG. 65 illustrates details of the spring loaded reciprocating coupling assembly according to exemplary embodiments of the present invention, which is used for both shoulder rotation as well as wrist rotation, and FIG. 66 illustrates wrist rotation using the reciprocating coupling assembly of FIG. 65 in various clockwise (form the point of view of the dummy) rotations (90 and 180 degrees) of an exemplary wrist of a Trubreak dummy according to exemplary embodiments of the present invention.

FIG. 67 illustrates (i) maximum hyperflexion of an exemplary elbow, (ii) maximum hyperextension of an exemplary elbow; and (iii) the elbow breaking point, i.e., beyond such maximum hyper extension, of an exemplary arm according to exemplary embodiments of the present invention. FIG. 68A illustrates (i) maximum shoulder rotation (left panels), and (ii) shoulder breaking point (right panels), from both counterclockwise and clockwise rotation of the shoulder according to exemplary embodiments of the present invention.

FIGS. 68B and 68C are photographs of an actual Trubreak arm and hand portion. One can see inventor David Ordini demonstrating examples of these portions at: https://www.youtube.com/watch?v=ISwweH0ZCZM, for example.

FIG. 69 illustrates attachment of an exemplary Trubreak arm (by itself), such as shown in FIG. 68, to a canvas heavy punching bag or martial arts training bag, via adapter and harness, according to exemplary embodiments of the present invention.

FIG. 70 illustrates an exemplary leg of an exemplary Trubreak dummy according to exemplary embodiments of the present invention, showing (i) reciprocating coupling assembly, (ii) knee break assembly, (iii) knee hinge assembly, and (iv) reciprocating coupling assembly with slip clutch (ankle break).

FIG. 71 illustrates an exemplary head according to exemplary embodiments of the present invention, including (i) skull frame; (ii) temple strike pad and force sensor; (iii) gougable eyeball assembly; (iv) jaw dislocation assembly; (v) jaw sub-assembly; (vi) barrel spring/neck break assembly; and (vii) the fact that the head may be rotated in either direction until a break mechanism is engaged, where sufficient additional force is required to activate a break mechanism to cause a simulated broken neck. FIG. 72 depicts the head of FIG. 71, showing detail of a crushable Adam's apple assembly according to exemplary embodiments of the present invention.

FIG. 73 depicts the head of FIGS. 71 and 72 with the addition of a flexible/cuttable throat assembly according to exemplary embodiments of the present invention with force sensors. FIG. 74 depicts a detail of the temple strike pad shown in FIG. 71 as well as a mechanism for simulating a cheek bone break according to exemplary embodiments of the present invention. FIG. 75 illustrates a mechanism for simulating a jawbone break according to exemplary embodiments of the present invention.

Force Sensors Shown as Placed on Exemplary Dummy

FIG. 76 illustrates various force sensors as placed on an exemplary Trubreak dummy according to exemplary embodiments of the present invention. The dummy is further provided with an outer simulated skin covering. The force sensors including a nose sensor, a temple sensor, a throat sensor, a carotid artery sensor; a sternum sensor, a ribcage sensor, a groin sensor and a peroneal nerve sensor; FIG. 77 illustrates details of the nose, temple, throat and carotid artery force sensors on the upper panel, as well as details of the sternum and ribcage sensors on the lower panel, according to exemplary embodiments of the present invention.

FIG. 78 depicts a wire terminal and data recorder interface which may be, for example, located somewhere in the chest cavity of an exemplary Trubreak dummy, and which may be connected to, or have wires running to the various force sensors depicted in FIG. 76, all according to exemplary embodiments of the present invention. This allows central collection of all force sensor data, and storage and reporting of same to a central server, for various analytical and system to user feedback, recommendation and customized training functionality, as described more fully below.

Synthetic Blood Vessels

Rounding out the description of an exemplary Trubreak dummy, FIGS. 79-84 provide detail on the various synthetic blood vessels and organs that a trainee can attack, sever, damage or break, as the case may be, using the Trubreak technology.

FIG. 79 illustrates exemplary synthetic blood vessels that may be used in an exemplary Trubreak dummy according to exemplary embodiments of the present invention. The synthetic blood vessels may contain separate compartments to prevent total loss of fluid due to a single puncture, may be made of a flexible tubing filled with synthetic blood fluid, and may be provided with a quick-connect fitting at both ends for easy installation and replacement. Thus, FIG. 80 illustrates two synthetic blood vessels and a puncturable trachea area according to exemplary embodiments of the present invention; the synthetic blood vessels are to simulate the carotid arteries running to the head. FIG. 81 illustrates essentially a full body Trubreak dummy with various synthetic blood vessels at (i) the carotid arteries, (ii) the pulmonary arteries, (iii) brachial arteries in the upper arm; (iv) renal arteries; (v) an aorta; (vi) iliac arteries; and (vii) femoral arteries.

Flexible Cuttable Synthetic Organ

FIG. 82 illustrates the variety of flexible, cutable synthetic organs which may be provided in exemplary Trubreak dummy according to exemplary embodiments of the present invention, including (i) a synthetic heart; (ii) lungs; (iii) spleen; (iv) liver; (v) stomach, and (vi) kidneys. FIG. 83 shows a front and back view of the torso and lower back with a number of synthetic organs provided, including a (i) heart; (ii) lungs, (iii) stomach, (iv) liver, (v) spleen; and (vi) kidneys in an anatomically correct position;

Force Indicating Sensor Organs

FIG. 84 illustrates an exemplary set of organs provided with sensors to indicate force according to exemplary embodiments of the present invention, including (i) heart, (ii) liver, (iii) stomach; (iv) kidneys, (v) spleen, (vi) lungs and (viii) wire terminal/data recorder interface to capture the sensor recordings when these synthetic organs are hit or subject to trauma.

Actuation, Motion-Recognition, Data Capture

FIG. 85 illustrates a number of actuation devices which can move a Trubreak dummy "by wire" according to exemplary embodiments of the present invention, including actuators at each of the (i) neck, (ii) shoulder, (iii) elbow, (iv) wrist, (v) spine, (vi) hip, (vii) leg, (viii) knee and (ix) ankle.

The design intent here is, for example, to provide a semi-mobile mounting fixture and an integrated "move-by-wire" system of mechanical linkages, mechanical actuators, electronic controls and software which can, for example, provide the following features:

Motion-Recognition and Visual-Feedback-Actuation

In some embodiments, the device can, for example, include a light camera or similar component which allows the device to recognize a user and their physical movements visually and record data electronically. The data can be used by the software to command movements of the linkages of the device by electronic controls in response to visual input(s) by the user. For example, a user may approach a full-body version of the device attached to a stand, the device will command the user to perform physical movements to gather data including physical stature, visual recognition and tagging of the hands and feet of the user, and may record a digital video of the user's performance. This gathered data will then be transferred to custom software which will use the data to command actuators which will drive the linkages of the device, either directly or indirectly, based on live visual inputs of the user. A typical scenario is as follows: a user attacks the device, the device gathers the visual data, transfers to the program, the program commands actuators which move the mechanical linkages in a way that simulates actions that may include dodging a punch, throwing a counterpunch, feinting and blocking.

Force and Pressure Sensors and Performance-Data-Collection

In some embodiments, an exemplary device can record a chronological record of a user's performance during a typical session by using data collected by various sensors, as noted above. Such sensors may, for example, be placed at specific locations on the device and be arranged to record force and pressure data. The data can be transferred to the software, which will use the data to complete a statistical report of the user's performance during the session, locally, but also can, as described below, upload all data to a central server for further remote analysis and feedback by a Trubreak approved martial arts master.

Exemplary Breakable/Cuttable/Puncturable Elements; Feedback to User

In various exemplary embodiments according to the present invention, TB's feedback can be measured by an actual breaking of various strike points on the dummy, or, for example, by alerting the user with a pre-programmed or default signal to include, but not be limited to, blinking light, sound stimulus or computer prompt when the appropriate sensor is struck at the appropriate strength.

Pre-determined targets on the TB dummy may be equipped with these signal sensors. There may be breakable joints, bones, as well as soft tissue targets preset to respond to an average man's sensitivity to applied strike forces or joint manipulations based on factual medical research to achieve the damage desired. The user can then reset the "damaged physical structure" or response sensor to its undamaged position or resting status to be able to engage the dummy repetitiously.

The skin of TB may be, for example, made of self-healing latex that can be engaged repeatedly by a knife or cutting tool without permanent damage. The user only needs to rub the cut area quickly and it actually reforms. There may also be located on or in the TB dummy realistic layers of fat and muscle to accurate human specifications. There may also be, for example, a simulated nervous system, vascular system, and organs that all are actual weight, size, and dimensions of an average human male adult, and are all self-healing. When placed in the TB dummy at their correct anatomical locations the knife wielder, in conjunction with the TB dummy, may be able to receive actual damage feedback from the above human systems when they are damaged by the knife attack.

Organs in the TB dummy may include, for example, heart, brain, lungs, eyes, testis, liver and kidneys. There may be femoral arteries, jugular veins, aortic arteries as well as nerve bundles, like the brachioplexis. The organs and veins as well as arteries and nerve bundles could be filled with a fluid for easier visual assistance to determine if the knife attack did its desired damage . . . in effect there could be blood.

In addition, replaceable pieces of all of the above body parts could be inserted into its appropriate cavity if the damage from an attack is too severe for the skin or organ to return to their fully healed status. There may be access points all over the TB body to allow the user to get to damaged internals to inspect or replace damaged parts.

The bone structure of TB may be a combination of any determined material, but when the full TB dummy is in its complete state, it can, for example, have the same size, weight, dimension, and height of an average full-grown man. However, customizable TB dummies and or appendages may be available upon request, this may include, men, women and children of various sizes, and body types. The breakable bones, joints, ligaments and tendons may include, but not be limited to, orbital floor, cheekbone, TMJ, points of the skull, jaw, nose, throat, spine, clavicle, various ribs, coccyx, hip, knee, top of foot, ankle, large toe, shoulder, elbow, wrist, thumb and fingers.

Cuttable, pucturable, or impact registrable damageable areas may include, for example, eyes, temple, throat, wrist and elbow ligaments, Achilles tendon, femoral arteries, testes, heart, kidneys, jugular and carotid, lungs, liver, and brachioplexis. In some embodiments, there may be overlapping cuttable or puncturable areas where sensor might be located as well. These impact sensors may be strategically located so they will not be damaged in knife drill attacks.

Strike force sensors may be located including, but not limited to, the temple, floating rib, testis, jaw, top of foot, points on the spine, and throat. Using force sensors that will be preset to an average man's damage force tolerance, a signal may be triggered when impacted at or above the appropriate force to acknowledge the desired damage occurs. Each force sensor can be adjusted to a given force commensurate with knockouts, life-threatening injuries or immediate fatal trauma which can be found in our provided manual. Again these force ranges will be accurate to medical information for an average man to assist in the most realistic force training simulation.

The muscular resistance of TB is necessary to give the user a realistic need to apply a force arc to specific TB appendages to achieve damage. This can be accomplished using accurate medical information for an average man's muscular strength to resist hyperextension. These resistance "muscles" may be located in, for example, biceps, forearm, shoulder, neck, quadriceps, hip, thigh, abdomen, calf, and triceps.

Exemplary embodiments of TB may have pneumatic, electro pneumatic or contractile polymer systems attached inside the dummy or in the TB base structure creating the ability for TB to perform predetermined or programmable movements based on computer-generated simulations or reaction to trauma to sensors. For example, if the TB testicular sensor was struck appropriately, the pneumatics in the torso would contract making the TB dummy fold over at a specified angle at the waist, in effect bending over in the same manner as a human would if kicked in the discussed target.

It is noted that TB can be separated into four stand-alone parts: Arm, leg, torso, head. These parts, if connected, would create the full TB dummy. The connectable spine resides in the torso and allows the user to lock in whatever appendage they desire to the torso. The user can purchase separates to create full TB dummy or but TB all at once.

In exemplary embodiments of the present invention, each appendage can be used as a stand-alone training apparatus. The TB arm includes the shoulder, bicep, forearm, wrist, and fingers. At the shoulder may be the connecting point that can be inserted into the receiving contact point in the TB spine. The arm may weigh the same as an average man's arm and be equipped with the mobility for bending and rotating. The bicep may have resistance muscle as well as the forearm and shoulder. The range of motion along the three axis's may be as close to an average human's as possible allowing hyperextension to occur based on the direction one torques the desired joint. For example, if a TB dummy arm was given to a ground fight submission practitioner and he decided to perform a straight arm bar, when he applied the appropriate force at the correct angle to the TB elbow, it would "hyperextend" to a point of snapping the same way a natural human anatomical hyper-extending result would occur. The user would hear the mechanical break snap as well as feel and see a "broken" elbow joint position. The user then, if desired, could reset the joint back to proper anatomical resting position to continue the repetitive training needed to be able to perform this break technique instinctively. As the user pulls the arm in the direction needed to achieve this result of breaking, he would have to allow for the muscle resistance mechanism in the TB bicep. This resistance mimics the natural human response to defend against the hyperextension damage by flexing the bicep muscle to try to get the wrist as close to the shoulder as possible. The combination of the feel of natural muscle resistance compounded with an accurate necessity of angle and force to achieve a break may give a user the truest simulation known to man without causing damage to a living partner.

As noted, in some embodiments, the TB arm may have breakable fingers. In some exemplary embodiments, breakability may be supported only on the index and pinky fingers, and in other embodiments, other, or even all, fingers maybe breakable. Inasmuch as the wrist is bent by applying pressure on the chosen side, the index finger may slightly point (true to life). As stated, all TB appendages can be fixed to the TB spine/torso, or attached to a stand-alone base or harness that could hang on a boxing-type heavy bag, teardrop bag or any upright weighted column-shaped object. The user could attach the shoulder lock mechanism to a commonly found base plate or cylindrical or circular object that the TB Company could recommend or sell separately.

As children, many persons have been put into a chicken wing by an older brother and made to scream "uncle." The pain created by that arm lock originates at the ligaments and tendons connecting the shoulder to the torso. These connective ligaments and tendons, when put in this unnatural position, are stretched to a point where they actually separate from the bones and muscles at this area, ending in a painful and debilitating result. In some exemplary embodiments, a TB arm may have mock ligaments and tendons for the shoulder and other joints such that when the correct angle, force and rotation are applied, they may tear from the corresponding anatomical connections. As always, damage pressures, angles, rotations and forces, will be based upon medically supported average values. In the Truebreak dummy, however, unlike humans, these ligaments and tendons can be essentially infinitely reset for repetition. There can be, for example, a mock nerve bundle located at the armpit. LPs for strikes and cuttable connective tissue for knife practitioners can be provided as well.

The TB leg, besides being realistic as to weight and dimension, can also mirror the TB arm (as described above) in functionality. Thus, just as what the TB shoulder is for the arm, the TB hip can be for the leg, the knee for the elbow, the ankle for the wrist, and the toes can function in similar fashion as do the fingers. Of course, the breaking pressures and rotational tear damages for the leg key areas would have to be changed, as necessary, to keep to realistic true human averages. The TB leg can be attached to the same sort of base or harness as described above for the arm, to be used as a stand-alone training apparatus.

The torso and head combination may, for example, itself comprise an alternate stand-alone TB product. Alternatively, exemplary embodiments marketed to the public may include one or more elements in various combinations, such as, for example, (i) head only, (ii) torso only, (iii) head and torso, with additional arm(s) and leg(s), etc., as may be desired. In some embodiments, the TB head may be provided with gougeable eyes which have the same density, size, dimension as well as viscosity as actual human eyes. When gouged, they can react physically the same way human eyes will. Thus, if enough force is applied they could actually burst. These "burstable" eyes would be a consumable (hard to reset an eye burst) and can be replaced by purchasing through a TB manufacturer or resellers. Additionally located in the head there may be breakable and resettable bones for the jaw, cheek, nose and various points on the skull. In addition, positions in the jaw and temple may have sensors to sense and signal knockout impact or fatal force.

Choke

In some embodiments the throat area in a TB dummy's head may have sensors to register specific choke forces so as to simulate air and blood vessel choke techniques. In such embodiments, a user must apply the chosen choke at proper angle and force to create a clean technique and may be signaled by TB only at that point of perfection. For the blood choke sensor to signal, the user must apply pressure to both carotid arteries properly to activate the signal. As a separate function, the TB neck can be manipulated on a rotational axis to assist in neck breaking techniques for lethal force training. At the proper force and degree of rotation, the TB neck may move past its preset range of motion and "snap" simulating fatal damage. The throat, specifically trachea, may have a breakable insert for fatal crush damage training. Again, all of the breakable parts in the head and neck are resettable and are medical human averages.

In exemplary embodiments of the present invention, a demonstration of exemplary choke technology in the TB system can be viewed in the video entitled "TB Choke Video" provided on the inventors' YouTube channel (David Ordini) at https://www.youtube.com/watch?v=JLb7Yydaeu0. In such embodiments, a circuit is provided that sends a current to a buzzer when a proper choke technique is performed. Initially open, when the circuit is closed the flowing electrical current (supplied, for example, by a battery) energizes a buzzer or other audible signal. The force needed to close the circuit can be made to be greater or smaller by adjusting the space between the conducting contacts. The greater the distance the greater effort needed to close the circuit. Additionally, the physical resistance supplied by the apparatus to which the circuit is attached can increase or decrease the necessary user effort as well. For example, if the circuit is embodied using a weaker set of sheet metal pieces that are separated, the user can easily close the circuit. If the circuit is connected to two ½ inch pieces of rebar biased or held open by a significant spring, the amount of compressive force would have to be much greater to bring the pieces together and close the circuit. This change in choke compression difficulty can simulate an individual with a more robust neck circumference if the user wants a greater training challenge.

As noted, in exemplary embodiments of the present invention, the clavicle in the TB torso, as well as the floating ribs, may also be breakable and resettable. The torso may have, positioned in the correct anatomical location, including but not limited to, a heart, lungs, liver, kidneys and spinal cord. All of these organs are made of (damageable and healable) material discussed before. The kidneys, heart, and liver may have sensors for impact damage as well. All of these organs, as well as the spinal cord, are replaceable through purchases with TB. In some exemplary embodiments, the torso and head can be placed on its own base plate to be used as a stand-alone training apparatus.

When fully assembled, in one embodiment, an exemplary TB dummy can, for example, stand about 5'10" tall and weigh about 180 pounds. The TB dummy can, for example, connect to any standard free-standing heavy bag base which can accommodate a 200-pound bag. In some embodiments, a customized TB base can be made be available to users. It would allow for a more secure TB stance allowing it to lock into specifically designed outlet stance variations. TB, in this custom base, would hang from the head and connect at the feet.

In exemplary embodiments, all of the TB appendages may have the ability to be set at specific angles to create rigidity. These positions may allow the user to practice targeting on an opponent in any stance imaginable; in other words, TB can be posed like a mannequin. TB may have the ability using, for example, digital input, motion recognition software, RFID or any other device to react to programmed or preprogrammed stimulus. Additionally, TB may be programmed to do specific movements at specific points in time, based on programming, to appear to be "alive." An example of this behavior would be a user program designed to make TB raise his hands or leg at a specific time interval in a specific time in a fight. When the program is initiated for a programmed 8-second fight, the user could program the TB leg to rise at a 90-degree angle at 1½ seconds into the fight, at 4 seconds into the fight, TB could deliver a right straight punch and at 6 seconds TB could cover its head with its hands. The user could also initiate a totally random movement program for a completely unpredictable fight training experience.

The TB base motion sensor may, for example, recognize impending strikes from the user and manipulate the TB dummy to respond with a set defense movement. These movements could include, for example, bobbing, weaving, gunting, head movement, kick defenses, etc. When the full TB dummy is attached to its corresponding TB base, it may literally have the ability to think, act and react. The strength and ferocity at which the TB dummy moves may, in some embodiments, be limited to the engines and driving system in the base or the dummy's pneumatics. Additionally, for example, a second individual could directly control the TB dummy, for example, via a computer controller located on the TB base. Internet connections could allow a TB user in one location to control another TB unit in another location, allowing two users to virtually spar over the internet.

Exemplary Use Cases and Further Details

Instructor Feedback and Supervision

In exemplary embodiments of the present invention, an instructor, using a given training platform's eye or webcam, or an Internet connection synchronized to a trainee's Trubreak system, can connect to feedback sensors in the trainee's dummy and watch the trainee's technique. Thus, a trainer can look via webcam at the same actions that a user may record on the device, and thus may remotely look at a user's positioning and actions.

Because on exemplary platforms a device may be connected from the head via a chain, much like a heavy bag, a webcam may, for example, be placed above the dummy, facing down, providing an angled view of the front and top portion of the user, who would be standing there in a fighting position or stance. In such case the sensors in the dummy's body may send their captured data and signals via internet connection, and thus the data would come up on a display for the trainer to see in his home or dojo. For example, some icon or avatar for the dummy and the user can be used, and as the user is hitting, kicking or doing whatever technique that they are doing, sensor registers may be updated in real time on the trainer's screen, and the trainer can thus see how hard the student has hit the dummy for example. Due to the camera and the various sensor readouts, the trainer may remotely look at the user's body positioning, and may make adjustments by voice command over the Internet, as in, for example, a two way communications application. Thus, in real time the trainer may say "I want you to do this body positioning, and I want you to hit exactly the same way." The student may then see that with better technique and better positioning they are able to achieve a harder hit or faster hit. This interactive learning can only be done if the trainer can see the user, and more importantly, that the trainer is able to get instantaneous feedback as to speed or ferocity or pounds per square inch of force, etc. This may be implemented using force sensors, such as noted, for example, FlexiForce made by Tekscan, or any functionally equivalent sensors, as shown in FIGS. 76-77, for example.

Exemplary Attack with Weapon (Real or TB Compliant)

Another exemplary application, with reference to FIG. 3, is if a user is going to attack the Trubreak dummy with an edged weapon or puncturing weapon. Assume this is a knife, and further assume that the attacker is going to train to cut the throat of the Trubreak dummy, puncturing the lung and then manipulating behind the Trubreak dummy and stabbing and puncturing into a kidney. For example, Paramount, or the like, can provide organs for this combination as well as for the torso. Thus, the user approaches the Trubreak dummy with a knife and the Trubreak dummy is either suspended from the Trubreak platform, which may be webcam enabled. Or, for example, the Trubreak dummy could be suspended, be connected via a connecting rod to a stand, or be attached to a wall. The user can approach the Trubreak dummy, slash at the skin of the neck and two potentiometers therein. The neck may have cuttable veins and arteries so the user slashes towards the neck as shown, for example, at 4A, 50CS in FIG. 4A. Next the user may, for example, do a forward thrust, trying to move that knife or that puncturing weapon deep into the dummy. He may withdraw that and the 320, which is the puncturable lung, may be filled with a fluid now or a gel that obviously is not going to interfere with any of the electronics, but as he pulls it out the user is going to recognize that either there is a gel on his edged weapon or there is a gel leaking out of the hole that he just made from his puncturing assault. The user now manipulates so that he is now behind the Trubreak dummy and stabs into the kidney area, as shown at number 325 in FIG. 3. Again, that particular organ, the kidney, may leak a fluid that does not interfere with electronics or anything inside the Trubreak dummy. The user may then step away. The lesson or the movement pattern or kata has ended and now he can inspect the damage he has hopefully inflicted. The cuttable veins and/or arteries, inside the neck, whether he was able to puncture through the dummy's simulated skin; he can see if he was able to get deep enough in puncturing through the skin and the layers of fat and muscle (dragon skin has these as well). Additionally, the dummy may be provided with a simulated bone structure, which can be more or less a rib cage, allowing the individual to have some difficulty puncturing, then he pulls it out and he can inspect the kidneys. Those organs can, for example, all be provided at the same depth and can have the same thickness and the same weight as an average human being, for example.

The knife example may easily be extended to guns, blackjacks, nunchuku, pipes, boards and the like, all as may be fitted with RFID and contact sensor technology, as described above.

Dummy Response Functionality

Putting an arm bar on and applying pressure to the elbow joint, to hyperextension, the response to the Trubreak dummy is going to be that that joint makes a loud crack, some sort of sound but that is actually going to be the mechanics separating and breaking. The user now visually is able to see that the arm no longer looks like an extended arm but actually looks like a hyperextended arm, which I can't do but it would basically be if I were to invert this and snap it. So it would look like an inverted arm that is no longer flat, palm up, it's now the palm hangs lower than 180 degrees. And as well as the actual physical mechanics breaking, when the user pulls back the skin to reset the cam or the apparatus that shows the break, he is going to be able to inspect it and see that he actually was able to break it past its normal point of movement and resetting it to have it come back into a regular position. If one were to kick a more advanced Trubreak dummy, one that actually moves, if one were to fire a response and do a groin kick, the groin kick is going to create a transmission, some sort of communication to one of the pneumatics in the abdomen area of the Trubreak dummy forcing it to bend forward, which is the natural movement of a human being when they are kicked in the groin. Usually, people instinctively cover up and bend forward. In the Trubreak case, the dummy actually bends forward, which would obviate many of the techniques out there, inasmuch as a lot of the times the techniques commonly used are a groin kick and two punches to the face. In the real world that does not happen, as a groin injured opponent will bend over, and his face will not be easily reached to even punch. Actually, when you groin kick, the opponent's head bends over and if you try to implement the convention "groin kick and two head punches" combination you actually end up punching them to top of the head which is actually going to break your hands. By animating the Trubreak dummy to move and respond to attacks in realistic human ways, this creates a much truer representation of what actually happens.

Trubreak technology actually is the equivalent of a humanoid sparring partner that may be programmed in various ways by martial arts experts to put up a *real* fight.

In exemplary embodiments of the present invention, if one were to punch the Trubreak dummy in the jaw, the mandible joints in the Trubreak dummy, which are depicted in FIG. 3 at element 425, will actually make the jaw slide off of its track when it's hit with enough force, which is going to show that sort of break. One may not get the same sort of sound as a real broken jaw, but one can definitely inspect the effect on the simulated jaw, recognize the damage and learn. Another way Trubreak offers realistic feedback is, for example, if a user jumps on and does a throat choke, i.e., gets behind or in front of it and actually applies choking pressure, the Trubreak dummy releases some sort of sound, which is going to alert the user that they have in fact either (i) collapsed both arteries in the carotid sheath—which would cause brain asphyxiation of blood—or (ii) if a collapse to the throat enough to allow or to not allow the user to breathe anymore getting oxygen to the system. The dummy will make some sort of noise to signal the user that he or she has done the proper technique. When the Trubreak dummy is defending itself (as described below, either via attack move recognition and preprogrammed response, or via teleoperational control by a remote teacher) it may move based on the contraction and expansion of either pneumatics or servos, which allows it to either dodge punches or to raise its leg and to defend against kicks, to bend at the waist, or to retreat and get away as well. Thus we could actually have the Trubreak dummy—via a rapid expansion of pneumatic—actually throw punches towards the user as well as throw kicks towards the user so you have a virtual fighting training partner without the risk of doing injury to it. As a result, a user can go as hard as he or she wants in attacking the dummy.

Simulate Larger Opponent

In exemplary embodiments of the present invention, a Trubreak dummy can come in different weights and sizes as may be desired by manipulating component material and scale. It is noted that if a teacher wishes to see the student deal with unknown, on the spot, he may administer to the student a test or assigned technique on a completely different type of body that they are used to interacting with. This can be very useful when preparing soldiers to fight against a foreign nation or people of different build, attitudes and fighting techniques.

Kata—Defined Forms

Another way that an exemplary Trubreak dummy may be used is during katas. Krav Maga, for example, does not necessarily use katas. However, Karate does to a large extent. When a Karate-ka (Karate practitioner) is doing his or her katas and its movements, many times boards are added so that the student has to do, for example, a three-move jump and kick, breaking a board for example in the leg, at the rib height and then do a spinning kick to hit the face. Boards, even if perfectly placed, are not realistic humans. One simply cannot practice such a kata on one or more real human beings, because one would injure them if the technique is done even poorly, simply because of the amount of power that one can generate by doing some of these moves. However, one set up a Trubreak dummy, or multiple dummies, and in this particular application—instead of having the Trubreak dummy in its platform suspended from the head and then magnetized to the floor, for example—the Trubreak dummy can be configured to stand in various positions. Thus, for example, the Trubreak dummy can be provided with holes in the back where one may attach a pipe, for example, from 18 inches to 2 feet long, at various points on a Trubreak body, such that one may insert that locking pipe, and then attach it to a wall or to a heavy bag in a way that allows the Trubreak dummy to stand in various positions and not have the platform get in the way. For example, the Trubreak dummy may be provided with a suspension pipe that is attached to a wall (e.g., via a wall screw attachment) and to the Trubreak dummy's back so as to have both of its arms available.

In this particular instance why it would be practical in a kata, is, assuming one has the entire Trubreak dummy suspended off of the wall a couple feet, having the above described pipe or locking mechanism attached to the back of the Trubreak dummy so that he is standing two or three feet away from a wall, and suspended using that pipe coming out of the wall into the back of the Trubreak dummy. The martial arts student, doing that same three or four movement combination or kata, could kick to the Trubreak leg, kick to the Trubreak rib, punch to its face and then kick to its face. Now this offers actual damage feedback coming back. If they kick hard enough, one may see actual breakage on the Trubreak dummy, where the arms snap or the knee snaps if they do the kick properly, or, for a head kick the optical bone inside the Trubreak face breaks.

In alternate Trubreak embodiments, provided with one or more potentiometers, an instructor can actually get computerized feedback and be able to say, for example: "okay you hit with X amount of force, that is within the range that we are going to accept for you to pass this test; moreover, your form was fine so you're going to pass this kata." Alternatively, if the sensors record that the student hit the Trubreak dummy very lightly, the time in between which the student hit the first, the second, the third and the fourth targets was extremely long, for example, he or she had to set up and regain his or her balance and similar adjustments because his or her form was bad, the instructor can see with extreme accuracy and chronologically where the student hit those targets, how long it took him to hit those targets, as well as the force with which he impacted those targets, the instructor can, based on this actual documented feedback, advise why the student failed the test.

Feedback Signaling

In some embodiments, there may be different apparatus inside the Trubreak invention that can give feedback. First and foremost the simplest way to do the feedback is going to be the breakable bones or breakable ligaments and tendons inside the Trubreak body. For example, the elbow. The elbow on a normal person goes to about 180° parallel to the floor and to the ceiling if one holds their arm straight out, it bends towards one on that rotation, and if one were to hyperextend this joint down he would get a hyperextension and a break at this joint where the radial and ulnar bone meet the humorous bone inside the arm. So there are bones, and an actual bunch of joints and ligaments and tendons that come together there—if one were to hyperextend, it snaps. So one form of feedback on the Trubreak dummy may be that actual snapping of the bone, set at a pressure that the user can set but defaulted to a standard pressure, but adjustable.

A second form of feedback includes using force sensors that can measure the force applied to a surface, or between almost any two surfaces and are durable enough to stand up to most environments. Such force sensing devices can be used in the Trubreak device, for example, to (i) measure relative change in force or applied load, (ii) measure rate of change in force, and (iii) measure force thresholds and trigger appropriate action.

Such sensors record an applied force, say in pounds per square inch, or Newtons per square meter. Tekscan and other force sensing manufacturers also provide a central controller or "remote brain" that allows one to have multiple Flexi-Force™ sensors throughout the Trubreak body, and send data to a connected computer. Thus, when one makes an impact an exemplary Trubreak computer program can say "you are able to hit this particular sensor with 1300 lbs. of force."

In another example, there may be provided auditory feedback. If one applies a choke to the Trubreak dummy, again it having force sensors, and one uses the neck because there are chokeable veins and arteries that run inside the neck in a human being—enabling blood to get to the brain or oxygen to get to the lungs.

So, if one applies a choke to the Trubreak dummy, on a man one can hear that it actually changes the human voice when pressure is applied to the throat. Thus, the Trubreak dummy may, in some embodiments, actually to emit a signal, such as, for example, a beep, buzz, or other sensation, that is going to allow the user to know that they're applying the choke not only properly but with enough force to actually clasp that particular target which may either be air or blood, it's the jugular vein, and although there's only a couple of ways to choke a human being there's many, many different positions to do it. Trubreak allows instantaneous feedback, and a user may apply choke pressure at full force which one may never completely to do if training with a live human being.

Global Community of Users

Various new and novel opportunities arise when numerous Trubreak dummies are deployed throughout the world. Some of these are next described.

In exemplary embodiments of the present invention, an on-line global feedback system may be provided, and accessed via one or more websites. FIG. 86 illustrates exemplary process flow at a system website and server, according to exemplary embodiments of the present invention, and FIG. 87 depicts exemplary user plans available at the exemplary system website of FIG. 86.

As can be seen with reference to FIG. 86, a user accesses the system website, and moves to a "Create Logon" screen. After inputting all of his or her relevant information, the system can assign the user to a category, and the user then logs in. Process flow from login is illustrated in the bottom of FIG. 86, where as shown, a user may view various open challenges the system supports, including various contests centered around defined challenges, which are sequences of moves. Given a user's completion of a challenge, or upon viewing a user's previously performed challenges, a user may select further training, at one of the five shown paths to "Enter Improvement Tutorial" in FIG. 86. Here is where the aggregation of data form all users, and the analytical expertise of system martial arts masters comes into play. For each type and degree of user weaknesses, or areas where he or she needs specific improvement of techniques, the Trubreak system has a tutorial, semi-custom made, for that user's problem. By signing up for the system, and uploading his or her interactions with a Trubreak dummy according to defined challenges, katas, or remote instructor guided sessions, a user's training can be tailored to specific areas he or she needs to improve upon. This is like having a personal sensei, who, using accumulated knowledge of many students, and various techniques, can diagnose errors and their causes, and take the student through precisely those exercises and assignments that will most efficiently advance their study, technique, and ultimate mastery of their martial art.

Thus, for example, a community of users, guided by the Trubreak team, can create documentation and move/exercise/sequence of moves protocol standards, and a user can connect to a Trubreak website and compare his or her results (uploaded in a common format and describing a common protocol, so all comparisons make sense, and the data may be mined in detail for patterns and indicators of both success and problems) to those of other users listed in best to worst format. For example, within a specified category, which a user may specify in a login process (such as those depicted in the top left portion of FIG. 86, following the "Create Login" process flow), the user may be queried by the system with a list of questions so as to evaluate and place the user in a "class." Once the user is registered and logged in, he or she can challenge herself to complete a series of strikes and breaks, according to various defined programs in the Trubreak system, to "compete" against other users or that user's own past performances, and compare his or her talent to that of others to obtain a martial arts benchmark.

The sequence of strikes and breaks that the user performs in each challenge can, for example, be digitally simulated, and, for example, text may be displayed instructing the user to practice the moves before they go to a "record sequence" option in the system menu. After the user performs the drill for scoring, his or her results as well as his or her competitive placement will be instantly registered so the user can see if they are in, for example, first place or $500^{th}$ place.

Additionally, as noted, the user can request to view a tutorial video, established and vetted thorough the Trubreak board, to help achieve better results in subsequent competition attempts. In some embodiments, various tutorial videos may be provided on the website, with variation in addressing or focusing on various weaknesses and areas needing improvement. The correct tutorial may be dynamically delivered based on the detailed actual results of a user's drill.

Using available sensor technology, the various mechanical apparatuses which trip upon application of actual real-world needed force, properly applied, can also be mirrored using various electronic or electromechanical sensors. Thus, as a user interacts with the actual Trubreak device, it can establish force of impact, length of time between one strike and the next strike, average power across all hits, and accuracy. By closing an open circuit, the reverse, or using various other electronics, the system can recognize a bone or joint break, cut through an organ, etc. In the mechanical dummy, the resting position of the mechanics of each target joint simulates an undamaged joint. Thus, for every mechanical break point on the training dummy or apparatus, an electronic circuit can be "broken" (either opened, closed, or other) as well, thus creating a digital footprint of every mechanical interaction possible which can be sent to the system server.

Extending Motion and Actuation Capture

In exemplary embodiments of the present invention, the actuation, motion-recognition and data capture illustrated in FIG. 85 may be integrated with the Trubreak system website described above to support remote monitoring and tutoring by a martial arts master or teacher. Using existing technologies such as Xbox connect and Wii systems already incorporate, a TB user could in effect assume a physical role with Trubreak similar to that of an avatar in a video game.

By correctly following a step of instructions given in exemplary menus on a Trubreak website, a user can appropriately configure and calibrate a smartphone camera or computer mounted or connected web camera to recognize finite motor movements.

By logging into a portal in the Trubreak website, a user may have a virtual lesson with pre-recorded videos stored and streamed, or downloadable from the Trubreak website that help the user apply better techniques. An example would look like this: a user, for example Tom, purchases a TB device and registers on the Trubreak website. Tom calibrates the motion system by following instructions of camera angles and distance as well as additional movements required by the Trubreak website. After a full calibration, Tom selects a straight punch tutorial. The motion capture sequence records Tom punching a given amount of times. By proper calibration, the Trubreak website would be able to recognize common technical errors in delivery of said strike that a novice martial artist may not be aware of. For example, not rotating the hips, raising the elbows, snapping the wrists in delivery, telegraphing before delivery and so on. The motion capture program should recognize this movement deviations and be able to playback to tom his deficiency. With a brief Trubreak website tutorial option, Tom can review his mistake(s), motion capture his corrections, and repeat his strike. He should now be able to achieve a higher level of technique based on proper technique, having been corrected by the Trubreak system.

Angles of Damage

Natural and unnatural articulation of targeted joints and bones is important to training engagements. In order for the user to properly execute a hyper extension, he or she must be knowledgeable in the parameters of the Range of Motion ("ROM") of said joint as well as the understanding of how to apply maximum leverage to the target.

An example of this would be the human elbow joint. On average, the arm can be extended to a horizontal plane without discomfort or stress to the fulcrum at the elbow. Visually, if you stand between two beams, about 6.5 feet apart, and try to push your palms flat against each beam, your arms would be at their maximum average angle. This looks like this "----", essentially arms extended straight outwards to each side, and for explanation purposes we refer to that angle as "0" degrees. Additionally the arm can bend to an angle where the palm is close to, or even pressing against, the bicep muscle, as if one were doing a weight lifting exercise called a bicep curl. For this illustration that angle should be 90 to 135 degrees.

Although damage can occur by pressing the targeted joint in the direction of its normal range of motion ("ROM"), with enough force and exaggerated degree of rotation, the TB system will focus on hyperextension (see FIG. 67, for example) and not hypo-extension. Thus, hyperextended damage would occur when the fulcrum is directed, at its apex, in a negative ROM. This degree of attack usually occurs at as little as −5 degrees. I.e., when someone bends your arm so that your elbow extends against its normal ROM, and an angle greater than 180 degrees is made between your upper and lower arms (humerus and ulna) so that your elbow is strained.

A good example of this functionality is when you are trying to snap a stick over your knee. The elbow would be the middle of the stick; by pressing the two ends of the stick shapely and forcefully against the knee you most likely create a hyper extension of the connective bark and wood (analogous to bones and connective tissue) resulting in catastrophic damage. The stick, when simultaneously pressed at its ends, usually flexes until it snaps. Human bones and joints have significantly less flexibility than a stick, so damage would occur much more quickly.

Thus, in exemplary embodiments of the present invention, the TB system can be set up such that target joints may only be broken when the user applies proper force, speed, and as explained in the above illustrations, the force is applied at the proper angle.

Exemplary Materials

Any simulated skin used in motion picture special effects could be a close comparison to the "skin" used in the TB system. Most training dummies use a silicone/rubber mix that is proprietary to that particular training dummy. The TB system can, for example, incorporate a skin thickness of from ⅛ inch to 1 inch at specific points in the mold to allow for greater timeline wear and realism. The skin on the fingers would generally be less thick than the skin on the thigh but finger and facial skin thickness would be close. As noted above, the simulation skin could be a silicon and rubber mix with added color dyes for complexion variations at user requests as well as additional mixtures for hypoallergenic properties.

Bones would be made of materials ranging from a 6/6 nylon blend, 3D printer resin, rubber, aluminum or other metals, steel, or injection molded proprietary blends of any above combination.

The breakable joints in the TB system will be formed from any of the above mentioned materials as well as titanium, brass, copper, and other resins and alloys.

Fillers that would represent the internal mass of the TB would be a foam or gel material, expandable insulator, rubber or silicon. Based in user requests, we could increase or decrease the weight of TB by using materials with higher or lower density. For example, if a user wanted a 100 lb TB we might fill the cavities with a heavier gel rather than a light expandable foam. Specific weight targets can be achieved easily with this fill combination capability.

The skin and organs, made, for example, from the blend discussed above may, for example, be manufactured to be buttoned, zipped, stretched over like a glove, adhered, attached by Velcro™, or permanently fixed to the skeleton of the system based on user requests.

All current conventional training dummies have a seam where the molds are melted together. Currently, if a patch of skin is damaged, and a user is forced to work with it in its damaged state, he or she may perform a quick "bandaid" repair using duct tape, or be forced to purchase a new system. In stark contrast, in exemplary embodiments of the present invention, Trubreak devices will have repairable skin patches that can fill a damaged area by injecting a liquid skin and letting it dry, or replacing an area with a skin patch.

Exemplary Equation to Determine Force

The peak stress of 92 Newton-meters (Nm) torque on the distal humerus bone was used to theorize the average break point of the "elbow." It is noted that Torque (T) in Newton-meters (Nm)=radius (r) of the lever×force on end of lever (F), where "×" denotes a vector cross-product, which is simply the multiplication of r and F where r is perpendicular to the moment arm of force F. Thus, T=r×F. Given that the average length of the human elbow to the wrist is 0.33 meters or 1.1 feet long, the torsional strength of the humerus bone (TsH) may therefore be calculated at 92 Nm/0.48 because the humerus is a class 3 lever. This equals about 192 Nm. Thus, T=TsH=192 Nm=0.33 m×F. Now 192 Nm/0.33 m=581 newtons or about 131 pounds of force. Thus, it can be assumed that about 131 pounds of force is needed, and it must be applied in a quick snapping motion that would not allow for ligament and tendon stretching, to snap the elbow. This value can be used to set the simulated elbow in Trubreak dummies.

Similarly, the same equation could be used for the knee. However, this is, by comparison a much larger joint. However, where the elbow peak bending moment ("PBM") before breakage was 92 Nm, that of the knee is usually not much higher—knee PBM before break point is 108 Nm. In fact, only 16 Nm higher for a much larger bone/tissue connection. Thus, in exemplary embodiments of the present invention, Trubreak will be adjustable but will most likely have a starting point closer to the maximum break points rather than at the lower end. Adjustments would thus increase the difficulty past human averages to engage the user in more challenging training opportunities.

It is noted that in addition to the various technologies noted above for simulating broken bones and joints, bellcranks may also be used. A bellcrank is a type of crank that changes motion through an angle. The angle can be any angle from 0 to 360 degrees, but 90 degrees and 180 degrees are most common.

Examples not Limiting; Exemplary Systems and Software Implementations

It is understood that the description of various exemplary embodiments as provided above are merely illustrative, and understood to not mandate, or limit, any particular attribute, element, or specific combination of elements. Various TB dummies, and interactive elements thereof, as well as compatible accessories, such as simulated weapons and data acquisition and transmission systems, may be built or configured in numerous "mix and match" combinations of the above disclosed examples and elements. All of which are within the scope of the present invention.

As regards system software, and dummy control and data acquisition systems, in exemplary embodiments of the present invention, any suitable programming language may be used to implement the routines of particular embodiments of the present invention including C, C++, Java, JavaScript, Python, Ruby, CoffeeScript, assembly language, etc. Different programming techniques may be employed such as procedural or object oriented. The routines may execute on a single processing device or multiple processors. Although the steps, operations, or computations may be presented in a specific order, this order may be changed in different particular embodiments. In some particular embodiments, multiple steps shown as sequential in this specification may be performed at the same time Particular embodiments may be implemented in a computer-readable storage device or non-transitory computer readable medium for use by or in connection with the instruction execution system, apparatus, system, or device. This may be true in either a transmission end device (e.g., pre-processor, aggregator, etc.) or a receiver, for example. Particular embodiments may be implemented in the form of control logic in software or hardware or a combination of both. The control logic, when executed by one or more processors, may be operable to perform that which is described in particular embodiments.

Particular embodiments may be implemented by using one or more programmed general purpose digital computers, by using application specific integrated circuits, programmable logic devices, field programmable gate arrays, optical, chemical, biological, quantum or nano-engineered systems, components and mechanisms may be used. In general, the functions of particular embodiments may be achieved by any means as is known in the art. Distributed, networked systems, components, and/or circuits may be used. Communication, or transfer, of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that may be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It will thus be seen that the objects set forth above, among those made apparent from the preceding description, are efficiently attained, and since certain changes may be made in the above processes and constructions without departing from the spirit and scope of the invention, it is intended that all matter contained in the above description or shown in the accompanying drawings shall be interpreted as illustrative and not in a limiting sense.

What is claimed:

1. A training device, comprising:
   a set of artificial human body parts, including one or more of an anatomically correct as to shape, size and weight: head, neck, leg, arm, hand, foot or torso,
   each artificial human body part including a covering of simulated human skin correct as to thickness and density,
   wherein at least one of the artificial body parts includes at least one of:
      a simulated joint to hyperextend and snap upon receipt of an accurate hyperextension force; or
      a simulated bone to break upon receipt of an accurate breaking force,
   the simulated joint or simulated bone to be reset to its original unsnapped or unbroken state to engage the device repeatedly.

2. The device of claim 1, wherein at least one of the set of anatomically correct artificial body parts comprises at least one force sensor arranged to measure at least one of an impact force or a torque delivered by a user.

3. The device of claim 1, wherein at least one of the anatomically correct body parts comprises a puncturable artificial blood vessel.

4. The device of claim 1, comprising two arms, two hands, two legs, two feet, a head, a neck and a torso, assembled to have the form and weight of an adult human.

5. The device of claim 1, the torso further comprising at least one artificial internal organ, to, upon application of appropriate force at an appropriate direction to the torso, puncture and simulate at least one of bleeding or leakage of bodily fluids.

6. The device of claim 2, further comprising a compatible simulated weapon itself provided with sensors to read contact points on the training device, and also provided with triggering elements arranged to activate sensors on the device under defined useparameters.

7. The device of claim 5, the at least one artificial internal organ further to:
   once punctured, be resealed and repaired for repeated use.

8. The device of claim 1, further comprising a set of sensors placed at one or more positions on at least one of the artificial human body parts, and a data acquisition device, which records all forces sensed by the set of sensors during a defined time interval.

9. The device of claim 8, further comprising a communications module arranged to transmit in real time the force sensor data directly or remotely.

10. The device of claim 8, wherein each of the sensors acquires both actual force applied and angle of application of said force.

11. The device of claim 1, wherein at least one of:
each neck, leg, arm, hand and foot in the set of artificial body parts is provided with one or more joints, to be set at a variety of specific angles and positions;
or
at least one of the artificial body parts includes one of a simulated muscle tissue, connective tissue, organ, blood vessels or nerve.

12. The device of claim 1, further comprising a data recording device or similar component to recognize a user and their physical movements, and record interaction data.

13. A training system, comprising:
the device of claim 8;
a recording device to record user interactions with the device; and
a remote instructor interface communicably connected to each of the device and the webcam or recording device, to send user interaction data to a remote instructor.

14. The training system of claim 13, wherein the recording apparatus is integrated in the device.

15. The training system of claim 13, wherein the user interaction data includes sensor readings associated with a user's physical interactions with the device.

16. The training system of claim 13, further comprising a communications module, to receive instructor comments from a remote location.

17. The training system of claim 13, wherein the recording device includes an image acquisition module separate from the device, placed so as to view the user-device interaction in a calibration operation.

18. The device of claim 1, wherein the set of artificial body parts is also anatomically correct as to range of motion.

19. A training device, comprising:
a set of artificial human body parts, including one or more of an anatomically correct as to shape, size and weight: head, neck, leg, arm, hand, foot or torso,
wherein each artificial human body part includes a covering of simulated human skin correct as to thickness and density.

20. The training device of claim 19, wherein one or more of the artificial body parts includes at least one of:
a simulated joint to hyperextend and snap upon receipt of an accurate hyperextension force; or
a simulated bone to break upon receipt of an accurate breaking force, the simulated joint or simulated bone to be reset to its original unsnapped or unbroken state to engage the device repeatedly.

21. A training device, comprising:
a set of artificial human body parts, including one or more of an anatomically correct as to shape, size and weight:
head, neck, leg, arm, hand, foot or torso,
wherein at least one of the artificial body parts includes at least one of:
a simulated joint to hyperextend and snap upon receipt of an accurate hyperextension force; or
a simulated bone to break upon receipt of an accurate breaking force, the simulated joint or simulated bone to be reset to its original unsnapped or unbroken state to engage the device repeatedly.

* * * * *